United States Patent
Li et al.

(10) Patent No.: US 10,462,761 B2
(45) Date of Patent: Oct. 29, 2019

(54) METHOD AND SS BLOCK TIME LOCATIONS AND SS BURST SET COMPOSITION FOR NR UNLICENSED SPECTRUM

(71) Applicant: Samsung Electronics Co., Ltd., Suwon-si, Gyeonggi-do (KR)

(72) Inventors: Yingzhe Li, Mountain View, CA (US); Hongbo Si, Plano, TX (US); Le Liu, Fremont, CA (US); Young-Han Nam, Plano, TX (US); Hao Chen, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/041,198

(22) Filed: Jul. 20, 2018

(65) Prior Publication Data
US 2019/0037509 A1    Jan. 31, 2019

Related U.S. Application Data

(60) Provisional application No. 62/536,721, filed on Jul. 25, 2017, provisional application No. 62/552,137, filed on Aug. 30, 2017, provisional application No. 62/569,922, filed on Oct. 9, 2017, provisional application No. 62/575,783, filed on Oct. 23, 2017, provisional application No. 62/609,684, filed on Dec. 22, 2017, provisional application No. 62/671,740, (Continued)

(51) Int. Cl.
*H04W 56/00* (2009.01)
*H04W 72/04* (2009.01)
*H04W 74/08* (2009.01)

(52) U.S. Cl.
CPC ..... *H04W 56/001* (2013.01); *H04W 72/0406* (2013.01); *H04W 74/0808* (2013.01)

(58) Field of Classification Search
None
See application file for complete search history.

(56) References Cited

U.S. PATENT DOCUMENTS

| 8,462,688 B1 | 6/2013 | Dinan |
| 2003/0095538 A1 | 5/2003 | Kayama et al. |
| 2009/0016263 A1 | 1/2009 | Kishigami et al. |

(Continued)

OTHER PUBLICATIONS

ISA/KR, "International Search Report and Written Opinion of the International Searching Authority," International Application No. PCT/KR2018/008443, dated Nov. 27, 2018, 13 pages.

(Continued)

*Primary Examiner* — Kevin D Mew

(57) ABSTRACT

A user equipment (UE) for receiving control signals in a wireless communication system is provided. The UE comprises receiving, from a base station (BS), at least one synchronization signal/physical broadcast channel block (SSB) included in a set of SSBs over downlink channels, determining a subcarrier spacing (SCS) associated with the at least one SSB included in the set of SSBs based on a carrier frequency range, determining the at least one SSB included in the set of SSBs comprising a plurality of symbols in a time domain; and determining a starting time and a transmission duration for the at least one SSB included in the set of SSBs.

20 Claims, 54 Drawing Sheets

Related U.S. Application Data filed on May 15, 2018, provisional application No. 62/693,731, filed on Jul. 3, 2018.

(56) References Cited

U.S. PATENT DOCUMENTS

| | | | |
|---|---|---|---|
| 2009/0196249 | A1 | 8/2009 | Kawamura et al. |
| 2012/0322492 | A1 | 12/2012 | Koo et al. |
| 2017/0325260 | A1* | 11/2017 | Guo .................. H04L 5/0007 |
| 2017/0353257 | A1* | 12/2017 | Islam ................ H04J 3/0617 |
| 2018/0070341 | A1* | 3/2018 | Islam ................ H04L 1/1887 |
| 2018/0262313 | A1* | 9/2018 | Nam ................. H04L 5/0053 |
| 2018/0287840 | A1* | 10/2018 | Akkarakaran ...... H04L 27/2613 |
| 2018/0338271 | A1* | 11/2018 | Park ................. H04W 36/0083 |
| 2018/0367985 | A1* | 12/2018 | Novlan ............... H04W 8/22 |
| 2019/0029040 | A1* | 1/2019 | Sun .................. H04B 7/0413 |
| 2019/0037481 | A1* | 1/2019 | Zhang ............... H04W 48/16 |
| 2019/0150198 | A1* | 5/2019 | Sun .................. H04L 1/0068 |

OTHER PUBLICATIONS

"3rd Generation Partnership Project; Technical Specification Group Radio Access Network; Evolved Universal Terrestrial Radio Access (E-UTRA); Physical Channels and Modulation (Release 13)," 3GPP TS 36.211, V13.2.0, Jun. 2016, 168 pages.

"3rd Generation Partnership Project; Technical Specification Group Radio Access Network; Evolved Universal Terrestrial Radio Access (E-UTRA); Multiplexing and Channel Coding (Release 13)," 3GPP TS 36.212, V13.2.0, Jun. 2016, 140 pages.

"3rd Generation Partnership Project; Technical Specification Group Radio Access Network; Evolved Universal Terrestrial Radio Access (E-UTRA); Physical Layer Procedures (Release 13)," 3GPP TS 36.321, V13.2.0, Jun. 2016, 381 pages.

"3rd Generation Partnership Project; Technical Specification Group Radio Access Network; Evolved Universal Terrestrial Radio Access (E-UTRA); Medium Access Control (MAC) Protocol Specification (Release 13)," 3GPP TS 36.321, V13.2.0, Jun. 2016, 91 pages.

"3rd Generation Partnership Project; Technical Specification Group Radio Access Network; Evolved Universal Terrestrial Radio Access (E-UTRA); Radio Resource Control (RRC) Protocol Specification (Release 13)," 3GPP TS 36.331, V13.2.0, Jun. 2016, 623 pages.

"3rd Generation Partnership Project; Technical Specification Group Radio Access Network; NR; Physical Layer Procedures for Control (Release 15)," 3GPP TS 38.213, V15.2.0, Jun. 2018, 98 pages.

* cited by examiner

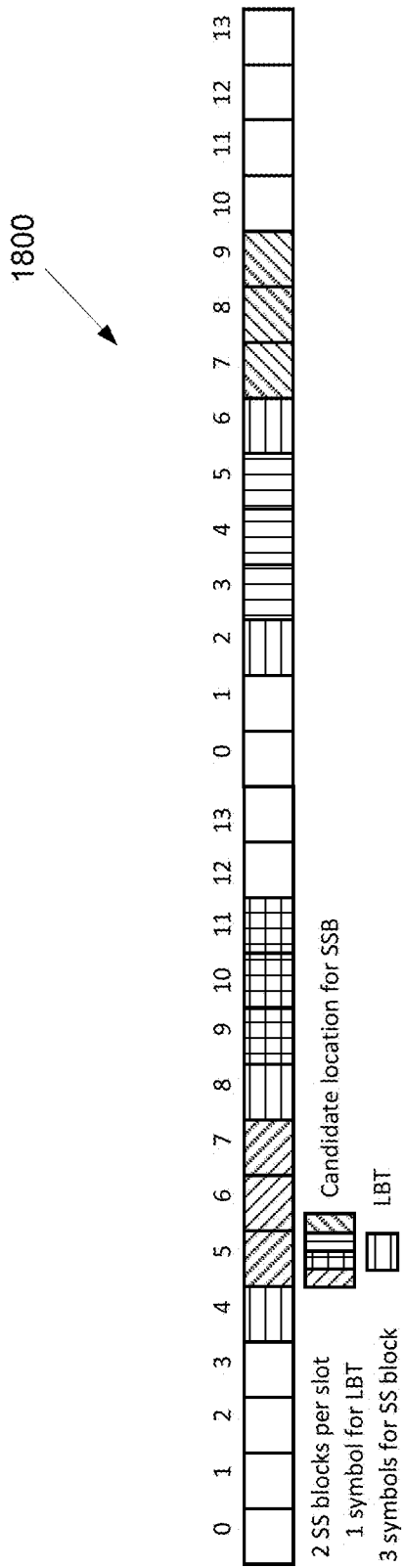
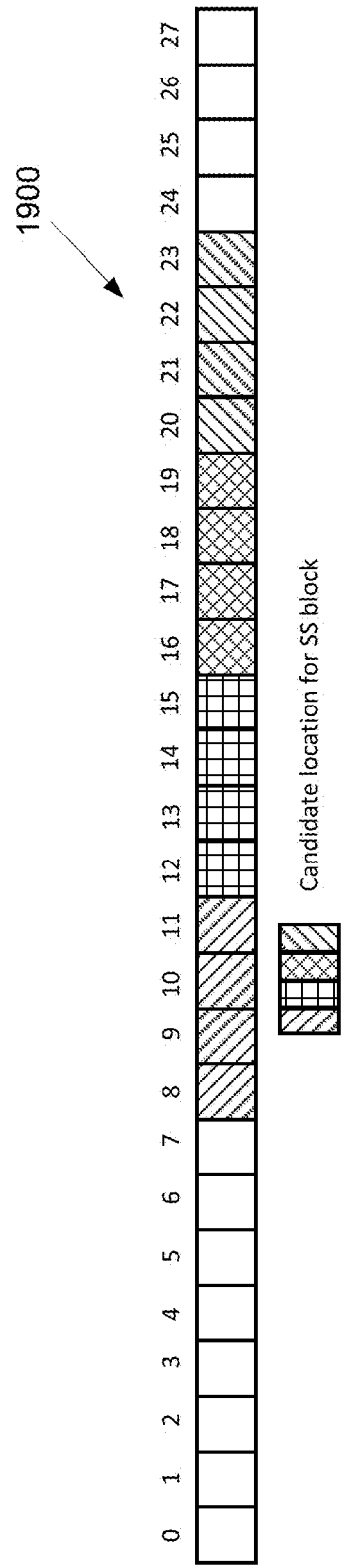
FIG. 18
FIG. 19

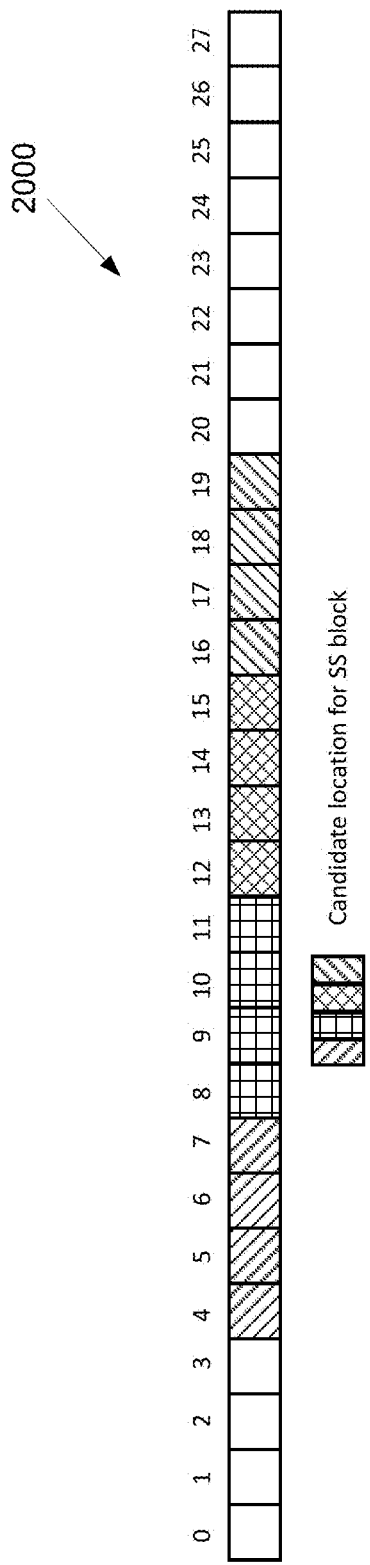
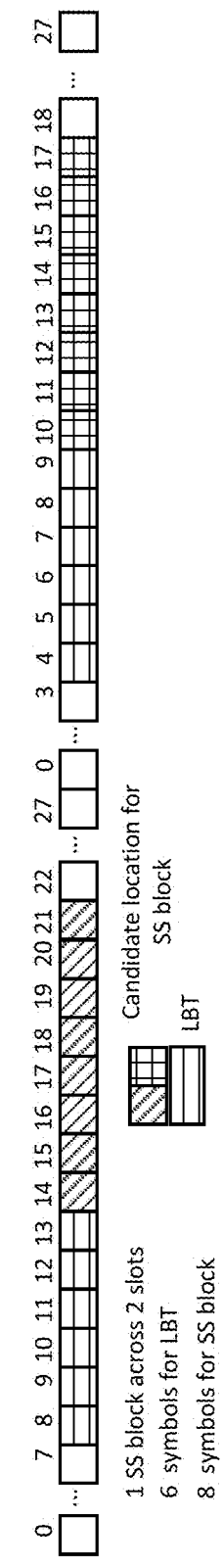
FIG. 20
FIG. 21

METHOD AND SS BLOCK TIME LOCATIONS AND SS BURST SET COMPOSITION FOR NR UNLICENSED SPECTRUM

CROSS-REFERENCE TO RELATED APPLICATION(S) AND CLAIM OF PRIORITY

The present application claims priority to:
U.S. Provisional Patent Application Ser. No. 62/536,721, filed on Jul. 25, 2017;
U.S. Provisional Patent Application Ser. No. 62/552,137, filed on Aug. 30, 2017;
U.S. Provisional Patent Application Ser. No. 62/569,922, filed on Oct. 9, 2017;
U.S. Provisional Patent Application Ser. No. 62/575,783, filed on Oct. 23, 2017;
U.S. Provisional Patent Application Ser. No. 62/609,684, filed on Dec. 22, 2017;
U.S. Provisional Patent Application Ser. No. 62/671,740, filed on May 15, 2018; and
U.S. Provisional Patent Application Ser. No. 62/693,731, filed on Jul. 3, 2018.
The content of the above-identified patent documents is incorporated herein by reference.

TECHNICAL FIELD

The present disclosure relates generally to wireless communication systems and, more specifically, to SS block time locations and SS burst set composition in an advanced wireless communication system.

BACKGROUND

In a wireless communication network, a network access and a radio resource management (RRM) are enabled by physical layer synchronization signals and higher (MAC) layer procedures. In particular, a UE attempts to detect the presence of synchronization signals along with at least one cell identification (ID) for initial access. Once the UE is in the network and associated with a serving cell, the UE monitors several neighboring cells by attempting to detect their synchronization signals and/or measuring the associated cell-specific reference signals (RSs). For next generation cellular systems such as third generation partnership-new radio access or interface (3GPP-NR), efficient and unified radio resource acquisition or tracking mechanism which works for various use cases such as enhanced mobile broadband (eMBB), ultra reliable low latency (URLLC), massive machine type communication (mMTC), each corresponding to a different coverage requirement and frequency bands with different propagation losses is desirable. Most likely designed with a different network and radio resource paradigm, seamless and low-latency RRM is also desirable.

SUMMARY

Embodiments of the present disclosure provide an NR-SS burst set design in an advanced wireless communication system.

In one embodiment, a user equipment (UE) for receiving control signals in a wireless communication system is provided. The UE includes a transceiver configured to receive, from a base station (BS), at least one synchronization signal/physical broadcast channel block (SSB) included in a set of SSBs over downlink channels. The UE further includes at least one processor operably connected to the transceiver, the at least one processor configured to: determine a subcarrier spacing (SCS) associated with the at least one SSB included in the set of SSBs based on a carrier frequency range; determine the at least one SSB included in the set of SSBs comprising a plurality of symbols in a time domain; and determine a starting time and a transmission duration for the at least one SSB included in the set of SSBs.

In another embodiment, a base station (BS) for transmitting control signals in a wireless communication system is provided, the BS includes at least one processor configured to: determine a subcarrier spacing (SCS) for a set of synchronization signal/physical broadcast channel blocks (SSBs) based on a carrier frequency range; generate the set of SSBs comprising a plurality of symbols in a time domain using the determined SCS; determine a transmission window associated with the set of SSBs in the time domain, wherein the set of SSBs is confined in the transmission window; and determine a starting time and a transmission duration for each SSB of the set of SSBs that is confined in the transmission window. The BS further includes a transceiver operably connected to the at least one processor, the transceiver configured to transmit, to a user equipment (UE), the set of SSBs at the determined starting time and with the determined transmission duration over downlink channels.

In yet another embodiment, a method of a base station (BS) for transmitting control signals in a wireless communication system is provided, the method comprises determining a subcarrier spacing (SCS) for a set of synchronization signal/physical broadcast channel blocks (SBBs) based on a carrier frequency range; generating the set of SSBs comprising a plurality of symbols in a time domain using the determined SCS; determining a transmission window associated with the set of SSBs in the time domain, wherein the set of SSBs is confined in the transmission window; determining a starting time and a transmission duration for each SSB of the set of SSBs that is confined in the transmission window; and transmitting, to a user equipment (UE), the set of SSBs at the determined starting time and with the determined transmission duration over downlink channels.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 18 illustrates yet another example SS/PBCH block mapping according to embodiments of the present disclosure;

FIG. 19 illustrates yet another example SS/PBCH block mapping according to embodiments of the present disclosure;

FIG. 20 illustrates yet another example SS/PBCH block mapping according to embodiments of the present disclosure;

FIG. 21 illustrates yet another example SS/PBCH block mapping according to embodiments of the present disclosure;

DETAILED DESCRIPTION

FIG. 1 through FIG. 51, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents and standards descriptions are hereby incorporated by reference into the present disclosure as if fully set forth herein: 3GPP TS 36.211 v13.2.0, "E-UTRA, Physical channels and modulation;" 3GPP TS 36.212 v13.2.0, "E-UTRA, Multiplexing and Channel coding;" 3GPP TS 36.213 v13.2.0, "E-UTRA, Physical Layer Procedures;" 3GPP TS 36.321 v13.2.0, "E-UTRA, Medium Access Control (MAC) protocol specification;" 3GPP TS 36.331 v13.2.0, "E-UTRA, Radio Resource Control (RRC) protocol specification;" and 3GPP TS 38.213, "NR; Physical layer procedures for control."

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system."

The 5G communication system is considered to be implemented in higher frequency (mmWave) bands, e.g., 60 GHz bands, so as to accomplish higher data rates. To decrease propagation loss of the radio waves and increase the transmission coverage, the beamforming, massive multiple-input multiple-output (MIMO), full dimensional MIMO (FD-MIMO), array antenna, an analog beam forming, large scale antenna techniques and the like are discussed in 5G communication systems.

In addition, in 5G communication systems, development for system network improvement is under way based on advanced small cells, cloud radio access networks (RANs), ultra-dense networks, device-to-device (D2D) communication, wireless backhaul communication, moving network, cooperative communication, coordinated multi-points (CoMP) transmission and reception, interference mitigation and cancellation and the like.

In the 5G system, hybrid frequency shift keying and quadrature amplitude modulation (FQAM) and sliding window superposition coding (SWSC) as an adaptive modulation and coding (AMC) technique, and filter bank multi carrier (FBMC), non-orthogonal multiple access (NOMA), and sparse code multiple access (SCMA) as an advanced access technology have been developed.

Figure 1:
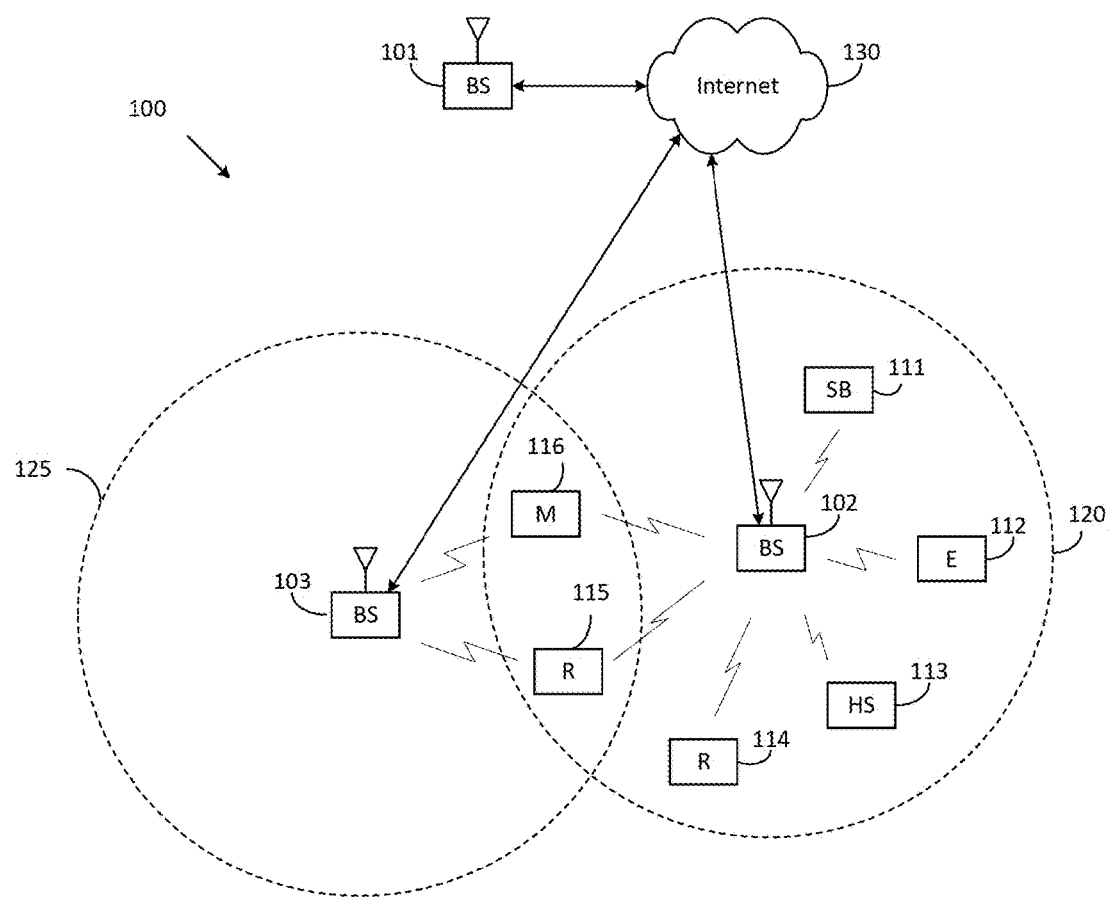
FIG. 1 illustrates an example wireless network according to embodiments of the present disclosure.
Figure 2:
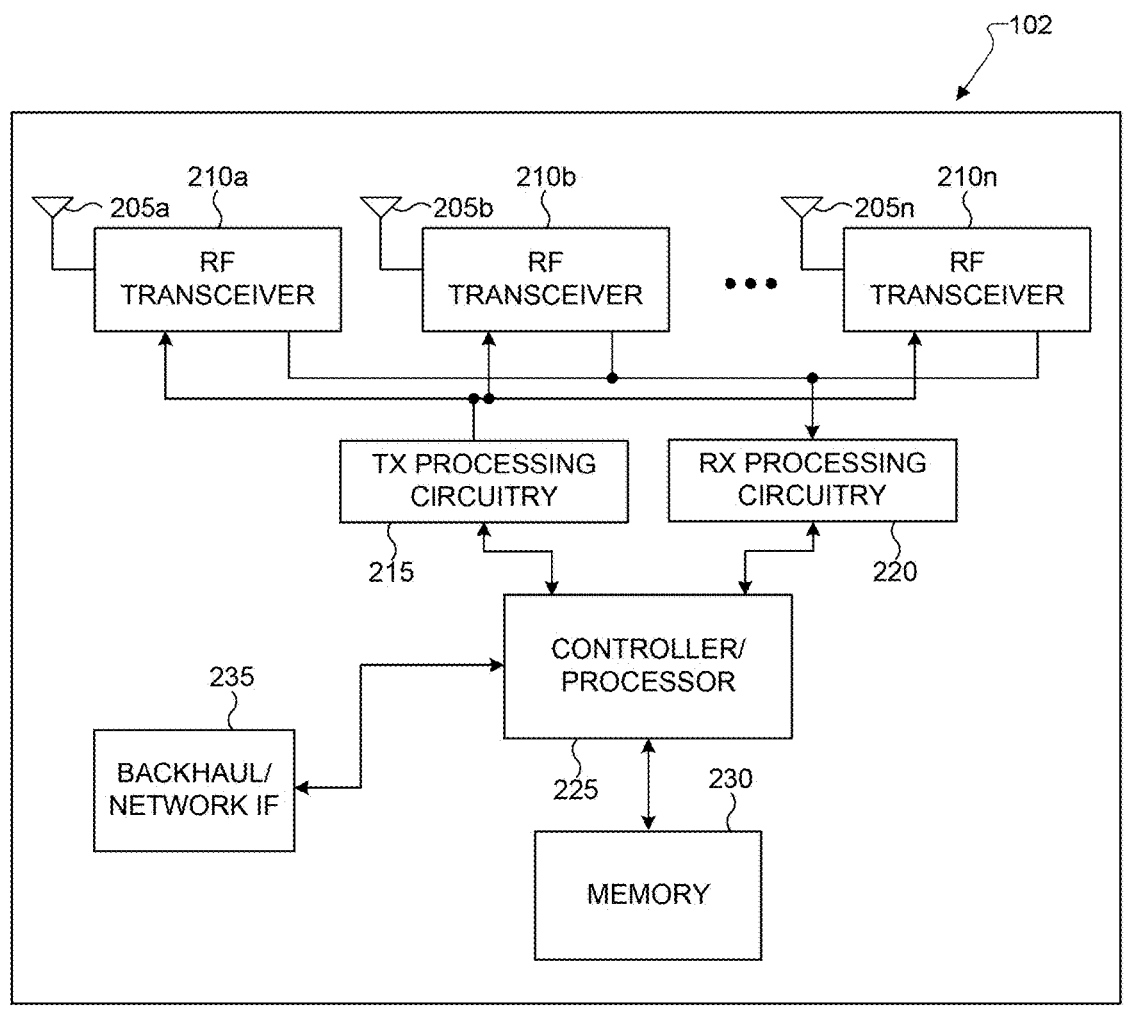
FIG. 2 illustrates an example eNB according to embodiments of the present disclosure.
Figure 3:
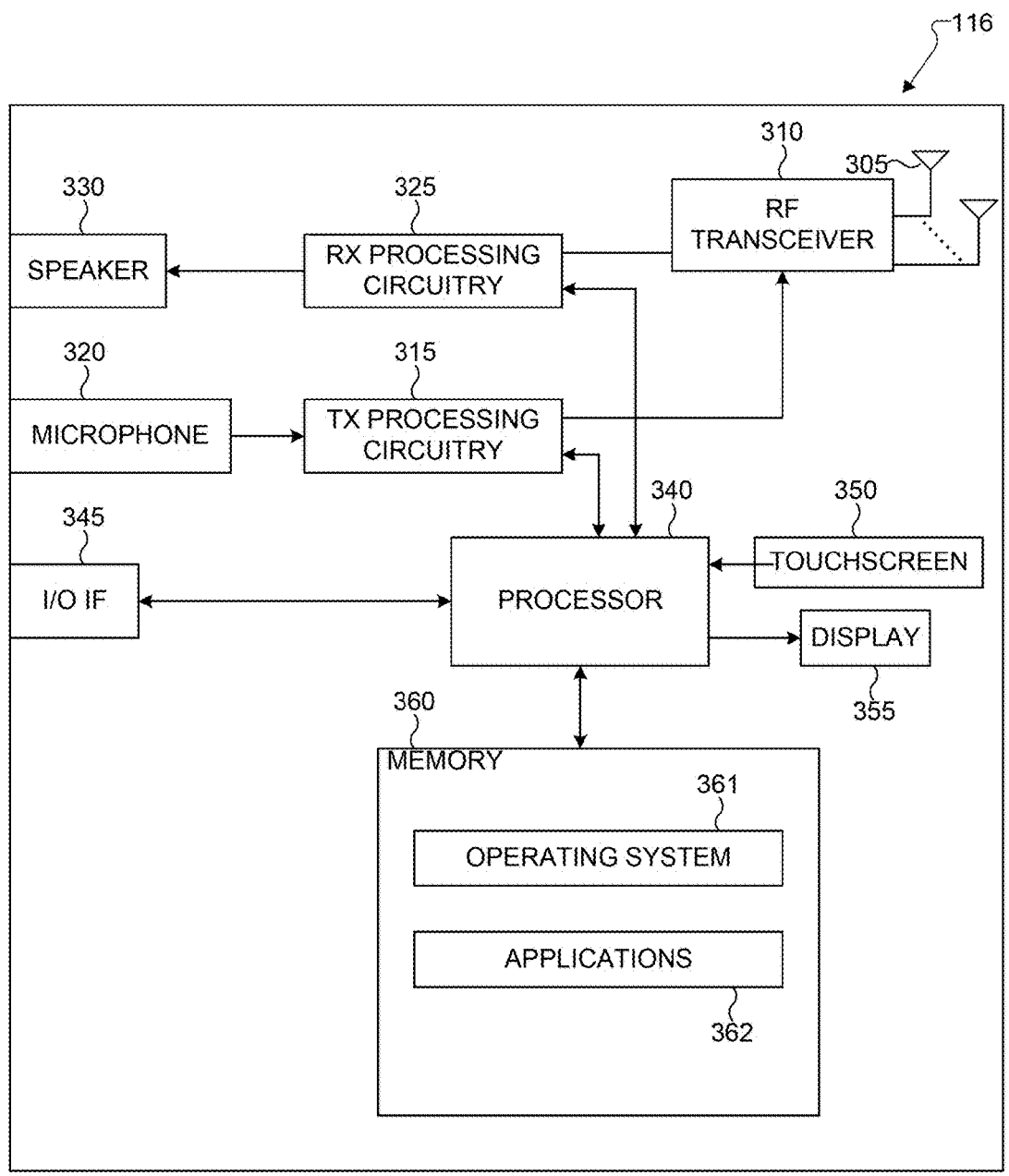
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes an eNB 101, an eNB 102, and an eNB 103. The eNB 101 communicates with the eNB 102 and the eNB 103. The eNB 101 also communicates with at least one network 130, such as the Internet, a proprietary Internet Protocol (IP) network, or other data network.

The eNB 102 provides wireless broadband access to the network 130 for a first plurality of user equipments (UEs) within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, one or more of the UEs 111-116 include circuitry, programming, or a combination thereof, for efficient SS block time locations and SS burst set composition in an advanced wireless communication system. In certain embodiments, and one or more of the eNBs 101-103 includes circuitry, programming, or a combination thereof, for receiving efficient SS block time locations and SS burst set composition in an advanced wireless communication system.

Although FIG. 1 illustrates one example of a wireless network, various changes may be made to FIG. 1. For example, the wireless network could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNBs 101, 102, and/or 103 could provide access to other or additional external networks, such as external telephone networks or other types of data networks.

FIG. 2 illustrates an example eNB 102 according to embodiments of the present disclosure. The embodiment of the eNB 102 illustrated in FIG. 2 is for illustration only, and the eNBs 101 and 103 of FIG. 1 could have the same or similar configuration. However, eNBs come in a wide variety of configurations, and FIG. 2 does not limit the scope of this disclosure to any particular implementation of an eNB.

As shown in FIG. 2, the eNB 102 includes multiple antennas 205a-205n, multiple RF transceivers 210a-210n, transmit (TX) processing circuitry 215, and receive (RX) processing circuitry 220. The eNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the eNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the eNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the eNB 102 to communicate with other devices or systems over a backhaul connection or over a network. The interface 235 could support communications over any suitable wired or wireless connection(s). For example, when the eNB 102 is implemented as part of a cellular communication system (such as one supporting 5G, LTE, or LTE-A), the interface 235 could allow the eNB 102 to communicate with other eNBs over a wired or wireless backhaul connection. When the eNB 102 is implemented as an access point, the interface 235 could allow the eNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of eNB 102, various changes may be made to FIG. 2. For example, the eNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the eNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by an eNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for CSI reporting on PUCCH. The processor 340 can move data into or out of the memory 360 as required by an executing process. In some embodiments, the processor 340 is configured to execute the applications 362 based on the OS 361 or in response to signals received from eNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
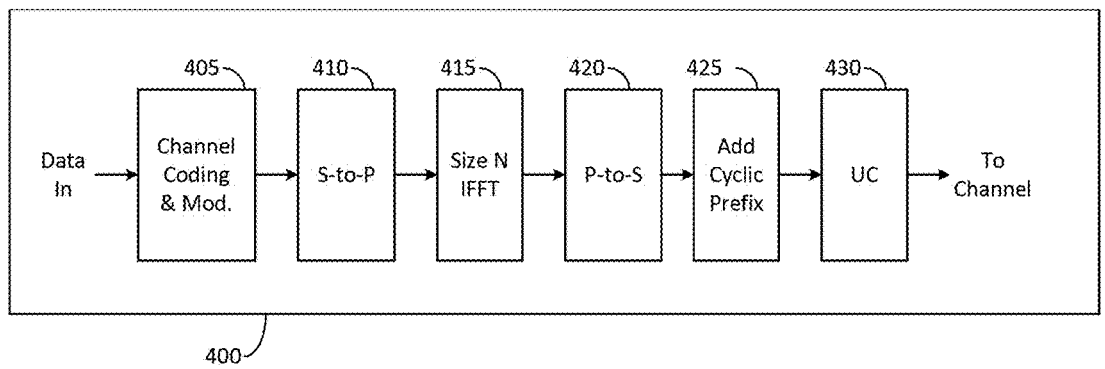
FIG. 4A illustrates a high-level diagram of an orthogonal frequency division multiple access transmit path according to embodiments of the present disclosure.
Figure 4B:
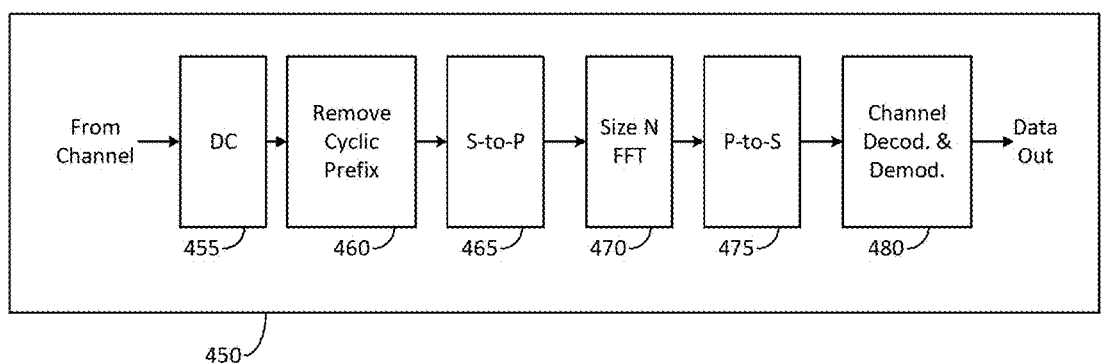
FIG. 4B illustrates a high-level diagram of an orthogonal frequency division multiple access receive path according to embodiments of the present disclosure.

FIG. 4A is a high-level diagram of transmit path circuitry. For example, the transmit path circuitry may be used for an orthogonal frequency division multiple access (OFDMA) communication. FIG. 4B is a high-level diagram of receive path circuitry. For example, the receive path circuitry may be used for an orthogonal frequency division multiple access (OFDMA) communication. In FIGS. 4A and 4B, for downlink communication, the transmit path circuitry may be implemented in a base station (eNB) 102 or a relay station, and the receive path circuitry may be implemented in a user equipment (e.g. user equipment 116 of FIG. 1). In other examples, for uplink communication, the receive path circuitry 450 may be implemented in a base station (e.g. eNB 102 of FIG. 1) or a relay station, and the transmit path circuitry may be implemented in a user equipment (e.g. user equipment 116 of FIG. 1).

Transmit path circuitry comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A 400 and 4B 450 may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and may not be construed to limit the scope of the disclosure. It may be appreciated that in an alternate embodiment of the present disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at UE 116 after passing through the wireless channel, and reverse operations to those at eNB 102 are performed. Down-converter 455 down-converts the received signal to baseband frequency, and remove cyclic prefix block 460 removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of eNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to eNBs 101-103 and may implement a receive path corresponding to the architecture for receiving in the downlink from eNBs 101-103.

5G communication system use cases have been identified and described. Those use cases can be roughly categorized into three different groups. In one example, enhanced mobile broadband (eMBB) is determined to do with high bits/sec requirement, with less stringent latency and reliability requirements. In another example, ultra reliable and low latency (URLL) is determined with less stringent bits/sec requirement. In yet another example, massive machine type communication (mMTC) is determined that a number of devices can be as many as 100,000 to 1 million per km2, but the reliability/throughput/latency requirement could be less stringent. This scenario may also involve power efficiency requirement as well, in that the battery consumption should be minimized as possible.

A communication system includes a Downlink (DL) that conveys signals from transmission points such as Base Stations (BSs) or NodeBs to User Equipments (UEs) and an Uplink (UL) that conveys signals from UEs to reception points such as NodeBs. A UE, also commonly referred to as a terminal or a mobile station, may be fixed or mobile and may be a cellular phone, a personal computer device, or an automated device. An eNodeB, which is generally a fixed station, may also be referred to as an access point or other equivalent terminology. For LTE systems, a NodeB is often referred as an eNodeB.

In a communication system, such as LTE system, DL signals can include data signals conveying information content, control signals conveying DL control information (DCI), and reference signals (RS) that are also known as pilot signals. An eNodeB transmits data information through a physical DL shared channel (PDSCH). An eNodeB transmits DCI through a physical DL control channel (PDCCH) or an Enhanced PDCCH (EPDCCH).

An eNodeB transmits acknowledgement information in response to data transport block (TB) transmission from a UE in a physical hybrid ARQ indicator channel (PHICH). An eNodeB transmits one or more of multiple types of RS including a UE-common RS (CRS), a channel state information RS (CSI-RS), or a demodulation RS (DMRS). A CRS is transmitted over a DL system bandwidth (BW) and can be used by UEs to obtain a channel estimate to demodulate data or control information or to perform measurements. To reduce CRS overhead, an eNodeB may transmit a CSI-RS with a smaller density in the time and/or frequency domain than a CRS. DMRS can be transmitted only in the BW of a respective PDSCH or EPDCCH and a UE can use the DMRS to demodulate data or control information in a PDSCH or an EPDCCH, respectively. A transmission time interval for DL channels is referred to as a subframe and can have, for example, duration of 1 millisecond.

DL signals also include transmission of a logical channel that carries system control information. A BCCH is mapped to either a transport channel referred to as a broadcast channel (BCH) when the DL signals convey a master information block (MIB) or to a DL shared channel (DL-SCH) when the DL signals convey a System Information Block (SIB). Most system information is included in different SIBs that are transmitted using DL-SCH. A presence of system information on a DL-SCH in a subframe can be indicated by a transmission of a corresponding PDCCH conveying a codeword with a cyclic redundancy check (CRC) scrambled with special system information RNTI (SI-RNTI). Alternatively, scheduling information for a SIB transmission can be provided in an earlier SIB and scheduling information for the first SIB (SIB-1) can be provided by the MIB.

DL resource allocation is performed in a unit of subframe and a group of physical resource blocks (PRBs). A transmission BW includes frequency resource units referred to as resource blocks (RBs). Each RB includes $N_{sc}^{RB}$ sub-carriers, or resource elements (REs), such as 12 REs. A unit of one RB over one subframe is referred to as a PRB. A UE can be allocated $M_{PDSCH}$ RBs for a total of $M_{sc}^{PDSCH} = M_{PDSCH} \cdot N_{sc}^{RB}$ REs for the PDSCH transmission BW.

UL signals can include data signals conveying data information, control signals conveying UL control information (UCI), and UL RS. UL RS includes DMRS and Sounding RS (SRS). A UE transmits DMRS only in a BW of a respective PUSCH or PUCCH. An eNodeB can use a DMRS to demodulate data signals or UCI signals. A UE transmits SRS to provide an eNodeB with an UL CSI. A UE transmits data information or UCI through a respective physical UL shared channel (PUSCH) or a Physical UL control channel (PUCCH). If a UE needs to transmit data information and UCI in a same UL subframe, the UE may multiplex both in a PUSCH. UCI includes Hybrid Automatic Repeat request acknowledgement (HARQ-ACK) information, indicating correct (ACK) or incorrect (NACK) detection for a data TB in a PDSCH or absence of a PDCCH detection (DTX), scheduling request (SR) indicating whether a UE has data in the UE's buffer, rank indicator (RI), and channel state information (CSI) enabling an eNodeB to perform link adaptation for PDSCH transmissions to a UE. HARQ-ACK information is also transmitted by a UE in response to a detection of a PDCCH/EPDCCH indicating a release of semi-persistently scheduled PDSCH.

An UL subframe includes two slots. Each slot includes $N_{symb}^{UL}$ symbols for transmitting data information, UCI, DMRS, or SRS. A frequency resource unit of an UL system BW is a RB. A UE is allocated $N_{RB}$ RBs for a total of $N_{RB} \cdot N_{sc}^{RB}$ REs for a transmission BW. For a PUCCH, $N_{RB}=1$. A last subframe symbol can be used to multiplex SRS transmissions from one or more UEs. A number of subframe symbols that are available for data/UCI/DMRS transmission is $N_{symb}=2\cdot(N_{symb}^{UL}-1)-N_{SRS}$, where $N_{SRS}=1$ if a last subframe symbol is used to transmit SRS and $N_{SRS}=0$ otherwise.

Figure 5:
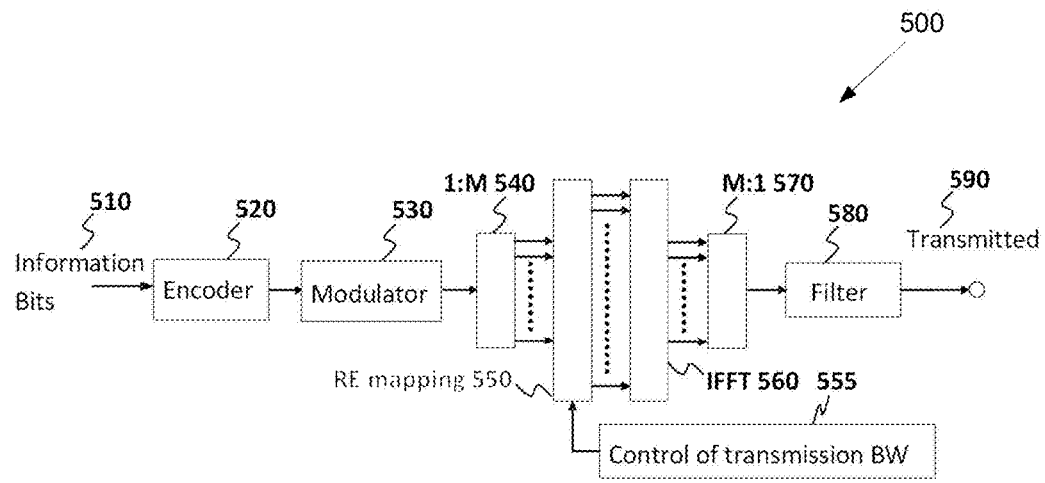
FIG. 5 illustrates a transmitter block diagram for a PDSCH in a subframe according to embodiments of the present disclosure.

FIG. 5 illustrates a transmitter block diagram 500 for a PDSCH in a subframe according to embodiments of the present disclosure. The embodiment of the transmitter block diagram 500 illustrated in FIG. 5 is for illustration only. FIG. 5 does not limit the scope of this disclosure to any particular implementation of the transmitter block diagram 500.

As shown in FIG. 5, information bits 510 are encoded by encoder 520, such as a turbo encoder, and modulated by modulator 530, for example using quadrature phase shift keying (QPSK) modulation. A serial to parallel (S/P) converter 540 generates M modulation symbols that are subsequently provided to a mapper 550 to be mapped to REs selected by a transmission BW selection unit 555 for an assigned PDSCH transmission BW, unit 560 applies an Inverse fast Fourier transform (IFFT), the output is then serialized by a parallel to serial (P/S) converter 570 to create a time domain signal, filtering is applied by filter 580, and a signal transmitted 590. Additional functionalities, such as data scrambling, cyclic prefix insertion, time windowing, interleaving, and others are well known in the art and are not shown for brevity.

Figure 6:
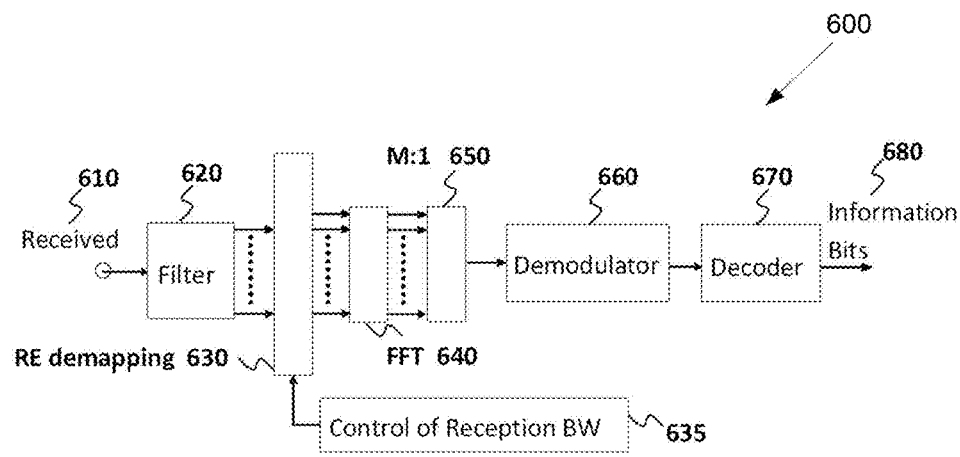
FIG. 6 illustrates a receiver block diagram for a PDSCH in a subframe according to embodiments of the present disclosure.

FIG. 6 illustrates a receiver block diagram 600 for a PDSCH in a subframe according to embodiments of the present disclosure. The embodiment of the diagram 600 illustrated in FIG. 6 is for illustration only. FIG. 6 does not limit the scope of this disclosure to any particular implementation of the diagram 600.

As shown in FIG. 6, a received signal 610 is filtered by filter 620, REs 630 for an assigned reception BW are selected by BW selector 635, unit 640 applies a fast Fourier transform (FFT), and an output is serialized by a parallel-to-serial converter 650. Subsequently, a demodulator 660 coherently demodulates data symbols by applying a channel estimate obtained from a DMRS or a CRS (not shown), and a decoder 670, such as a turbo decoder, decodes the demodulated data to provide an estimate of the information data bits 680. Additional functionalities such as time-windowing, cyclic prefix removal, de-scrambling, channel estimation, and de-interleaving are not shown for brevity.

Figure 7:
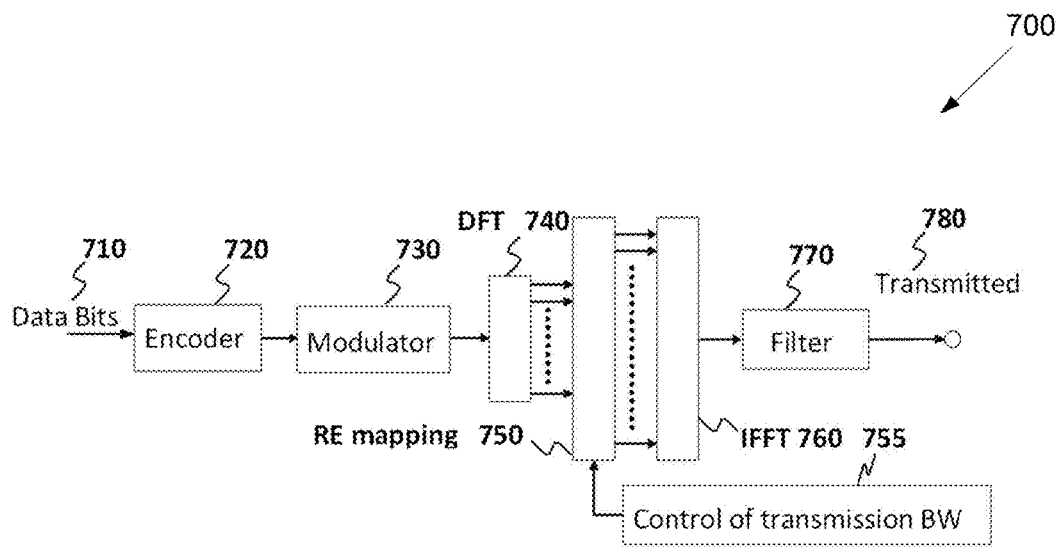
FIG. 7 illustrates a transmitter block diagram for a PUSCH in a subframe according to embodiments of the present disclosure.

FIG. 7 illustrates a transmitter block diagram 700 for a PUSCH in a subframe according to embodiments of the present disclosure. The embodiment of the block diagram 700 illustrated in FIG. 7 is for illustration only. FIG. 7 does not limit the scope of this disclosure to any particular implementation of the block diagram 700.

As shown in FIG. 7, information data bits 710 are encoded by encoder 720, such as a turbo encoder, and modulated by modulator 730. A discrete Fourier transform (DFT) unit 740 applies a DFT on the modulated data bits, REs 750 corresponding to an assigned PUSCH transmission BW are selected by transmission BW selection unit 755, unit 760 applies an IFFT and, after a cyclic prefix insertion (not shown), filtering is applied by filter 770 and a signal transmitted 780.

Figure 8:
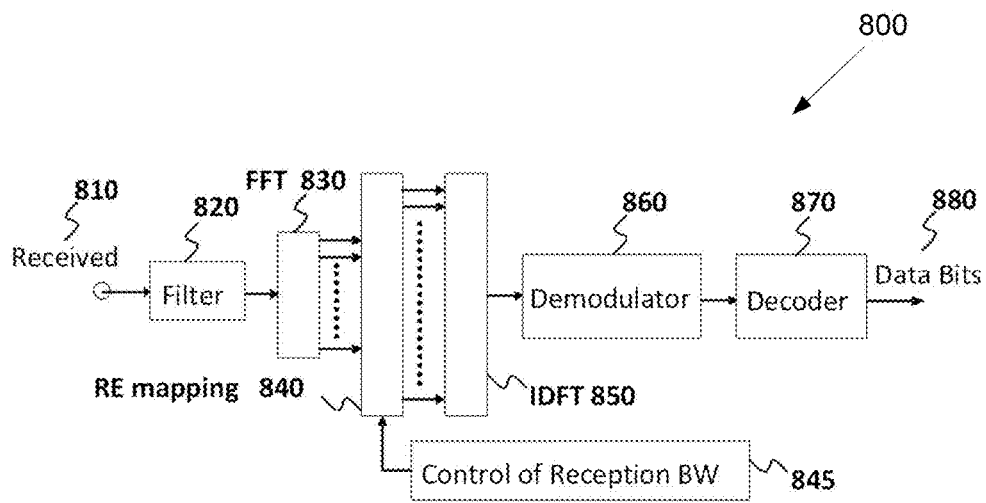
FIG. 8 illustrates a receiver block diagram for a PUSCH in a subframe according to embodiments of the present disclosure.

FIG. 8 illustrates a receiver block diagram 800 for a PUSCH in a subframe according to embodiments of the present disclosure. The embodiment of the block diagram 800 illustrated in FIG. 8 is for illustration only. FIG. 8 does not limit the scope of this disclosure to any particular implementation of the block diagram 800.

As shown in FIG. 8, a received signal 810 is filtered by filter 820. Subsequently, after a cyclic prefix is removed (not shown), unit 830 applies a FFT, REs 840 corresponding to an assigned PUSCH reception BW are selected by a reception BW selector 845, unit 850 applies an inverse DFT (IDFT), a demodulator 860 coherently demodulates data symbols by applying a channel estimate obtained from a DMRS (not shown), a decoder 870, such as a turbo decoder, decodes the demodulated data to provide an estimate of the information data bits 880.

In next generation cellular systems, various use cases are envisioned beyond the capabilities of LTE system. Termed 5G or the fifth generation cellular system, a system capable of operating at sub-6 GHz and above-6 GHz (for example, in mmWave regime) becomes one of the requirements. In 3GPP TR 22.891, 74 5G use cases has been identified and described; those use cases can be roughly categorized into three different groups. A first group is termed 'enhanced mobile broadband' (eMBB), targeted to high data rate services with less stringent latency and reliability requirements. A second group is termed "ultra-reliable and low latency (URLL)" targeted for applications with less stringent data rate requirements, but less tolerant to latency. A third group is termed "massive MTC (mMTC)" targeted for large number of low-power device connections such as 1 million per km$^2$ with less stringent the reliability, data rate, and latency requirements.

In order for the 5G network to support such diverse services with different quality of services (QoS), one method has been identified in LTE specification, called network slicing. To utilize PHY resources efficiently and multiplex various slices (with different resource allocation schemes, numerologies, and scheduling strategies) in DL-SCH, a flexible and self-contained frame or subframe design is utilized.

Figure 9:
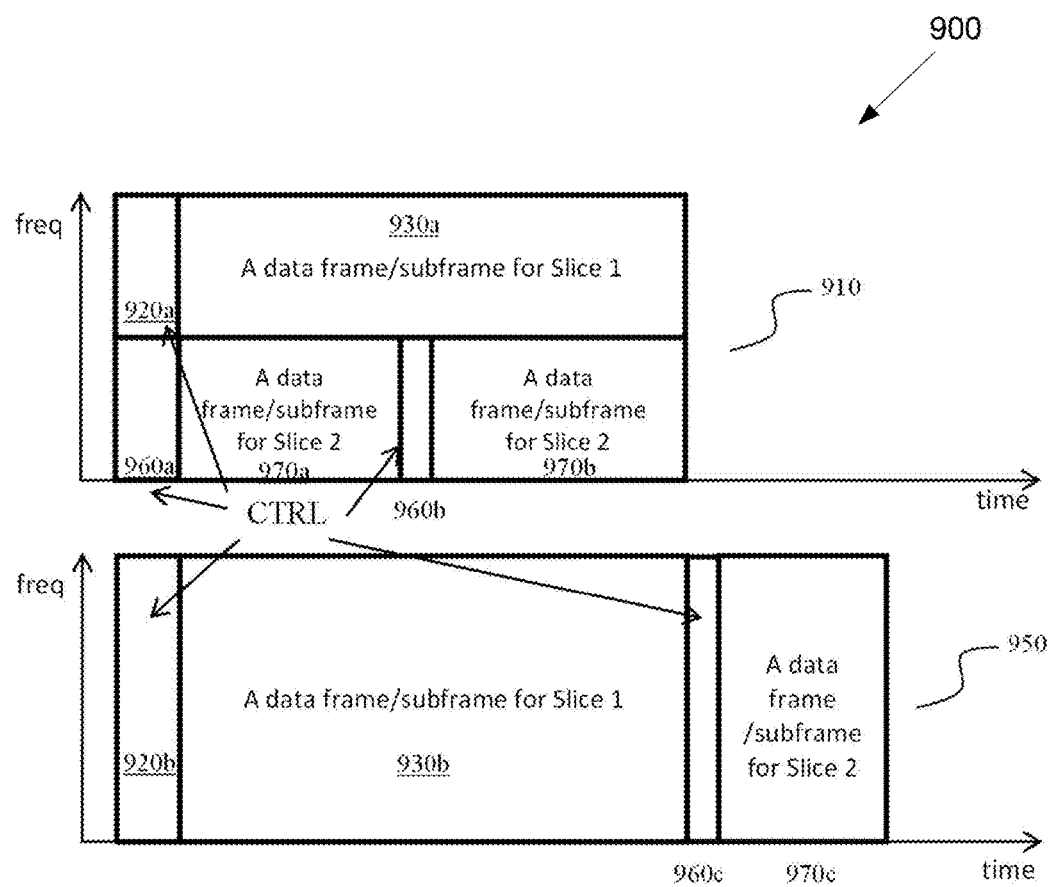
FIG. 9 illustrates an example multiplexing of two slices according to embodiments of the present disclosure.

FIG. 9 illustrates an example multiplexing of two slices 900 according to embodiments of the present disclosure. The embodiment of the multiplexing of two slices 900 illustrated in FIG. 9 is for illustration only. FIG. 9 does not limit the scope of this disclosure to any particular implementation of the multiplexing of two slices 900.

Two exemplary instances of multiplexing two slices within a common subframe or frame are depicted in FIG. 9. In these exemplary embodiments, a slice can be composed of one or two transmission instances where one transmission instance includes a control (CTRL) component (e.g., 920*a*, 960*a*, 960*b*, 920*b*, or 960*c*) and a data component (e.g., 930*a*, 970*a*, 970*b*, 930*b*, or 970*c*). In embodiment 910, the two slices are multiplexed in frequency domain whereas in embodiment 950, the two slices are multiplexed in time domain. These two slices can be transmitted with different sets of numerology.

LTE specification supports up to 32 CSI-RS antenna ports which enable an eNB to be equipped with a large number of antenna elements (such as 64 or 128). In this case, a plurality of antenna elements is mapped onto one CSI-RS port. For next generation cellular systems such as 5G, the maximum number of CSI-RS ports can either remain the same or increase.

Figure 10:
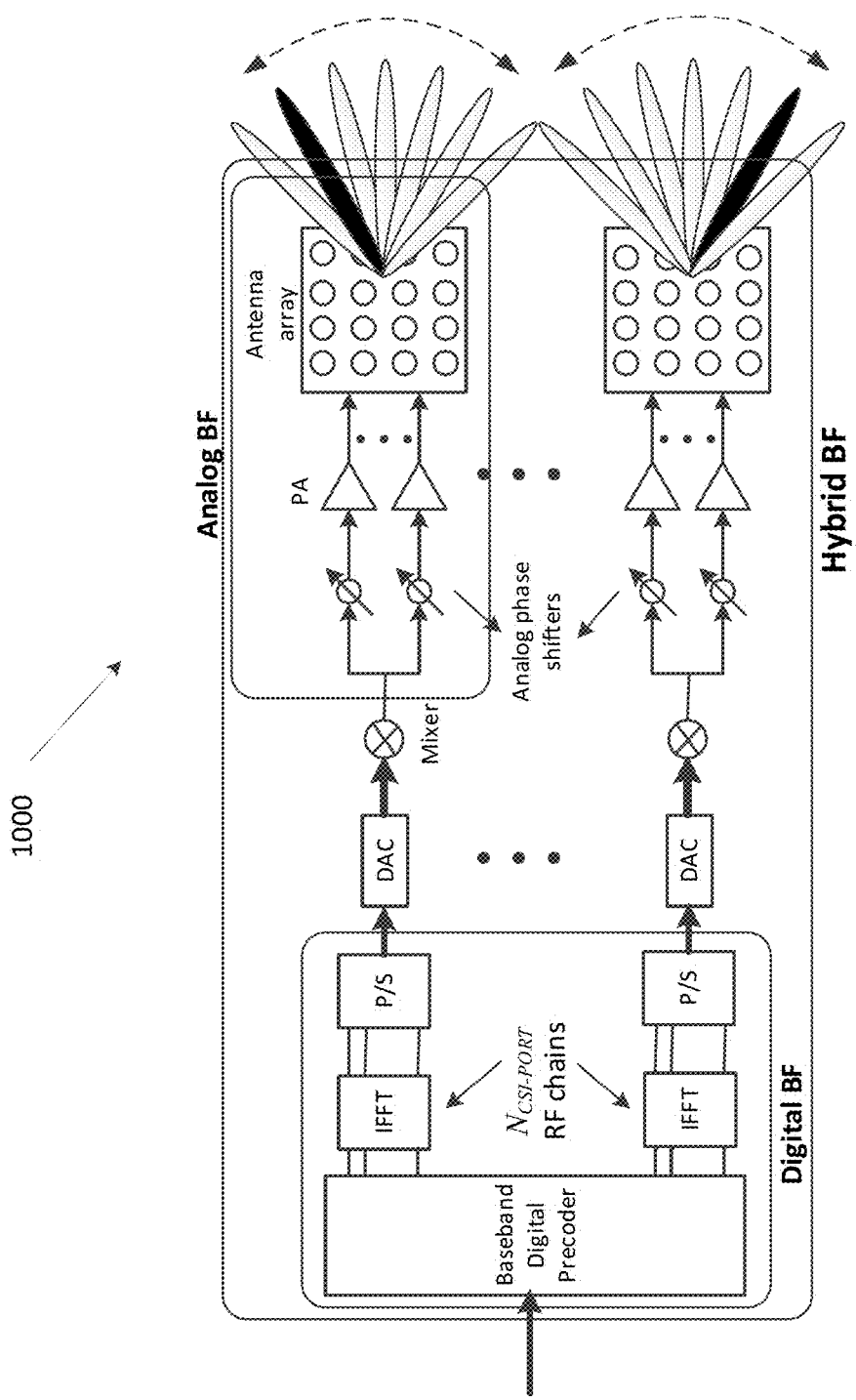
FIG. 10 illustrates an example antenna blocks according to embodiments of the present disclosure.

FIG. 10 illustrates an example antenna blocks 1000 according to embodiments of the present disclosure. The embodiment of the antenna blocks 1000 illustrated in FIG. 10 is for illustration only. FIG. 10 does not limit the scope of this disclosure to any particular implementation of the antenna blocks 1000.

For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 10. In this case, one CSI-RS port is mapped onto a large number of antenna elements which can be controlled by a bank of analog phase shifters. One CSI-RS port can then correspond to one sub-array which produces a narrow analog beam through analog beamforming. This analog beam can be configured to sweep across a wider range of angles by varying the phase shifter bank across symbols or subframes. The number of sub-arrays (equal to the number of RF chains) is the same as the number of CSI-RS ports $N_{CSI-PORT}$. A digital beamforming unit performs a linear combination across $N_{CSI-PORT}$ analog beams to further increase precoding gain. While analog beams are wideband (hence not frequency-selective), digital precoding can be varied across frequency sub-bands or resource blocks.

In a 3GPP LTE communication system, network access and radio resource management (RRM) are enabled by physical layer synchronization signals and higher (MAC) layer procedures. In particular, a UE attempts to detect the presence of synchronization signals along with at least one cell ID for initial access. Once the UE is in the network and associated with a serving cell, the UE monitors several neighboring cells by attempting to detect their synchronization signals and/or measuring the associated cell-specific RSs (for instance, by measuring their RSRPs). For next generation cellular systems such as 3GPP NR (new radio access or interface), efficient and unified radio resource acquisition or tracking mechanism which works for various use cases (such as eMBB, URLLC, mMTC, each corresponding to a different coverage requirement) and frequency bands (with different propagation losses) is desirable. Most likely designed with a different network and radio resource paradigm, seamless and low-latency RRM is also desirable. Such goals pose at least the following problems in designing an access, radio resource, and mobility management framework.

First, since NR is likely to support even more diversified network topology, the notion of cell can be redefined or replaced with another radio resource entity. As an example, for synchronous networks, one cell can be associated with a plurality of TRPs (transmit-receive points) similar to a COMP (coordinated multipoint transmission) scenario in LTE specification. In this case, seamless mobility is a desirable feature.

Second, when large antenna arrays and beamforming are utilized, defining radio resource in terms of beams (although possibly termed differently) can be a natural approach. Given that numerous beamforming architectures can be utilized, an access, radio resource, and mobility management framework which accommodates various beamforming architectures (or, instead, agnostic to beamforming architecture) is desirable.

Figure 11:
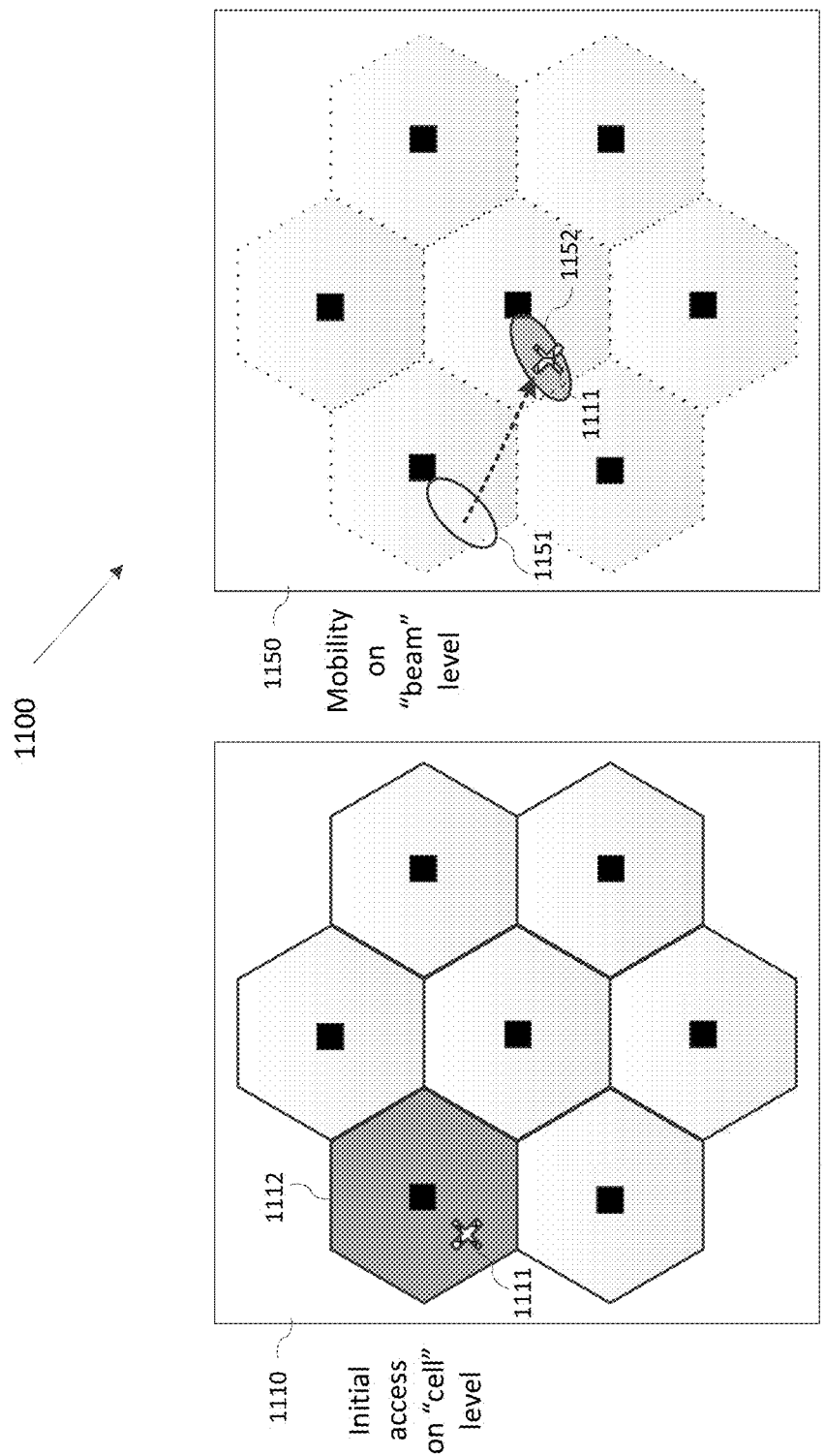
FIG. 11 illustrates an example UE mobility scenario according to embodiments of the present disclosure.

FIG. 11 illustrates an example UE mobility scenario 1100 according to embodiments of the present disclosure. The embodiment of the UE mobility scenario 1100 illustrated in FIG. 11 is for illustration only. FIG. 11 does not limit the scope of this disclosure to any particular implementation of the UE mobility scenario 1100.

For instance, the framework may be applicable for or agnostic to whether one beam is formed for one CSI-RS port (for instance, where a plurality of analog ports are connected to one digital port, and a plurality of widely separated digital ports are utilized) or one beam is formed by a plurality of CSI-RS ports. In addition, the framework may be applicable whether beam sweeping (as illustrated in FIG. 11) is used or not.

Third, different frequency bands and use cases impose different coverage limitations. For example, mmWave bands impose large propagation losses. Therefore, some form of coverage enhancement scheme is needed. Several candidates include beam sweeping (as shown in FIG. 10), repetition, diversity, and/or multi-TRP transmission. For mMTC where transmission bandwidth is small, time-domain repetition is needed to ensure sufficient coverage.

A UE-centric access which utilizes two levels of radio resource entity is described in FIG. 11. These two levels can be termed as "cell" and "beam". These two terms are exemplary and used for illustrative purposes. Other terms such as radio resource (RR) 1 and 2 can also be used. Additionally, the term "beam" as a radio resource unit is to be differentiated with, for instance, an analog beam used for beam sweeping in FIG. 10.

As shown in FIG. 11, the first RR level (termed "cell") applies when an UE enters a network and therefore is engaged in an initial access procedure. In 1110, a UE 1111 is connected to cell 1112 after performing an initial access procedure which includes detecting the presence of synchronization signals. Synchronization signals can be used for coarse timing and frequency acquisitions as well as detecting the cell identification (cell ID) associated with the serving cell. In this first level, the UE observes cell boundaries as different cells can be associated with different cell IDs. In FIG. 11, one cell is associated with one TRP (in general, one cell can be associated with a plurality of TRPs). Since cell ID is a MAC layer entity, initial access involves not only physical layer procedure(s) (such as cell search via synchronization signal acquisition) but also MAC layer procedure(s).

The second RR level (termed "beam") applies when a UE is already connected to a cell and hence in the network. In this second level, a UE 1111 can move within the network without observing cell boundaries as illustrated in embodiment 1150. That is, UE mobility is handled on beam level rather than cell level, where one cell can be associated with N beams (N can be 1 or >1). Unlike cell, however, beam is a physical layer entity. Therefore, UE mobility management is handled solely on physical layer. An example of UE mobility scenario based on the second level RR is given in embodiment 1150 of FIG. 11.

After the UE 1111 is associated with the serving cell 1112, the UE 1111 is further associated with beam 1151. This is achieved by acquiring a beam or radio resource (RR) acquisition signal from which the UE can acquire a beam identity or identification. An example of beam or RR acquisition signal is a measurement reference signal (RS). Upon acquiring a beam (or RR) acquisition signal, the UE 1111 can report a status to the network or an associated TRP. Examples of such report include a measured beam power (or measurement RS power) or a set of at least one recommended "beam identity (ID)" or "RR-ID". Based on this report, the network or the associated TRP can assign a beam (as a radio resource) to the UE 1111 for data and control transmission. When the UE 1111 moves to another cell, the boundary between the previous and the next cells is neither observed nor visible to the UE 1111. Instead of cell handover, the UE 1111 switches from beam 1151 to beam 1152. Such a seamless mobility is facilitated by the report from UE 711 to the network or associated TRP—especially when the UE 1111 reports a set of M>1 preferred beam identities by acquiring and measuring M beam (or RR) acquisition signals.

Figure 12:
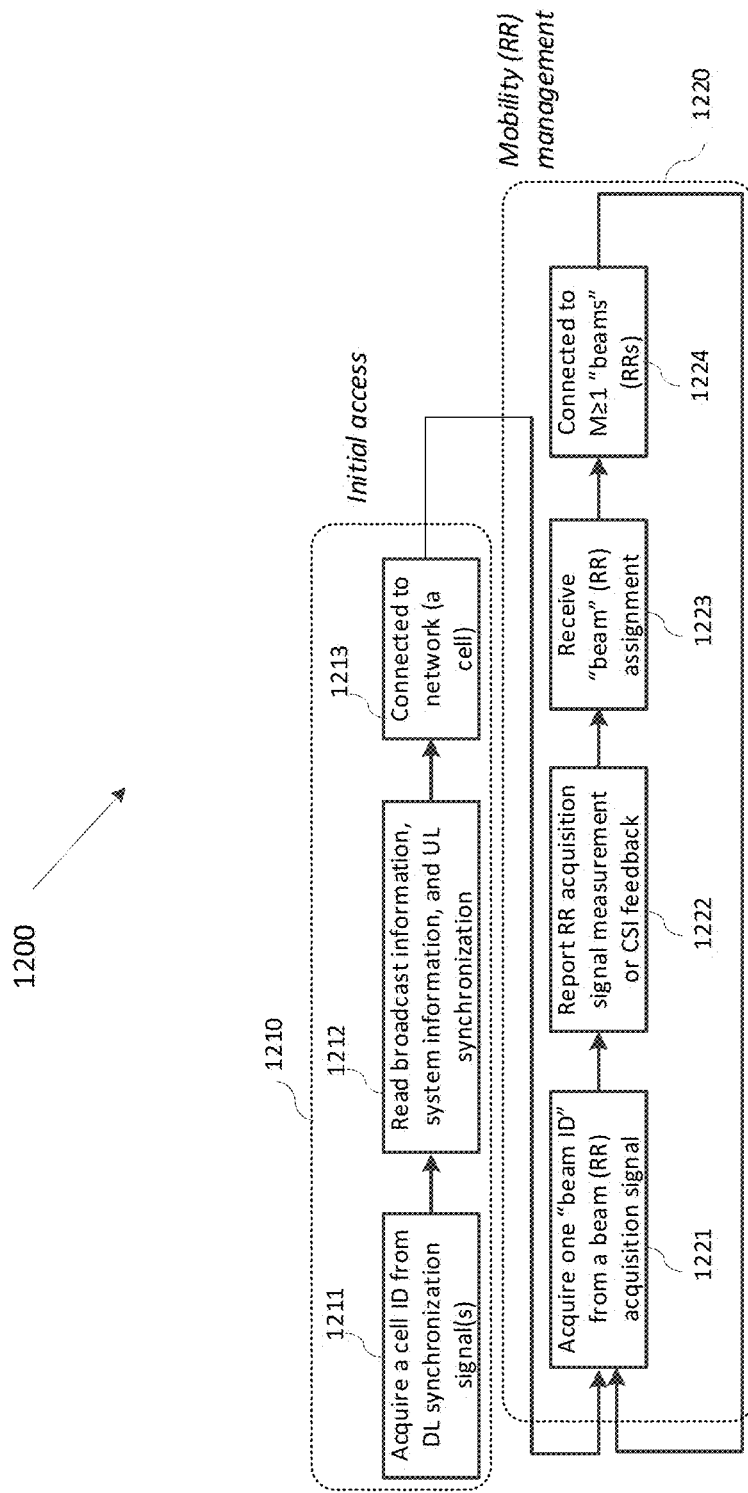
FIG. 12 illustrates an example beam sweeping operation according to embodiments of the present disclosure.

FIG. 12 illustrates an example beam sweeping operation 1200 according to embodiments of the present disclosure. The embodiment of the beam sweeping operation 1200 illustrated in FIG. 12 is for illustration only. FIG. 12 does not limit the scope of this disclosure to any particular implementation of the beam sweeping operation 1200.

As shown in FIG. 12, the aforementioned initial access procedure 1210 and the aforementioned mobility or radio resource management 1220 from the perspective of a UE are described. The initial access procedure 1210 includes cell ID acquisition from DL synchronization signal(s) 1211 as well as retrieval of broadcast information (along with system information required by the UE to establish DL and UL connections) followed by UL synchronization (which can include random access procedure). Once the UE completes 1211 and 1212, the UE is connected to the network and associated with a cell. Following the completion of initial access procedure, the UE, possibly mobile, is in an RRM state described in 1220. This state includes, first, an acquisition stage 1221 where the UE can periodically (repeatedly) attempt to acquire a "beam" or RR ID from a "beam" or RR acquisition signal (such as a measurement RS).

The UE can be configured with a list of beam/RR IDs to monitor. This list of "beam"/RR IDs can be updated or reconfigured by the TRP/network. This configuration can be signaled via higher-layer (such as RRC) signaling or a dedicated L1 or L2 control channel. Based on this list, the UE can monitor and measure a signal associated with each of these beam/RR IDs. This signal can correspond to a measurement RS resource such as that analogous to CSI-RS resource in LTE system. In this case, the UE can be configured with a set of K>1 CSI-RS resources to monitor. Several options are possible for measurement report 1222. First, the UE can measure each of the K CSI-RS resources, calculate a corresponding RS power (similar to RSRP or RSRQ in LTE system), and report the RS power to the TRP (or network). Second, the UE can measure each of the K CSI-RS resources, calculate an associated CSI (which can include CQI and potentially other CSI parameters such as RI and PMI), and report the CSI to the TRP (or network). Based on the report from the UE, the UE is assigned M≥1 "beams" or RRs either via a higher-layer (RRC) signaling or an L1/L2 control signaling 1223. Therefore the UE is connected to these M "beams"/RRs.

NR Rel-15 defines an SS/PBCH block to be consisted of the NR-PSS, NR-SSS, and NR-PBCH. Specifically, NR-PSS and NR-SSS provide time and frequency synchronization and cell ID acquisition, while NR-PBCH carries at least part of the minimum system information. In both single-beam and multi-beam scenarios of NR, time division multiplexing of NR-PSS, NR-SSS and NR-PBCH within an SS/PBCH block is supported. In the time domain, an SS/PBCH block consists of one OFDM symbol to which the NR-PSS is mapped, one OFDM symbol to which the NR-SSS is mapped, and at least two OFDM symbols to which the NR-PBCH is mapped. In the case that there are 2 NR-PBCH symbols within the SS/PBCH block, the mapping order of the SS/PBCH block is [NR-PSS, NR-PBCH, NR-SSS, NR-PBCH].

In the frequency domain, an SS/PBCH block consists of 20 contiguous resource blocks. NR has also defined possible SS/PBCH block time locations within consecutive and non-overlapping blocks of certain number of symbols for different subcarrier spacing (e.g., 14 symbols for 15

KHz/30 KHz/120 KHz SCS, and 28 symbols for 240 KHz SCS). In the rest of the present disclosure, a slot is referred to as 14 such consecutive and non-overlapping symbols of NR-U.

In one embodiment, in addition to supporting subcarrier spacing of 15 KHz and 30 KHz for the SS/PBCH block in sub-6 GHz bands, and 120 KHz and 240 KHz for the SS/PBCH block in the above-6 GHz bands as in Rel-15 NR, beyond Rel-15 NR can also support 60 KHz SCS for the SS/PBCH block in sub-7 GHz bands, and 60 KHz and beyond 240 kHz SCS, such as 480 kHz SCS and 960 kHz SCS for the above 7 GHz bands. In the present disclosure, the sub-7 GHz bands can include the unlicensed and shared bands including the 5 GHz unlicensed bands, the 6 GHz unlicensed/shared bands, and unlicensed/shared bands below 5 GHz for NR-U.

In another embodiment, the above-7 GHz bands can include the unlicensed and shared bands above 7 GHz, including the 60 GHz unlicensed bands, 37 GHz unlicensed/shared bands, etc. for NR-U. For the rest of the present disclosure, sub-7 GHz NR-U and above-7 GHz beyond Rel-15 NR refer to beyond Rel-15 NR system operating in sub-7 GHz bands and above-7 GHz bands respectively. Therefore, in one sub-embodiment, the supported SS/PBCH block SCS for sub-7 GHz beyond Rel-15 NR can be all or a subset of {15 kHz, 30 kHz, 60 kHz}; and the supported SS/PBCH block SCS for above-7 GHz beyond Rel-15 NR can be all or a subset of {60 kHz, 120 kHz, 240 kHz, 480 kHz, 960 kHz}.

One design consideration for the mapping of SS/PBCH blocks in beyond Rel-15 NR is the number of symbols per SS/PBCH block and correspondingly the number of SS/PBCH blocks per slot. Rel-15 NR supports at most 2 SS/PBCH block time locations mapped to consecutive and non-overlapping block of 14 symbols (i.e., one slot) for the SCS of 15 KHz, 30 KHz and 120 KHz, or 4 SS/PBCH block time locations mapped to consecutive and non-overlapping blocks of 28 symbols (i.e., two consecutive slots) for the SCS of 240 KHz. For beyond Rel-15 NR, extra enhanced NR-PSS/NR-SSS/NR-PBCH (or equivalently eNR-PSS/eNR-SSS/eNR-PBCH) symbols may be transmitted within an SS/PBCH block as compared to NR in licensed spectrum, such as to improve the one-shot detection probability, which can be applied to NR-U, V2X or URLLC applications. In addition, when beyond Rel-15 NR operates in the non-standalone mode, less number of symbols than Rel-15 NR may be required for an SS/PBCH block (e.g., only NR-PSS and NR-SSS). The number of symbols per SS/PBCH block for beyond Rel-15 NR can be as follows.

In one embodiment, an SS/PBCH block can be consisted of N=5 (e.g., NR-PSS/eNR-PBCH/NR-SSS/eNR-PBCH/eNR-PBCH), 6 (e.g., NR-PSS/eNR-PBCH/NR-SSS/eNR-PBCH/eNR-PSS/eNR-SSS), 7 (e.g., NR-PSS/eNR-PBCH/NR-SSS/eNR-PBCH/eNR-PSS/eNR-PBCH/eNR-SSS), 8 (e.g., NR-PSS/eNR-PBCH/NR-SSS/eNR-PBCH/eNR-PSS/eNR-PBCH/eNR-SSS/eNR-PBCH) symbols; or N=2 (e.g., NR-PSS/NR-SSS), 3 (e.g., NR-PSS/NR-PBCH/NR-SSS), 4 (e.g., NR-PSS/NR-PBCH/NR-SSS/NR-PBCH) symbols.

In another embodiment, the number of symbols for an SS/PBCH block for beyond Rel-15 NR can be more than 8 symbols. In one example, the number of symbols can be 12, 13 or 14 with potential empty symbols reserved within 14 symbols (i.e, a slot). For example, this can be applied to URLLC, V2X or unlicensed V2X applications to improve one-shot SSB detection probability.

In another embodiment, an SS/PBCH block for beyond Rel-15 NR can consist of non-consecutive symbols, wherein gap can exist between symbol groups, such as to take into account the reservation for control channels and coexistence of multiple numerologies.

In another embodiment, beyond Rel-15 NR SSB can be TDM'ed and/or FDM'ed with other DL signals such as remaining minimum system information (RMSI)/other system information (OSI)/Paging and the corresponding control resource set (CORESET); in which case the SSB and RMSI/OSI/Paging can be composed as an IA block. In one sub-embodiment, the IA block can be confined within a slot of 14 symbols, with the number of symbols to be between 4 and 14 symbols. In another sub-embodiment, if the IA block occupies consecutive symbols or non-consecutively but with gap smaller than SIFS; at most a single listen-before-talk (LBT) operation before the IA block can grant transmission of the IA block for NR-U application.

Therefore, in one embodiment, depending on the application scenario, the number of symbols for SSB in beyond Rel-15 NR can range from 2 to 14.

For beyond Rel-15 NR that operates in unlicensed band, the mapping of SS/PBCH block time locations may need to be modified according to the unlicensed spectrum regulations. In particular, listen-before-talk (LBT), where the channel needs to be sensed idle for certain amount of time before transmission is granted, is an important feature to achieve fair spectrum sharing among the coexisting systems in the unlicensed band. LBT is implemented by the IEEE 802.11 systems that operate in unlicensed spectrum including the 5 GHz and 60 GHz bands. Therefore, LBT may also be required before the transmission of each SS/PBCH block or a group of SS/PBCH blocks for NR in unlicensed band. In addition, the synchronization signals and NR-PBCH within an SS/PBCH block may be transmitted in consecutive symbols as much as possible; otherwise, competing networks may access the channel, which may necessitate additional LBT process to resume SS/PBCH block transmissions for NR unlicensed.

Given the LBT requirement, one important design consideration for SS/PBCH block mapping in NR unlicensed is the number of symbols that are utilized for LBT. Specifically, before the transmission of each SS/PBCH block, an LBT process with at least energy detection (ED) may be required, such that the total energy in the channel needs to be sensed below energy level $\Gamma_{ed}$ for certain amount of time.

In one embodiment, subject to the LBT design for NR unlicensed, LBT can be required before the transmission of each SS/PBCH block; or for a group of M (M>=1) SS/PBCH blocks wherein the gap between neighboring SS/PBCH blocks are less than certain duration, only one LBT process can be performed preceding the first SS/PBCH blocks, such that these M SS/PBCH blocks can share the channel occupancy time of the LBT without performing additional LBT for the remaining M−1 SS/PBCH blocks. In one example, this duration, can be SIFS duration of the coexisting Wi-Fi system, which is 16 μs for sub-7 GHz unlicensed band and 3 μs for above-7 GHz unlicensed bands. In another example, SS/PBCH block can be TDM'ed with RMSI/OSI/Paging, and the time offset between SSB and the RMSI/OSI/Paging is less than SIFS; in this case, the duration can be the duration for RMSI/OSI/Paging block plus 2 SIFS duration.

In another embodiment, in order to increase the channel access opportunity for NR unlicensed, the transmission for each SS/PBCH block or a group of SS/PBCH blocks can be subject to a single-shot LBT for a fixed sensing duration τ. The duration τ can be chosen to be within SIFS and DIFS (i.e., SIFS+2 Wi-Fi slot duration) of the coexisting IEEE 802.11 system. One example may be the PIFS duration, which can be 25 us for sub-7 GHz bands and 8 us for above-7 GHz bands. Depending on the ED duration τ and the SCS for NR unlicensed, the number of symbols for LBT that precedes each SS/PBCH block can be different. For sub-7 GHz unlicensed bands, the COT corresponding to a successful single-shot LBT can be 1 ms. For above-7 GHz unlicensed bands, the COT corresponding to a successful single-shot LBT can be at least 250 us.

In one sub-embodiment, for NR unlicensed that operates in the sub-7 GHz unlicensed bands, LBT for SS/PBCH block can require 1 symbol with 15 KHz or 30 KHz SCS and 2 symbols with 60 KHz SCS, when ED duration τ follows that of LTE-LAA. This is because LTE-LAA requires at least 25 µs single shot LBT for transmissions to be granted, while OFDM symbol duration including the CP length is 71.4 µs, 35.7 µs, and 17.4 µs for NR unlicensed spectrum with 15 KHz, 30 KHz and 60 KHz SCS respectively.

In another sub-embodiment, for NR unlicensed that operates in the above 7 GHz unlicensed band, the number of symbols for LBT may vary for different SCS and LBT requirement. For example, when following the 25 µs single shot LBT requirement as in LTE-LAA, the LBT process of NR unlicensed may occupy 3 symbols and 6 symbols for 120 KHz and 240 KHz SCS respectively. In another example, the duration for LBT of NR unlicensed system could be within the SIFS (e.g. 3 µs) and DIFS (e.g., 13 µs) of the IEEE 802.11 ad/ay system when the NR unlicensed system and IEEE 802.11 ad/ay system coexist in the 60 GHz band. As a result, the LBT process could occupy 1 OFDM symbol for 60 KHz SCS; 1 or 2 OFDM symbols for 120 KHz SCS; 1, 2, or 3 OFDM symbols for 240 KHz SCS; and 2 to 6 OFDM symbols for 480 KHz SCS Different number of LBT symbols may lead to different mapping of SS/PBCH blocks that will be discussed in the rest of the component. In a specific example, when the LBT for SS/PBCH follows 8 µs PIFS duration of IEEE 802.11ad/ay, the number of OFDM symbols may be 1, 1, 2, 4 and 8 for SS/PBCH SCS of 60 kHz, 120 kHz, 240 kHz, 480 kHz and 960 kHz respectively.

In another embodiment, besides the single-shot LBT, NR unlicensed can also perform LBT similar to the category 4 LBT of LTE-LAA. For example, the category 4 LBT can be applied to the case the first SS/PBCH blocks of a group of M SS/PBCH blocks wherein the gap between neighboring SS/PBCH blocks are less than certain duration, such that these M SS/PBCH blocks can share the channel occupancy time of the LBT without performing additional LBT for the remaining M−1 SS/PBCH blocks.

In one sub-embodiment, in order to increase the channel access opportunity for NR-U SSB, the CAT-4 LBT for SSB can be of higher priority class. For example, CAT-4 LBT of LAA with priority class 1 supports set of CW sizes={3, 7}, and COT of 2 ms; while CAT-4 LBT of LAA with priority class 2 supports set of CW sizes={7, 15}, and COT of 3 ms; CAT-4 LBT of LAA with priority class 3 supports set of CW sizes={15, 31, 63}, and COT of 8 ms or 10 ms.

In another sub-embodiment, the LBT duration since CAT-4 LBT follows LBT with random back-off with configurable contention window size (CWS), the LBT duration for addition, for sub-7 GHz unlicensed bands, since each contention slot is 9 us, the CAT-4 LBT with priority 1 assuming each step of CAT-4 LBT is successful can range from 25 us to 88 us.

Another key consideration in designing the mapping of SS/PBCH blocks for beyond Rel-15 NR is the mapping pattern of SS/PBCH blocks within the slot(s). Specifically, in one embodiment, gNB configures a transmission window in time domain associated to the set of SSBs to transmit (e.g., SS burst set), which is referred to as the SSB measurement window as will be detailed in the present disclosure; and gNB configure a starting time and a transmission duration for each SSB within the set of SSBs, such that each SSB is confined within the transmission window. In another embodiment, for the application of NR unlicensed, gNB further needs to determine a number of symbols before the starting time of an SSB (or a group of SSBs) to be reserved for a LBT operation.

In one sub-embodiment, if the LBT is performed with a fixed sensing duration (e.g., single-shot LBT), the number of symbols reserved for LBT is predefined; and if the LBT is performed with a configurable and/or non-deterministic sensing duration with an adaptable contention window size (e.g. CAT-4 LBT), the number of symbols reserved for LBT is at least one of predefined or configurable. In another embodiment, for NR-U, gNB needs to determine a channel occupancy time (COT) associated to the LBT depending on the type of LBT; and further determine a set of spatial reception parameters associated to the LBT and a set of spatial transmission parameters for a transmission of at least one SSB within the COT associated to the LBT, which will be detailed in the present disclosure.

Rel-15 NR supports several mapping patterns of SS/PBCH blocks within the slot(s), which can minimize the overlapping with the DL control and GP/UL control regions that have the same SCS as the SS/PBCH block, as well as the DL control and GP/UL control regions that have different SCS as the SS/PBCH block. These mapping patterns can provide the baseline for the design of SS/PBCH block mapping in beyond Rel-15 NR such as the NR unlicensed, wherein similar design principle can also apply.

In one embodiment, the mapping pattern of SS/PBCH blocks for beyond Rel-15 NR can be based on that of NR. On one hand, this means SS/PBCH block(s) of the beyond Rel-15 NR can be transmitted within the SS/PBCH block locations of the corresponding mapping pattern of NR. On the other hand, for NR unlicensed, the mapping pattern of SS/PBCH blocks including the LBT symbols for NR-U may avoid as much as possible the overlapping with the DL control and GP/UL control regions within the slot for the same SCS, as well as the DL control and GP/UL control regions of different SCS.

In another embodiment, since the GP/UL control region is typically reserved at the end of the slot, these symbols could potentially be utilized for the LBT process that is intended for the transmission of DL control symbols in the next slot.

In another embodiment, new mapping patterns of SS/PBCH blocks can be introduced due to possible new subcarrier spacings supported for beyond Rel-15 NR, such as 60 kHz for sub-7 GHz bands and 480/960 kHz for above 7-GHz bands; and/or different number of symbols per SSB compared to the 4-symbol SSB in Rel-15 NR.

The possible SSB mapping patterns for beyond Rel-15 NR are detailed in the following (e.g., TABLE 1 to TABLE 9). In one embodiment, when the following mapping patterns are applied to NR unlicensed, the starting location for SSB transmission can be shifted within the SSB measurement window depending on the LBT result, and that there can be multiple possible opportunities for the starting location of the SSB transmission within the SSB measurement window. This is because channel access for NR-U SSB is not always guaranteed due to LBT, and the LBT duration may be non-deterministic (e.g., for CAT-4).

In another embedment, in TABLE 1 to TABLE 9, "Number of symbols per LBT" represents the number of symbols reserved for each LBT process; "LBT symbols" represents the indexes of symbols that are used for LBT; "SS/PBCH block symbols" represents the indexes of symbols that are used for the SS/PBCH block; "Number of symbols per SS/PBCH block" represents the number of symbols inside each SS/PBCH block. In one sub-embodiment, when single-shot LBT is used, the "LBT symbols" and "Number of symbols per LBT" refer to all the symbol positions used by a single-shot LBT process since duration of single-shot LBT is deterministic. In addition, when CAT-4 LBT is used, since the LBT duration for CAT-4 LBT is configurable and non-deterministic, and the duration of CAT-4 LBT (at least for the extended CCA) is larger than the duration of a single-shot LBT with the same subcarrier spacing.

Therefore, in another sub-embodiment, when CAT-4 LBT is used, the "LBT symbols" and "Number of symbols per LBT" can refer to the ending symbol positions of the CAT-4 LBT, and the rest of the CAT-4 LBT process that is not covered by "LBT symbols" can happen in the symbols preceding the "LBT symbols," possibly in the previous slot(s). In yet another sub-embodiment, when CAT-4 LBT is used, the "LBT symbols" and "Number of symbols per LBT" can refer to the starting symbol positions of the CAT-4 LBT, and if the CAT-4 LBT is not finished within the "LBT symbols" such as due to failed LBT (which is a probabilistic event), the CAT-4 can be extended to later symbols following "LBT symbols."

In another embodiment, the symbol positions for LBT and SSB(s) for beyond Rel-15 NR that correspond to each SS/PBCH block mapping patterns as specified in the following can also be shifted by a few symbols (to either earlier symbols or later symbols) respectively. In one sub-embodiment, the symbol positions for SS/PBCH blocks can be shifted within the SSB measurement window. For example, this can be applied to when CAT-4 LBT is used for NR-U, wherein the duration for CAT-4 LBT process is non-deterministic and random, and/or when there are multiple starting locations for the SSB of NR-U. In another sub-embodiment, the symbol positions for LBT can be shifted to a few symbols earlier, such as when CORESET for RMSI is transmitted before SS/PBCH block, but with the same spatial TX parameter.

In another embodiment, different examples of symbol positions for LBT and SSB(s) for beyond Rel-15 NR that correspond to each SS/PBCH block mapping patterns as specified in the following, can be combined and supported across different slot(s) of the same subcarrier spacing within the SSB measurement window.

Figure 13:
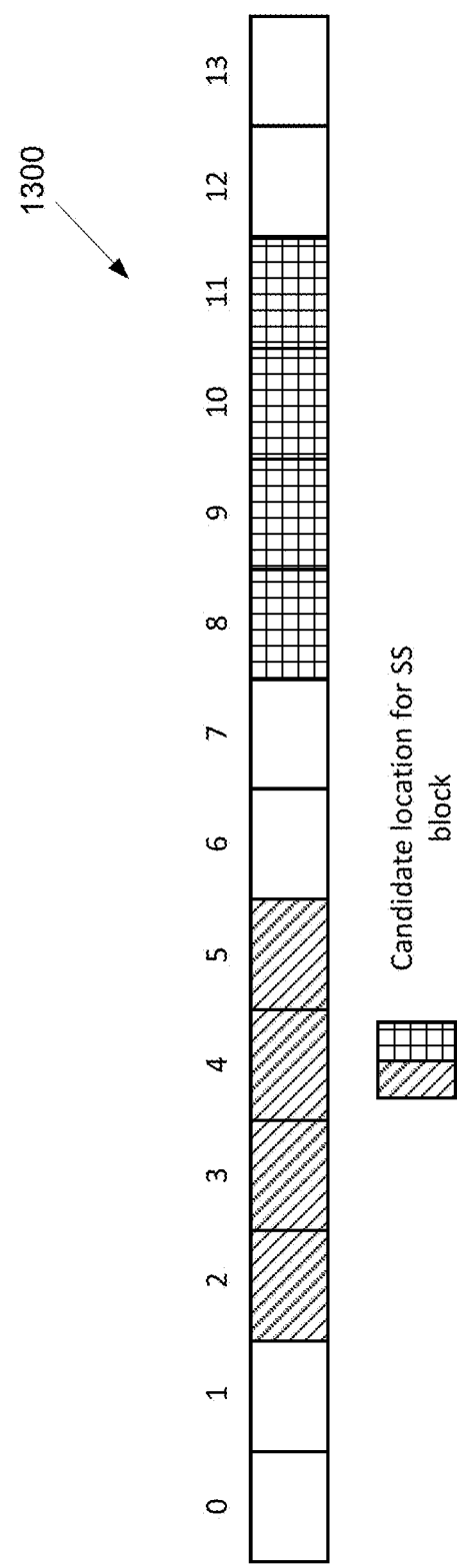
FIG. 13 illustrates another example SS/PBCH block mapping according to embodiments of the present disclosure.

FIG. 13 illustrates another example SS/PBCH block mapping 1300 according to embodiments of the present disclosure. The embodiment of the SS/PBCH block mapping 1350 illustrated in FIG. 13 is for illustration only. FIG. 13 does not limit the scope of this disclosure to any particular implementation FIG. 13 shows one mapping pattern of SS/PBCH blocks in Rel-15 NR within a slot (i.e., consecutive and non-overlapping block of 14 symbols), where there are two candidate locations for SS/PBCH blocks separated by a gap of 2 symbols. In addition, the first two symbols can be preserved for DL control and/or LBT, the last two symbols can be preserved for guard period and UL control and/or LBT, while the gap between two SS/PBCH blocks can be utilized at least for multiplexing with other SCS and/or for 7 symbol slot operation and/or for LBT. In one example, this mapping pattern can be utilized by sub-7 GHz beyond Rel-15 NR with 15 KHz or 30 KHz for SS/PBCH block; and above-7 GHz beyond Rel-15 NR with 60 KHz or 120 kHz SCS for SS/PBCH block.

As discussed earlier, for NR unlicensed system that operates in the sub-7 GHz unlicensed spectrum, each SS/PBCH block may need to perform at least 25 μs single shot LBT to be granted transmission, which is consistent with LTE-LAA. Since OFDM symbol duration, including the CP period for 15 KHz SCS and 30 KHz is 71.4 μs and 35.7 μs respectively, single-shot LBT needs to be performed in one symbol that precedes the SS/PBCH block. Similarly, if the LBT requirement is between the SIFS (e.g. 3 μs) and DIFS (e.g., 13 μs) for above-7 GHz NR-U, single-shot LBT may occupy 1 OFDM symbol with 60 KHz SCS; and LBT may occupy 1 or 2 OFDM symbols with 120 kHz SCS.

If denote by $\{0, 1, 2, \ldots, 13\}$ the symbol positions for one slots of 14 symbols, then for a possible NR-U SS/PBCH block mapping that corresponds to the SS/PBCH block mapping pattern in FIG. 13, the possible NR-U SS/PBCH block mapping can contain the following: (1) $\{SSB_1, \ldots SSB_m\}$ denotes the set of symbol positions for all SS/PBCH blocks of this mapping, wherein $SSB_i$ contains the set of symbol positions for the i-th SSB with cardinality $|SSB_i|=n$; and $\{LBT_1, \ldots, LBT_m\}$ denotes the symbol positions of all LBT operations of this mapping, wherein $LBT_i$ corresponds to the set of symbol positions for the LBT to grant the transmission of $SSB_i$. Note if an SSB is not consecutive in symbols, the LBT symbols corresponding to this SSB can also be non-consecutive, e.g., LBT is performed before each segment of the SSB.

In one embodiment, for a SS/PBCH block mapping that corresponds to FIG. 13 and that SS/PBCH blocks are contained within symbol #2 to symbol #5 and symbol #8 to symbol #11, this mapping can be supported if the following constraints are satisfied: (1) $SSB_1 \cup LBT_2 \cup SSB_2 \cup \ldots \cup LBT_m \cup_m \subset SSB$, wherein $SSB=\{2, 3, 4, 5, 8, 9, 10, 11\}$; (2) $0<=|LBT_1|<=6$ (e.g. if SSB is transmitted in two segments, LBT symbols corresponding to the SSB may also divide into two segments); (3) $0<=|LBT_i|<=|LBT_1|$ for $2<=i<=n3$; (4) $2<=|SSB_i|<=14$ for $1<=i<=m$; and (5) $1<=m<=7$.

In another embodiment, for a SS/PBCH block mapping that corresponds to FIG. 13 and that SS/PBCH blocks can be contained across within 14 symbols, this mapping can be supported if the following constraints are satisfied: (1) $SSB_1 \cup LBT_2 \cup SSB_2 \cup \ldots \cup LBT_m \cup SSB_m \subset SSB$, wherein $SSB=\{0, 1, 2, 3, 4, 5, 6, 7, 8, 9, 10, 11, 12, 13\}$; (2) $0<=|LBT_1|<=6$; (3) $0<=|LBT_i|<=|LBT_1|$ for $2<=i<=n3$; (4) $2<=<=8$ for $1<=i<=m$; and (5) $1<=m<=7$.

In one embodiment, the actual supported SS/PBCH block mappings for beyond Rel-15 NR that corresponds to SS/PBCH block mapping pattern 1 can be a subset of the SS/PBCH block mappings that satisfy the above constraints. Another embodiment is that the symbol positions for LBT and SS/PBCH blocks specified above can also be shifted by a few symbols. In addition, the actual transmitted SS/PBCH block(s) can occupy all or a subset of the SS/PBCH block symbol positions. In addition, when CAT-4 LBT is used, the number of symbols for LBT is larger than or equal to the number of symbols for the corresponding single-shot LBT under the same subcarrier spacing.

TABLE 1 has summarized examples of the possible SS/PBCH block mappings for beyond Rel-15 NR under the SS/PBCH block pattern in FIG. 1, wherein 1 SS/PBCH block is transmitted within a slot of 14 symbols. One embodiment of TABLE 11 is that when the number of symbols for the SS/PBCH block is within 5 and 8 (e.g., for standalone NR unlicensed operation), the SS/PBCH block may not be transmitted continuously and LBT processes may be divided into two segments for the transmission of the first and second segment of the SS/PBCH block respectively.

Another embodiment of TABLE 1 is that when the number of symbols per SS/PBCH block is 4, the SS/PBCH block can either be transmitted in 4 consecutive symbols and is subject to 1 LBT process for NR-U, or transmitted discontinuously subject to 1 or 2 LBT processes for NR-U. Another embodiment of TABLE 1 is that when the number of symbols per SS/PBCH block is 2 or 3 (e.g., for non-standalone operations of NR-U), only 1 LBT process is suffice and the SS/PBCH block can be transmitted in consecutive symbols. Another embodiment is that symbol #12 and #13 for LBT symbol refer to the symbols from the previous slot.

Figure 32:
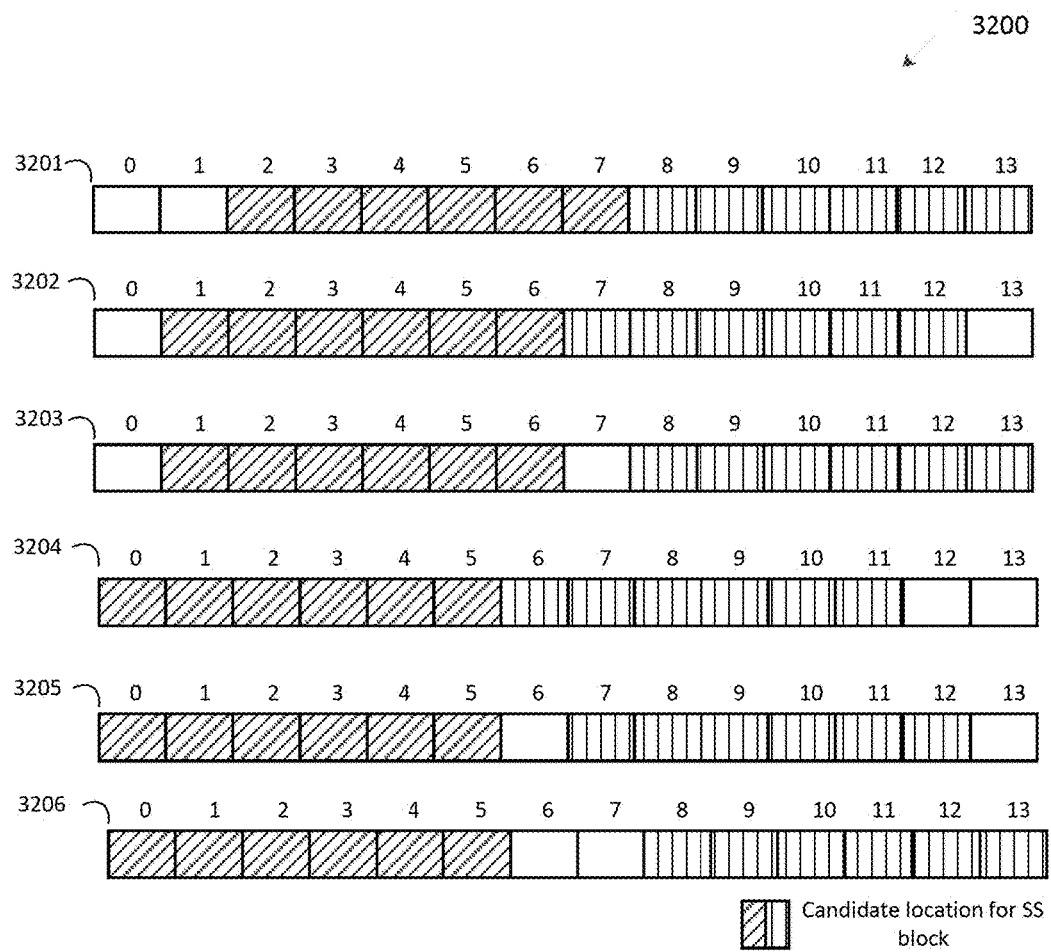
FIG. 32 illustrates an example mapping of NR-SS block locations according to embodiments of the present disclosure.
Figure 34:
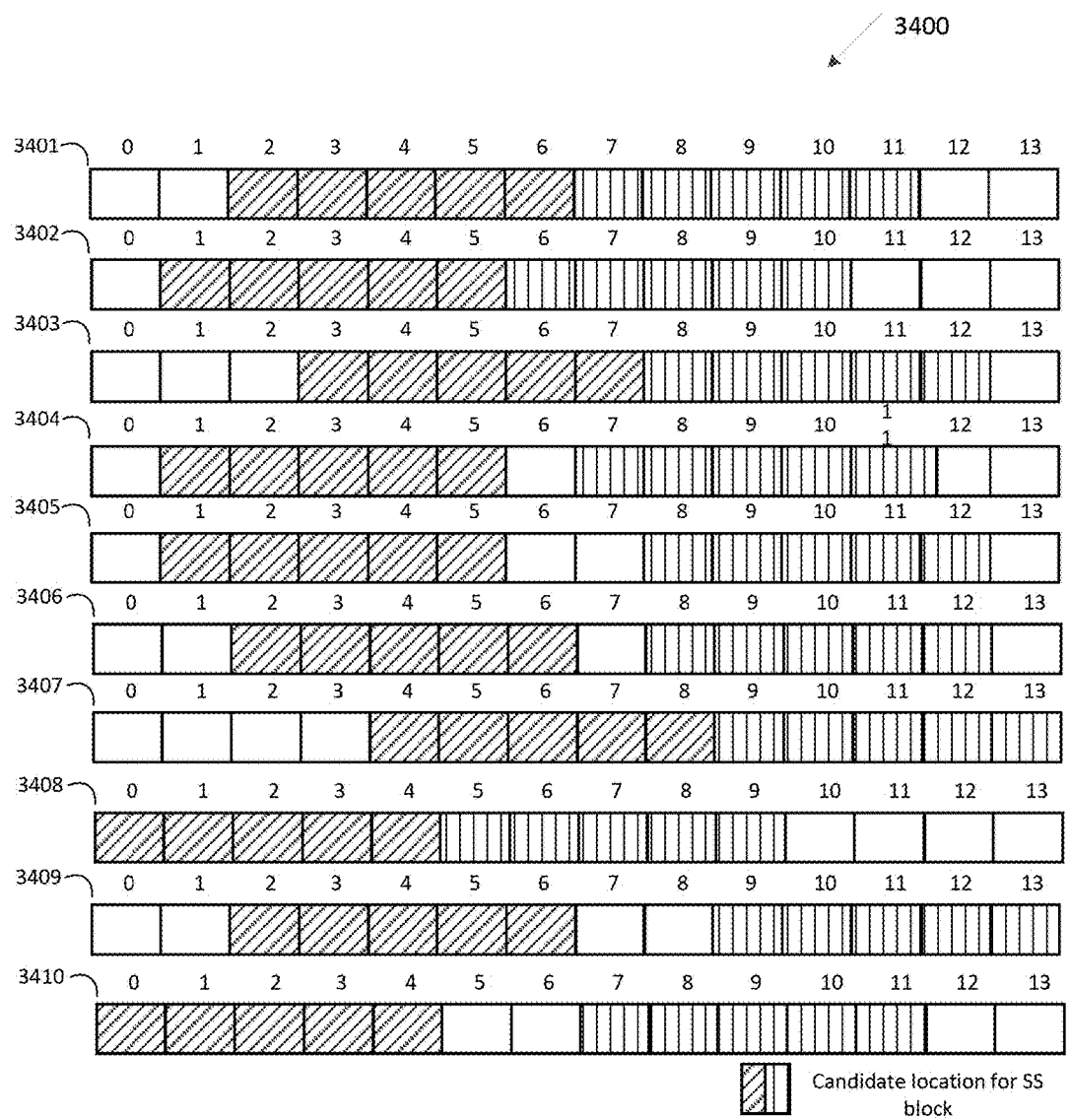
FIG. 34 illustrates yet another example mapping of NR-SS block locations according to embodiments of the present disclosure.
Figure 36:
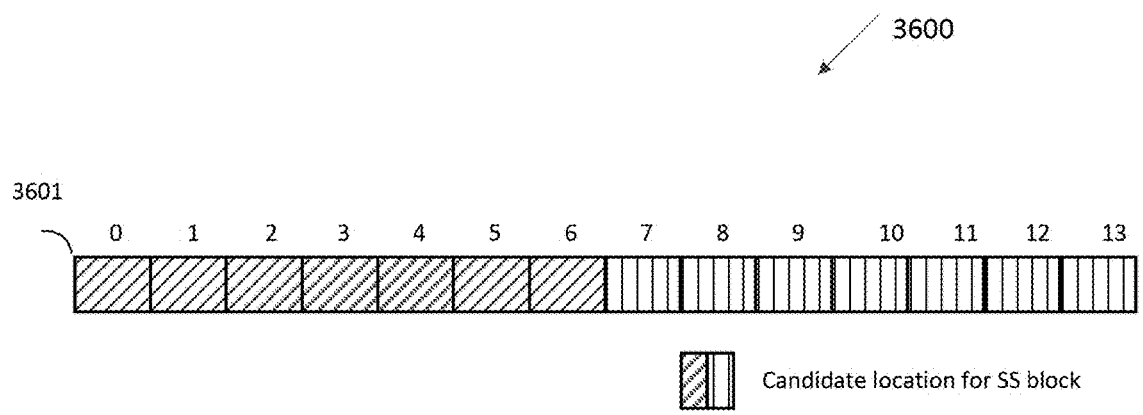
FIG. 36 illustrates yet another example mapping of NR-SS block locations according to embodiments of the present disclosure.

In another embodiment, in addition to the mapping patterns detailed in TABLE 1, the SSB mapping patterns detailed in FIG. 32, FIG. 34 and FIG. 36 can be utilized to the scenario where one SSB is transmitted within a slot, with the number of symbols per SSB being 9, 10, 11, 12, 13, and 14. Specifically, FIG. 32 can be applied to when each SSB contains 12 or 11 symbols (by deleting one symbol from FIG. 32, wherein the symbol positions illustrated in FIG. 16 can be considered to be belonging to 1 SSB. Similarly, FIG. 34 can be applied to when each SSB contains 10 or 9 symbols, and FIG. 36 can be applied to when each SSB contains 14 or 13 symbols.

The examples in FIG. 32, FIG. 34, and FIG. 36 can be applied to when no LBT is required, or when one LBT process preceding the start of the SS/PBCH block is used. In another embodiment, in addition to the mapping patterns detailed in TABLE 1, the SSB mapping patterns detailed in FIG. 33, FIG. 35, and FIG. 37 can be utilized to the scenario where one SSB is transmitted within a slot, with the number of symbols per SSB being 6, 5, 7 respectively; which can be applied to when no LBT is required, or when one LBT process preceding the start of the SS/PBCH block is used.

TABLE 1

SS/PBCH block symbols

| Number of symbols per LBT | LBT symbols | SS/PBCH block symbols | Number of symbols per SS/PBCH block |
|---|---|---|---|
| 2 | 0, 1 | 2, 3, 4, 5, 8, 9, 10, 11 | 8 |
| | 0, 1, 6, 7 | 2, 3, 4, 5, 8, 9, 10, 11 | 8 |
| | 0, 1, 6, 7 | 2, 3, 4, 5, 7, 8, 9 | 7 |
| | 1, 2, 6, 7 | 3, 4, 5, 8, 9, 10, 11 | 7 |
| | 1, 2, 7, 8 | 3, 4, 5, 8, 9, 10 | 6 |
| | 1, 2, 8, 9 | 3, 4, 5, 10, 11 | 5 |
| | 2, 3, 7, 8 | 4, 5, 9, 10, 11 | 5 |
| | 2, 3, 8, 9 | 4, 5, 10, 11 | 4 |
| | 0, 1 | 2, 3, 4, 5 | 4 |
| | 6, 7 | 8, 9, 10, 11 | 4 |
| | 0, 1 | 2, 3, 4 | 3 |
| | 0, 1 | 2, 3 | 2 |
| | 0, 1 | 2, 3, 4, 5, 6, 7, 8, 9, 10 | 9 |
| | 13, 0 | 1, 2, 3, 4, 5, 8, 9, 10, 11 | 9 |
| | 0, 1 | 2, 3, 4, 5, 6, 8, 9, 10, 11 | 9 |
| | 0, 1 | 2, 3, 4, 5, 7, 8, 9, 10, 11 | 9 |
| | 0, 1 | 2, 3, 4, 5, 8, 9, 10, 11, 12 | 9 |
| | 0, 1 | 2, 3, 4, 5, 6, 7, 8, 9, 10, 11 | 10 |
| | 0, 1 | 2, 3, 4, 5, 6, 8, 9, 10, 11, 12 | 10 |
| | 13, 0 | 1, 2, 3, 4, 5, 6, 8, 9, 10, 11 | 10 |
| | 0, 1 | 2, 3, 4, 5, 7, 8, 9, 10, 11, 12 | 10 |
| | 13, 0 | 1, 2, 3, 4, 5, 8, 9, 10, 11, 12 | 10 |

TABLE 1-continued

SS/PBCH block symbols

| Number of symbols per LBT | LBT symbols | SS/PBCH block symbols | Number of symbols per SS/PBCH block |
|---|---|---|---|
| | 0, 1 | 2, 3, 4, 5, 6, 7, 8, 9, 10, 11, 12 | 11 |
| | 13, 0 | 1, 2, 3, 4, 5, 6, 8, 9, 10, 11, 12 | 11 |
| | 13, 0 | 1, 2, 3, 4, 5, 7, 8, 9, 10, 11, 12 | 11 |
| | 0, 1 | 2, 3, 4, 5, 6, 7, 8, 9, 10, 11, 12, 13 | 12 |
| | 12, 13 | 0, 1, 2, 3, 4, 5, 8, 9, 10, 11, 12, 13 | 12 |
| | 12, 13 | 0, 1, 2, 3, 4, 5, 7, 8, 9, 10, 11, 12 | 12 |
| | 13, 0 | 1, 2, 3, 4, 5, 6, 7, 8, 9, 10, 11, 12, 13 | 13 |
| | 12, 13 | 0, 1, 2, 3, 4, 5, 6, 7, 8, 9, 10, 11, 12, 13 | 14 |
| 1 | 1, 7 | 2, 3, 4, 5, 8, 9, 10, 11 | 8 |
| | 1, 8 | 2, 3, 4, 5, 9, 10, 11 | 7 |
| | 2, 7 | 3, 4, 5, 8, 9, 10, 11 | 7 |
| | 1, 8 | 2, 3, 4, 5, 9, 10 | 6 |
| | 3, 7 | 4, 5, 8, 9, 10, 11 | 6 |
| | 2, 8 | 3, 4, 5, 9, 10, 11 | 6 |
| | 2, 8 | 3, 4, 5, 9, 10 | 5 |
| | 2, 8 | 3, 4, 9, 10, 11 | 5 |
| | 1 | 2, 3, 4, 5 | 4 |
| | 7 | 8, 9, 10, 11 | 4 |
| | 2, 8 | 3, 4, 9, 10 | 4 |
| | 2 | 3, 4, 5 | 3 |
| | 8 | 9, 10, 11 | 3 |
| | 2 | 3, 4 | 2 |
| | 8 | 9, 10 | 2 |
| | 1 | 2, 3, 4, 5, 6, 7, 8, 9, 10 | 9 |
| | 0 | 1, 2, 3, 4, 5, 8, 9, 10, 11 | 9 |
| | 1 | 2, 3, 4, 5, 6, 8, 9, 10, 11 | 9 |
| | 1 | 2, 3, 4, 5, 7, 8, 9, 10, 11 | 9 |
| | 1 | 2, 3, 4, 5, 8, 9, 10, 11, 12 | 9 |
| | 1 | 2, 3, 4, 5, 6, 7, 8, 9, 10, 11 | 10 |
| | 1 | 2, 3, 4, 5, 6, 8, 9, 10, 11, 12 | 10 |
| | 0 | 1, 2, 3, 4, 5, 6, 8, 9, 10, 11 | 10 |
| | 1 | 2, 3, 4, 5, 7, 8, 9, 10, 11, 12 | 10 |
| | 13 | 1, 2, 3, 4, 5, 8, 9, 10, 11, 12 | 10 |
| | 1 | 2, 3, 4, 5, 6, 7, 8, 9, 10, 11, 12 | 11 |
| | 0 | 1, 2, 3, 4, 5, 6, 8, 9, 10, 11, 12 | 11 |
| | 0 | 1, 2, 3, 4, 5, 7, 8, 9, 10, 11, 12 | 11 |
| | 1 | 2, 3, 4, 5, 6, 7, 8, 9, 10, 11, 12, 13 | 12 |
| | 13 | 0, 1, 2, 3, 4, 5, 8, 9, 10, 11, 12, 13 | 12 |
| | 0 | 1, 2, 3, 4, 5, 6, 7, 8, 9, 10, 11, 12, 13 | 13 |
| | 13 | 0, 1, 2, 3, 4, 5, 6, 7, 8, 9, 10, 11, 12, 13 | 14 |
| 0 | | 2, 3, 4, 5, 8, 9, 10, 11 | 8 |
| | | 2, 3, 4, 5, 8, 9, 10 | 7 |
| | | 3, 4, 5, 8, 9, 10, 11 | 7 |
| | | 2, 3, 4, 5, 8, 9 | 6 |
| | | 4, 5, 8, 9, 10, 11 | 6 |
| | | 2, 3, 4, 8, 9, 10 | 6 |
| | | 2, 3, 4, 8, 9 | 5 |
| | | 2, 3, 8, 9, 10 | 5 |
| | | 2, 3, 4, 5 | 4 |
| | | 8, 9, 10, 11 | 4 |
| | | 2, 3, 8, 9 | 4 |
| | | 2, 3, 4 | 3 |
| | | 8, 9, 10 | 3 |
| | | 2, 3 | 2 |
| | | 8, 9 | 2 |
| | | 2, 3, 4, 5, 6, 7, 8, 9, 10 | 9 |
| | | 1, 2, 3, 4, 5, 8, 9, 10, 11 | 9 |
| | | 2, 3, 4, 5, 6, 8, 9, 10, 11 | 9 |
| | | 2, 3, 4, 5, 7, 8, 9, 10, 11 | 9 |
| | | 2, 3, 4, 5, 8, 9, 10, 11, 12 | 9 |
| | | 2, 3, 4, 5, 6, 7, 8, 9, 10, 11 | 10 |
| | | 2, 3, 4, 5, 6, 8, 9, 10, 11, 12 | 10 |
| | | 1, 2, 3, 4, 5, 6, 8, 9, 10, 11 | 10 |
| | | 2, 3, 4, 5, 7, 8, 9, 10, 11, 12 | 10 |
| | | 1, 2, 3, 4, 5, 8, 9, 10, 11, 12 | 10 |
| | | 2, 3, 4, 5, 6, 7, 8, 9, 10, 11, 12 | 11 |
| | | 1, 2, 3, 4, 5, 6, 8, 9, 10, 11, 12 | 11 |
| | | 1, 2, 3, 4, 5, 7, 8, 9, 10, 11, 12 | 11 |
| | | 2, 3, 4, 5, 6, 7, 8, 9, 10, 11, 12, 13 | 12 |
| | | 0, 1, 2, 3, 4, 5, 8, 9, 10, 11, 12, 13 | 12 |

TABLE 1-continued

SS/PBCH block symbols

| Number of symbols per LBT | LBT symbols | SS/PBCH block symbols | Number of symbols per SS/PBCH block |
|---|---|---|---|
| | | 1, 2, 3, 4, 5, 6, 7, 8, 9, 10, 11, 12, 13 | 13 |
| | | 0, 1, 2, 3, 4, 5, 6, 7, 8, 9, 10, 11, 12, 13 | 14 |

TABLE 2 has summarized the examples of the possible SS/PBCH block mappings for beyond Rel-15 NR under the SS/PBCH block pattern in FIG. 13, wherein 2 SS/PBCH blocks are transmitted within a slot of 14 symbols.

One embodiment of TABLE 2 is that for NR-U, one LBT process can be required before each SS/PBCH block, and a total of 2 LBT processes can be performed within 14 symbols. Another embodiment of TABLE 2 is that for NR-U, one LBT process can be performed to grant transmission of 2 SS/PBCH blocks. In one example, this can be applied to when each SSB is also TDM'ed with RMSI/OSI/paging. In another example, this can be applied to when two SSBs are transmitted consecutively.

In another embodiment, in addition to the mapping patterns detailed in TABLE 2, the SSB mapping patterns detailed in FIG. 32, FIG. 34, and FIG. 36 can be utilized to the scenario where two SSBs are transmitted within a slot, with the number of symbols per SSB being 6, 5, and 7 respectively; which can be applied to when no LBT is required, or when one LBT process preceding the start of the SS/PBCH block is used. Another embodiment is that symbol #12 and #13 for LBT symbol refer to the symbols from the previous slot.

TABLE 2

SS/PBCH block symbols

| Number of symbols per LBT | LBT symbols for SS/PBCH block 1 | SS/PBCH block 1 symbols | LBT symbols for SS/PBCH block 2 | SS/PBCH block 2 symbols | Number of symbols per SS/PBCH block |
|---|---|---|---|---|---|
| 2 | 0, 1 | 2, 3, 4, 5 | 6, 7 | 8, 9, 10, 11 | 4 |
| | 1, 2 | 3, 4, 5 | 7, 8 | 9, 10, 11 | 3 |
| | 2, 3 | 4, 5 | 8, 9 | 10, 11 | 2 |
| | 0, 1 | 2, 3, 4, 5 | | 8, 9, 10, 11 | 4 |
| | 0, 1 | 2, 3, 4, 5 | | 6, 7, 8, 9 | 4 |
| | 0, 1 | 2, 3, 4, 5, 6 | 7, 8 | 9, 10, 11, 12, 13 | 5 |
| | 0, 1 | 2, 3, 4, 5, 6 | | 7, 8, 9, 10, 11 | 5 |
| | 0, 1 | 2, 3, 4, 5, 6 | | 8, 9, 10, 11, 12 | 5 |
| | 0, 1 | 2, 3, 4, 5, 6 | | 9, 10, 11, 12, 13 | 5 |
| | 0, 1 | 2, 3, 4, 5, 6, 7 | | 8, 9, 10, 11, 12, 13 | 6 |
| | 12, 13 | 0, 1, 2, 3, 4, 5 | 6, 7 | 8, 9, 10, 11, 12, 13 | 6 |
| | 12, 13 | 0, 1, 2, 3, 4, 5, 6 | | 7, 8, 9, 10, 11, 12, 13 | 7 |
| 1 | 1 | 2, 3, 4, 5 | 7 | 8, 9, 10, 11 | 4 |
| | 2 | 3, 4, 5 | 8 | 9, 10, 11 | 3 |
| | 2 | 3, 4 | 8 | 9, 10 | 2 |
| | 1 | 2, 3, 4, 5 | | 8, 9, 10, 11 | 4 |
| | 1 | 2, 3, 4, 5 | | 6, 7, 8, 9 | 4 |
| | 1 | 2, 3, 4, 5, 6 | 8 | 9, 10, 11, 12, 13 | 5 |
| | 1 | 2, 3, 4, 5, 6 | 7 | 8, 9, 10, 11, 12 | 5 |
| | 1 | 2, 3, 4, 5, 6 | | 7, 8, 9, 10, 11 | 5 |
| | 1 | 2, 3, 4, 5, 6 | | 8, 9, 10, 11, 12 | 5 |
| | 1 | 2, 3, 4, 5, 6 | | 9, 10, 11, 12, 13 | 5 |
| | 1 | 2, 3, 4, 5, 6, 7 | | 8, 9, 10, 11, 12, 13 | 6 |
| | 0 | 1, 2, 3, 4, 5, 6 | 7 | 8, 9, 10, 11, 12, 13 | 6 |
| | 13 | 0, 1, 2, 3, 4, 5, 6, 7 | | 7, 8, 9, 10, 11, 12, 13 | 7 |
| 0 | | 2, 3, 4, 5 | | 8, 9, 10, 11 | 4 |
| | | 2, 3, 4 | | 8, 9, 10 | 3 |
| | | 2, 3 | | 8, 9 | 2 |
| | | 2, 3, 4, 5, 6 | | 9, 10, 11, 12, 13 | 5 |
| | | 2, 3, 4, 5, 6 | | 8, 9, 10, 11, 12 | 5 |
| | | 2, 3, 4, 5, 6 | | 7, 8, 9, 10, 11 | 5 |
| | | 2, 3, 4, 5, 6 | | 8, 9, 10, 11, 12 | 5 |
| | | 2, 3, 4, 5, 6 | | 9, 10, 11, 12, 13 | 5 |
| | | 2, 3, 4, 5, 6, 7 | | 8, 9, 10, 11, 12, 13 | 6 |
| | | 1, 2, 3, 4, 5, 6 | | 8, 9, 10, 11, 12, 13 | 6 |
| | | 0, 1, 2, 3, 4, 5, 6 | | 7, 8, 9, 10, 11, 12, 13 | 7 |

Figure 14:
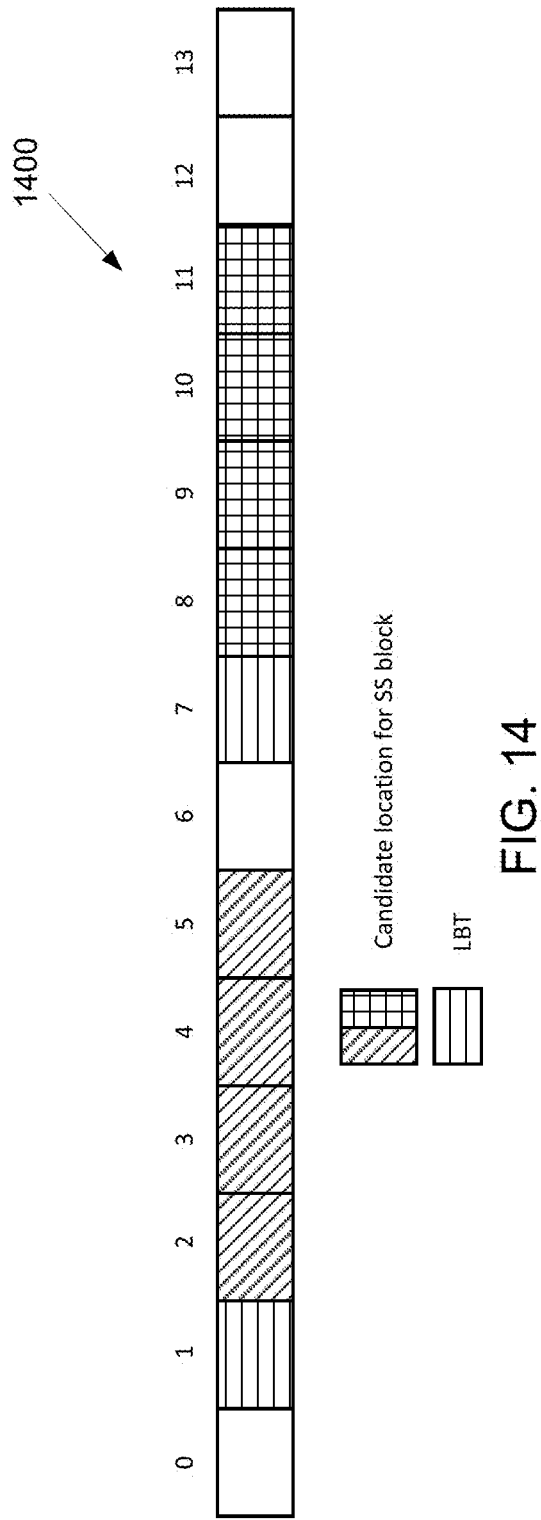
FIG. 14 illustrates yet another example SS/PBCH block mapping according to embodiments of the present disclosure.

FIG. 14 illustrates yet another example SS/PBCH block mapping 1400 according to embodiments of the present disclosure. The embodiment of the SS/PBCH block mapping 1400 illustrated in FIG. 14 is for illustration only. FIG. 14 does not limit the scope of this disclosure to any particular implementation In FIG. 14, one specific example of the mapping of SS/PBCH blocks for NR unlicensed under pattern 1 is illustrated. There are two candidate locations for SS/PBCH block in this potential mapping, and these two candidate locations could either belong to the same SS/PBCH block of 8 symbols (i.e., in TABLE 1), or correspond to 2 different SS/PBCH blocks with 4 symbols each (i.e., in TABLE 2). This example could be applied to either 15 KHz SCS or 30 KHz SCS for sub-7 NR-U; or 60 kHz SCS or 120 kHz SCS for above-7 NR-U.

Figure 15:
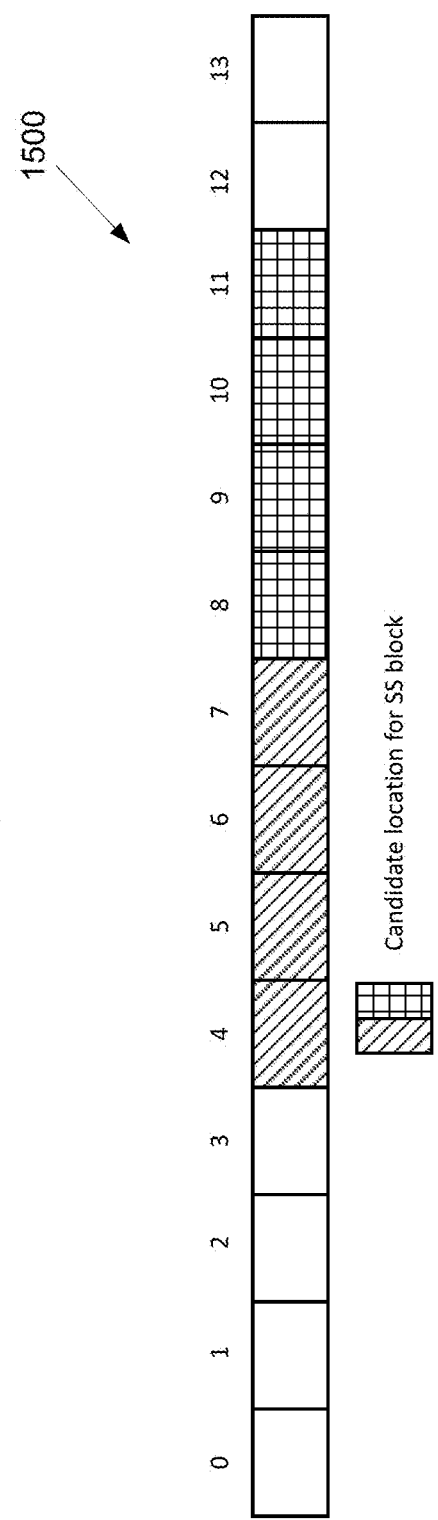
FIG. 15 illustrates yet another example SS/PBCH block mapping according to embodiments of the present disclosure.

FIG. 15 illustrates yet another example SS/PBCH block mapping 1500 according to embodiments of the present disclosure. The embodiment of the SS/PBCH block mapping 1500 illustrated in FIG. 15 is for illustration only. FIG. 15 does not limit the scope of this disclosure to any particular implementation FIG. 15 shows a mapping pattern of SS/PBCH blocks in NR within a slot (i.e., consecutive and non-overlapping block of 14 symbols), where there are two consecutive candidate locations for SS/PBCH blocks within a slot of 14 symbols. In addition, the first four symbols in the slot can be preserved for DL control and/or LBT, and the last two symbols in the slot can be preserved for guard period and/or UL control and/or LBT. In one example, this mapping pattern can be utilized by sub-7 GHz beyond Rel-15 NR with 30 KHz SCS or 60 KHz SCS for SS/PBCH block; and above-7 GHz beyond Rel-15 NR with 60 KHz or 120 KHz or 240 kHz SCS for SS/PBCH block. In one embodiment, in particular, this mapping can be typically combined with the SS/PBCH block mapping pattern 3 in two consecutive slots, which will be detailed later.

If the mapping pattern 2 in FIG. 11 is applied to 30 KHz SCS, the number of symbols for each single-shot LBT process of NR-U can be 1; if the mapping pattern is applied to 60 KHz SCS, the number of symbols for each single-shot LBT process of NR-U can be 1 or 2; if the mapping pattern is applied to 120 KHz or 240 kHz SCS, the number of symbols for each sinlge-shot LBT process of NR-U can be 1, 2, or 3. In addition, when CAT-4 LBT is used, the number of symbols for LBT is larger than or equal to the number of symbols for the corresponding single-shot LBT under the same subcarrier spacing. In addition, since two candidate SS/PBCH block locations are defined under this mapping pattern, either 1 or 2 SS/PBCH blocks can be transmitted within a slot for NR unlicensed under this pattern.

If denote by $\{0, 1, 2, \ldots, 13\}$ the symbol positions for one slots of 14 symbols, then for a possible NR-U SS/PBCH block mapping that corresponds to the SS/PBCH block mapping pattern in FIG. 15, the possible NR-U SS/PBCH block mapping can contain the following: (1) $\{SSB_1, \ldots SSB_m\}$ denotes the set of symbol positions for all SS/PBCH blocks of this mapping, wherein $SSB_i$ contains the set of symbol positions for the i-th SSB with cardinality $|SSB_i|=n$; and $\{LBT_1, \ldots, LBT_m\}$ denotes the symbol positions of all LBT operations of this mapping, wherein $LBT_i$ corresponds to the set of symbol positions for the LBT to grant the transmission of $SSB_i$. Note if an SSB is not consecutive in symbols, the LBT symbols corresponding to this SSB can also be non-consecutive, e.g., LBT is performed before each segment of the SSB.

In one embodiment, for a SS/PBCH block mapping that corresponds to FIG. 15 and that SS/PBCH blocks are contained within symbol #4 to symbol #11, this mapping can be supported if the following constraints are satisfied: (1) $SSB_1 \cup LBT_2 \cup SSB_2 \cup \ldots \cup LBT_m \cup SSB_m \subset SSB$, wherein $SSB=\{4, 5, 6, 7, 8, 9, 10, 11\}$; (2) $0<=|LBT_1|<=6$; (3) $0<=|LBT_i|<=|LBT_1|$ for $2<=i<=n3$; (4) $2<=SSB_i<=14$ for $1<=i<=m$; and (5) $1<=m<=7$. In another embodiment, for a SS/PBCH block mapping that corresponds to FIG. 15 and that SS/PBCH blocks can be contained across 14 symbols, this mapping can be supported if the following constraints are satisfied: (1) $SSB_1 \cup LBT_2 \cup SSB_2 \cup \ldots \cup LBT_m \cup SSB_m \subset SSB$, wherein $SSB=\{0, 1, 2, 3, 4, 5, 6, 7, 8, 9, 10, 11, 12, 13\}$; (2) $0<=|LBT_1|<=6$; (3) $0<=|LBT_i|<=|LBT_1|$ for $2<=i<=n3$; (4) $2<=|SSB_i|<=8$ for $1<=i<=m$; and (5) $1<=m<=7$.

In one embodiment, the actual supported SS/PBCH block mappings for beyond Rel-15 NR that corresponds to SS/PBCH block mapping pattern 2 can be a subset of the SS/PBCH block mappings that satisfy the above constraints. Another embodiment is that the symbol positions for LBT and SS/PBCH blocks specified above can also be shifted by a few symbols. In addition, the actual transmitted SS/PBCH block(s) can occupy all or a subset of the SS/PBCH block symbol positions. In addition, when CAT-4 LBT is used, the number of symbols for LBT is larger than or equal to the number of symbols for the corresponding single-shot LBT under the same subcarrier spacing.

TABLE 3 illustrates the examples of possible SS/PBCH block mappings for beyond Rel-15 NR under the SS/PBCH block pattern in FIG. 15, wherein 1 SS/PBCH block is transmitted within a slot of 14 symbols. With 1 SS/PBCH block being transmitted within a slot, SS/PBCH block mappings for NR unlicensed under this pattern could well support both standalone and non-standalone operations. One embodiment for TABLE 3 is that symbol #11, #12 and #13 for LBT symbol refer to the symbols from the previous slot. In another embodiment, the mapping patterns where the number of symbols per LBT is 2, 1, 0 and the number of symbols per SS/PBCH block larger is than 8 from TABLE 1 can also be applied to the scenario in TABLE 3.

TABLE 3

| Number of symbols per LBT | LBT symbols for SS/PBCH block 1 | SS/PBCH block 1 symbols | Number of symbols per SS/PBCH block |
|---|---|---|---|
| 3 | 1, 2, 3 | 4, 5, 6, 7, 8, 9, 10, 11 | 8 |
|  | 2, 3, 4 | 5, 6, 7, 8, 9, 10, 11 | 7 |
|  | 3, 4, 5 | 6, 7, 8, 9, 10, 11 | 6 |
|  | 4, 5, 6 | 7, 8, 9, 10, 11 | 5 |
|  | 4, 5, 6 | 7, 8, 9, 10 | 4 |
|  | 4, 5, 6 | 7, 8, 9 | 3 |
|  | 4, 5, 6 | 7, 8 | 2 |
|  | 1, 2, 3 | 4, 5, 6, 7, 8, 9, 10, 11, 12 | 9 |
|  | 1, 2, 3 | 4, 5, 6, 7, 8, 9, 10, 11, 12, 13 | 10 |
|  | 0, 1, 2 | 3, 4, 5, 6, 7, 8, 9, 10, 11, 12, 13 | 11 |
|  | 13, 0, 1 | 2, 3, 4, 5, 6, 7, 8, 9, 10, 11, 12, 13 | 12 |
|  | 12, 13, 0 | 1, 2, 3, 4, 5, 6, 7, 8, 9, 10, 11, 12, 13 | 13 |
|  | 11, 12, 13 | 0, 1, 2, 3, 4, 5, 6, 7, 8, 9, 10, 11, 12, 13 | 14 |
| 2 | 2, 3 | 4, 5, 6, 7, 8, 9, 10, 11 | 8 |
|  | 3, 4 | 5, 6, 7, 8, 9, 10, 11 | 7 |
|  | 4, 5 | 6, 7, 8, 9, 10, 11 | 6 |
|  | 4, 5 | 6, 7, 8, 9, 10 | 5 |
|  | 4, 5 | 6, 7, 8, 9 | 4 |

TABLE 3-continued

| Number of symbols per LBT | LBT symbols for SS/PBCH block 1 | SS/PBCH block 1 symbols | Number of symbols per SS/PBCH block |
|---|---|---|---|
|  | 4, 5 | 6, 7, 8 | 3 |
|  | 4, 5 | 6, 7 | 2 |
| 1 | 3 | 4, 5, 6, 7, 8, 9, 10, 11 | 8 |
|  | 4 | 5, 6, 7, 8, 9, 10, 11 | 7 |
|  | 4 | 5, 6, 7, 8, 9, 10 | 6 |
|  | 4 | 5, 6, 7, 8, 9 | 5 |
|  | 4 | 5, 6, 7, 8 | 4 |
|  | 4 | 5, 6, 7 | 3 |
|  | 4 | 5, 6 | 2 |
| 0 |  | 4, 5, 6, 7, 8, 9, 10, 11 | 8 |
|  |  | 4, 5, 6, 7, 8, 9, 10 | 7 |
|  |  | 4, 5, 6, 7, 8, 9 | 6 |
|  |  | 4, 5, 6, 7, 8 | 5 |
|  |  | 4, 5, 6, 7 | 4 |
|  |  | 4, 5, 6 | 3 |
|  |  | 4, 5 | 2 |

TABLE 4 summarizes examples of possible SS/PBCH block mappings for beyond Rel-15 NR under the SS/PBCH block pattern in FIG. 15, wherein 2 SS/PBCH blocks are transmitted within a slot of 14 symbols. One embodiment of TABLE 4 is that two separate LBT processes can be performed to transmit two SS/PBCH blocks within a slot. With the LBT requirement, the maximum number of symbols that is supported by each SS/PBCH block is at most 4. In another embodiment, subject to the maximum channel occupancy time (MCOT) of the LBT, two SS/PBCH blocks can be transmitted consecutively after only 1 LBT process that precedes the first SS/PBCH block succeeds. In another embodiment, the mapping patterns when the number of symbols per LBT is 2, 1, 0 and number of symbols per SS/PBCH block larger than 4 from TABLE 2 can also be applied to the scenario in TABLE 4.

Figure 16:
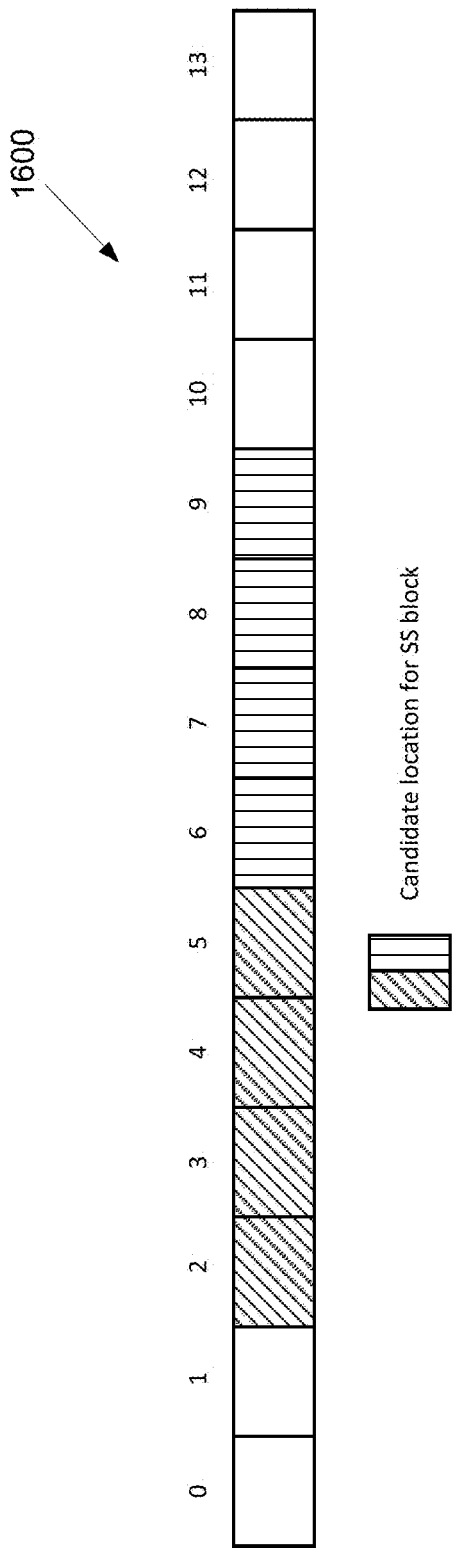
FIG. 16 illustrates yet another example SS/PBCH block mapping according to embodiments of the present disclosure.

FIG. 16 illustrates yet another example SS/PBCH block mapping 1600 according to embodiments of the present disclosure. The embodiment of the SS/PBCH block mapping 1600 illustrated in FIG. 16 is for illustration only. FIG. 16 does not limit the scope of this disclosure to any particular implementation FIG. 16 shows another mapping pattern of SS/PBCH blocks in Rel-15 NR within a slot with two consecutive candidate locations for SS/PBCH blocks, where the first two symbols in the slot are preserved for DL control, and the last four symbols in the slot are preserved for guard period and UL control. In one example, this mapping pattern has been utilized by sub-7 GHz beyond Rel-15 NR with 30 KHz SCS or 60 KHz SCS for SS/PBCH blocks; and above-7 GHz beyond Rel-15 NR with 120 KHz SCS or 60 KHz SCS or 240 kHz SCS for SS/PBCH block. In particular, this mapping is typically combined with the SS/PBCH block mapping pattern 2 in two consecutive slots, wherein this mapping is used by the second slot.

In one embodiment, for any given number of symbols for LBT and each SS/PBCH block, the LBT and SS/PBCH block symbol positions for pattern 3 can be constructed by shifting the supported beyond Rel-15 NR mapping patterns that correspond to pattern 2 (e.g., given by TABLE 3 and TABLE 4) to 2 symbols earlier. In one sub-embodiment, TABLE 5 and TABLE 6 illustrate examples of the possible SS/PBCH block mappings for NR unlicensed under the SS/PBCH block pattern in FIG. 16, wherein 1 and 2 SS/PBCH blocks are transmitted within a slot of 14 symbols respectively. Note in both tables, symbol #11, #12, #13 for LBT symbol is the last symbol from the previous slot.

In one embodiment, the actual supported SS/PBCH block mappings for beyond Rel-15 NR that corresponds to SS/PBCH block mapping pattern 3 can be a subset of the SS/PBCH block mappings that satisfy the above constraints. Another embodiment is that the symbol positions for LBT and SS/PBCH blocks that correspond to SS/PBCH block mapping pattern 3 can also be shifted by a few symbols. In addition, the actual transmitted SS/PBCH block(s) can occupy all or a subset of the SS/PBCH block symbol

TABLE 4

| Number of symbols per LBT | LBT symbols for SS/PBCH block 1 | SS/PBCH block 1 symbols | LBT symbols for SS/PBCH block 2 | SS/PBCH block 2 symbols | Number of symbols per SS/PBCH block |
|---|---|---|---|---|---|
| 3 | 2, 3, 4 | 5, 6 | 7, 8, 9 | 10, 11 | 2 |
|  | 2, 3, 4 | 5, 6, 7 |  | 8, 9, 10 | 3 |
|  | 1, 2, 3 | 4, 5, 6, 7 |  | 8, 9, 10, 11 | 4 |
|  | 0, 1, 2 | 3, 4, 5, 6 | 7, 8, 9 | 10, 11, 12, 13 | 4 |
|  | 0, 1, 2 | 3, 4, 5, 6, 7 |  | 8, 9, 10, 11, 12 | 5 |
|  | 12, 13, 0 | 1, 2, 3, 4, 5 | 6, 7, 8 | 9, 10, 11, 12, 13 | 5 |
|  | 13, 0, 1 | 2, 3, 4, 5, 6, 7 |  | 8, 9, 10, 11, 12, 13 | 6 |
|  | 11, 12, 13 | 0, 1, 2, 3, 4, 5, 6 |  | 7, 8, 9, 10, 11, 12, 13 | 7 |
| 2 | 2, 3 | 4, 5, 6 | 7, 8 | 9, 10, 11 | 3 |
|  | 4, 5 | 6, 7 | 8, 9 | 10, 11 | 2 |
|  | 2, 3 | 4, 5, 6, 7 |  | 8, 9, 10, 11 | 4 |
|  | 4, 5 | 6, 7, 8 |  | 9, 10, 11 | 3 |
| 1 | 4 | 5, 6, 7 | 8 | 9, 10, 11 | 3 |
|  | 4 | 5, 6 | 8 | 9, 10 | 2 |
|  | 4 | 5, 6, 7 |  | 8, 9, 10 | 3 |
|  | 3 | 4, 5, 6, 7 |  | 8, 9, 10, 11 | 4 |
|  | 4 | 5, 6 |  | 7, 8 | 2 |
| 0 |  | 4, 5, 6, 7 |  | 8, 9, 10, 11 | 4 |
|  |  | 4, 5, 6 |  | 8, 9, 10 | 3 |
|  |  | 4, 5 |  | 8, 9 | 2 | positions. In addition, when CAT-4 LBT is used, the number of symbols for LBT is larger than or equal to the number of symbols for the corresponding single-shot LBT under the same subcarrier spacing.

TABLE 5

SS/PBCH block

| Number of symbols per LBT | LBT symbols for SS/PBCH block 1 | SS/PBCH block 1 symbols | Number of symbols per SS/PBCH block |
|---|---|---|---|
| 3 | 13, 0, 1 | 2, 3, 4, 5, 6, 7, 8, 9 | 8 |
|   | 0, 1, 2 | 3, 4, 5, 6, 7, 8, 9 | 7 |
|   | 1, 2, 3 | 4, 5, 6, 7, 8, 9 | 6 |
|   | 2, 3, 4 | 5, 6, 7, 8, 9 | 5 |
|   | 2, 3, 4 | 5, 6, 7, 8 | 4 |
|   | 2, 3, 4 | 5, 6, 7 | 3 |
|   | 2, 3, 4 | 5, 6 | 2 |
|   | 13, 0, 1 | 2, 3, 4, 5, 6, 7, 8, 9, 10 | 9 |
|   | 13, 0, 1 | 2, 3, 4, 5, 6, 7, 8, 9, 10, 11 | 10 |
|   | 12, 13, 0 | 1, 2, 3, 4, 5, 6, 7, 8, 9, 10, 11 | 11 |
|   | 11, 12, 13 | 0, 1, 2, 3, 4, 5, 6, 7, 8, 9, 10, 11 | 12 |
| 2 | 0, 1 | 2, 3, 4, 5, 6, 7, 8, 9 | 8 |
|   | 1, 2 | 3, 4, 5, 6, 7, 8, 9 | 7 |
|   | 2, 3 | 4, 5, 6, 7, 8, 9 | 6 |
|   | 2, 3 | 4, 5, 6, 7, 8 | 5 |
|   | 2, 3 | 4, 5, 6, 7 | 4 |
|   | 2, 3 | 4, 5, 6 | 3 |
|   | 2, 3 | 4, 5 | 2 |
| 1 | 1 | 2, 3, 4, 5, 6, 7, 8, 9 | 8 |
|   | 2 | 3, 4, 5, 6, 7, 8, 9 | 7 |
|   | 2 | 3, 4, 5, 6, 7, 8 | 6 |
|   | 2 | 3, 4, 5, 6, 7 | 5 |
|   | 2 | 3, 4, 5, 6 | 4 |
|   | 2 | 3, 4, 5 | 3 |
|   | 2 | 3, 4 | 2 |
| 0 |   | 2, 3, 4, 5, 6, 7, 8, 9 | 8 |
|   |   | 2, 3, 4, 5, 6, 7, 8 | 7 |
|   |   | 2, 3, 4, 5, 6, 7 | 6 |
|   |   | 2, 3, 4, 5, 6 | 5 |
|   |   | 2, 3, 4, 5 | 4 |
|   |   | 2, 3, 4 | 3 |
|   |   | 2, 3 | 2 |

Figure 17:
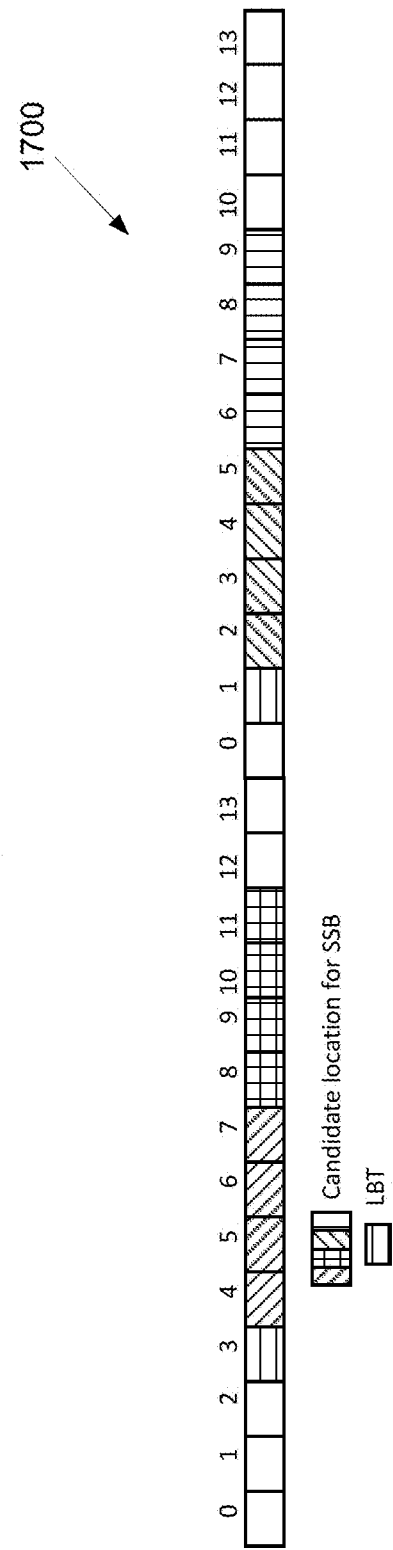
FIG. 17 illustrates yet another example SS/PBCH block mapping according to embodiments of the present disclosure.

FIG. 17 illustrates yet another example SS/PBCH block mapping 1700 according to embodiments of the present disclosure. The embodiment of the SS/PBCH block mapping 1700 illustrated in FIG. 17 is for illustration only. FIG. 17 does not limit the scope of this disclosure to any particular implementation FIG. 18 illustrates yet another example SS/PBCH block mapping 1800 according to embodiments of the present disclosure. The embodiment of the SS/PBCH block mapping 1800 illustrated in FIG. 18 is for illustration only. FIG. 18 does not limit the scope of this disclosure to any particular implementation In one embodiment, FIG. 17 and FIG. 18 give two specific examples of the mapping for SS/PBCH blocks in two consecutive slots (i.e., consecutive non-overlapping blocks of 28 symbols) for NR unlicensed, wherein the first slot follows pattern 2 and the second slot follows pattern 3. FIG. 17 illustrates the example where there are 8 candidate symbol locations for SS/PBCH block(s) within a slot, which can be allocated to one SS/PBCH block with 8 symbols, or two SS/PBCH blocks with each having 4 symbols.

In addition, the SS/PBCH block(s) within a slot is subject to LBT that occurs in 1 symbol preceding the SS/PBCH block(s). In one sub-embodiment, the LBT can also span over more than 1 symbols, e.g., to support 120 kHz SCS or 240 kHz SCS. In another sub-embodiment, the example in FIG. 17 also applies to scenarios where the LBT symbol positions and SS/PBCH block(s) positions are shifted from the example in FIG. 17 within the 2 slots of 28 symbols. One sub-embodiment in FIG. 17 is that if one SS/PBCH block is transmitted within a slot of 14 symbols with each SS/PBCH block consisting of 8 symbols, better one-shot detection performance for SS/PBCH block than NR licensed can be achieved.

In another sub-embodiment for FIG. 17, if two SS/PBCH blocks are transmitted within a slot of 14 symbols, the LBT procedure and directionality for LBT operation and the SS/PBCH blocks may be designed to ensure two consecutive SS/PBCH blocks can be transmitted subject to one successful LBT, and several design examples are detailed in the present disclosure. In another sub-embodiment, the

TABLE 6

SS/PBCH block

| Number of symbols per LBT | LBT symbols for SS/PBCH block 1 | SS/PBCH block 1 symbols | LBT symbols for SS/PBCH block 2 | SS/PBCH block 2 symbols | Number of symbols per SS/PBCH block |
|---|---|---|---|---|---|
| 3 | 0, 1, 2 | 3, 4 | 5, 6, 7 | 8, 9 | 2 |
|   | 0, 1, 2 | 3, 4, 5 |   | 6, 7, 8 | 3 |
|   | 13, 0, 1 | 2, 3, 4, 5 |   | 6, 7, 8, 9 | 4 |
|   | 12, 13, 0 | 1, 2, 3, 4 | 5, 6, 7 | 8, 9, 10, 11 | 4 |
|   | 12, 13, 0 | 1, 2, 3, 4, 5 |   | 6, 7, 8, 9, 10 | 5 |
|   | 11, 12, 13 | 0, 1, 2, 3, 4, 5 |   | 6, 7, 8, 9, 10, 11 | 6 |
| 2 | 0, 1 | 2, 3, 4 | 5, 6 | 7, 8, 9 | 3 |
|   | 2, 3 | 4, 5 | 6, 7 | 8, 9 | 2 |
|   | 0, 1 | 2, 3, 4, 5 |   | 6, 7, 8, 9 | 4 |
|   | 2, 3 | 4, 5, 6 |   | 7, 8, 9 | 3 |
| 1 | 2 | 3, 4, 5 | 6 | 7, 8, 9 | 3 |
|   | 2 | 3, 4 | 6 | 7, 8 | 2 |
|   | 2 | 3, 4, 5 |   | 6, 7, 8 | 3 |
|   | 1 | 2, 3, 4, 5 |   | 6, 7, 8, 9 | 4 |
|   | 2 | 3, 4 |   | 5, 6 | 2 |
| 0 |   | 2, 3, 4, 5 |   | 6, 7, 8, 9 | 4 |
|   |   | 2, 3, 4 |   | 6, 7, 8 | 3 |
|   |   | 2, 3 |   | 6, 7 | 2 | mapping in FIG. 17 can be applied to sub-7 NR-U with 30 KHz SCS or above-7 NR-U with 120 KHz SCS; wherein subject to LBT, the same number of SS/PBCH blocks can be transmitted within a slot as NR. Next in FIG. 18, two SS/PBCH blocks of 3 symbols each are transmitted within one slot, which are subject to LBT that occurs in 1 symbol preceding the SS/PBCH block. This mapping can be applied to the non-standalone NR unlicensed operation for both 30 KHz SCS and 120 KHz, wherein subject to LBT, the same number of SS/PBCH blocks can be transmitted within a slot as NR. In another sub-embodiment, the example in FIG. 18 also applies to scenarios where the LBT symbol positions and SS/PBCH block(s) positions are shifted from the example in FIG. 18 within the 2 slots of 28 symbols.

FIG. 19 illustrates yet another example SS/PBCH block mapping 1900 according to embodiments of the present disclosure. The embodiment of the SS/PBCH block mapping 1900 illustrated in FIG. 19 is for illustration only. FIG. 19 does not limit the scope of this disclosure to any particular implementation FIG. 19 shows another mapping pattern of SS/PBCH blocks in Rel-15 NR with 4 SS/PBCH block candidate locations across consecutive non-overlapping blocks of 28 symbols (i.e., 2 consecutive slots), where the symbols are indexed from 0 to 27. Specifically, 8 symbols are preserved for DL control at the beginning of the first slot, 4 symbols are preserved for guard period and UL control at the end of the second slot, and 4 consecutive SS/PBCH block candidate locations of 16 symbols are allowed in the middle.

In one example, this mapping pattern can be utilized by above-7 GHz beyond Rel-15 NR with 240 KHz SCS for SS/PBCH block. In addition, this mapping can also be utilized for sub-7 GHz beyond Rel-15 NR with 60 KHz SCS for SS/PBCH block, and for above-7 GHz beyond Rel-15 NR with 480 kHz SCS for SS/PBCH block. This mapping is typically combined with the SS/PBCH block mapping pattern 5 in 4 consecutive slots, which will be detailed later.

The OFDM symbol duration with 240 kHz SCS is 4.46 μs, and the mapping of SS/PBCH blocks with 240 KHz SCS for NR unlicensed may depend on the LBT requirement. For example, when 25 μs single-shot LBT as in LTE-LAA is required, the LBT may occupy 6 OFDM symbols with 240 KHz SCS, and 2 symbols for 60 KHz SCS. If the single-shot LBT requirement is between the SIFS (e.g. 3 μs) and DIFS (e.g., 13 μs) of the IEEE 802.11 ad/ay system, LBT may occupy 1, 2 or 3 OFDM symbols for pattern 4 with 240 KHz SCS; and LBT may occupy 2 to 6 OFDM symbols for pattern 4 with 480 kHz SCS. In addition, when CAT-4 LBT is used, the number of symbols for LBT is larger than or equal to the number of symbols for the corresponding single-shot LBT under the same subcarrier spacing. In addition, the number of SS/PBCH blocks that is transmitted across the two consecutive slots under pattern 4 for NR unlicensed could be 1, 2, 3, 4 when SS/PBCH blocks are contained within symbol #8 to symbol #23 as in FIG. 19; or 1, 2, 3, 4, 5, 6, 7 when SS/PBCH blocks are contained across 28 symbols of 2 slots.

Therefore, in one embodiment, for a possible NR-U SS/PBCH block mapping that corresponds to the SS/PBCH block mapping pattern in FIG. 19, the number of symbols of each LBT operation can be {6, 5, 4, 3, 2, 1, 0}; the number of symbols per SS/PBCH block can be n={14, 13, 12, 11, 10, 9, 8, 7, 6, 5, 4, 3, 2}; and the number of SS/PBCH blocks across two slots of 28 symbols can be m={7, 6, 5, 4, 3, 2, 1}.

If denote by {0, 1, 2, ..., 27} the symbol positions for two slots of 28 symbols, then for a possible NR-U SS/PBCH block mapping that corresponds to the SS/PBCH block mapping pattern in FIG. 19, the possible NR-U SS/PBCH block mapping can contain the following: (1) $\{SSB_1, \ldots SSB_m\}$ denotes the set of symbol positions for all SS/PBCH blocks of this mapping, wherein $SSB_i$ contains the set of symbol positions for the i-th SSB with cardinality $|SSB_i|=n$; and $\{LBT_1, \ldots, LBT_m\}$ denotes the symbol positions of all LBT operations of this mapping, wherein $LBT_i$ corresponds to the set of symbol positions for the LBT operation that follows $SSB_{i-1}$ and precedes $SSB_i$.

In one embodiment, for a SS/PBCH block mapping that corresponds to FIG. 19 and that SS/PBCH blocks are contained within symbol #8 to symbol #23, this mapping can be supported if the following constraints are satisfied: (1) $SSB_1 \cup LBT_2 \cup SSB_2 \cup \ldots \cup LBT_m \cup SSB_m \subset SSB$, wherein SSB={8, 9, 10, 11, 12, 13, 14, 15, 16, 17, 18, 19, 20, 21, 22, 23}; (2) $0 \le |LBT_1| \le 6$ (e.g. if LBT follows PIFS duration, $|LBT_1|$ can be 2, 2, 4 for 60 kHz SCS, 240 kHz and 480 kHz SCS respectively); (3) $0 \le |LBT_i| \le |LBT_1|$ for $2 \le i \le n3$; (4) $2 \le |SSB_i| \le 14$ for $1 \le i \le m$; and (5) $1 \le m \le 7$.

In another embodiment, for a SS/PBCH block mapping that corresponds to FIG. 19 and that SS/PBCH blocks can be contained across 28 symbols of 2 slots, this mapping can be supported if the following constraints are satisfied: (1) $SSB_1 \cup LBT_2 \cup SSB_2 \cup \ldots \cup LBT_m \cup SSB_m \subset SSB$, wherein SSB={0, 1, 2, 3, 4, 5, 6, 7, 8, 9, 10, 11, 12, 13, 14, 15, 16, 17, 18, 19, 20, 21, 22, 23, 24, 25, 26, 27}; (2) $0 \le |LBT_1| \le 6$ (e.g. if LBT follows PIFS duration, $|LBT_1|$ can be 2, 2, 4 for 60 kHz SCS, 240 kHz and 480 kHz SCS respectively); (3) $0 \le |LBT_i| \le |LBT_1|$ for $2 \le i \le n3$; (4) $2 \le |SSB_i| \le 8$ for $1 \le i \le m$; and (5) $1 \le m \le 7$.

In one embodiment, the actual supported SS/PBCH block mappings for beyond Rel-15 NR that corresponds to SS/PBCH block mapping pattern 4 can be a subset of the SS/PBCH block mappings that satisfy the above constraints. Another embodiment is that the symbol positions for LBT and SS/PBCH blocks specified above can also be shifted by a few symbols. In addition, the actual transmitted SS/PBCH block(s) can occupy all or a subset of the SS/PBCH block symbol positions. In addition, when CAT-4 LBT is used, the number of symbols for LBT is larger than or equal to the number of symbols for the corresponding single-shot LBT under the same subcarrier spacing. Examples of the possible SS/PBCH block mappings satisfying the constraints are illustrated in TABLE 7 to TABLE 10, wherein the number of SS/PBCH blocks across 28 symbols is 1, 2, 3, and 4, respectively.

In one embodiment, TABLE 7 illustrates some examples of the possible SS/PBCH block mappings for beyond Rel-15 NR under the SS/PBCH block pattern in FIG. 19, wherein 1 SS/PBCH block is transmitted across consecutive non-overlapping blocks of 28 symbols (i.e., two consecutive slots) and the number of LBT symbols for each SS/PBCH block is 0, 1, 2, 3, 4, 5 or 6.

TABLE 7

| Number of symbols per LBT | LBT for symbols SS/PBCH block 1 | SS/PBCH block 1 symbols | Number of symbols per SS/PBCH block |
|---|---|---|---|
| 6 | 8, 9, 10, 11, 12, 13 | 14, 15, 16, 17, 18, 19, 20, 21 | 8 |
|  | 8, 9, 10, 11, 12, 13 | 14, 15, 16, 17, 18, 19, 20 | 7 |
|  | 8, 9, 10, 11, 12, 13 | 14, 15, 16, 17, 18, 19 | 6 |
|  | 8, 9, 10, 11, 12, 13 | 14, 15, 16, 17, 18 | 5 |
|  | 8, 9, 10, 11, 12, 13 | 14, 15, 16, 17 | 4 |
|  | 8, 9, 10, 11, 12, 13 | 14, 15, 16 | 3 |
|  | 8, 9, 10, 11, 12, 13 | 14, 15 | 2 |
|  | 8, 9, 10, 11, 12, 13 | 14, 15, 16, 17, 18, 19, 20, 21, 22 | 9 |
|  | 8, 9, 10, 11, 12, 13 | 14, 15, 16, 17, 18, 19, 20, 21, 22, 23 | 10 |
|  | 7, 8, 9, 10, 11, 12 | 13, 14, 15, 16, 17, 18, 19, 20, 21, 22, 23 | 11 |
|  | 6, 7, 8, 9, 10, 11 | 12, 13, 14, 15, 16, 17, 18, 19, 20, 21, 22, 23 | 12 |
|  | 5, 6, 7, 8, 9, 10 | 11, 12, 13, 14, 15, 16, 17, 18, 19, 20, 21, 22, 23 | 13 |
|  | 4, 5, 6, 7, 8, 9 | 10, 11, 12, 13, 14, 15, 16, 17, 18, 19, 20, 21, 22, 23 | 14 |
| 5 | 8, 9, 10, 11, 12 | 13, 14, 15, 16, 17, 18, 19, 20 | 8 |
|  | 8, 9, 10, 11, 12 | 13, 14, 15, 16, 17, 18, 19 | 7 |
|  | 8, 9, 10, 11, 12 | 13, 14, 15, 16, 17, 18 | 6 |
|  | 8, 9, 10, 11, 12 | 13, 14, 15, 16, 17 | 5 |
|  | 8, 9, 10, 11, 12 | 13, 14, 15, 16 | 4 |
|  | 8, 9, 10, 11, 12 | 13, 14, 15 | 3 |
|  | 8, 9, 10, 11, 12 | 13, 14 | 2 |
|  | 9, 10, 11, 12, 13 | 14, 15, 16, 17, 18, 19, 20, 21, 22 | 9 |
|  | 9, 10, 11, 12, 13 | 14, 15, 16, 17, 18, 19, 20, 21, 22, 23 | 10 |
|  | 8, 9, 10, 11, 12 | 13, 14, 15, 16, 17, 18, 19, 20, 21, 22, 23 | 11 |
|  | 7, 8, 9, 10, 11 | 12, 13, 14, 15, 16, 17, 18, 19, 20, 21, 22, 23 | 12 |
|  | 6, 7, 8, 9, 10 | 11, 12, 13, 14, 15, 16, 17, 18, 19, 20, 21, 22, 23 | 13 |
|  | 5, 6, 7, 8, 9 | 10, 11, 12, 13, 14, 15, 16, 17, 18, 19, 20, 21, 22, 23 | 14 |
| 4 | 8, 9, 10, 11 | 12, 13, 14, 15, 16, 17, 18, 19 | 8 |
|  | 8, 9, 10, 11 | 12, 13, 14, 15, 16, 17, 18 | 7 |
|  | 8, 9, 10, 11 | 12, 13, 14, 15, 16, 17 | 6 |
|  | 8, 9, 10, 11 | 12, 13, 14, 15, 16 | 5 |
|  | 8, 9, 10, 11 | 12, 13, 14, 15 | 4 |
|  | 8, 9, 10, 11 | 12, 13, 14 | 3 |
|  | 8, 9, 10, 11 | 12, 13 | 2 |
|  | 10, 11, 12, 13 | 14, 15, 16, 17, 18, 19, 20, 21, 22 | 9 |
|  | 10, 11, 12, 13 | 14, 15, 16, 17, 18, 19, 20, 21, 22, 23 | 10 |
|  | 9, 10, 11, 12 | 13, 14, 15, 16, 17, 18, 19, 20, 21, 22, 23 | 11 |
|  | 8, 9, 10, 11 | 12, 13, 14, 15, 16, 17, 18, 19, 20, 21, 22, 23 | 12 |
|  | 7, 8, 9, 10 | 11, 12, 13, 14, 15, 16, 17, 18, 19, 20, 21, 22, 23 | 13 |
|  | 6, 7, 8, 9 | 10, 11, 12, 13, 14, 15, 16, 17, 18, 19, 20, 21, 22, 23 | 14 |
| 3 | 8, 9, 10 | 11, 12, 13, 14, 15, 16, 17, 18 | 8 |
|  | 8, 9, 10 | 11, 12, 13, 14, 15, 16, 17 | 7 |
|  | 8, 9, 10 | 11, 12, 13, 14, 15, 16 | 6 |
|  | 8, 9, 10 | 11, 12, 13, 14, 15 | 5 |
|  | 8, 9, 10 | 11, 12, 13, 14 | 4 |
|  | 8, 9, 10 | 11, 12, 13 | 3 |
|  | 8, 9, 10 | 11, 12 | 2 |
|  | 11, 12, 13 | 14, 15, 16, 17, 18, 19, 20, 21, 22 | 9 |
|  | 11, 12, 13 | 14, 15, 16, 17, 18, 19, 20, 21, 22, 23 | 10 |
|  | 10, 11, 12 | 13, 14, 15, 16, 17, 18, 19, 20, 21, 22, 23 | 11 |
|  | 9, 10, 11 | 12, 13, 14, 15, 16, 17, 18, 19, 20, 21, 22, 23 | 12 |
|  | 8, 9, 10 | 11, 12, 13, 14, 15, 16, 17, 18, 19, 20, 21, 22, 23 | 13 |
|  | 7, 8, 9 | 10, 11, 12, 13, 14, 15, 16, 17, 18, 19, 20, 21, 22, 23 | 14 |
| 2 | 8, 9 | 10, 11, 12, 13, 14, 15, 16, 17 | 8 |
|  | 8, 9 | 10, 11, 12, 13, 14, 15, 16 | 7 |
|  | 8, 9 | 10, 11, 12, 13, 14, 15 | 6 |
|  | 8, 9 | 10, 11, 12, 13, 14 | 5 |
|  | 8, 9 | 10, 11, 12, 13 | 4 |
|  | 8, 9 | 10, 11, 12 | 3 |
|  | 8, 9 | 10, 11 | 2 |
|  | 12, 13 | 14, 15, 16, 17, 18, 19, 20, 21, 22 | 9 |
|  | 12, 13 | 14, 15, 16, 17, 18, 19, 20, 21, 22, 23 | 10 |
|  | 11, 12 | 13, 14, 15, 16, 17, 18, 19, 20, 21, 22, 23 | 11 |
|  | 10, 11 | 12, 13, 14, 15, 16, 17, 18, 19, 20, 21, 22, 23 | 12 |
|  | 9, 10 | 11, 12, 13, 14, 15, 16, 17, 18, 19, 20, 21, 22, 23 | 13 |
|  | 8, 9 | 10, 11, 12, 13, 14, 15, 16, 17, 18, 19, 20, 21, 22, 23 | 14 |
| 1 | 8 | 9, 10, 11, 12, 13, 14, 15, 16 | 8 |
|  | 8 | 9, 10, 11, 12, 13, 14, 15 | 7 |
|  | 8 | 9, 10, 11, 12, 13, 14 | 6 |
|  | 8 | 9, 10, 11, 12, 13 | 5 |
|  | 8 | 9, 10, 11, 12 | 4 |
|  | 8 | 9, 10, 11 | 3 |

TABLE 7-continued

| | | SS/PBCH block | |
|---|---|---|---|
| Number of symbols per LBT | LBT for symbols SS/PBCH block 1 | SS/PBCH block 1 symbols | Number of symbols per SS/PBCH block |
| | 8 | 9, 10 | 2 |
| | 13 | 14, 15, 16, 17, 18, 19, 20, 21, 22 | 9 |
| | 13 | 14, 15, 16, 17, 18, 19, 20, 21, 22, 23 | 10 |
| | 12 | 13, 14, 15, 16, 17, 18, 19, 20, 21, 22, 23 | 11 |
| | 11 | 12, 13, 14, 15, 16, 17, 18, 19, 20, 21, 22, 23 | 12 |
| | 10 | 11, 12, 13, 14, 15, 16, 17, 18, 19, 20, 21, 22, 23 | 13 |
| | 9 | 10, 11, 12, 13, 14, 15, 16, 17, 18, 19, 20, 21, 22, 23 | 14 |
| 0 | | 8, 9, 10, 11, 12, 13, 14, 15 | 8 |
| | | 8, 9, 10, 11, 12, 13, 14 | 7 |
| | | 8, 9, 10, 11, 12, 13 | 6 |
| | | 8, 9, 10, 11, 12 | 5 |
| | | 8, 9, 10, 11 | 4 |
| | | 8, 9, 10 | 3 |
| | | 8, 9 | 2 |
| | | 14, 15, 16, 17, 18, 19, 20, 21, 22 | 9 |
| | | 14, 15, 16, 17, 18, 19, 20, 21, 22, 23 | 10 |
| | | 13, 14, 15, 16, 17, 18, 19, 20, 21, 22, 23 | 11 |
| | | 12, 13, 14, 15, 16, 17, 18, 19, 20, 21, 22, 23 | 12 |
| | | 11, 12, 13, 14, 15, 16, 17, 18, 19, 20, 21, 22, 23 | 13 |
| | | 10, 11, 12, 13, 14, 15, 16, 17, 18, 19, 20, 21, 22, 23 | 14 |

In one embodiment, TABLE 8 illustrates examples of possible SS/PBCH block mappings for beyond Rel-15 NR under the SS/PBCH block pattern in FIG. 19, wherein 2 SS/PBCH blocks are transmitted across consecutive non-overlapping blocks of 28 symbols (i.e., two consecutive slots) and the number of LBT symbols is 0, 1, 2, 3, 4, 5 or 6. In one sub-embodiment, subject to the maximum channel occupancy time (MCOT) of the LBT, two SS/PBCH blocks can be transmitted consecutively after only 1 LBT process that precedes the first SS/PBCH block succeeds. Another sub-embodiment of TABLE 8 is that when LBT requires 1, 2 or 3 symbols, both standalone and non-standalone NR unlicensed operations could be supported.

TABLE 8

| | | SS/PBCH block | | | |
|---|---|---|---|---|---|
| Number of symbols per LBT | LBT symbols for SS/PBCH block 1 | SS/PBCH block 1 symbols | LBT symbols for SS/PBCH block 2 | SS/PBCH block 2 symbols | Number of symbols per SS/PBCH block |
| 6 | 6, 7, 8, 9, 10, 11 | 12, 13, 14 | 15, 16, 17, 18, 19, 20 | 21, 22, 23 | 3 |
| | 8, 9, 10, 11, 12, 13 | 14, 15 | 16, 17, 18, 19, 20, 21 | 22, 23 | 2 |
| | 6, 7, 8, 9, 10, 11 | 12, 13, 14, 15, 16, 17 | | 18, 19, 20, 21, 22, 23 | 6 |
| | 8, 9, 10, 11, 12, 13 | 14, 15, 16, 17, 18 | | 19, 20, 21, 22, 23 | 5 |
| | 8, 9, 10, 11, 12, 13 | 14, 15, 16, 17 | | 18, 19, 20, 21 | 4 |
| | 8, 9, 10, 11, 12, 13 | 14, 15, 16 | | 17, 18, 19 | 3 |
| | 8, 9, 10, 11, 12, 13 | 14, 15 | | 17, 18 | 2 |
| | 4, 5, 6, 7, 8, 9 | 10, 11, 12, 13, 14, 15, 16 | | 17, 18, 19, 20, 21, 22, 23 | 7 |
| | 2, 3, 4, 5, 6, 7 | 8, 9, 10, 11, 12, 13, 14, 15 | | 16, 17, 18, 19, 20, 21, 22, 23 | 8 |
| 5 | 6, 7, 8, 9, 10 | 11, 12, 13, 14 | 15, 16, 17, 18, 19 | 20, 21, 22, 23 | 4 |
| | 5, 6, 7, 8, 9 | 10, 11, 12, 13, 14, 15, 16 | | 17, 18, 19, 20, 21, 22, 23 | 7 |
| | 7, 8, 9, 10, 11 | 12, 13, 14, 15 | | 16, 17, 18, 19 | 6 |
| | 3, 4, 5, 6, 7 | 8, 9, 10, 11, 12, 13, 14, 15 | | 16, 17, 18, 19, 20, 21, 22, 23 | 8 |
| 4 | 6, 7, 8, 9 | 10, 11, 12, 13, 14 | 15, 16, 17, 18 | 19, 20, 21, 22, 23 | 5 |
| | 8, 9, 10, 11 | 12, 13, 14, 15 | 16, 17, 18, 19 | 20, 21, 22, 23 | 4 |
| | 8, 9, 10, 11 | 12, 13, 14, 15, 16, 17 | | 18, 19, 20, 21, 22, 23 | 6 |
| | 8, 9, 10, 11 | 12, 13, 14, 15 | | 16, 17, 18, 19 | 4 |
| | 6, 7, 8, 9 | 10, 11, 12, 13, 14, 15, 16 | | 17, 18, 19, 20, 21, 22, 23 | 7 |
| | 2, 3, 4, 5 | 6, 7, 8, 9, 10, 11, 12 | 13, 14, 15, 16 | 17, 18, 19, 20, 21, 22, 23 | 7 |
| | 4, 5, 6, 7 | 8, 9, 10, 11, 12, 13, 14, 15 | | 16, 17, 18, 19, 20, 21, 22, 23 | 8 |
| | 0, 1, 2, 3 | 4, 5, 6, 7, 8, 9, 10, 11 | 12, 13, 14, 15 | 16, 17, 18, 19, 20, 21, 22, 23 | 8 |
| 3 | 6, 7, 8 | 9, 10, 11, 12, 13, 14 | 15, 16, 17 | 18, 19, 20, 21, 22, 23 | 6 |
| | 8, 9, 10 | 11, 12, 13, 14, 15 | 16, 17, 18 | 19, 20, 21, 22, 23 | 5 |
| | 8, 9, 10 | 11, 12, 13, 14 | 15, 16, 17 | 18, 19, 20, 21 | 4 |
| | 8, 9, 10 | 11, 12, 13 | 14, 15, 16 | 17, 18, 19 | 3 |
| | 8, 9, 10 | 11, 12 | 14, 15, 16 | 17, 18 | 2 |
| | 5, 6, 7 | 8, 9, 10, 11, 12, 13, 14, 15 | | 16, 17, 18, 19, 20, 21, 22, 23 | 8 |
| | 7, 8, 9 | 10, 11, 12, 13, 14, 15, 16 | | 17, 18, 19, 20, 21, 22, 23 | 7 |
| | 8, 9, 10 | 11, 12, 13, 14, 15, 16 | | 17, 18, 19, 20, 21, 22 | 6 |

TABLE 8-continued

| | | SS/PBCH block | | | |
|---|---|---|---|---|---|
| Number of symbols per LBT | LBT symbols for SS/PBCH block 1 | SS/PBCH block 1 symbols | LBT symbols for SS/PBCH block 2 | SS/PBCH block 2 symbols | Number of symbols per SS/PBCH block |
| | 8, 9, 10 | 11, 12, 13, 14, 15 | | 16, 17, 18, 19, 20 | 5 |
| | 8, 9, 10 | 11, 12, 13, 14 | | 15, 16, 17, 18 | 4 |
| | 8, 9, 10 | 11, 12, 13 | | 14, 15, 16 | 3 |
| | 8, 9, 10 | 11, 12 | | 14, 15 | 2 |
| | 4, 5, 6 | 7, 8, 9, 10, 11, 12, 13 | 14, 15, 16 | 17, 18, 19, 20, 21, 22, 23 | 7 |
| 2 | 2, 3, 4 | 5, 6, 7, 8, 9, 10, 11, 12 | 13, 14, 15 | 16, 17, 18, 19, 20, 21, 22, 23 | 8 |
| | 6, 7 | 8, 9, 10, 11, 12, 13, 14 | 15, 16 | 17, 18, 19, 20, 21, 22, 23 | 7 |
| | 8, 9 | 10, 11, 12, 13, 14, 15 | 16, 17 | 18, 19, 20, 21, 22, 23 | 6 |
| | 8, 9 | 10, 11, 12, 13, 14 | 15, 16 | 17, 18, 19, 20, 21 | 5 |
| | 8, 9 | 10, 11, 12, 13 | 14, 15 | 16, 17, 18, 19 | 4 |
| | 8, 9 | 10, 11, 12 | 14, 15 | 16, 17, 18 | 3 |
| | 8, 9 | 10, 11 | 12, 13 | 14, 15 | 2 |
| | 6, 7 | 8, 9, 10, 11, 12, 13, 14, 15 | | 16, 17, 18, 19, 20, 21, 22, 23 | 8 |
| | 8, 9 | 10, 11, 12, 13, 14, 15, 16 | | 17, 18, 19, 20, 21, 22, 23 | 7 |
| | 8, 9 | 10, 11, 12, 13, 14, 15 | | 16, 17, 18, 19, 20, 21 | 6 |
| | 8, 9 | 10, 11, 12, 13, 14 | | 15, 16, 17, 18, 19 | 5 |
| | 8, 9 | 10, 11, 12, 13 | | 14, 15, 16, 17 | 4 |
| | 8, 9 | 10, 11, 12 | | 13, 14, 15 | 3 |
| | 8, 9 | 10, 11 | | 12, 13 | 2 |
| | 4, 5 | 6, 7, 8, 9, 10, 11, 12, 13 | 14, 15 | 16, 17, 18, 19, 20, 21, 22, 23 | 8 |
| 1 | 8 | 9, 10, 11, 12, 13, 14, 15 | 16 | 17, 18, 19, 20, 21, 22, 23 | 7 |
| | 8 | 9, 10, 11, 12, 13, 14 | 15 | 16, 17, 18, 19, 20, 21 | 6 |
| | 8 | 9, 10, 11, 12, 13, 14 | 15 | 16, 17, 18, 19, 20 | 5 |
| | 8 | 9, 10, 11, 12 | 13 | 14, 15, 16, 17 | 4 |
| | 8 | 9, 10, 11 | 12 | 13, 14, 15 | 3 |
| | 8 | 9, 10 | 11 | 12, 13 | 2 |
| | 7 | 8, 9, 10, 11, 12, 13, 14, 15 | | 16, 17, 18, 19, 20, 21, 22, 23 | 8 |
| | 8 | 9, 10, 11, 12, 13, 14, 15 | | 16, 17, 18, 19, 20, 21, 22 | 7 |
| | 8 | 9, 10, 11, 12, 13, 14 | | 15, 16, 17, 18, 19, 20 | 6 |
| | 8 | 9, 10, 11, 12, 13 | | 14, 15, 16, 17, 18 | 5 |
| | 8 | 9, 10, 11, 12 | | 13, 14, 15, 16 | 4 |
| | 8 | 9, 10, 11 | | 12, 13, 14 | 3 |
| | 8 | 9, 10 | | 11, 12 | 2 |
| 0 | | 8, 9, 10, 11, 12, 13, 14, 15 | | 16, 17, 18, 19, 20, 21, 22, 23 | 8 |
| | | 8, 9, 10, 11, 12, 13, 14 | | 15, 16, 17, 18, 19, 20, 21 | 7 |
| | | 8, 9, 10, 11, 12, 13 | | 14, 15, 16, 17, 18, 19 | 6 |
| | | 8, 9, 10, 11, 12 | | 14, 15, 16, 17, 18 | 5 |
| | | 8, 9, 10, 11 | | 12, 13, 14, 15 | 4 |
| | | 8, 9, 10 | | 11, 12, 13 | 3 |
| | | 8, 9 | | 10, 11 | 2 |
| | | 5, 6, 7, 8, 9, 10, 11, 12, 13 | | 14, 15, 16, 17, 18, 19, 20, 21, 22 | 9 |
| | | 4, 5, 6, 7, 8, 9, 10, 11, 12, 13 | | 14, 15, 16, 17, 18, 19, 20, 21, 22, 23 | 10 |
| | | 3, 4, 5, 6, 7, 8, 9, 10, 11, 12, 13 | | 14, 15, 16, 17, 18, 19, 20, 21, 22, 23, 24 | 11 |
| | | 2, 3, 4, 5, 6, 7, 8, 9, 10, 11, 12, 13 | | 14, 15, 16, 17, 18, 19, 20, 21, 22, 23, 24, 25 | 12 |
| | | 1, 2, 3, 4, 5, 6, 7, 8, 9, 10, 11, 12, 13 | | 14, 15, 16, 17, 18, 19, 20, 21, 22, 23, 24, 25, 26 | 12 |
| | | 0, 1, 2, 3, 4, 5, 6, 7, 8, 9, 10, 11, 12, 13 | | 14, 15, 16, 17, 18, 19, 20, 21, 22, 23, 24, 25, 26, 27 | 12 |

In one embodiment, TABLE 9 illustrates examples of possible SS/PBCH block mappings for beyond Rel-15 NR under the SS/PBCH block pattern in FIG. 19, wherein 3 SS/PBCH blocks are transmitted across consecutive non-overlapping blocks of 28 symbols (i.e., two consecutive slots) and the number of LBT symbols for each SS/PBCH block is 0, 1, 2, 3, 4, 5, or 6. In one embodiment, subject to the maximum channel occupancy time (MCOT) of the LBT, SS/PBCH blocks can be transmitted consecutively after only 1 LBT process that precedes the first SS/PBCH block succeeds.

TABLE 9

| | | | | SS/PBCH block | | | | |
|---|---|---|---|---|---|---|---|---|
| Number of symbols per LBT | LBT symbols for SS/PBCH block 1 | SS/PBCH block 1 symbols | LBT symbols for SS/PBCH block 2 | SS/PBCH block 2 symbols | LBT symbols for SS/PBCH block 3 | SS/PBCH block 3 symbols | Number of symbols per SS/PBCH block |
| 6 | 8, 9, 10, 11, 12, 13 | 14, 15, 16 | | 17, 18, 19 | | 20, 21, 22 | 3 |

TABLE 9-continued

| Number of symbols per LBT | LBT symbols for SS/PBCH block 1 | SS/PBCH block 1 symbols | LBT symbols for SS/PBCH block 2 | SS/PBCH block 2 symbols | LBT symbols for SS/PBCH block 3 | SS/PBCH block 3 symbols | Number of symbols per SS/PBCH block |
|---|---|---|---|---|---|---|---|
| | 8, 9, 10, 11, 12, 13 | 14, 15 | | 16, 17 | | 18, 19 | 2 |
| | 6, 7, 8, 9, 10, 11 | 12, 13, 14, 15 | | 16, 17, 18, 19 | | 20, 21, 22, 23 | 4 |
| | 3, 4, 5, 6, 7, 8, 9, 10, 11, 12, 13 | | | 14, 15, 16, 17, 18 | | 19, 20, 21, 22, 23 | 5 |
| 5 | 7, 8, 9, 10, 11 | 12, 13, 14, 15 | | 16, 17, 18, 19 | | 20, 21, 22, 23 | 4 |
| 4 | 8, 9, 10, 11 | 12, 13, 14, 15 | | 16, 17, 18, 19 | | 20, 21, 22, 23 | 4 |
| | 6, 7, 8, 9 | 10, 11 | 12, 13, 14, 15 | 16, 17 | 18, 19, 20, 21 | 22, 23 | 2 |
| | 3, 4, 5, 6 | 7, 8, 9 | 10, 11, 12, 13 | 14, 15, 16 | 17, 18, 19, 20 | 21, 22, 23 | 3 |
| | 4, 5, 6, 7, 8 | 9, 10, 11, 12, 13 | | 14, 15, 16, 17, 18 | | 19, 20, 21, 22, 23 | 5 |
| | 1, 2, 3, 4, 5 | 6, 7, 8, 9, 10, 11 | | 12, 13, 14, 15, 16, 17 | | 18, 19, 20, 21, 22, 23 | 6 |
| 3 | 6, 7, 8 | 9, 10, 11 | 12, 13, 14 | 15, 16, 17 | 18, 19, 20 | 21, 22, 23 | 3 |
| | 8, 9, 10 | 11, 12 | 13, 14, 15 | 16, 17 | 18, 19, 20 | 21, 22 | 2 |
| | 4, 5, 6 | 7, 8, 9, 10 | 11, 12, 13 | 14, 15, 16, 17 | 18, 19, 20 | 21, 22, 23, 24 | 4 |
| | 6, 7, 8 | 9, 10, 11, 12, 13 | | 14, 15, 16, 17, 18 | | 19, 20, 21, 22, 23 | 5 |
| | 8, 9, 10 | 11, 12, 13, 14 | | 15, 16, 17, 18 | | 19, 20, 21, 22 | 4 |
| | 8, 9, 10 | 11, 12, 13 | | 14, 15, 16 | | 17, 18, 19 | 3 |
| | 8, 9, 10 | 11, 12 | | 13, 14 | | 15, 16 | 2 |
| | 2, 3, 4, 5 | 6, 7, 8, 9, 10, 11 | | 12, 13, 14, 15, 16, 17 | | 18, 19, 20, 21, 22, 23 | 6 |
| 2 | 6, 7 | 8, 9, 10, 11 | 12, 13 | 14, 15, 16, 17 | 18, 19 | 20, 21, 22, 23 | 4 |
| | 8, 9 | 10, 11, 12 | 13, 14 | 15, 16, 17 | 18, 19 | 20, 21, 22 | 3 |
| | 8, 9 | 10, 11 | 12, 13 | 14, 15 | 16, 17 | 18, 19 | 2 |
| | 7, 8 | 9, 10, 11, 12, 13 | | 14, 15, 16, 17, 18 | | 19, 20, 21, 22, 23 | 5 |
| | 8, 9 | 10, 11, 12, 13 | | 14, 15, 16, 17 | | 18, 19, 20, 21 | 4 |
| | 8, 9 | 10, 11, 12 | | 13, 14, 15 | | 16, 17, 18 | 3 |
| | 8, 9 | 10, 11 | | 12, 13 | | 14, 15 | 2 |
| 1 | 8 | 9, 10, 11, 12 | 13 | 14, 15, 16, 17 | 18 | 19, 20, 21, 22 | 4 |
| | 8 | 9, 10, 11 | 12 | 13, 14, 15 | 16 | 17, 18, 19 | 3 |
| | 8 | 9, 10 | 11 | 12, 13 | 14 | 15, 16 | 2 |
| | 7 | 8, 9, 10, 11, 12 | | 13, 14, 15, 16, 17 | | 18, 19, 20, 21, 22 | 5 |
| | 8 | 9, 10, 11, 12 | | 13, 14, 15, 16 | | 17, 18, 19, 20 | 4 |
| | 8 | 9, 10, 11 | | 12, 13, 14 | | 15, 16, 17 | 3 |
| | 8 | 9, 10 | | 11, 12 | | 13, 14 | 2 |
| | 5 | 6, 7, 8, 9, 10, 11 | | 12, 13, 14, 15, 16, 17 | | 18, 19, 20, 21, 22, 23 | 6 |
| 0 | | 8, 9, 10, 11, 12 | | 13, 14, 15, 16, 17 | | 18, 19, 20, 21, 22 | 5 |
| | | 8, 9, 10, 11 | | 12, 13, 14, 15 | | 16, 17, 18, 19 | 4 |
| | | 8, 9, 10 | | 12, 13, 14 | | 16, 17, 18 | 3 |
| | | 8, 9 | | 12, 13 | | 16, 17 | 2 |
| | | 6, 7, 8, 9, 10, 11 | | 12, 13, 14, 15, 16, 17 | | 18, 19, 20, 21, 22, 23 | 6 |
| | | 5, 6, 7, 8, 9, 10, 11 | | 12, 13, 14, 15, 16, 17, 18 | | 19, 20, 21, 22, 23, 24, 25 | 7 |
| | | 3, 4, 5, 6, 7, 8, 9, 10 | | 11, 12, 13, 14, 15, 16, 17, 18 | | 19, 20, 21, 22, 23, 24, 25, 26 | 8 |
| | | 1, 2, 3, 4, 5, 6, 7, 8, 9 | | 10, 11, 12, 13, 14, 15, 16, 17, 18 | | 19, 20, 21, 22, 23, 24, 25, 26, 27 | 9 |

In one embodiment, TABLE 10A and TABLE 10B illustrates examples of possible SS/PBCH block mappings for beyond Rel-15 NR under the SS/PBCH block pattern in FIG. 19, wherein 4 SS/PBCH blocks are transmitted across consecutive non-overlapping blocks of 28 symbols (i.e., two consecutive slots) and the number of LBT symbols for each SS/PBCH block is 0, 1, 2, 3, 4, 5, or 6. In one embodiment, subject to the maximum channel occupancy time (MCOT) of the LBT, SS/PBCH blocks can be transmitted consecutively after only 1 LBT process that precedes the first SS/PBCH block succeeds.

TABLE 10A

| | | SS/PBCH block | | |
|---|---|---|---|---|
| Number of symbols per LBT | LBT symbols for SS/PBCH block 1 | SS/PBCH block 1 symbols | LBT symbols for SS/PBCH block 2 | SS/PBCH block 2 symbols |
| 6 | 6, 7, 8, 9, 10, 11 | 12, 13, 14 | | 15, 16, 17 |
| | 2, 3, 4, 5, 6, 7 | 8, 9, 10, 11 | | 12, 13, 14, 15 |
| 5 | 7, 8, 9, 10, 11 | 12, 13, 14 | | 15, 16, 17 |
| | 3, 4, 5, 6, 7 | 8, 9, 10, 11 | | 12, 13, 14, 15 |
| 4 | 4, 5, 6, 7 | 8, 9, 10, 11 | | 12, 13, 14, 15 |
| 3 | 5, 6, 7 | 8, 9, 10, 11 | | 12, 13, 14, 15 |
| | 8, 9, 10 | 11, 12, 13 | | 14, 15, 16 |
| | 8, 9, 10 | 11, 12 | | 13, 14 |
| | 6, 7, 8 | 9, 10, 11 | | 12, 13, 14 |
| | 8, 9, 10 | 11, 12 | | 13, 14 |
| 2 | 8, 9 | 10, 11 | 12, 13 | 14, 15 |
| | 6, 7 | 8, 9, 10, 11 | | 12, 13, 14, 15 |
| | 8, 9 | 10, 11, 12 | | 13, 14, 15 |
| | 8, 9 | 10, 11 | | 12, 13 |
| | 8, 9 | 10, 11, 12 | | 13, 14, 15 |
| | 8, 9 | 10, 11 | | 12, 13 |
| 1 | 8 | 9, 10, 11 | 12 | 13, 14, 15 |
| | 8 | 9, 10 | 11 | 12, 13 |
| | 7 | 8, 9, 10, 11 | | 12, 13, 14, 15 |
| | 4 | 5, 6, 7, 8 | 9 | 10, 11, 12, 13 |
| | 8 | 9, 10, 11 | | 12, 13, 14 |
| | 8 | 9, 10 | | 11, 12 |
| | 8 | 9, 10, 11 | | 12, 13, 14 |
| | 8 | 9, 10 | | 11, 12 |
| 0 | | 8, 9, 10, 11 | | 12, 13, 14, 15 |
| | | 8, 9, 10 | | 12, 13, 14 |
| | | 8, 9 | | 12, 13 |
| | | 5, 6, 7, 8, 9 | | 10, 11, 12, 13, 14 |
| | | 2, 3, 4, 5, 6, 7 | | 8, 9, 10, 11, 12, 13 |
| | | 0, 1, 2, 3, 4, 5, 6 | | 7, 8, 9, 10, 11, 12, 13 |

TABLE 10B

| | | SS/PBCH block | | | |
|---|---|---|---|---|---|
| Number of symbols pe LBT | LBT symbols for SS/PBCH block 3 | SS/PBCH block 3 symbols | LBT symbols for SS/PBCH block 4 | SS/PBCH block 4 symbols | Number of symbols per SS/PBCH block |
| 6 | | 18, 19, 20 | | 21, 22, 23 | 3 |
| | | 16, 17, 18, 19 | | 20, 21, 22, 23 | 4 |
| 5 | | 18, 19, 20 | | 21, 22, 23 | 3 |
| | | 16, 17, 18, 19 | | 20, 21, 22, 23 | 4 |
| 4 | | 16, 17, 18, 19 | | 20, 21, 22, 23 | 4 |
| 3 | | 16, 17, 18, 19 | | 20, 21, 22, 23 | 4 |
| | | 17, 18, 19 | | 20, 21, 22 | 3 |
| | | 15, 16 | | 17, 18 | 2 |
| | 15, 16, 17 | 18, 19, 20 | | 21, 22, 23 | 3 |
| | 15, 16, 17 | 18, 19 | | 20, 21 | 2 |
| 2 | 16, 17 | 18, 19 | 20, 21 | 22, 23 | 2 |
| | | 16, 17, 18, 19 | | 20, 21, 22, 23 | 4 |
| | | 16, 17, 18 | | 19, 20, 21 | 3 |
| | | 14, 15 | | 16, 17 | 2 |
| | 16, 17 | 18, 19, 20 | | 21, 22, 23 | 3 |
| | 14, 15 | 16, 17 | | 18, 19 | 2 |
| 1 | 16 | 17, 18, 19 | 20 | 21, 22, 23 | 3 |
| | 14 | 15, 1, 6 | 17 | 18, 19 | 2 |
| | | 16, 17, 18, 19 | | 20, 21, 22, 23 | 4 |
| | 14 | 15, 16, 17, 18 | 19 | 20, 21, 22, 23 | 4 |
| | | 15, 16, 17 | | 18, 19, 20 | 3 |
| | | 13, 14 | | 15, 16 | 2 |
| | 15 | 16, 17, 18 | | 19, 20, 21 | 3 |
| | 13 | 14, 15 | | 16, 17 | 2 |
| 0 | | 16, 17, 18, 19 | | 20, 21, 22, 23 | 4 |
| | | 16, 17, 18 | | 20, 21, 22 | 3 |
| | | 16, 17 | | 20, 21 | 2 |
| | | 15, 16, 17, 18, 19 | | 20, 21, 22, 23, 24 | 5 |

TABLE 10B-continued

| | | SS/PBCH block | | | |
|---|---|---|---|---|---|
| Number of symbols pe LBT | LBT symbols for SS/PBCH block 3 | SS/PBCH block 3 symbols | LBT symbols for SS/PBCH block 4 | SS/PBCH block 4 symbols | Number of symbols per SS/PBCH block |
| | | 14, 15, 16, 17, 18, 19 | | 20, 21, 22, 23, 24, 25 | 6 |
| | | 14, 15, 16, 17, 18, 19, 20 | | 21, 22, 23, 24, 25, 26, 27 | 7 |

FIG. 20 illustrates yet another example SS/PBCH block mapping 2000 according to embodiments of the present disclosure. The embodiment of the SS/PBCH block mapping 2000 illustrated in FIG. 20 is for illustration only. FIG. 20 does not limit the scope of this disclosure to any particular implementation.

FIG. 20 shows another mapping pattern of SS/PBCH blocks in Rel-15 NR with 4 SS/PBCH block candidate locations across consecutive non-overlapping blocks of 28 symbols (i.e., 2 consecutive slots). Specifically, 4 symbols are preserved for DL control at the beginning of the first slot, 8 symbols are preserved for guard period and UL control at the end of the second slot, and 4 consecutive SS/PBCH block candidate locations of 16 symbols are allowed in the middle. In one example, this mapping pattern can be utilized by above-7 GHz beyond Rel-15 NR with 240 KHz SCS for SS/PBCH block. In addition, this mapping can also be utilized for sub-7 GHz beyond Rel-15 NR with 60 KHz SCS for SS/PBCH block, and for above-7 beyond Rel-15 NR with 480 kHz SCS for SS/PBCH block. This mapping is typically combined with the SS/PBCH block mapping pattern 4 in 4 consecutive slots, wherein pattern 5 is used in the last 2 slots.

In one embodiment, the possible SS/PBCH block mappings for beyond Rel-15 NR under the SS/PBCH block pattern in FIG. 20 (i.e., pattern 5) can be inferred from similar constraints of those under the SS/PBCH block pattern in FIG. 19 (i.e., pattern 4). Specifically, in one embodiment, if denote by $\{0, 1, 2, \ldots, 27\}$ the symbol positions for two slots of 28 symbols, then for a possible beyond Rel-15 NR SS/PBCH block mapping that corresponds to the SS/PBCH block mapping pattern in FIG. 20, which contains the following: (1) $\{SSB_1, \ldots SSB_m\}$ denotes the set of symbol positions for all SS/PBCH blocks of this mapping, wherein $SSB_i$ contains the set of symbol positions for the i-th SSB with cardinality $|SSB_i|=n$; and $\{LBT_1, \ldots, LBT_m\}$ denotes the symbol positions of all LBT operations of this mapping, wherein $LBT_i$ corresponds to the set of symbol positions for the LBT operation that follows $SSB_{i-1}$ and precedes $SSB_i$.

In one embodiment, for a SS/PBCH block mapping that corresponds to FIG. 20 and that SS/PBCH blocks are contained within symbol #4 to symbol #19, this mapping can be supported if the following constraints are satisfied: (1) $SSB_1 \cup LBT_2 \cup SSB_2 \cup \ldots \cup LBT_m \cup SSB_m \subset SSB$, wherein $SSB=\{4, 5, 6, 7, 8, 9, 10, 11, 12, 13, 14, 15, 16, 17, 18, 19\}$; (2) $0<=|LBT_1|<=6$ (e.g. if LBT follows PIFS duration, $|LBT_1|$ can be 2, 2, 4 for 60 kHz SCS, 240 kHz and 480 kHz SCS respectively); (3) $0<=|LBT_i|<=|LBT_1|$ for $2<=i<=n3$; (4) $2<=|SSB_i|<=14$ for $1<=i<=m$; and (5) $1<=m<=7$. In another embodiment, for a SS/PBCH block mapping that corresponds to FIG. 19 and that SS/PBCH blocks can be contained across 28 symbols of 2 slots, this mapping can be supported if the following constraints are satisfied: (1) $SSB_1 \cup LBT_2 \cup SSB_2 \cup \ldots \cup LBT_m \cup SSB_m \subset SSB$, wherein SSB $\{0, 1, 2, 3, 4, 5, 6, 7, 8, 9, 10, 11, 12, 13, 14, 15, 16, 17, 18, 19, 20, 21, 22, 23, 24, 25, 26, 27\}$; (2) $0<=|LBT_1|<=6$ (e.g. if LBT follows PIFS duration, $|LBT_1|$ can be 2, 2, 4 for 60 kHz SCS, 240 kHz and 480 kHz SCS respectively); (3) $0<=|LBT_i|<=|LBT_1|$ for $2<=i<=n3$; (4) $2<=|SSB_i|<=8$ for $1<=i<=m$; and (5) $1<=m<=7$.

In one embodiment, the actual supported SS/PBCH block mappings for beyond Rel-15 NR that corresponds to SS/PBCH block mapping pattern 5 can be a subset of the SS/PBCH block mappings that satisfy the above constraints. Another embodiment is that the symbol positions for LBT and SS/PBCH blocks specified above can also be shifted by a few symbols. In addition, the actual transmitted SS/PBCH block(s) can occupy all or a subset of the SS/PBCH block symbol positions. In addition, when CAT-4 LBT is used, the number of symbols for LBT is larger than or equal to the number of symbols for the corresponding single-shot LBT under the same subcarrier spacing. In one sub-embodiment, the symbol positions for the first LBT operation (i.e., $LBT_1$) can start from the previous slot, if the symbol positions cannot fit in the two slots of 28 symbols as shown in FIG. 20.

In another sub-embodiment, examples of possible SS/PBCH block mappings that correspond to pattern 5 can be constructed by being 4 symbols earlier than the counterparts in TABLE 7, TABLE 8, TABLE 9, or TABLE 10A and 10B for pattern 4.

Figure 22:
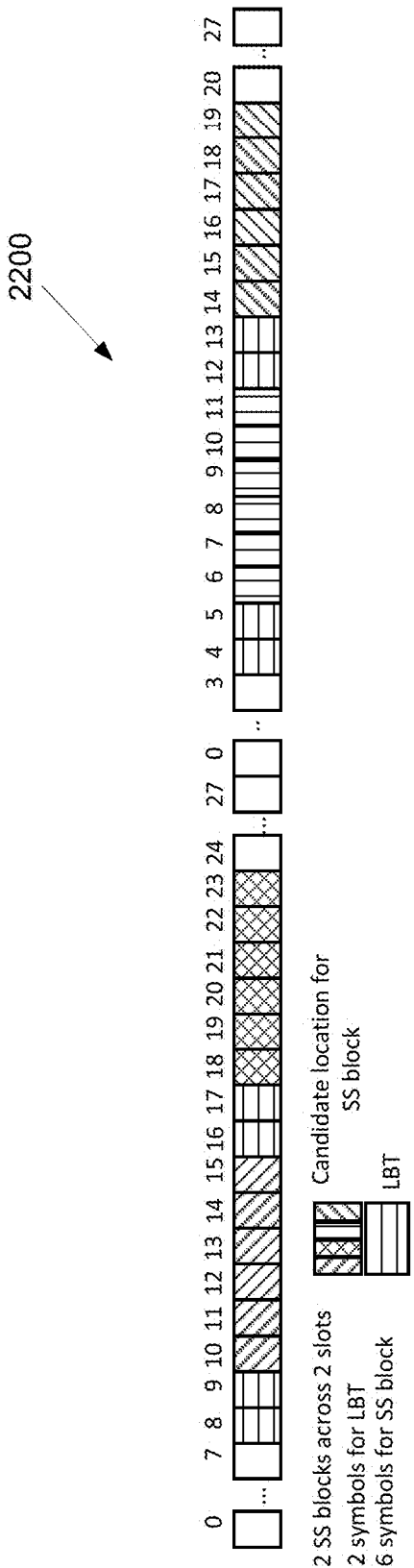
FIG. 22 illustrates yet another example SS/PBCH block mapping according to embodiments of the present disclosure.
Figure 23:
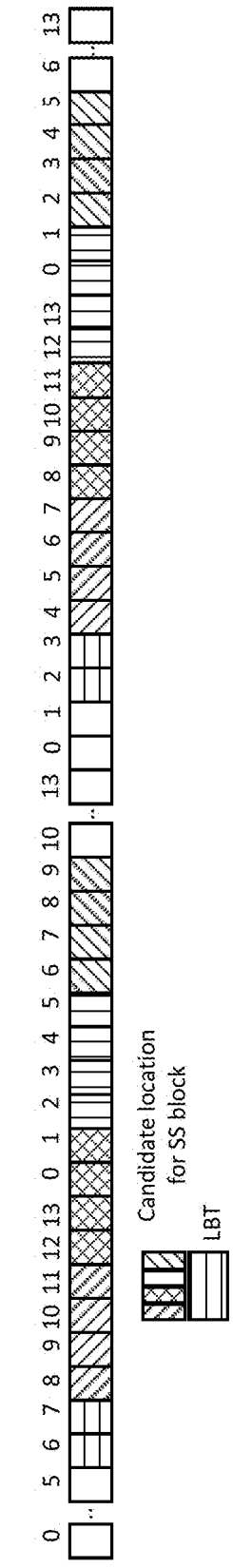
FIG. 23 illustrates yet another example SS/PBCH block mapping according to embodiments of the present disclosure.

In one embodiment, FIG. 21, FIG. 22, and FIG. 23 provide three specific examples of the mapping for SS/PBCH blocks across 4 consecutive slots (i.e., consecutive non-overlapping blocks of 56 symbols) for NR unlicensed, wherein the first two slots follow pattern 4 and the next two slots follow pattern 5. In addition, FIG. 21, FIG. 22 and FIG. 23 are applicable to 240 KHz SCS, and FIG. 21, FIG. 22 and FIG. 23 correspond to the cases that the number of SS/PBCH blocks transmitted across 2 consecutive slots are 1, 2, and 4 respectively.

FIG. 21 illustrates yet another example SS/PBCH block mapping 2100 according to embodiments of the present disclosure. The embodiment of the SS/PBCH block mapping 2100 illustrated in FIG. 21 is for illustration only. FIG. 21 does not limit the scope of this disclosure to any particular implementation In one sub-embodiment, FIG. 21 shows the SS/PBCH block mapping when the number of symbols for each SS/PBCH block is 8, the number of symbols for LBT is 6, and 1 SS/PBCH block can be transmitted across 2 consecutive slots (i.e., consecutive non-overlapping block of 28 symbols) subject to LBT. Specifically, for the first SS/PBCH block, LBT ranges from symbol #8 to symbol #13 in the first block of 28 symbols and SS/PBCH block ranges from symbol #14 to symbol #21 in the first block of 28 symbols. For the second SS/PBCH block, LBT ranges from symbol #4 to symbol #9 in the second block of 28 symbols and SS/PBCH block ranges from symbol #10 to symbol #17 in the second block of 28 symbols. This mapping can be applied to standalone NR unlicensed operations with long LBT requirement on the above-7 GHz unlicensed band, but the number of SS/PBCH blocks to be transmitted across consecutive slots needs to be sacrificed.

FIG. 22 illustrates yet another example SS/PBCH block mapping 2200 according to embodiments of the present disclosure. The embodiment of the SS/PBCH block mapping 2200 illustrated in FIG. 22 is for illustration only. FIG. 22 does not limit the scope of this disclosure to any particular implementation In another sub-embodiment, FIG. 22 shows the SS/PBCH block mapping when the number of symbols for each SS/PBCH block is 6, the number of symbols for LBT is 2, and 2 SS/PBCH blocks can be transmitted across 2 consecutive slots (i.e., consecutive non-overlapping block of 28 symbols) subject to LBT. In this mapping, for the first block of 28 symbols, LBT for first SS/PBCH block ranges from symbol #8 to #9 and the corresponding SS/PBCH block ranges from symbol #10 to symbol #15; LBT for the second SS/PBCH block ranges from symbol #16 to #17 and the corresponding SS/PBCH block ranges from symbol #18 to #23. For the block of 28 symbols, LBT for first SS/PBCH block ranges from symbol #4 to #5 and the corresponding SS/PBCH block ranges from symbol #6 to #11; LBT for the second SS/PBCH block ranges from symbol #12 to #13 and the corresponding SS/PBCH block ranges from symbol #14 to #19. This mapping can be applied to standalone NR unlicensed operations with short LBT requirement, and the number of SS/PBCH blocks to be transmitted across consecutive slots is higher than that in FIG. 21.

FIG. 23 illustrates yet another example SS/PBCH block mapping 2300 according to embodiments of the present disclosure. The embodiment of the SS/PBCH block mapping 2300 illustrated in FIG. 23 is for illustration only. FIG. 23 does not limit the scope of this disclosure to any particular implementation.

In another sub-embodiment, FIG. 23 illustrates the example where there are 16 candidate symbol locations for SS/PBCH block(s) across two consecutive slots, which can be allocated to two consecutive SS/PBCH block with 8 symbols each, or four consecutive SS/PBCH blocks with each having 4 symbols, and these consecutive SS/PBCH block(s) are subject to LBT that occurs in 2 symbols. In another example, the number of symbols for LBT operations can also be other than 2 symbols, e.g., to support 480 kHz SCS. The LBT procedure, and directionality for LBT operation and the SS/PBCH blocks may be designed to ensure consecutive SS/PBCH blocks can be transmitted subject to one successful LBT, and several design examples are detailed in the present disclosure. In addition, the mapping in FIG. 23 can be applied to sub-7 GHz NR-U with 60 KHz SCS, or above-7 GHz NR-U with 240 KHz SCS, or above-7 GHz NR-U and 480 kHz SCS.

Figure 24:
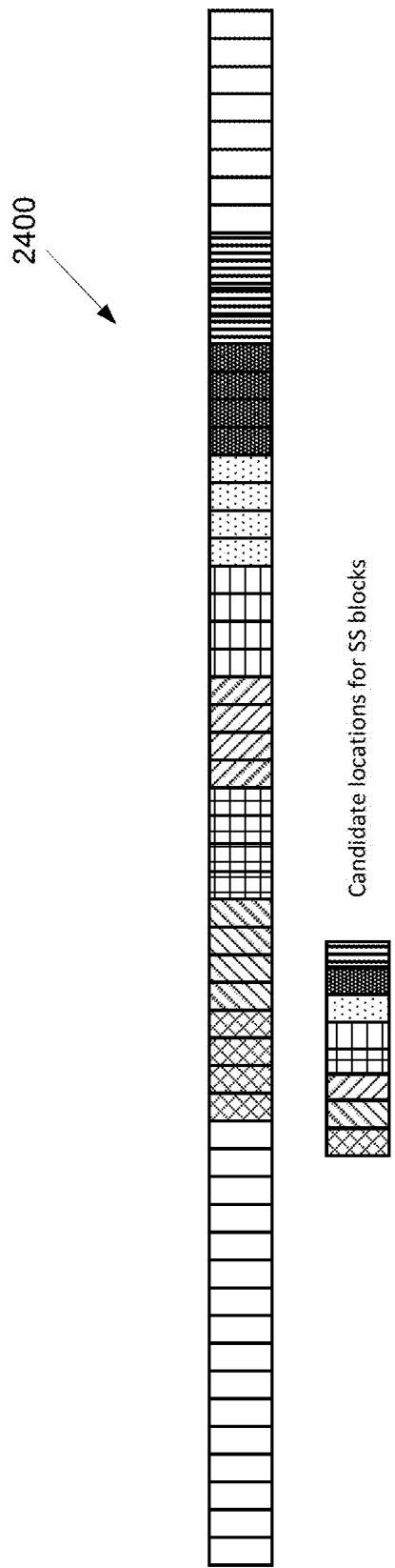
FIG. 24 illustrates yet another example SS/PBCH block mapping according to embodiments of the present disclosure.

FIG. 24 illustrates yet another example SS/PBCH block mapping 2400 according to embodiments of the present disclosure. The embodiment of the SS/PBCH block mapping 2400 illustrated in FIG. 24 is for illustration only. FIG. 24 does not limit the scope of this disclosure to any particular implementation.

SS/PBCH block mapping pattern 6. FIG. 24 shows another mapping pattern of SS/PBCH blocks with 8 SS/PBCH block candidate locations across consecutive non-overlapping blocks of 56 symbols (i.e., 4 consecutive slots), where the symbols are indexed from 0 to 56, and the SS/PBCH block locations span from symbol #16 to #47. Specifically, 16 symbols are preserved for DL control at the beginning of the first slot, 8 symbols are preserved for guard period and UL control at the end of the second slot, and 8 consecutive SS/PBCH block candidate locations of 32 symbols are allowed in the middle. This mapping pattern can be utilized by above-7 GHz beyond Rel-15 NR as a reference pattern for 480 KHz SCS or above-7 GHz beyond Rel-15 NR as a reference pattern for 960 kHz SCS. This mapping can be combined with the SS/PBCH block mapping pattern 7 in 8 consecutive slots, which will be detailed later.

The OFDM symbol duration with 480 KHz SCS and 960 KHz SCS is 2.23 µs and 1.12 µs respectively, and if the LBT requirement is between the SIFS (e.g. 3 µs) and DIFS (e.g., 13 µs) of the IEEE 802.11 ad/ay system, LBT may occupy 2 to 6 OFDM symbols for pattern 6 with 480 KHz SCS, or 3 to 13 OFDM symbols for pattern 6 with 480 KHz SCS. In addition, the number of SS/PBCH blocks that is transmitted across the four consecutive slots under pattern 6 for NR unlicensed could be between 2 and 8. Therefore, in one embodiment, for a possible NR-U SS/PBCH block mapping that corresponds to the SS/PBCH block mapping pattern in FIG. 20, the number of symbols of each LBT operation can be {13, 12, 11, 10, 9, 8, 7, 6, 5, 4, 3, 2, 1, 0}; the number of symbols per SS/PBCH block can be n={14, 13, 12, 11, 10, 9, 8, 7, 6, 5, 4, 3, 2}; and the number of SS/PBCH blocks across two slots of 28 symbols can be m={12, 11, 10, 9, 8, 7, 6, 5, 4, 3, 2}.

In another embodiment, if denote by {0, 1, 2, . . . , 54, 55} the symbol positions for four slots of 56 symbols, then for a possible NR-U SS/PBCH block mapping that corresponds to the SS/PBCH block mapping pattern in FIG. 19, which contains the following: (1) $\{SSB_1, \ldots SSB_m\}$ denotes the set of symbol positions for all SS/PBCH blocks of this mapping, wherein $SSB_i$ contains the set of symbol positions for the i-th SSB with cardinality $|SSB_i|$=n; and $\{LBT_1, \ldots LBT_m\}$ denotes the symbol positions of all LBT operations of this mapping, wherein $LBT_1$ corresponds to the set of symbol positions for the LBT operation that follows $SSB_{i-1}$ and precedes $SSB_i$.

In one embodiment, for a SS/PBCH block mapping that corresponds to FIG. 24 and that SS/PBCH blocks are contained within symbol #16 to symbol #47, this mapping can be supported if the following constraints are satisfied: this mapping pattern can be supported if the following constraints are satisfied: (1) $SSB_1 \cup LBT_2 \cup SSB_2 \cup \ldots \cup LBT_m \cup SSB_m \subset SSB$, wherein SSB={16, 17, . . . 46, 47} (i.e., 32 symbols from symbol #16 to symbol#47); (2) 0<=|$LBT_1$|<=13 (if LBT follows PIFS duration, |$LBT_1$| can be 4 for 480 kHz SCS; or 8 for 960 kHz SCS); (3) 0<=|$LBT_i$|<=|$LBT_1$| for 2<=i<=n3; (4) 2<=|$SSB_i$|<=14 for 1<=i<=m; and (5) 2<=m<=12. In another embodiment, for a SS/PBCH block mapping that corresponds to FIG. 24 and that SS/PBCH blocks are contained across 56 symbols of 4 slots, this mapping can be supported if the following constraints are satisfied: this mapping pattern can be supported if the following constraints are satisfied: (1) $SSB_1 \cup LBT_2 \cup SSB_2 \cup \ldots \cup LBT_m \cup SSB_m \subset SSB$, wherein SSB={0, 1, 2, . . . , 53, 54, 55} (i.e., 56 symbols from symbol #0 to symbol#55); (2) 0<=|$LBT_1$|<=13 (if LBT follows PIFS duration, |$LBT_1$| can be 4 for 480 kHz SCS; or 8 for 960 kHz SCS); (3) 0<=|$LBT_i$|<=|$LBT_1$| for 2<=i<=n3; (4) 2<=|$SSB_i$|<=14 for 1<=i<=m; and (5) 2<=m<=12.

In one embodiment, the actual supported SS/PBCH block mappings for beyond Rel-15 NR that corresponds to SS/PBCH block mapping pattern 6 can be a subset of the SS/PBCH block mappings that satisfy the above constraints. Another embodiment is that the symbol positions for LBT and SS/PBCH blocks specified above can also be shifted by a few symbols. In addition, the actual transmitted SS/PBCH block(s) can occupy all or a subset of the SS/PBCH block symbol positions. In addition, when CAT-4 LBT is used, the number of symbols for LBT is larger than or equal to the number of symbols for the corresponding single-shot LBT under the same subcarrier spacing. In one sub-embodiment, the symbol positions for the first LBT operation (i.e., $LBT_1$) can start from the previous slot, if the symbol positions cannot fit in the four slots of 56 symbols.

In one embodiment, TABLE 11A to TABLE 11D illustrate examples of the possible SS/PBCH block mappings for NR unlicensed under the SS/PBCH block pattern in FIG. 24, wherein ($n_1$, n, m) represents the number of symbols for LBT, number of symbols per SS/PBCH block, and number of SS/PBCH blocks that are transmitted across 4 slots respectively. In one embodiment, each SS/PBCH block can require a separate LBT process, which is shown in TABLE 11. In another embodiment, subject to the maximum channel occupancy time (MCOT) of the LBT, SS/PBCH blocks can be transmitted consecutively after only 1 LBT process that precedes the first SS/PBCH block succeeds.

In one sub-embodiment, examples of possible SS/PBCH block mappings that correspond to pattern 7 can be constructed by being 8 symbols earlier than the counterparts in TABLES 11A, 11B, 12C, and 11D.

TABLE 11A

SS/PBCH block mappings

| [n 1, n, m] | Symbols for LBT 1 | Symbols for SSB1 | Symbols for LBT2 | Symbols for SSB2 | Symbols for LBT3 | Symbols for SSB3 | Symbols for LBT4 | Symbols for SSB4 |
|---|---|---|---|---|---|---|---|---|
| [8, 8, 2] | [16, 17, 18, 19, 20, 21, 22, 23] | [24, 25, 26, 27, 28, 29, 30, 31] | [32, 33, 34, 35, 36, 37, 38, 39] | [40, 41, 42, 43, 44, 45, 46, 47] | [] | [] | [] | [] |
| [6, 6, 3] | [12, 13, 14, 15, 16, 17] | [18, 19, 20, 21, 22, 23] | [24, 25, 26, 27, 28, 29] | [30, 31, 32, 33, 34, 35] | [36, 37, 38, 39, 40, 41] | [42, 43, 44, 45, 46, 47] | [] | [] |
| [6, 6, 2] | [16, 17, 18, 19, 20, 21] | [22, 23, 24, 25, 26, 27] | [28, 29, 30, 31, 32, 33] | [34, 35, 36, 37, 38, 39] | [] | [] | [] | [] |
| [6, 3, 4] | [12, 13, 14, 15, 16, 17] | [18, 19, 20] | [21, 22, 23, 24, 25, 26] | [27, 28, 29] | [30, 31, 32, 33, 34, 35] | [36, 37, 38] | [39, 40, 41, 42, 43, 44] | [45, 46, 47] |
| [6, 2, 4] | [16, 17, 18, 19, 20, 21] | [22, 23] | [24, 25, 26, 27, 28, 29] | [30, 31] | [32, 33, 34, 35, 36, 37] | [38, 39] | [40, 41, 42, 43, 44, 45] | [46, 47] |
| [5, 4, 4] | [12, 13, 14, 15, 16] | [17, 18, 19, 20] | [21, 22, 23, 24, 25] | [26, 27, 28, 29] | [30, 31, 32, 33, 34] | [35, 36, 37, 38] | [39, 40, 41, 42, 43] | [44, 45, 46, 47] |
| [5, 4, 3] | [16, 17, 18, 19, 20] | [21, 22, 23, 24] | [25, 26, 27, 28, 29] | [30, 31, 32, 33] | [34, 35, 36, 37, 38] | [39, 40, 41, 42] | [] | [] |
| [5, 3, 4] | [16, 17, 18, 19, 20] | [21, 22, 23] | [24, 25, 26, 27, 28] | [29, 30, 31] | [32, 33, 34, 35, 36] | [37, 38, 39] | [40, 41, 42, 43, 44] | [45, 46, 47] |
| [5, 3, 3] | [16, 17, 18, 19, 20] | [21, 22, 23] | [24, 25, 26, 27, 28] | [29, 30, 31] | [32, 33, 34, 35, 36] | [37, 38, 39] | [] | [] |
| [5, 2, 5] | [13, 14, 15, 16, 17] | [18, 19] | [20, 21, 22, 23, 24] | [25, 26] | [27, 28, 29, 30, 31] | [32, 33] | [34, 35, 36, 37, 38] | [39, 40] |
| [4, 8, 2] | [16, 17, 18, 19] | [20, 21, 22, 23, 24, 25, 26, 27] | [28, 29, 30, 31] | [32, 33, 34, 35, 36, 37, 38, 39] | [] | [] | [] | [] |
| [4, 7, 3] | [15, 16, 17, 18] | [19, 20, 21, 22, 23, 24, 25] | [26, 27, 28, 29] | [30, 31, 32, 33, 34, 35, 36] | [37, 38, 39, 40] | [41, 42, 43, 44, 45, 46, 47] | [] | [] |
| [4, 7, 2] | [16, 17, 18, 19] | [20, 21, 22, 23, 24, 25, 26] | [27, 28, 29, 30] | [31, 32, 33, 34, 35, 36, 37] | [] | [] | [] | [] |
| [4, 5, 4] | [12, 13, 14, 15] | [16, 17, 18, 19, 20] | [21, 22, 23, 24] | [25, 26, 27, 28, 29] | [30, 31, 32, 33] | [34, 35, 36, 37, 38] | [39, 40, 41, 42] | [43, 44, 45, 46, 47] |
| [4, 4, 4] | [16, 17, 18, 19] | [20, 21, 22, 23] | [24, 25, 26, 27] | [28, 29, 30, 31] | [32, 33, 34, 35] | [36, 37, 38, 39] | [40, 41, 42, 43] | [44, 45, 46, 47] |
| [4, 3, 5] | [13, 14, 15, 16] | [17, 18, 19] | [20, 21, 22, 23] | [24, 25, 26] | [27, 28, 29, 30] | [31, 32, 33] | [34, 35, 36, 37] | [38, 39, 40] |
| [4, 2, 6] | [12, 13, 14, 15] | [16, 17] | [18, 19, 20, 21] | [22, 23] | [24, 25, 26, 27] | [28, 29] | [30, 31, 32, 33] | [34, 35] |
| [3, 4, 5] | [13, 14, 15] | [16, 17, 18, 19] | [20, 21, 22] | [23, 24, 25, 26] | [27, 28, 29] | [30, 31, 32, 33] | [34, 35, 36] | [37, 38, 39, 40] |
| [3, 2, 7] | [13, 14, 15] | [16, 17] | [18, 19, 20] | [21, 22] | [23, 24, 25] | [26, 27] | [28, 29, 30] | [31, 32] |
| [3, 2, 6] | [16, 17, 18] | [19, 20] | [21, 22, 23] | [24, 25] | [26, 27, 28] | [29, 30] | [31, 32, 33] | [34, 35] |
| [3, 2, 5] | [16, 17, 18] | [19, 20] | [21, 22, 23] | [24, 25] | [26, 27, 28] | [29, 30] | [31, 32, 33] | [34, 35] |
| [3, 2, 4] | [16, 17, 18] | [19, 20] | [21, 22, 23] | [24, 25] | [26, 27, 28] | [29, 30] | [31, 32, 33] | [34, 35] |
| [2, 6, 4] | [16, 17] | [18, 19, 20, 21, 22, 23] | [24, 25] | [26, 27, 28, 29, 30, 31] | [32, 33] | [34, 35, 36, 37, 38, 39] | [40, 41] | [42, 43, 44, 45, 46, 47] |
| [2, 5, 4] | [16, 17] | [18, 19, 20, 21, 22] | [23, 24] | [25, 26, 27, 28, 29] | [30, 31] | [32, 33, 34, 35, 36] | [37, 38] | [39, 40, 41, 42, 43] |
| [2, 4, 5] | [16, 17] | [18, 19, 20, 21] | [22, 23] | [24, 25, 26, 27] | [28, 29] | [30, 31, 32, 33] | [34, 35] | [36, 37, 38, 39] |
| [2, 3, 6] | [16, 17] | [18, 19, 20] | [21, 22] | [23, 24, 25] | [26, 27] | [28, 29, 30] | [31, 32] | [33, 34, 35] |

TABLE 11A-continued

SS/PBCH block mappings

| [n1, n, m] | Symbols for LBT 1 | Symbols for SSB1 | Symbols for LBT2 | Symbols for SSB2 | Symbols for LBT3 | Symbols for SSB3 | Symbols for LBT4 | Symbols for SSB4 |
|---|---|---|---|---|---|---|---|---|
| [2, 2, 8] | [16, 17] | [18, 19] | [20, 21] | [22, 23] | [24, 25] | [26, 27] | [28, 29] | [30, 31] |
| [1, 8, 3] | 16 | [17, 18, 19, 20, 21, 22, 23, 24] | 25 | [26, 27, 28, 29, 30, 31, 32, 33] | 34 | [35, 36, 37, 38, 39, 40, 41, 42] | [] | [] |
| [1, 7, 4] | 16 | [17, 18, 19, 20, 21, 22, 23] | 24 | [25, 26, 27, 28, 29, 30, 31] | 32 | [33, 34, 35, 36, 37, 38, 39] | 40 | [41, 42, 43, 44, 45, 46, 47] |
| [1, 6, 4] | 16 | [17, 18, 19, 20, 21, 22] | 23 | [24, 25, 26, 27, 28, 29] | 30 | [31, 32, 33, 34, 35, 36] | 37 | [38, 39, 40, 41, 42, 43] |
| [1, 5, 5] | 16 | [17, 18, 19, 20, 21] | 22 | [23, 24, 25, 26, 27] | 28 | [29, 30, 31, 32, 33] | 34 | [35, 36, 37, 38, 39] |
| [1, 4, 6] | 16 | [17, 18, 19, 20] | 21 | [22, 23, 24, 25] | 26 | [27, 28, 29, 30] | 31 | [32, 33, 34, 35] |
| [1, 3, 8] | 16 | [17, 18, 19] | 20 | [21, 22, 23] | 24 | [25, 26, 27] | 28 | [29, 30, 31] |
| [1, 2, 8] | 16 | [17, 18] | 19 | [20, 21] | 22 | [23, 24] | 25 | [26, 27] |
| [0, 8, 4] | [] | [16, 17, 18, 19, 20, 21, 22, 23] | [] | [24, 25, 26, 27, 28, 29, 30, 31] | [] | [32, 33, 34, 35, 36, 37, 38, 39] | [] | [40, 41, 42, 43, 44, 45, 46, 47] |
| [0, 7, 4] | [] | [16, 17, 18, 19, 20, 21, 22] | [] | [23, 24, 25, 26, 27, 28, 29] | [] | [30, 31, 32, 33, 34, 35, 36] | [] | [37, 38, 39, 40, 41, 42, 43] |
| [0, 6, 5] | [] | [16, 17, 18, 19, 20, 21] | [] | [22, 23, 24, 25, 26, 27] | [] | [28, 29, 30, 31, 32, 33] | [] | [34, 35, 36, 37, 38, 39] |
| [0, 5, 6] | [] | [16, 17, 18, 19, 20] | [] | [21, 22, 23, 24, 25] | [] | [26, 27, 28, 29, 30] | [] | [31, 32, 33, 34, 35] |
| [0, 4, 8] | [] | [16, 17, 18, 19] | [] | [20, 21, 22, 23] | [] | [24, 25, 26, 27] | [] | [28, 29, 30, 31] |

TABLE 11B

SS/PBCH block mappings

| [n1, n, m] | Symbols for LBT5 | Symbols for SSB5 | Symbols for LBT6 | Symbols for SSB6 | Symbols for LBT7 | Symbols for SSB7 | Symbols for LBT8 | Symbols for SSB8 |
|---|---|---|---|---|---|---|---|---|
| [8, 8, 2] | [] | [] | [] | [] | [] | [] | [] | [] |
| [6, 6, 3] | [] | [] | [] | [] | [] | [] | [] | [] |
| [6, 6, 2] | [] | [] | [] | [] | [] | [] | [] | [] |
| [6, 3, 4] | [] | [] | [] | [] | [] | [] | [] | [] |
| [6, 2, 4] | [] | [] | [] | [] | [] | [] | [] | [] |
| [5, 4, 4] | [] | [] | [] | [] | [] | [] | [] | [] |
| [5, 4, 3] | [] | [] | [] | [] | [] | [] | [] | [] |
| [5, 3, 4] | [] | [] | [] | [] | [] | [] | [] | [] |
| [5, 3, 3] | [] | [] | [] | [] | [] | [] | [] | [] |
| [5, 2, 5] | [41, 42, 43, 44, 45] | [46, 47] | [] | [] | [] | [] | [] | [] |
| [4, 8, 2] | [] | [] | [] | [] | [] | [] | [] | [] |
| [4, 7, 3] | [] | [] | [] | [] | [] | [] | [] | [] |
| [4, 7, 2] | [] | [] | [] | [] | [] | [] | [] | [] |
| [4, 5, 4] | [] | [] | [] | [] | [] | [] | [] | [] |
| [4, 4, 4] | [] | [] | [] | [] | [] | [] | [] | [] |
| [4, 3, 5] | [41, 42, 43, 44] | [45, 46, 47] | [] | [] | [] | [] | [] | [] |
| [4, 2, 6] | [36, 37, 38, 39] | [40, 41] | [42, 43, 44, 45] | [46, 47] | [] | [] | [] | [] |

TABLE 11B-continued

SS/PBCH block mappings

| [n1, n, m] | Symbols for LBT5 | Symbols for SSB5 | Symbols for LBT6 | Symbols for SSB6 | Symbols for LBT7 | Symbols for SSB7 | Symbols for LBT8 | Symbols for SSB8 |
|---|---|---|---|---|---|---|---|---|
| [3, 4, 5] | [41, 42, 43] | [44, 45, 46, 47] | [] | [] | [] | [] | [] | [] |
| [3, 2, 7] | [33, 34, 35] | [36, 37] | [38, 39, 40] | [41, 42] | [43, 44, 45] | [46, 47] | [] | [] |
| [3, 2, 6] | [36, 37, 38] | [39, 40] | [41, 42, 43] | [44, 45] | [] | [] | [] | [] |
| [3, 2, 5] | [36, 37, 38] | [39, 40] | [] | [] | [] | [] | [] | [] |
| [3, 2, 4] | [] | [] | [] | [] | [] | [] | [] | [] |
| [2, 6, 4] | [] | [] | [] | [] | [] | [] | [] | [] |
| [2, 5, 4] | [] | [] | [] | [] | [] | [] | [] | [] |
| [2, 4, 5] | [40, 41] | [42, 43, 44, 45] | [] | [] | [] | [] | [] | [] |
| [2, 3, 6] | [36, 37] | [38, 39, 40] | [41, 42] | [43, 44, 45] | [] | [] | [] | [] |
| [2, 2, 8] | [32, 33] | [34, 35] | [36, 37] | [38, 39] | [40, 41] | [42, 43] | [44, 45] | [46, 47] |
| [1, 8, 3] | [] | [] | [] | [] | [] | [] | [] | [] |
| [1, 7, 4] | [] | [] | [] | [] | [] | [] | [] | [] |
| [1, 6, 4] | [] | [] | [] | [] | [] | [] | [] | [] |
| [1, 5, 5] | 40 | [41, 42, 43, 44, 45] | [] | [] | [] | [] | [] | [] |
| [1, 4, 6] | 36 | [37, 38, 39, 40] | 41 | [42, 43, 44, 45] | [] | [] | [] | [] |
| [1, 3, 8] | 32 | [33, 34, 35] | 36 | [37, 38, 39] | 40 | [41, 42, 43] | 44 | [45, 46, 47] |
| [1, 2, 8] | 28 | [29, 30] | 31 | [32, 33] | 34 | [35, 36] | 37 | [38, 39] |
| [0, 8, 4] | [] | [] | [] | [] | [] | [] | [] | [] |
| [0, 7, 4] | [] | [] | [] | [] | [] | [] | [] | [] |
| [0, 6, 5] | [] | [40, 41, 42, 43, 44, 45] | [] | [] | [] | [] | [] | [] |
| [0, 5, 6] | [] | [36, 37, 38, 39, 40] | [] | [41, 42, 43, 44, 45] | [] | [] | [] | [] |
| [0, 4, 8] | [] | [32, 33, 34, 35] | [] | [36, 37, 38, 39] | [] | [40, 41, 42, 43] | [] | [44, 45, 46, 47] |

TABLE 11C

SS/PBCH block mappings

| [n1, n, m] | Symbols for LBT | Symbols for SSB1 | Symbols for SSB2 | Symbols for SSB3 |
|---|---|---|---|---|
| [8, 8, 4] | [8, 9, 10, 11, 12, 13, 14, 15] | [16, 17, 18, 19, 20, 21, 22, 23] | [24, 25, 26, 27, 28, 29, 30, 31] | [32, 33, 34, 35, 36, 37, 38, 39] |
| [8, 4, 8] | [8, 9, 10, 11, 12, 13, 14, 15] | [16, 17, 18, 19] | [20, 21, 22, 23] | [24, 25, 26, 27] |
| [6, 8, 4] | [10, 11, 12, 13, 14, 15] | [16, 17, 18, 19, 20, 21, 22, 23] | [24, 25, 26, 27, 28, 29, 30, 31] | [32, 33, 34, 35, 36, 37, 38, 39] |
| [6, 8, 3] | [16, 17, 18, 19, 20, 21] | [22, 23, 24, 25, 26, 27, 28, 29] | [30, 31, 32, 33, 34, 35, 36, 37] | [38, 39, 40, 41, 42, 43, 44, 45] |
| [6, 8, 2] | [16, 17, 18, 19, 20, 21] | [22, 23, 24, 25, 26, 27, 28, 29] | [30, 31, 32, 33, 34, 35, 36, 37] | [ ] |
| [6, 7, 4] | [14, 15, 16, 17, 18, 19] | [20, 21, 22, 23, 24, 25, 26] | [27, 28, 29, 30, 31, 32, 33] | [34, 35, 36, 37, 38, 39, 40] |
| [6, 6, 5] | [12, 13, 14, 15, 16, 17] | [18, 19, 20, 21, 22, 23] | [24, 25, 26, 27, 28, 29] | [30, 31, 32, 33, 34, 35] |
| [6, 5, 6] | [12, 13, 14, 15, 16, 17] | [18, 19, 20, 21, 22] | [23, 24, 25, 26, 27] | [28, 29, 30, 31, 32] |
| [6, 4, 8] | [10, 11, 12, 13, 14, 15] | [16, 17, 18, 19] | [20, 21, 22, 23] | [24, 25, 26, 27] |
| [6, 3, 8] | [16, 17, 18, 19, 20, 21] | [22, 23, 24] | [25, 26, 27] | [28, 29, 30] |
| [6, 2, 8] | [16, 17, 18, 19, 20, 21] | [22, 23] | [24, 25] | [26, 27] |
| [5, 8, 4] | [11, 12, 13, 14, 15] | [16, 17, 18, 19, 20, 21, 22, 23] | [24, 25, 26, 27, 28, 29, 30, 31] | [32, 33, 34, 35, 36, 37, 38, 39] |
| [5, 7, 4] | [15, 16, 17, 18, 19] | [20, 21, 22, 23, 24, 25, 26] | [27, 28, 29, 30, 31, 32, 33] | [34, 35, 36, 37, 38, 39, 40] |
| [5, 6, 5] | [13, 14, 15, 16, 17] | [18, 19, 20, 21, 22, 23] | [24, 25, 26, 27, 28, 29] | [30, 31, 32, 33, 34, 35] |
| [5, 5, 6] | [13, 14, 15, 16, 17] | [18, 19, 20, 21, 22] | [23, 24, 25, 26, 27] | [28, 29, 30, 31, 32] |
| [5, 4, 8] | [11, 12, 13, 14, 15] | [16, 17, 18, 19] | [20, 21, 22, 23] | [24, 25, 26, 27] |
| [5, 3, 8] | [16, 17, 18, 19, 20] | [21, 22, 23] | [24, 25, 26] | [27, 28, 29] |
| [5, 2, 8] | [16, 17, 18, 19, 20] | [21, 22] | [23, 24] | [25, 26] |
| [4, 8, 4] | [12, 13, 14, 15] | [16, 17, 18, 19, 20, 21, 22, 23] | [24, 25, 26, 27, 28, 29, 30, 31] | [32, 33, 34, 35, 36, 37, 38, 39] |
| [4, 7, 4] | [16, 17, 18, 19] | [20, 21, 22, 23, 24, 25, 26] | [27, 28, 29, 30, 31, 32, 33] | [34, 35, 36, 37, 38, 39, 40] |

TABLE 11C-continued

SS/PBCH block mappings

| [n1, n, m] | Symbols for LBT | Symbols for SSB1 | Symbols for SSB2 | Symbols for SSB3 |
|---|---|---|---|---|
| [4, 6, 5] | [14, 15, 16, 17] | [18, 19, 20, 21, 22, 23] | [24, 25, 26, 27, 28, 29] | [30, 31, 32, 33, 34, 35] |
| [4, 5, 6] | [14, 15, 16, 17] | [18, 19, 20, 21, 22] | [23, 24, 25, 26, 27] | [28, 29, 30, 31, 32] |
| [4, 4, 8] | [12, 13, 14, 15] | [16, 17, 18, 19] | [20, 21, 22, 23] | [24, 25, 26, 27] |
| [4, 3, 8] | [16, 17, 18, 19] | [20, 21, 22] | [23, 24, 25] | [26, 27, 28] |
| [4, 2, 8] | [16, 17, 18, 19] | [20, 21] | [22, 23] | [24, 25] |
| [3, 8, 4] | [13, 14, 15] | [16, 17, 18, 19, 20, 21, 22, 23] | [24, 25, 26, 27, 28, 29, 30, 31] | [32, 33, 34, 35, 36, 37, 38, 39] |
| [3, 7, 4] | [16, 17, 18] | [19, 20, 21, 22, 23, 24, 25] | [26, 27, 28, 29, 30, 31, 32] | [33, 34, 35, 36, 37, 38, 39] |
| [3, 6, 5] | [15, 16, 17] | [18, 19, 20, 21, 22, 23] | [24, 25, 26, 27, 28, 29] | [30, 31, 32, 33, 34, 35] |
| [3, 5, 6] | [15, 16, 17] | [18, 19, 20, 21, 22] | [23, 24, 25, 26, 27] | [28, 29, 30, 31, 32] |
| [3, 4, 8] | [13, 14, 15] | [16, 17, 18, 19] | [20, 21, 22, 23] | [24, 25, 26, 27] |
| [3, 3, 8] | [16, 17, 18] | [19, 20, 21] | [22, 23, 24] | [25, 26, 27] |
| [3, 2, 8] | [16, 17, 18] | [19, 20] | [21, 22] | [23, 24] |
| [2, 8, 4] | [14, 15] | [16, 17, 18, 19, 20, 21, 22, 23] | [24, 25, 26, 27, 28, 29, 30, 31] | [32, 33, 34, 35, 36, 37, 38, 39] |
| [2, 7, 4] | [16, 17] | [18, 19, 20, 21, 22, 23, 24] | [25, 26, 27, 28, 29, 30, 31] | [32, 33, 34, 35, 36, 37, 38] |
| [2, 6, 5] | [16, 17] | [18, 19, 20, 21, 22, 23] | [24, 25, 26, 27, 28, 29] | [30, 31, 32, 33, 34, 35] |
| [2, 5, 6] | [16, 17] | [18, 19, 20, 21, 22] | [23, 24, 25, 26, 27] | [28, 29, 30, 31, 32] |
| [2, 4, 8] | [14, 15] | [16, 17, 18, 19] | [20, 21, 22, 23] | [24, 25, 26, 27] |
| [2, 3, 8] | [16, 17] | [18, 19, 20] | [21, 22, 23] | [24, 25, 26] |
| [2, 2, 8] | [16, 17] | [18, 19] | [20, 21] | [22, 23] |
| [1, 8, 4] | 15 | [16, 17, 18, 19, 20, 21, 22, 23] | [24, 25, 26, 27, 28, 29, 30, 31] | [32, 33, 34, 35, 36, 37, 38, 39] |
| [1, 7, 4] | 16 | [17, 18, 19, 20, 21, 22, 23] | [24, 25, 26, 27, 28, 29, 30] | [31, 32, 33, 34, 35, 36, 37] |
| [1, 6, 5] | 16 | [17, 18, 19, 20, 21, 22] | [23, 24, 25, 26, 27, 28] | [29, 30, 31, 32, 33, 34] |
| [1, 5, 6] | 16 | [17, 18, 19, 20, 21] | [22, 23, 24, 25, 26] | [27, 28, 29, 30, 31] |
| [1, 4, 8] | 15 | [16, 17, 18, 19] | [20, 21, 22, 23] | [24, 25, 26, 27] |
| [1, 3, 8] | 16 | [17, 18, 19] | [20, 21, 22] | [23, 24, 25] |
| [1, 2, 8] | 16 | [17, 18] | [19, 20] | [21, 22] |
| [0, 8, 4] | [ ] | [16, 17, 18, 19, 20, 21, 22, 23] | [24, 25, 26, 27, 28, 29, 30, 31] | [32, 33, 34, 35, 36, 37, 38, 39] |
| [0, 6, 5] | [ ] | [16, 17, 18, 19, 20, 21] | [22, 23, 24, 25, 26, 27] | [28, 29, 30, 31, 32, 33] |
| [0, 5, 6] | [ ] | [16, 17, 18, 19, 20] | [21, 22, 23, 24, 25] | [26, 27, 28, 29, 30] |
| [0, 4, 8] | [ ] | [16, 17, 18, 19] | [20, 21, 22, 23] | [24, 25, 26, 27] |
| [0, 3, 8] | [ ] | [16, 17, 18] | [19, 20, 21] | [22, 23, 24] |
| [0, 2, 8] | [ ] | [16, 17] | [18, 19] | [20, 21] |

TABLE 11D

SS/PBCH block mappings

| [n1, n, m] | Symbols for SSB4 | Symbols for SSB5 | Symbols for SSB6 | Symbols for SSB7 | Symbols for SSB8 |
|---|---|---|---|---|---|
| [8, 8, 4] | [40, 41, 42, 43, 44, 45, 46, 47] | | | | |
| [8, 4, 8] | [28, 29, 30, 31] | [32, 33, 34, 35] | [36, 37, 38, 39] | [40, 41, 42, 43] | [44, 45, 46, 47] |
| [6, 8, 4] | [40, 41, 42, 43, 44, 45, 46, 47] | [ ] | [ ] | [ ] | [ ] |
| [6, 8, 3] | [ ] | [ ] | [ ] | [ ] | [ ] |
| [6, 8, 2] | [ ] | [ ] | [ ] | [ ] | [ ] |
| [6, 7, 4] | [41, 42, 43, 44, 45, 46, 47] | [ ] | [ ] | [ ] | [ ] |
| [6, 6, 5] | [36, 37, 38, 39, 40, 41] | [42, 43, 44, 45, 46, 47] | [ ] | [ ] | [ ] |
| [6, 5, 6] | [33, 34, 35, 36, 37] | [38, 39, 40, 41, 42] | [43, 44, 45, 46, 47] | [ ] | [ ] |
| [6, 4, 8] | [28, 29, 30, 31] | [32, 33, 34, 35] | [36, 37, 38, 39] | [40, 41, 42, 43] | [44, 45, 46, 47] |
| [6, 3, 8] | [31, 32, 33] | [34, 35, 36] | [37, 38, 39] | [40, 41, 42] | [43, 44, 45] |
| [6, 2, 8] | [28, 29] | [30, 31] | [32, 33] | [34, 35] | [36, 37] |
| [5, 8, 4] | [40, 41, 42, 43, 44, 45, 46, 47] | [ ] | [ ] | [ ] | [ ] |
| [5, 7, 4] | [41, 42, 43, 44, 45, 46, 47] | [ ] | [ ] | [ ] | [ ] |
| [5, 6, 5] | [36, 37, 38, 39, 40, 41] | [42, 43, 44, 45, 46, 47] | [ ] | [ ] | [ ] |
| [5, 5, 6] | [33, 34, 35, 36, 37] | [38, 39, 40, 41, 42] | [43, 44, 45, 46, 47] | [ ] | [ ] |
| [5, 4, 8] | [28, 29, 30, 31] | [32, 33, 34, 35] | [36, 37, 38, 39] | [40, 41, 42, 43] | [44, 45, 46, 47] |
| [5, 3, 8] | [30, 31, 32] | [33, 34, 35] | [36, 37, 38] | [39, 40, 41] | [42, 43, 44] |
| [5, 2, 8] | [27, 28] | [29, 30] | [31, 32] | [33, 34] | [35, 36] |
| [4, 8, 4] | [40, 41, 42, 43, 44, 45, 46, 47] | [ ] | [ ] | [ ] | [ ] |
| [4, 7, 4] | [41, 42, 43, 44, 45, 46, 47] | [ ] | [ ] | [ ] | [ ] |
| [4, 6, 5] | [36, 37, 38, 39, 40, 41] | [42, 43, 44, 45, 46, 47] | [ ] | [ ] | [ ] |
| [4, 5, 6] | [33, 34, 35, 36, 37] | [38, 39, 40, 41, 42] | [43, 44, 45, 46, 47] | [ ] | [ ] |
| [4, 4, 8] | [28, 29, 30, 31] | [32, 33, 34, 35] | [36, 37, 38, 39] | [40, 41, 42, 43] | [44, 45, 46, 47] |
| [4, 3, 8] | [29, 30, 31] | [32, 33, 34] | [35, 36, 37] | [38, 39, 40] | [41, 42, 43] |
| [4, 2, 8] | [26, 27] | [28, 29] | [30, 31] | [32, 33] | [34, 35] |
| [3, 8, 4] | [40, 41, 42, 43, 44, 45, 46, 47] | [ ] | [ ] | [ ] | [ ] |
| [3, 7, 4] | [40, 41, 42, 43, 44, 45, 46] | [ ] | [ ] | [ ] | [ ] |
| [3, 6, 5] | [36, 37, 38, 39, 40, 41] | [42, 43, 44, 45, 46, 47] | [ ] | [ ] | [ ] |
| [3, 5, 6] | [33, 34, 35, 36, 37] | [38, 39, 40, 41, 42] | [43, 44, 45, 46, 47] | [ ] | [ ] |
| [3, 4, 8] | [28, 29, 30, 31] | [32, 33, 34, 35] | [36, 37, 38, 39] | [40, 41, 42, 43] | [44, 45, 46, 47] |
| [3, 3, 8] | [28, 29, 30] | [31, 32, 33] | [34, 35, 36] | [37, 38, 39] | [40, 41, 42] |
| [3, 2, 8] | [25, 26] | [27, 28] | [29, 30] | [31, 32] | [33, 34] |
| [2, 8, 4] | [40, 41, 42, 43, 44, 45, 46, 47] | [ ] | [ ] | [ ] | [ ] |
| [2, 7, 4] | [39, 40, 41, 42, 43, 44, 45] | [ ] | [ ] | [ ] | [ ] |

TABLE 11D-continued

SS/PBCH block mappings

| [n1, n, m] | Symbols for SSB4 | Symbols for SSB5 | Symbols for SSB6 | Symbols for SSB7 | Symbols for SSB8 |
|---|---|---|---|---|---|
| [2, 6, 5] | [36, 37, 38, 39, 40, 41] | [42, 43, 44, 45, 46, 47] | [ ] | [ ] | [ ] |
| [2, 5, 6] | [33, 34, 35, 36, 37] | [38, 39, 40, 41, 42] | [43, 44, 45, 46, 47] | [ ] | [ ] |
| [2, 4, 8] | [28, 29, 30, 31] | [32, 33, 34, 35] | [36, 37, 38, 39] | [40, 41, 42, 43] | [44, 45, 46, 47] |
| [2, 3, 8] | [27, 28, 29] | [30, 31, 32] | [33, 34, 35] | [36, 37, 38] | [39, 40, 41] |
| [2, 2, 8] | [24, 25] | [26, 27] | [28, 29] | [30, 31] | [32, 33] |
| [1, 8, 4] | [40, 41, 42, 43, 44, 45, 46, 47] | [ ] | [ ] | [ ] | [ ] |
| [1, 7, 4] | [38, 39, 40, 41, 42, 43, 44] | [ ] | [ ] | [ ] | [ ] |
| [1, 6, 5] | [35, 36, 37, 38, 39, 40] | [41, 42, 43, 44, 45, 46] | [ ] | [ ] | [ ] |
| [1, 5, 6] | [32, 33, 34, 35, 36] | [37, 38, 39, 40, 41] | [42, 43, 44, 45, 46] | [ ] | [ ] |
| [1, 4, 8] | [28, 29, 30, 31] | [32, 33, 34, 35] | [36, 37, 38, 39] | [40, 41, 42, 43] | [44, 45, 46, 47] |
| [1, 3, 8] | [26, 27, 28] | [29, 30, 31] | [32, 33, 34] | [35, 36, 37] | [38, 39, 40] |
| [1, 2, 8] | [23, 24] | [25, 26] | [27, 28] | [29, 30] | [31, 32] |
| [0, 8, 4] | [40, 41, 42, 43, 44, 45, 46, 47] | [ ] | [ ] | [ ] | [ ] |
| [0, 6, 5] | [34, 35, 36, 37, 38, 39] | [40, 41, 42, 43, 44, 45] | [ ] | [ ] | [ ] |
| [0, 5, 6] | [31, 32, 33, 34, 35] | [36, 37, 38, 39, 40] | [41, 42, 43, 44, 45] | [ ] | [ ] |
| [0, 4, 8] | [28, 29, 30, 31] | [32, 33, 34, 35] | [36, 37, 38, 39] | [40, 41, 42, 43] | [44, 45, 46, 47] |
| [0, 3, 8] | [25, 26, 27] | [28, 29, 30] | [31, 32, 33] | [34, 35, 36] | [37, 38, 39] |
| [0, 2, 8] | [22, 23] | [24, 25] | [26, 27] | [28, 29] | [30, 31] |

Figure 25:
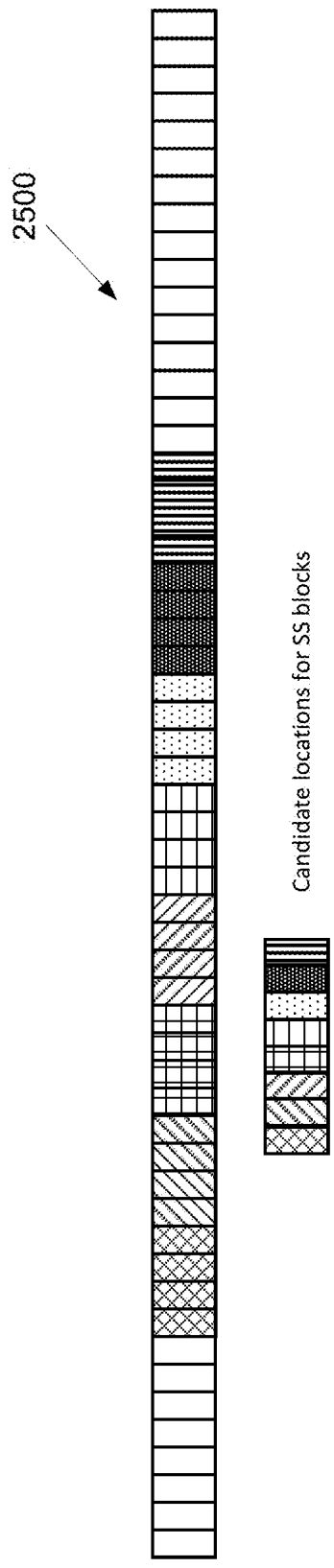
FIG. 25 illustrates yet another example SS/PBCH block mapping according to embodiments of the present disclosure.

FIG. 25 illustrates yet another example SS/PBCH block mapping 2500 according to embodiments of the present disclosure. The embodiment of the SS/PBCH block mapping 2500 illustrated in FIG. 25 is for illustration only. FIG. 25 does not limit the scope of this disclosure to any particular implementation.

FIG. 25 shows another mapping pattern of SS/PBCH blocks with 8 SS/PBCH block candidate locations across consecutive non-overlapping blocks of 56 symbols (i.e., 4 consecutive slots), where the symbols are indexed from 0 to 56, and the SS/PBCH block locations span from symbol #8 to #39. Specifically, 8 symbols are preserved for DL control at the beginning of the first slot, 16 symbols are preserved for guard period and UL control at the end of the second slot, and 8 consecutive SS/PBCH block candidate locations of 32 symbols are allowed in the middle. This mapping pattern can be utilized by above-7 GHz beyond Rel-15 NR as a reference pattern for 480 KHz SCS or above-7 GHz beyond Rel-15 NR as a reference pattern for 960 kHz SCS. This mapping pattern can be combined with the SS/PBCH block mapping pattern 6 in 8 consecutive slots, wherein pattern 7 is used in the last 4 slots.

In one embodiment, the possible SS/PBCH block mappings for NR unlicensed under the SS/PBCH block pattern in FIG. 25 (i.e., pattern 7) can be inferred from those under the SS/PBCH block pattern in FIG. 24 (i.e., pattern 6). Specifically, if denote by {0, 1, 2, . . . , 54, 55} the symbol positions for four slots of 56 symbols, then for a possible NR-U SS/PBCH block mapping that corresponds to the SS/PBCH block mapping pattern in FIG. 25, which contains the following: (1) $\{SSB_1, \ldots SSB_m\}$ denotes the set of symbol positions for all SS/PBCH blocks of this mapping, wherein $SSB_i$ contains the set of symbol positions for the i-th SSB with cardinality $|SSB_i|$=n; and $\{LBT_1, \ldots, LBT_m\}$ denotes the symbol positions of all LBT operations of this mapping, wherein $LBT_1$ corresponds to the set of symbol positions for the LBT operation that follows $SSB_{i-1}$ and precedes $SSB_i$.

In one embodiment, for a SS/PBCH block mapping that corresponds to FIG. 25 and that SS/PBCH blocks are contained within symbol #8 to symbol #39, this mapping can be supported if the following constraints are satisfied: this mapping pattern can be supported if the following constraints are satisfied: (1) $SSB_1 \cup LBT_2 \cup SSB_2 \cup \ldots \cup LBT_m \cup SSB_m \subset SSB$, wherein SSB={8, 9, . . . 38, 39}; (2) $0 <= |LBT_1| <= 13$ (if LBT follows PIFS duration, $|LBT_1|$ can be 4 for 480 kHz SCS; or 8 for 960 kHz SCS); (3) $0 <= |LBT_i| <= |LBT_1|$ for $2 <= i <= n3$; (4) $2 <= <= 14$ for $1 <= i <= m$; and (5) $2 <= m <= 12$. In another embodiment, for a SS/PBCH block mapping that corresponds to FIG. 25 and that SS/PBCH blocks are contained across 56 symbols of 4 slots, this mapping can be supported if the following constraints are satisfied: this mapping pattern can be supported if the following constraints are satisfied: (1) $SSB_1 \cup LBT_2 \cup SSB_2 \cup \ldots \cup LBT_m \cup SSB_m \subset SSB$, wherein SSB={0, 1, 2, . . . , 53, 54, 55}; (2) $0 <= |LBT_1| <= 13$ (if LBT follows PIFS duration, $|LBT_1|$ can be 4 for 480 kHz SCS; or 8 for 960 kHz SCS); (3) $0 <= |LBT_i| <= |LBT_1|$ for $2 <= i <= n3$; (4) $2 <= |SSB_i| <= 14$ for $1 <= i <= m$; and (5) $2 <= m <= 12$.

In one embodiment, the actual supported SS/PBCH block mappings for beyond Rel-15 NR that corresponds to SS/PBCH block mapping pattern 7 can be a subset of the SS/PBCH block mappings that satisfy the above constraints. Another embodiment is that the symbol positions for LBT and SS/PBCH blocks specified above can also be shifted by a few symbols. In addition, the actual transmitted SS/PBCH block(s) can occupy all or a subset of the SS/PBCH block symbol positions. In addition, when CAT-4 LBT is used, the number of symbols for LBT is larger than or equal to the number of symbols for the corresponding single-shot LBT under the same subcarrier spacing. In one sub-embodiment, the symbol positions for the first LBT operation (i.e., $LBT_1$) can start from the previous slot, if the symbol positions cannot fit in the four slots of 56 symbols. In one sub-embodiment, examples of possible SS/PBCH block mappings that correspond to pattern 7 can be constructed by being 8 symbols earlier than the counterparts.

For Rel-15 NR in licensed band, the transmission of SS/PBCH blocks within SS/PBCH burst set is confined to a 5 ms window regardless of SS/PBCH burst set periodicity. Within this 5 ms window, the number of possible candidate SS/PBCH block locations is L, which may depend on the frequency range. Specifically, L=4 for frequency range up to 3 GHz, L=8 for frequency range from 3 GHz to 6 GHz, L=64 for frequency range from 6 GHz to 52.6 GHz.

As shown in the aforementioned embodiments, for beyond Rel-15 NR, various different SS/PBCH block mappings with different number of SS/PBCH blocks to be transmitted within slot(s) can be supported. The design of SS/PBCH burst set composition for beyond Rel-15 NR needs to consider the measurement window size and SS/PBCH burst set periodicity, and the corresponding maximum number of SS/PBCH block locations L may also depend on the number of SS/PBCH blocks within a slot (on average).

In one embodiment, the measurement window size for SS/PBCH burst set in beyond Rel-15 NR can be 5 ms which is same as that in NR licensed spectrum. In this case, the default SS/PBCH burst set periodicity for initial access can be 20 ms as in NR licensed spectrum, or reduced from 20 ms to 10 ms or 5 ms to increase the channel access opportunities. The maximum number of SS/PBCH block locations L within the measurement window can depend on the mapping of SS/PBCH blocks (e.g., number of SS/PBCH blocks per slot) as discussed in the aforementioned embodiments.

TABLE 12 provides the candidate starting slot positions for SS/PBCH block within the measurement window, where slot 0 refers to the start slot of the 5 ms window. One sub-embodiment is that n in TABLE 12 refers to the maximum number of SS/PBCH blocks per slot for each SCS (on average), which is given by n=1, 2 for SCS of 15 KHz, 30 KHz, 60 KHz and 120 KHz; n=½, 1, 3/2, 2 for SCS of 240 KHz; n=½, ¾, 1, 5/4, 3/2, 7/4, 2 for SCS of 480 KHz and 960 kHz.

One sub-embodiment of TABLE 12 is that for 120 KHz and 240 KHz subcarrier spacing, there are two sets of candidate slot numbers that contain SS/PBCH blocks for NR unlicensed. Specifically, the first set corresponds to the case that within the 5 ms measurement window, the candidate slot numbers containing SS/PBCH blocks are $U_{n=0}^{7}\{(0, 1, 2, 3)+5 \times n\}$ for 120 KHz SCS, and $U_{n=0}^{3}\{(0, 1, 2, 3, 4, 5, 6, 7)+10 \times n\}$ for 240 KHz SCS. The second set corresponds to the case that within the 5 ms measurement window, the candidate slot numbers containing SS/PBCH blocks are $U_{n=0}^{3}\{(0, 1, 2, 3, 4, 5, 6, 7)+10 \times n\}$ for 120 KHz SCS, and $U_{n=0}^{1}\{(0, 1, 2, 3, 4, 5, 6, 7, 8, 9, 10, 11, 12, 13, 14, 15)+20 \times n\}$ for 240 KHz SCS.

One sub-embodiment of TABLE 12 is that the number of possible locations for SS/PBCH blocks can be more than that of Rel-15 NR, such as to enhance channel access chance to transmit SS/PBCH blocks or support standalone operations of NR unlicensed. Another sub-embodiment of TABLE 12 is depending on the application scenario, all or a subset of the entries can be supported by beyond Rel-15 NR.

TABLE 12

| | Slot positions for SS/PBCH block | |
|---|---|---|
| Subcarrier spacing (KHz) | Possible slot number | Maximum number of candidate SS/PBCH block locations L (n: max number of SS/PBCH blocks per slot) |
| 15 | 0, 1, 2, 3 | 4n |
| 30 | (0, 1, 2, 3, 5, 6, 7, 8) or (0, 1, 2, 3, 4, 5, 6, 7) | 8n |
| | 0, 1, 2, 3 | 4n |
| 60 | 0, 1, 2, 3 | 4n |
| | (0, 1, 2, 3, 4, 5, 6, 7) or (0, 1, 2, 3, 5, 6, 7, 8) | 8n |
| | $\bigcup_{k=0}^{1}\{(0, 1, 2, 3, 4, 5, 6, 7) + 10 \times k\}$ or $\bigcup_{k=0}^{1}\{(0, 1, 2, 3, 5, 6, 7, 8) + 10 \times k\}$ | 16n |
| 120 | $\bigcup_{k=0}^{7}\{(0, 1, 2, 3) + 5 \times k\}$ or $\bigcup_{k=0}^{3}\{(0, 1, 2, 3, 4, 5, 6, 7) + 10 \times k\}$ | 32n |
| 240 | $\bigcup_{k=0}^{3}\{(0, 1, 2, 3, 4, 5, 6, 7) + 10 \times k\}$ or $\bigcup_{k=0}^{1}\{\{(0, 1, 2, 3, 4, 5, 6, 7, 8, 9, 10, 11, 12, 13, 14, 15)+20 \times k\}$ | 32n |
| | $\bigcup_{k=0}^{7}\{(0, 1, 2, 3, 4, 5, 6, 7) + 10 \times k\}$ or $\bigcup_{k=0}^{3}\{\{(0, 1, 2, 3, 4, 5, 6, 7, 8, 9, 10, 11, 12, 13, 14, 15)+20 \times k\}$ | 64n |
| 480 | $\{0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31\}$ or | 32n |

TABLE 12-continued

Slot positions for SS/PBCH block

| Subcarrier spacing (KHz) | Possible slot number | Maximum number of candidate SS/PBCH block locations L (n: max number of SS/PBCH blocks per slot) |
|---|---|---|
| | $\bigcup_{k=0}^{1}\{(0, 1, 2, 3, 4, 5, 6, 7, 8, 9, 10, 11, 12, 13, 14, 15) + 20 \times k\}$ | |
| | $\bigcup_{k=0}^{1}\left\{\begin{pmatrix}0, 1, 2, 3, 4, 5, 6, 7, 8, 9, 10, 11, 12, 13, 14, 15, 16, 17,\\ 18, 19, 20, 21, 22, 23, 24, 25, 26, 27, 28, 29, 30, 31\end{pmatrix} + 40 \times k\right\}$ or | 64n |
| | $\bigcup_{k=0}^{1}\left\{\begin{pmatrix}0, 1, 2, 3, 4, 5, 6, 7, 8, 9, 10, 11, 12, 13, 14, 15, 16, 17,\\ 18, 19, 20, 21, 22, 23, 24, 25, 26, 27, 28, 29, 30, 31\end{pmatrix} + 80 \times k\right\}$ or | |
| | $\bigcup_{k=0}^{3}\{(0, 1, 2, 3, 4, 5, 6, 7, 8, 9, 10, 11, 12, 13, 14, 15) + 20 \times k\}$ | |
| | $\bigcup_{k=0}^{3}\left\{\begin{pmatrix}0, 1, 2, 3, 4, 5, 6, 7, 8, 9, 10, 11, 12, 13, 14, 15, 16, 17,\\ 18, 19, 20, 21, 22, 23, 24, 25, 26, 27, 28, 29, 30, 31\end{pmatrix} + 40 \times k\right\}$ or | 128n |
| | $\bigcup_{k=0}^{7}\{(0, 1, 2, 3, 4, 5, 6, 7, 8, 9, 10, 11, 12, 13, 14, 15) + 20 \times k\}$ | |
| 960 | $\left\{\begin{array}{c}0, 1, 2, 3, 4, 5, 6, 7, 8, 9, 10, 11, 12, 13, 14, 15, 16, 17,\\ 18, 19, 20, 21, 22, 23, 24, 25, 26, 27, 28, 29, 30, 31,\\ 32, 33, 34, 35, 36, 37, 38, 39, 40, 41, 42, 43, 44, 45, 46, 47, 48, 49,\\ 50, 51, 52, 53, 54, 55, 56, 57.58, 59, 60, 61, 62, 63\end{array}\right\}$ or | 64n |
| | $\bigcup_{k=0}^{1}\left\{\begin{pmatrix}0, 1, 2, 3, 4, 5, 6, 7, 8, 9, 10, 11, 12, 13, 14, 15, 16, 17,\\ 18, 19, 20, 21, 22, 23, 24, 25, 26, 27, 28, 29, 30, 31\end{pmatrix} + 40 \times k\right\}$ | |
| | $\bigcup_{k=0}^{1}\left\{\begin{array}{c}0, 1, 2, 3, 4, 5, 6, 7, 8, 9, 10, 11, 12, 13, 14, 15, 16, 17,\\ 18, 19, 20, 21, 22, 23, 24, 25, 26, 27, 28, 29, 30, 31,\\ 32, 33, 34, 35, 36, 37, 38, 39, 40, 41, 42, 43, 44, 45, 46, 47, 48, 49,\\ 50, 51, 52, 53, 64, 55, 56, 57, 58, 59, 60, 61, 62, 63\end{array} + 80 \times k\right\}$ or | 128n |
| | $\bigcup_{k=0}^{1}\left\{\begin{array}{c}0, 1, 2, 3, 4, 5, 6, 7, 8, 9, 10, 11, 12, 13, 14, 15, 16, 17,\\ 18, 19, 20, 21, 22, 23, 24, 25, 26, 27, 28, 29, 30, 31,\\ 32, 33, 34, 35, 36, 37, 38, 39, 40, 41, 42, 43, 44, 45, 46, 47, 48, 49,\\ 50, 51, 52, 53, 54, 55, 56, 57, 58, 59, 60, 61, 62, 63\end{array} + 160 \times k\right\}$ Or | |
| | $\bigcup_{k=0}^{3}\left\{\begin{pmatrix}0, 1, 2, 3, 4, 5, 6, 7, 8, 9, 10, 11, 12, 13, 14, 15, 16, 17,\\ 18, 19, 20, 21, 22, 23, 24, 25, 26, 27, 28, 29, 30, 31\end{pmatrix} + 40 \times k\right\}$ or | |
| | $\bigcup_{l=0}^{1}\bigcup_{k=0}^{1}\left\{\begin{pmatrix}0, 1, 2, 3, 4, 5, 6, 7, 8, 9, 10, 11, 12, 13, 14, 15, 16, 17,\\ 18, 19, 20, 21, 22, 23, 24, 25, 26, 27, 28, 29, 30, 31\end{pmatrix} + 40 \times k + 160 \times l\right\}$ | |

In another embodiment, the measurement window size for SS/PBCH burst set can be 10 ms. In this case, the default SS/PBCH burst set periodicity for initial access can be 20 ms as in Rel-15 NR, or reduced to 10 ms to enhance channel access opportunities. One sub-embodiment for 10 ms measurement window size is that the SS/PBCH burst set composition can be constructed through doubling the maximum number of candidate SS/PBCH blocks L compared to the SS/PBCH burst set composition under 5 ms measurement window size. In another sub-embodiment, the SS/PBCH burst set composition for 10 ms measurement window size can be constructed through distributing or spreading out within the 10 ms measurement window the SS/PBCH burst set composition under the 5 ms measurement window size.

In yet another sub-embodiment, the SS/PBCH burst set composition under 5 ms measurement window size (e.g., TABLE 13) can also be supported for 10 ms measurement window size. TABLE 13 provides the examples of candidate starting slot positions for SS/PBCH block within the measurement window, where slot 0 refers to the start slot of the 10 ms window. One sub-embodiment of TABLE 13 is that the number of possible locations for SS/PBCH blocks can be more than that of Rel-15 NR, such as to enhance channel access chance to transmit SS/PBCH blocks or support standalone operations of NR unlicensed.

TABLE 13

Slot positions for SS/PBCH block

| Subcarrier spacing (KHz) | Possible slot number | Maximum number of candidate SS/PCH block locations L (n: max number of SS/PCH blocks per slot) |
|---|---|---|
| 15 | 0, 1, 2, 3, 5, 6, 7, 8 | 8n |
|  | 0, 1, 5, 6 | 4n |
| 30 | (0, 1, 2, 3, 5, 6, 7, 8, 10, 11, 12, 13, 15, 16, 17, 18) or (0, 1, 2, 3, 4, 5, 6, 7, 10, 11, 12, 13, 14, 15, 16, 17) | 16n |
|  | 0, 1, 2, 3, 10, 11, 12, 13 | 8n |
| 60 | $\cup_{k=0}^{3}\{(0, 1, 2, 3, 4, 5, 6, 7) + 10 \times k\}$ or $\cup_{k=0}^{3}\{(0, 1, 2, 3, 5, 6, 7, 8) + 10 \times k\}$ | 32n |
|  | $\cup_{k=0}^{1}\{(0, 1, 2, 3, 4, 5, 6, 7) + 20 \times k\}$ or $\cup_{k=0}^{1}\{(0, 1, 2, 3, 5, 6, 7, 8) + 20 \times k\}$ | 16n |
| 120 | $\cup_{k=0}^{15}\{(0, 1, 2, 3) + 5 \times k\}$ or $\cup_{k=0}^{7}\{(0, 1, 2, 3, 4, 5, 6, 7) + 10 \times k\}$ | 64n |
|  | $\cup_{k=0}^{7}\{(0, 1, 2, 3) + 10 \times k\}$ or $\cup_{k=0}^{3}\{(0, 1, 2, 3, 4, 5, 6, 7) + 20 \times k\}$ | 32n |
| 240 | $\bigcup_{k=0}^{15}\{(0, 1, 2, 3, 4, 5, 6, 7) + 10 \times k\}$ or $\bigcup_{k=0}^{7}\left\{\binom{0, 1, 2, 3, 4, 5, 6, 7, 8, 9, 10,}{11, 12, 13, 14, 15} + 20 \times k\right\}$ | 128n |
|  | $\bigcup_{k=0}^{7}\{(0, 1, 2, 3, 4, 5, 6, 7) + 20 \times k\}$ or $\bigcup_{k=0}^{3}\left\{\binom{0, 1, 2, 3, 4, 5, 6, 7, 8, 9, 10,}{11, 12, 13, 14, 15} + 40 \times k\right\}$ or $\bigcup_{k=0}^{3}\left\{\binom{0, 1, 2, 3, 4, 5, 6, 7, 8, 9, 10,}{11, 12, 13, 14, 15} + 20 \times k\right\}$ | 64n |
| 480 | $\bigcup_{k=0}^{7}\left\{\binom{0, 1, 2, 3, 4, 5, 6, 7, 8, 9, 10, 11, 12, 13, 14, 15, 16, 17,}{18, 19, 20, 21, 22, 23, 24, 25, 26, 27, 28, 29, 30, 31} + 40 \times k\right\}$ | 256n |
|  | $\bigcup_{k=0}^{3}\left\{\binom{0, 1, 2, 3, 4, 5, 6, 7, 8, 9, 10, 11, 12, 13, 14, 15, 16, 17,}{18, 19, 20, 21, 22, 23, 24, 25, 26, 27, 28, 29, 30, 31} + 80 \times k\right\}$ | 128n |
| 960 | $\bigcup_{k=0}^{3}\left(\begin{array}{l}0, 1, 2, 3, 4, 5, 6, 7, 8, 9, 10, 11, 12, 13, 14, 15, 16, 17,\\ 18, 19, 20, 21, 22, 23, 24, 25, 26, 27, 28, 29, 30, 31,\\ 32, 33, 34, 35, 36, 37, 38, 39, 40, 41, 42, 43, 44, 45, 46, 47, 48, 49,\\ 50, 51, 52, 53, 54, 55, 56, 57, 58, 59, 60, 61, 62, 63\end{array}\right) + 80 \times k$ or | 256n |
|  | $\bigcup_{k=0}^{3}\left(\begin{array}{l}0, 1, 2, 3, 4, 5, 6, 7, 8, 9, 10, 11, 12, 13, 14, 15, 16, 17,\\ 18, 19, 20, 21, 22, 23, 24, 25, 26, 27, 28, 29, 30, 31,\\ 32, 33, 34, 35, 36, 37, 38, 39, 40, 41, 42, 43, 44, 45, 46, 47, 48, 49,\\ 50, 51, 52, 53, 54, 55, 56, 57, 58, 59, 60, 61, 62, 63\end{array}\right) + 160 \times k$ or |  |

TABLE 13-continued

Slot positions for SS/PBCH block

| Subcarrier spacing (KHz) | Possible slot number | Maximum number of candidate SS/PCH block locations L (n: max number of SS/PCH blocks per slot) |
|---|---|---|
| | $\bigcup_{k=0}^{7}\left\{\left(\begin{array}{l}0,1,2,3,4,5,6,7,8,9,10,11,12,13,14,15,16,17,\\ 18,19,20,21,22,23,24,25,26,27,28,29,30,31\end{array}\right)+40\times k\right\}$ or | |
| | $\bigcup_{l=0}^{3}\bigcup_{k=0}^{1}\left\{\left(\begin{array}{l}0,1,2,3,4,5,6,7,8,9,10,11,12,13,14,15,16,17,\\ 18,19,20,21,22,23,24,25,26,27,28,29,30,31\end{array}\right)+40\times k+160\times l\right\}$ | |
| | $\bigcup_{k=0}^{1}\left(\begin{array}{l}0,1,2,3,4,5,6,7,8,9,10,11,12,13,14,15,16,17,\\ 18,19,20,21,22,23,24,25,26,27,28,29,30,31,\\ 32,33,34,35,36,37,38,39,40,41,42,43,44,45,46,47,48,49,\\ 50,51,52,53,54,55,56,57,58,59,60,61,62,63\end{array}\right)+160\times k$ or | 128n |
| | $\bigcup_{k=0}^{1}\left(\begin{array}{l}0,1,2,3,4,5,6,7,8,9,10,11,12,13,14,15,16,17,\\ 18,19,20,21,22,23,24,25,26,27,28,29,30,31,\\ 32,33,34,35,36,37,38,39,40,41,42,43,44,45,46,47,48,49,\\ 50,51,52,53,54,55,56,57,58,59,60,61,62,63\end{array}\right)+320\times k$ or | |
| | $\bigcup_{k=0}^{3}\left\{\left(\begin{array}{l}0,1,2,3,4,5,6,7,8,9,10,11,12,13,14,15,16,17,\\ 18,19,20,21,22,23,24,25,26,27,28,29,30,31\end{array}\right)+80\times k+320\times l\right\}$ | |
| | $\bigcup_{l=0}^{1}\bigcup_{k=0}^{1}\left\{\left(\begin{array}{l}0,1,2,3,4,5,6,7,8,9,10,11,12,13,14,15,16,17,\\ 18,19,20,21,22,23,24,25,26,27,28,29,30,31\end{array}\right)+40\times k+320\times l\right\}$ | |
| | $\bigcup_{k=0}^{1}\left\{\left(\begin{array}{l}0,1,2,3,4,5,6,7,8,9,10,11,12,13,14,15,16,17,\\ 18,19,20,21,22,23,24,25,26,27,28,29,30,31\end{array}\right)+80\times k\right\}$ or | 64n |
| | $\bigcup_{k=0}^{1}\left\{\left(\begin{array}{l}0,1,2,3,4,5,6,7,8,9,10,11,12,13,14,15,16,17,\\ 18,19,20,21,22,23,24,25,26,27,28,29,30,31\end{array}\right)+160\times k\right\}$ | |

In another embodiment, the measurement window size for SS/PBCH burst set can be 20 ms. In this case, the default SS/PBCH burst set periodicity for initial access can be 20 ms. One sub-embodiment for 20 ms measurement window size is that compared to 10 ms measurement window size as shown in TABLE 13, the maximum number of candidate SS/PBCH block locations L can be further doubled. In another sub-embodiment, when the SS/PBCH burst set periodicity is 20 ms and the maximum number of candidate SS/PBCH blocks L is the same as that with 10 ms (or 5 ms) measurement window size, the possible starting slot numbers for SS/PBCH blocks with 20 ms measurement window size can be more distributed or spread out within the SS/PBCH burst set, as opposed to the 10 ms (or 5 ms) measurement window size.

Specifically, TABLE 14 provides the candidate starting slot positions for SS/PBCH block within the measurement window, where slot 0 refers to the start slot of the 20 ms window. One sub-embodiment for 20 ms measurement window size is that the SS/PBCH burst set composition can be constructed through doubling the maximum number of candidate SS/PBCH blocks L compared to the SS/PBCH burst set composition under 10 ms measurement window size. In another sub-embodiment, the SS/PBCH burst set composition for 20 ms measurement window size can be constructed through distributing or spreading out within the 20 ms measurement window the SS/PBCH burst set composition under the 10 ms measurement window size. In yet another sub-embodiment, the SS/PBCH burst set composition under 5 ms measurement window size (e.g., TABLE 13) and 10 ms measurement window size (e.g., TABLE 14) can also be supported for 20 ms measurement window size.

One sub-embodiment of TABLE 14 is that the number of possible locations for SS/PBCH blocks can be more than that of Rel-15 NR, such as to enhance channel access chance to transmit SS/PBCH blocks or support standalone operations of NR unlicensed.

TABLE 14

Slot positions for SS/PBCH block

| Subcarrier spacing (KHz) | Possible slot number | Maximum number of candidate SS/PBCH block locations L (n: max number of SS/PBCH blocks per slot) |
|---|---|---|
| 15 | 0, 1, 2, 3, 5, 6, 7, 8, 10, 11, 12, 13, 15, 16, 17, 18 | 16n |
|  | 0, 1, 2, 3, 10, 11, 12, 13 | 8n |
|  | 0, 1, 10, 11 | 4n |
| 30 | 0, 1, 2, 3, 5, 6, 7, 8, 10, 11, 12, 13, 15, 16, 17, 18, 20, 21, 22, 23, 25, 26, 27, 28, 30, 31, 32, 33, 35, 36, 37, 38 | 32n |
|  | 0, 1, 2, 3, 5, 6, 7, 8, 20, 21, 22, 23, 25, 26, 27, 28 | 16n |
|  | 0, 1, 2, 3, 20, 21, 22, 23 | 8n |
| 60 | $\cup_{k=0}^{7}\{(0, 1, 2, 3, 4, 5, 6, 7) + 10 \times k\}$ or $\cup_{k=0}^{7}\{(0, 1, 2, 3, 5, 6, 7, 8) + 10 \times k\}$ | 64n |
|  | $\cup_{k=0}^{3}\{(0, 1, 2, 3, 4, 5, 6, 7) + 20 \times k\}$ or $\cup_{k=0}^{3}\{(0, 1, 2, 3, 5, 6, 7, 8) + 20 \times k\}$ | 32n |
|  | $\cup_{k=0}^{1}\{(0, 1, 2, 3, 4, 5, 6, 7) + 40 \times k\}$ or $\cup_{k=0}^{1}\{(0, 1, 2, 3, 5, 6, 7, 8) + 40 \times k\}$ | 16n |
| 120 | $\cup_{k=0}^{31}\{(0, 1, 2, 3) + 5 \times k\}$ or $\cup_{k=0}^{15}\{(0, 1, 2, 3, 4, 5, 6, 7) + 10 \times k\}$ | 128n |
|  | $\cup_{k=0}^{15}\{(0, 1, 2, 3) + 10 \times k\}$ or $\cup_{k=0}^{7}\{(0, 1, 2, 3, 4, 5, 6, 7) + 20 \times k\}$ | 64n |
|  | $\cup_{k=0}^{7}\{(0, 1, 2, 3) + 20 \times k\}$ or $\cup_{k=0}^{3}\{(0, 1, 2, 3, 4, 5, 6, 7) + 40 \times k\}$ | 32n |
| 240 | $\bigcup_{k=0}^{31}\{(0, 1, 2, 3, 4, 5, 6, 7) + 10 \times k\}$ or $\bigcup_{k=0}^{15}\left\{\begin{pmatrix} 0, 1, 2, 3, 4, 5, 6, 7, 8, 9, 10, \\ 11, 12, 13, 14, 15 \end{pmatrix} + 20 \times k\right\}$ | 256n |
|  | $\bigcup_{k=0}^{15}\{(0, 1, 2, 3, 4, 5, 6, 7) + 20 \times k\}$ or $\bigcup_{k=0}^{7}\left\{\begin{pmatrix} 0, 1, 2, 3, 4, 5, 6, 7, 8, 9, 10, \\ 11, 12, 13, 14, 15 \end{pmatrix} + 40 \times k\right\}$ | 128n |
|  | $\bigcup_{k=0}^{7}\{(0, 1, 2, 3, 4, 5, 6, 7) + 40 \times k\}$ or $\bigcup_{k=0}^{3}\left\{\begin{pmatrix} 0, 1, 2, 3, 4, 5, 6, 7, 8, 9, 10, \\ 11, 12, 13, 14, 15 \end{pmatrix} + 80 \times k\right\}$ | 64n |
| 480 | $\bigcup_{k=0}^{15}\left\{\begin{pmatrix} 0, 1, 2, 3, 4, 5, 6, 7, 8, 9, 10, 11, 12, 13, 14, 15, 16, 17, \\ 18, 19, 20, 21, 22, 23, 24, 25, 26, 27, 28, 29, 30, 31 \end{pmatrix} + 40 \times k\right\}$ | 512n |
|  | $\bigcup_{k=0}^{7}\left\{\begin{pmatrix} 0, 1, 2, 3, 4, 5, 6, 7, 8, 9, 10, 11, 12, 13, 14, 15, 16, 17, \\ 18, 19, 20, 21, 22, 23, 24, 25, 26, 27, 28, 29, 30, 31 \end{pmatrix} + 80 \times k\right\}$ | 256n |
|  | $\bigcup_{k=0}^{3}\left\{\begin{pmatrix} 0, 1, 2, 3, 4, 5, 6, 7, 8, 9, 10, 11, 12, 13, 14, 15, 16, 17, \\ 18, 19, 20, 21, 22, 23, 24, 25, 26, 27, 28, 29, 30, 31 \end{pmatrix} + 160 \times k\right\}$ | 128n |
| 960 | $\bigcup_{k=0}^{7}\left\{\begin{matrix} 0, 1, 2, 3, 4, 5, 6, 7, 8, 9, 10, 11, 12, 13, 14, 15, 16, 17, \\ 18, 19, 20, 21, 22, 23, 24, 25, 26, 27, 28, 29, 30, 31, \\ 32, 33, 34, 35, 36, 37, 38, 39, 40, 41, 42, 43, 44, 45, 46, 47, 48, 49, \\ 50, 51, 52, 53, 54, 55, 56, 57, 58, 59, 60, 61, 62, 63 \end{matrix} + 80 \times k\right\}$ or | 512n |

TABLE 14-continued

Slot positions for SS/PBCH block

| Subcarrier spacing (KHz) | Possible slot number | Maximum number of candidate SS/PBCH block locations L (n: max number of SS/PBCH blocks per slot) |
|---|---|---|
| | $\bigcup_{k=0}^{7}\left\{\begin{array}{l}0, 1, 2, 3, 4, 5, 6, 7, 8, 9, 10, 11, 12, 13, 14, 15, 16, 17,\\ 18, 19, 20, 21, 22, 23, 24, 25, 26, 27, 28, 29, 30, 31,\\ 32, 33, 34, 35, 36, 37, 38, 39, 40, 41, 42, 43, 44, 45, 46, 47, 48, 49,\\ 50, 51, 52, 53, 54, 55, 56, 57, 58, 59, 60, 61, 62, 63\end{array}\right\} + 160 \times k$ or | |
| | $\bigcup_{k=0}^{15}\left\{\left(\begin{array}{l}0, 1, 2, 3, 4, 5, 6, 7, 8, 9, 10, 11, 12, 13, 14, 15, 16, 17,\\ 18, 19, 20, 21, 22, 23, 24, 25, 26, 27, 28, 29, 30, 31\end{array}\right) + 40 \times k\right\}$ or | |
| | $\bigcup_{l=0}^{7}\bigcup_{k=0}^{1}\left\{\left(\begin{array}{l}0, 1, 2, 3, 4, 5, 6, 7, 8, 9, 10, 11, 12, 13, 14, 15, 16, 17,\\ 18, 19, 20, 21, 22, 23, 24, 25, 26, 27, 28, 29, 30, 31\end{array}\right) + 40 \times k + 160 \times l\right\}$ | |
| | $\bigcup_{k=0}^{3}\left\{\begin{array}{l}0, 1, 2, 3, 4, 5, 6, 7, 8, 9, 10, 11, 12, 13, 14, 15, 16, 17,\\ 18, 19, 20, 21, 22, 23, 24, 25, 26, 27, 28, 29, 30, 31,\\ 32, 33, 34, 35, 36, 37, 38, 39, 40, 41, 42, 43, 44, 45, 46, 47, 48, 49,\\ 50, 51, 52, 53, 54, 55, 56, 57, 58, 59, 60, 61, 62, 63\end{array}\right\} + 160 \times k$ or | 256n |
| | $\bigcup_{k=0}^{3}\left\{\begin{array}{l}0, 1, 2, 3, 4, 5, 6, 7, 8, 9, 10, 11, 12, 13, 14, 15, 16, 17,\\ 18, 19, 20, 21, 22, 23, 24, 25, 26, 27, 28, 29, 30, 31,\\ 32, 33, 34, 35, 36, 37, 38, 39, 40, 41, 42, 43, 44, 45, 46, 47, 48, 49,\\ 50, 51, 52, 53, 54, 55, 56, 57, 58, 59, 60, 61, 62, 63\end{array}\right\} + 320 \times k$ or | |
| | $\bigcup_{k=0}^{7}\left\{\left(\begin{array}{l}0, 1, 2, 3, 4, 5, 6, 7, 8, 9, 10, 11, 12, 13, 14, 15, 16, 17,\\ 18, 19, 20, 21, 22, 23, 24, 25, 26, 27, 28, 29, 30, 31\end{array}\right) + 80 \times k\right\}$ or | |
| | $\bigcup_{l=0}^{3}\bigcup_{k=0}^{1}\left\{\left(\begin{array}{l}0, 1, 2, 3, 4, 5, 6, 7, 8, 9, 10, 11, 12, 13, 14, 15, 16, 17,\\ 18, 19, 20, 21, 22, 23, 24, 25, 26, 27, 28, 29, 30, 31\end{array}\right) + 40 \times k + 320 \times l\right\}$ | |
| | $\bigcup_{k=0}^{1}\left\{\begin{array}{l}0, 1, 2, 3, 4, 5, 6, 7, 8, 9, 10, 11, 12, 13, 14, 15, 16, 17,\\ 18, 19, 20, 21, 22, 23, 24, 25, 26, 27, 28, 29, 30, 31,\\ 32, 33, 34, 35, 36, 37, 38, 39, 40, 41, 42, 43, 44, 45, 46, 47, 48, 49,\\ 50, 51, 52, 53, 54, 55, 56, 57, 58, 59, 60, 61, 62, 63\end{array}\right\} + 160 \times k$ or | 128n |
| | $\bigcup_{k=0}^{1}\left\{\begin{array}{l}0, 1, 2, 3, 4, 5, 6, 7, 8, 9, 10, 11, 12, 13, 14, 15, 16, 17,\\ 18, 19, 20, 21, 22, 23, 24, 25, 26, 27, 28, 29, 30, 31,\\ 32, 33, 34, 35, 36, 37, 38, 39, 40, 41, 42, 43, 44, 45, 46, 47, 48, 49,\\ 50, 51, 52, 53, 54, 55, 56, 57, 58, 59, 60, 61, 62, 63\end{array}\right\} + 320 \times k$ or | |
| | $\bigcup_{k=0}^{3}\left\{\left(\begin{array}{l}0, 1, 2, 3, 4, 5, 6, 7, 8, 9, 10, 11, 12, 13, 14, 15, 16, 17,\\ 18, 19, 20, 21, 22, 23, 24, 25, 26, 27, 28, 29, 30, 31\end{array}\right) + 80 \times k\right\}$ or | |
| | $\bigcup_{l=0}^{1}\bigcup_{k=0}^{1}\left\{\left(\begin{array}{l}0, 1, 2, 3, 4, 5, 6, 7, 8, 9, 10, 11, 12, 13, 14, 15, 16, 17,\\ 18, 19, 20, 21, 22, 23, 24, 25, 26, 27, 28, 29, 30, 31\end{array}\right) + 40 \times k + 320 \times l\right\}$ | |

Figure 26A:
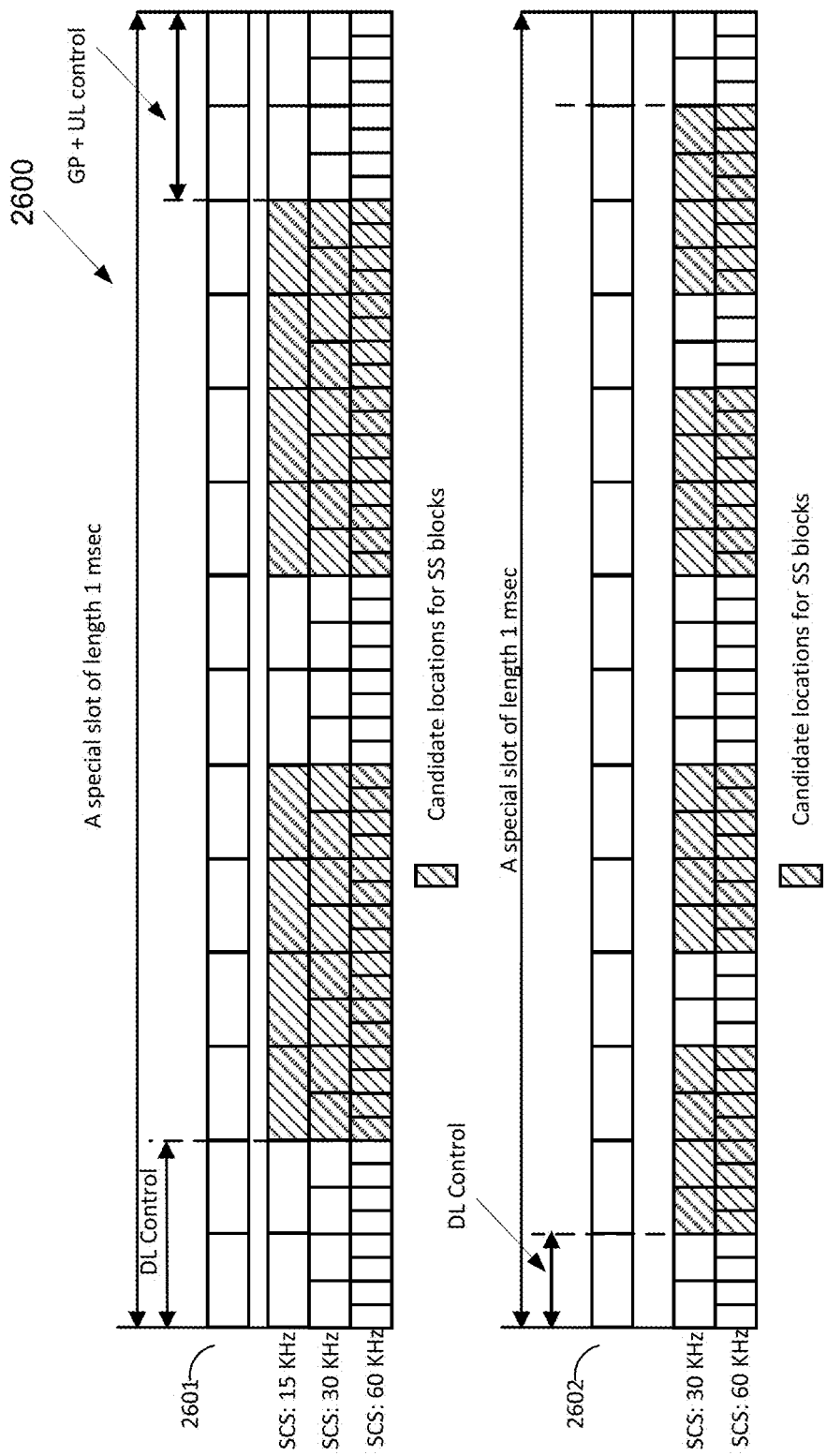
FIG. 26A illustrates yet another example SS/PBCH block mapping according to embodiments of the present disclosure.
Figure 26B:
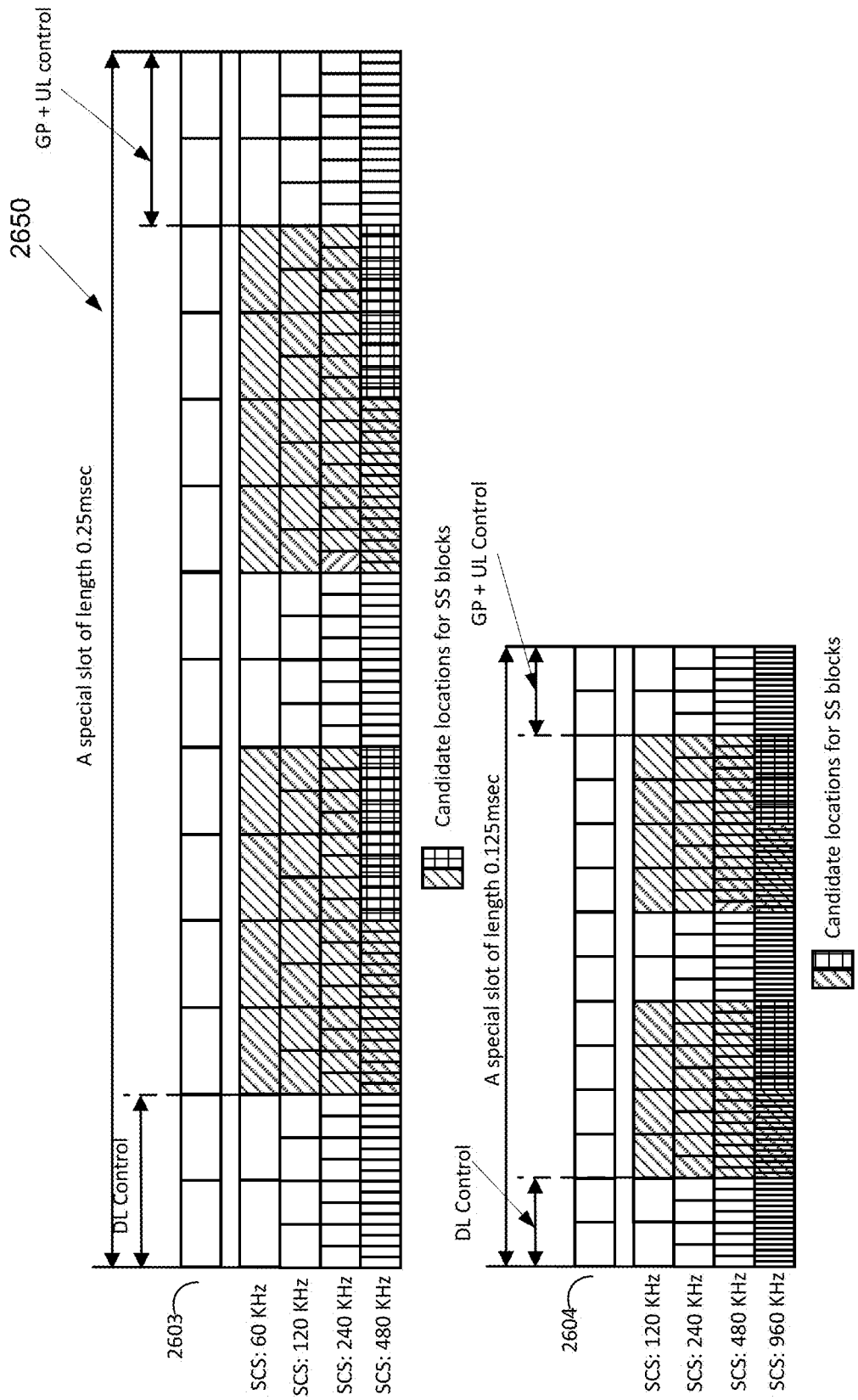
FIG. 26B illustrates yet another example SS/PBCH block mapping according to embodiments of the present disclosure.

FIG. 26A illustrates yet another example SS/PBCH block mapping 2600 according to embodiments of the present disclosure. The embodiment of the SS/PBCH block mapping 2600 illustrated in FIG. 26A is for illustration only. FIG. 26A does not limit the scope of this disclosure to any particular implementation FIG. 26B illustrates an example beam direction 2650 according to embodiments of the present disclosure. The embodiment of the beam direction 2650 illustrated in FIG. 26B is for illustration only. FIG. 26B does not limit the scope of this disclosure to any particular implementation Another important design consideration is the relationship between the provided mapping patterns of SS/PBCH blocks in the aforementioned embodiments across different subcarrier spacing for beyond Rel-15 NR system. For sub-7 GHz beyond Rel-15 NR, the SCS for SS/PBCH blocks can be 15 KHz, 30 KHz, or 60 KHz; while for the above 7 GHz beyond Rel-15 NR, the SCS for SS/PBCH block can be 60 KHz, 120 KHz, 240 KHz, 480 KHz or 960 kHz. FIGS. 26A and 26B illustrate examples of the relationship between the mapping patterns for different subcarrier spacing, which are detailed by the following.

In one example 2601, for a reference slot with 1 millisecond length, symbol #0 and #1 are preserved (e.g., for DL control), and symbol #12 and #13 are preserved (e.g., for guard period (GP) and UL control). Given the reference slot, for 15 KHz SCS slot that contains SS/PBCH block, the potential SS/PBCH block location(s) can be from symbol #2 to symbol #5, and from symbol #8 to symbol #11, with the detailed locations provided in the aforementioned embodiments. For 30 KHz SCS slots that contain SS/PBCH block, the potential SS/PBCH block(s) can be from symbol #4 to symbol #11 in the first slot of 14 symbols; and at symbol #2 to symbol #9 in the second slot of 14 symbols, with the detailed locations provided the aforementioned embodiments. For 60 KHz SCS slots that contain SS/PBCH block, the potential SS/PBCH block(s) can be from symbol #8 to symbol #23 in the first two slots of 28 symbols; and at symbol #4 to symbol #19 in the second two slot of 28 symbols, with the detailed locations provided in the aforementioned embodiments.

Specifically, the SS/PBCH block mapping patterns that correspond to FIG. 13 detailed in the aforementioned embodiments can be applied to 15 kHz SCS is this example; the SS/PBCH block mapping patterns that correspond to FIG. 15 and FIG. 16 detailed in the aforementioned embodiments can be applied to 30 kHz SCS is this example; the SS/PBCH block mapping patterns that correspond to FIG. 19 and FIG. 20 detailed in the aforementioned embodiments can be applied to 60 kHz SCS is this example.

In one example 2602, for a reference slot with 1 millisecond length, symbol #0 is preserved (e.g., for DL control), and symbol #13 is also persevered. Given the reference slot, for 30 KHz SCS slot that contains SS/PBCH block, the potential SS/PBCH block location(s) can be from symbol #2 to symbol #5, and from symbol #8 to symbol #11, with the detailed locations provided in the aforementioned embodiments. For 60 KHz SCS slots that contain SS/PBCH block, the potential SS/PBCH block(s) can be from symbol #4 to symbol #11 in the first slot of 14 symbols; and at symbol #2 to symbol #9 in the second slot of 14 symbols, with the detailed locations provided in the aforementioned embodiments. Specifically, the SS/PBCH block mapping patterns that correspond to FIG. 13 detailed in the aforementioned embodiments can be applied to 30 kHz SCS is this example; the SS/PBCH block mapping patterns that correspond to FIG. 15 and FIG. 16 detailed in the aforementioned embodiments can be applied to 60 kHz SCS is this example.

In one example 2603, for a reference slot with 0.25 millisecond length, symbol #0 and #1 are preserved (e.g., for DL control), and symbol #12 and #13 are preserved (e.g., for guard period (GP) and UL control). Given the reference slot, for 60 KHz SCS slot that contains SS/PBCH block, the potential SS/PBCH block location(s) can be from symbol #2 to symbol #5, and from symbol #8 to symbol #11, with the detailed locations provided in the aforementioned embodiments. For 120 KHz SCS slots that contain SS/PBCH block, the potential SS/PBCH block(s) can be from symbol #4 to symbol #11 in the first slot of 14 symbols; and at symbol #2 to symbol #9 in the second slot of 14 symbols, with the detailed locations provided the aforementioned embodiments. For 240 KHz SCS slots that contain SS/PBCH block, the potential SS/PBCH block(s) can be from symbol #8 to symbol #23 in the first two slots of 28 symbols; and at symbol #4 to symbol #19 in the second two slot of 28 symbols, with the detailed locations provided the aforementioned embodiments.

For 480 KHz SCS slots that contain SS/PBCH block, the potential SS/PBCH block(s) can be from symbol #16 to symbol #47 in the first four slots of 56 symbols; and at symbol #8 to symbol #39 in the second four slots of 56 symbols, with the detailed locations provided in the aforementioned embodiments. Specifically, the SS/PBCH block mapping patterns that correspond to FIG. 13 detailed in the aforementioned embodiments can be applied to 60 kHz SCS is this example; the SS/PBCH block mapping patterns that correspond to FIG. 15 and FIG. 16 detailed in the aforementioned embodiments can be applied to 120 kHz SCS is this example; the SS/PBCH block mapping patterns that correspond to FIG. 19 and FIG. 20 detailed in the aforementioned embodiments can be applied to 240 kHz SCS is this example; the SS/PBCH block mapping patterns that correspond to FIG. 24 and FIG. 25 detailed in the aforementioned embodiments can be applied to 480 kHz SCS is this example.

In one example 2604, for a reference slot with 0.125 millisecond length, symbol #0 and #1 are preserved (e.g., for DL control), and symbol #12 and #13 are preserved (e.g., for GP and UL control). Given the reference slot, for 120 KHz SCS slot that contains SS/PBCH block, the potential SS/PBCH block location(s) can be from symbol #2 to symbol #5, and from symbol #8 to symbol #11, with the detailed locations provided in the aforementioned embodiments. For 240 KHz SCS slots that contain SS/PBCH block, the potential SS/PBCH block(s) can be from symbol #4 to symbol #11 in the first slot of 14 symbols; and at symbol #2 to symbol #9 in the second slot of 14 symbols, with the detailed locations provided in the aforementioned embodiments. For 480 KHz SCS slots that contain SS/PBCH block, the potential SS/PBCH block(s) can be from symbol #8 to symbol #23 in the first two slots of 28 symbols; and at symbol #4 to symbol #19 in the second two slot of 28 symbols, with the detailed locations provided in the aforementioned embodiments. For 960 KHz SCS slots that contain SS/PBCH block, the potential SS/PBCH block(s) can be from symbol #16 to symbol #47 in the first four slots of 56 symbols; and at symbol #8 to symbol #39 in the second four slots of 56 symbols, with the detailed locations provided in the aforementioned embodiments.

Specifically, the SS/PBCH block mapping patterns that correspond to FIG. 13 detailed in the aforementioned embodiments can be applied to 120 kHz SCS is this example; the SS/PBCH block mapping patterns that correspond to FIG. 15 and FIG. 16 detailed in the aforementioned embodiments can be applied to 240 kHz SCS is this example; the SS/PBCH block mapping patterns that correspond to FIG. 19 and FIG. 20 detailed in the aforementioned embodiments can be applied to 480 kHz SCS is this example; the SS/PBCH block mapping patterns that correspond to FIG. 24 and FIG. 25 detailed in the aforementioned embodiments can be applied to 960 kHz SCS is this example.

In one embodiment, in addition to the examples detailed in FIGS. 26A and 26B, more examples of the multiplexing of SS/PBCH block mapping patterns may be provided in FIG. 38 to FIG. 48. In one sub-embodiment, these additional examples can be utilized to the scenario where one SSB is transmitted within a slot, with the number of symbols per SSB being 9, 10, 11, 12, 13, or 14. Specifically, this can be achieved by considering the symbol positions of two neighboring SS/PBCH blocks, as illustrated in FIG. 38 to FIG. 48, to be belonging to 1 SSB, similar to the procedure detailed in the aforementioned embodiments.

In another embodiment, all or a subset of the subcarrier spacings in the above examples can be supported for the multiplexing of SS/PBCH block mapping patterns across different subcarrier spacings.

Another important design consideration is regarding the directionality for SS/PBCH block transmissions, as well as the directionality for LBT operations that corresponds to the SS/PBCH blocks, whose time-domain resource allocations are specified in the aforementioned embodiments. In the present disclosure, a "spatial RX parameter" is referred to as a beamforming direction at the gNB for uplink reception (e.g., receive beamforming toward a certain direction); and a "spatial TX parameter" is referred to as the beamforming direction at the gNB for downlink transmission (e.g., transmit beamforming toward a certain direction).

For each SS/PBCH block, the spatial TX parameter to transmit each SS/PBCH block can be as follows. In one embodiment, each SS/PBCH block can be transmitted using an omni-directional or quasi-omni-directional spatial TX parameter. In another embodiment, each SS/PBCH block can be transmitted using the spatial TX parameter that corresponds to a directional beam. For example, this can be achieved through analog beamforming.

Due to the PSD and EIRP constraints from unlicensed regulations, the transmit power of SS/PBCH block plus antenna gain across the carrier is subject to the max EIRP constraint. As a result, the coverage area of SS/PBCH blocks with directional spatial TX parameters and beam-sweeping, may not be significantly enhanced compared to SS/PBCH blocks with omni-directional or quasi-omni-directional spatial TX parameter(s), especially for sub-7 GHz unlicensed bands wherein the max EIRP is around 23 dBm.

Figure 27:
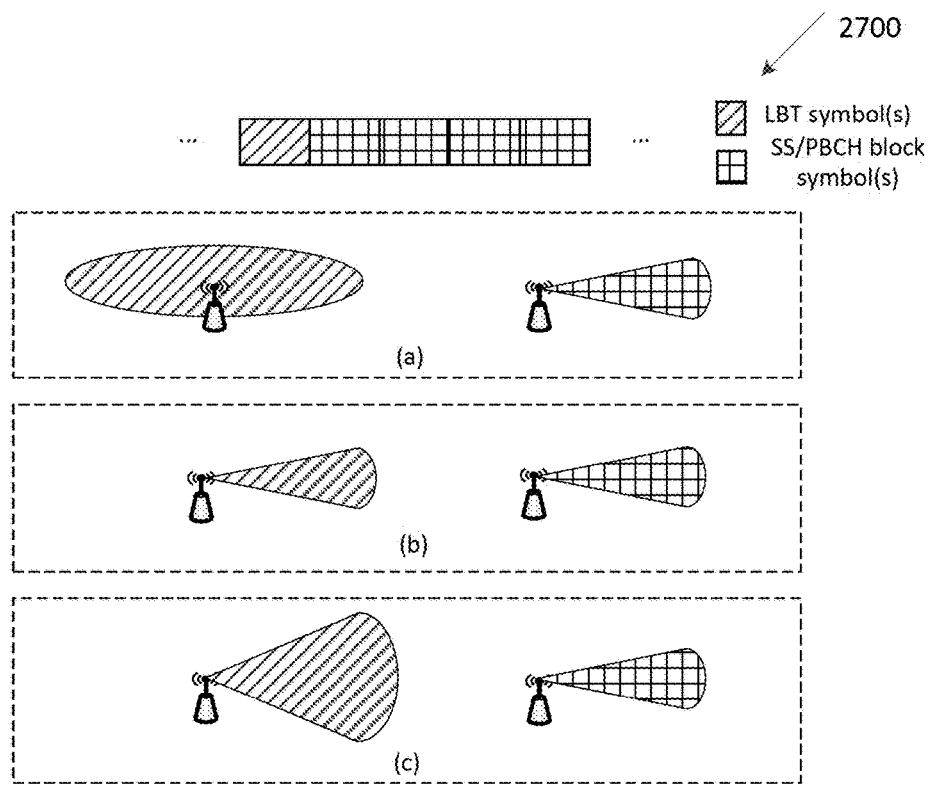
FIG. 27 illustrates an example beam direction according to embodiments of the present disclosure.

FIG. 27 illustrates an example beam direction 2700 according to embodiments of the present disclosure. The embodiment of the beam direction 2700 illustrated in FIG. 27 is for illustration only. FIG. 27 does not limit the scope of this disclosure to any particular implementation For the LBT operations that are performed before the transmission of SS/PBCH block(s), the directionality can be as follow. The LBT operation can be performed over omni-directional or quasi-omni-directional spatial RX parameter(s). One example is shown in FIG. 27 (e.g., (a) in FIG. 27).

The LBT operation can be performed over the spatial RX parameter, which is the same as the intended spatial TX parameter of the SS/PBCH block that follows the LBT operation. One example is shown in FIG. 27 (e.g., (b) in FIG. 27).

The LBT operation can be performed over the spatial RX parameter which corresponds to a wider beam direction, than that of the intended spatial TX parameter(s) of the following SS/PBCH block(s); and the beam direction that corresponds to the spatial RX parameter for LBT operation can cover the intended beam direction(s) that corresponds to the spatial TX parameter(s) of the following SS/PBCH block(s). One example is shown in FIG. 27 (e.g., (c) in FIG. 27).

For a group of M SS/PBCH blocks (M>1) wherein the gap between neighboring SS/PBCH blocks are less than a certain duration (e.g., SIFS), and that only one LBT process is be performed preceding the first SS/PBCH block, the following relation between the directionality of the LBT process and the directionality of SS/PBCH blocks are possible.

In one embodiment, the SS/PBCH blocks can use the same spatial TX parameters, and the LBT can be performed over the spatial RX parameter that is the same as the spatial TX parameter of the SS/PBCH blocks. One example with M=2 is illustrated in 2401 of FIG. 28.

Figure 28:
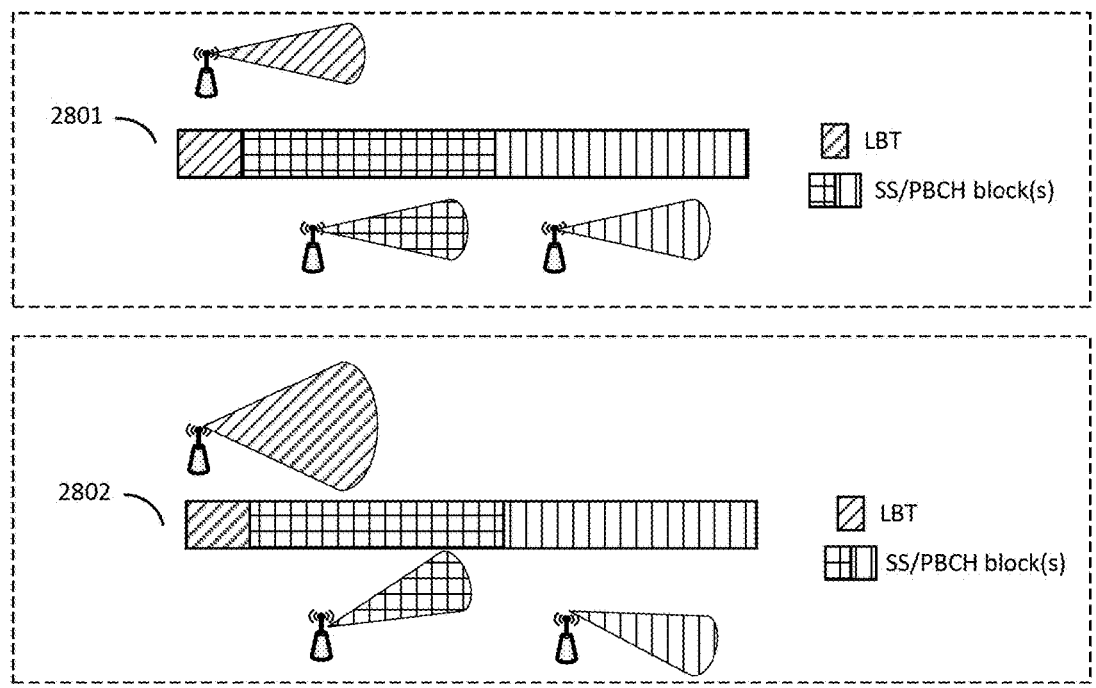
FIG. 28 illustrates another example beam direction according to embodiments of the present disclosure.

FIG. 28 illustrates another example beam direction 2800 according to embodiments of the present disclosure. The embodiment of the beam direction 2800 illustrated in FIG. 28 is for illustration only. FIG. 28 does not limit the scope of this disclosure to any particular implementation In another embodiment, at least two SS/PBCH blocks intend to use different spatial TX parameters within the group of SS/PBCH blocks, and the LBT can be performed over the omni-directional spatial RX parameter, or quasi-omni-directional spatial RX parameter, or a spatial RX parameter that corresponds to a wide beam direction that covers every spatial TX parameter of the SS/PBCH blocks. One example with M=2 is illustrated in 2402 of FIG. 28, wherein the 2 SS/PBCH blocks have different intended spatial TX parameters, while the LBT is performed over a spatial RX parameter that covers both intended spatial TX parameters of the 2 SS/PBCH blocks. In one sub-embodiment, an extra single-shot LBT can be performed before granting transmission of each SSB, after the LBT that is performed over an omni/quasi-omni spatial RX parameter or with a wide-beam direction is successfully completed.

For neighboring LBT operations of SS/PBCH block(s), the following relations of the spatial TX/RX parameters for the neighboring LBT operations and their corresponding SS/PBCH blocks are possible.

In one embodiment, the spatial RX parameter for LBT and spatial TX parameter(s) for SS/PBCH block(s) are predefined; each LBT operation may be performed according to the predefined spatial RX parameter, and the SS/PBCH block(s) corresponding to this LBT operation may be transmitted using the predefined spatial TX parameter(s) if LBT succeeds, and not transmitted if LBT fails.

In another embodiment, the spatial RX parameter for LBT and the spatial TX parameter(s) for the SS/PBCH blocks corresponding to this LBT operation, can be dynamically adjusted based on the status of previous LBT operation(s) and SS/PBCH block(s). In particular, one or multiple of the following options can be supported simultaneously.

In one sub-embodiment, the current LBT operation can be performed over the same spatial RX parameter of the previous LBT operation; and the spatial TX parameter(s) of the SS/PBCH blocks that corresponds to the current LBT operation, may re-use the spatial TX parameter(s) of the SS/PBCH blocks that corresponds to the previous LBT operation. In this case, if the previous LBT operation fails, the gNB re-attempts the LBT operation and re-attempts the transmission of SS/PBCH blocks with same spatial TX parameter(s); while if previous LBT operation succeeds, the gNB attempts to re-transmit SS/PBCH blocks with same spatial TX parameter(s), such as to enhance coverage.

In another sub-embodiment, the spatial TX parameter(s) of the SS/PBCH blocks that corresponds to the current LBT operation, can be dynamically adjusted and be different from the spatial TX parameter(s) of the SS/PBCH blocks that corresponds to the previous LBT operation; and the spatial RX parameter for current LBT operation can be adjusted accordingly, which can be a different spatial RX parameter from the previous LBT operation. In this case, the gNB attempts to transmit SS/PBCH blocks with different spatial TX parameter(s) irrespective of previous LBT result.

In yet another sub-embodiment, the current LBT operation can use the same spatial RX parameter as its previous LBT operation, while the spatial TX parameter(s) of the SS/PBCH blocks that corresponds to the current LBT operation, can be dynamically adjusted and be different from the spatial TX parameter(s) of the SS/PBCH blocks that corresponds to the previous LBT operation. For example, this case can be applied to the scenario where the LBT operations are performed over omni-directional or quasi-omni-directional spatial RX parameter, or a spatial RX parameter with wider beam than SS/PBCH block(s).

NR defines an SS block to be composed of the NR-PSS, NR-SSS, and NR-PBCH, where the time division multiplexing of NR-PSS, NR-SSS and NR-PBCH within an SS block is supported. Specifically, NR-PSS and NR-SSS provide time and frequency synchronization and cell ID acquisition, while NR-PBCH carries at least part of the minimum system information. One important design consideration is the composition of an NR SS block. In the time domain, an SS block consists of one OFDM symbol to which the NR-PSS is mapped, one OFDM symbol to which the NR-SSS is mapped. In the frequency domain, both NR-PSS and NR-SSS are mapped to 127 consecutive subcarriers. For NR-PBCH, the following frequency and time domain compositions within an SS block are possible.

In one embodiment, the transmission bandwidth of NR-PBCH can be 24 contiguous PRBs and each NR-PBCH is mapped to 288 subcarriers. In this case, each SS block can be consisted of 2 OFDM symbols for NR-PBCH in the time domain.

In another embodiment, the transmission bandwidth of NR-PBCH can be 12 PRBs. In particular, in one sub-embodiment, NR-PBCH can be mapped to 127 consecutive subcarriers to be aligned with the NR-PSS and NR-SSS. In another sub-embodiment, NR-PBCH can be mapped to all the 144 consecutive subcarriers of the 12 PRBs.

In yet another embodiment, the transmission bandwidth of NR-PBCH can be 11 PRBs. In particular, in one sub-embodiment, NR-PBCH can be mapped to 127 consecutive subcarriers to be aligned with the NR-PSS and NR-SSS. In another sub-embodiment, NR-PBCH can be mapped to all the 132 consecutive subcarriers of the 11 PRBs.

In yet another embodiment, the transmission bandwidth of NR-PBCH can be X PRBs, where 12<X<24.

Another aspect to consider is the number of OFDM symbols mapped for NR-PBCH within a SS block. Note that the determination of the number of OFDM symbols for NR-PBCH may also take into account the transmission bandwidth of NR-PBCH as well as the size of potential guard band, in order to achieve reasonable synchronization/broadcasting performance.

In one embodiment, there are 2 OFDM symbols mapped for NR-PBCH within each SS block.

In another embodiment, there are 3 OFDM symbols mapped for NR-PBCH within each SS block. For example, this can be combined with 11 or 12 PRBs of NR-PBCH transmission bandwidth. For another example, this can be combined with X PRBs of NR-PBCH transmission bandwidth, where 12<X<24.

In yet another embodiment, there are 4 OFDM symbols mapped for NR-PBCH within each SS block. For example, this can be combined with 11 or 12 PRBs of NR-PBCH transmission bandwidth. For another example, this can be combined with X PRBs of NR-PBCH transmission bandwidth, where 12<X<24.

In yet another embodiment, there are 5 OFDM symbols mapped for NR-PBCH within each SS block. For example, this can be combined with 11 or 12 PRBs of NR-PBCH transmission bandwidth. For another example, this can be combined with X PRBs of NR-PBCH transmission bandwidth, where 12<X<24.

Figure 29A:
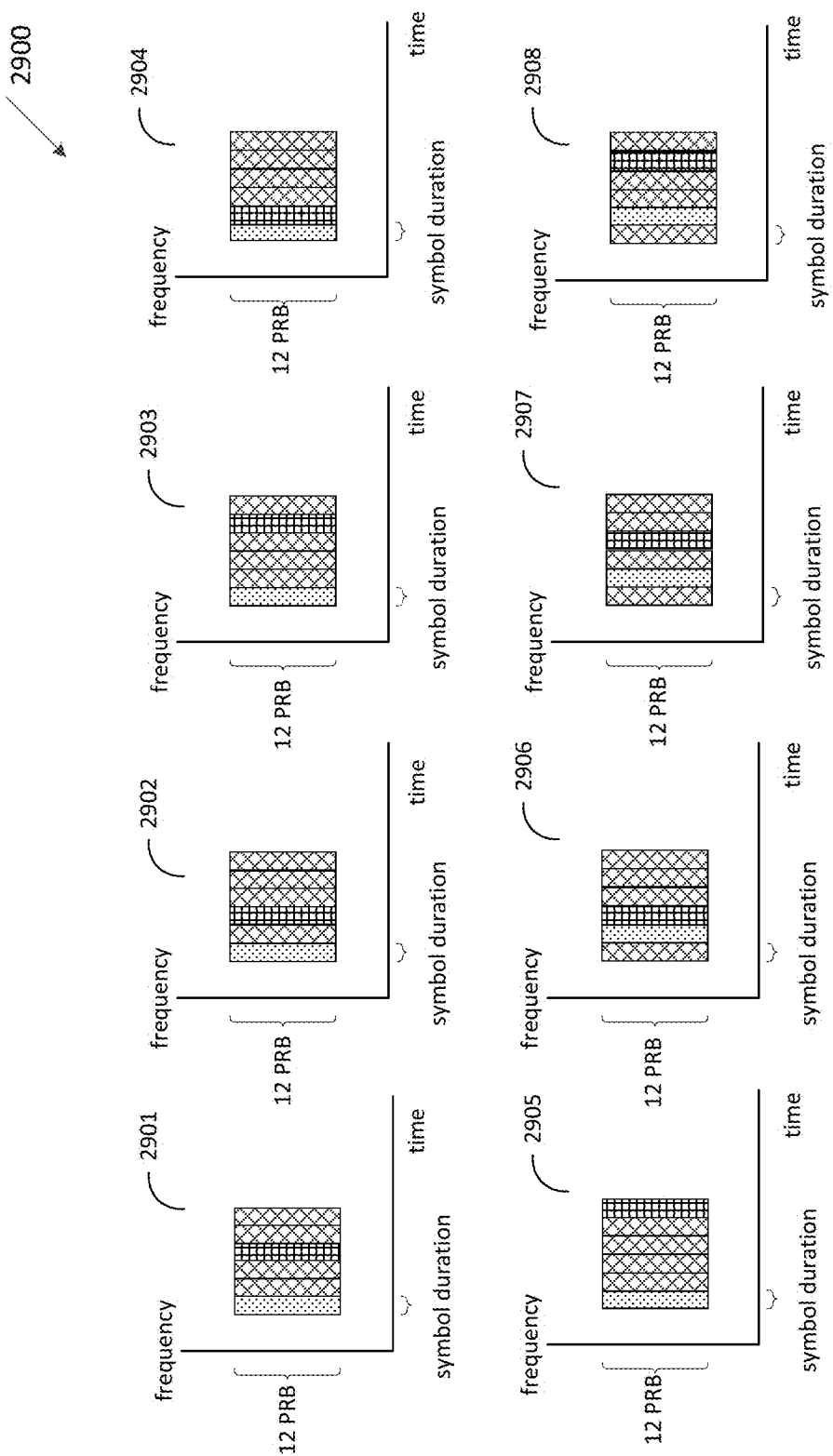
FIG. 29A illustrates an example NR-SS block composition according to embodiments of the present disclosure.
Figure 29B:
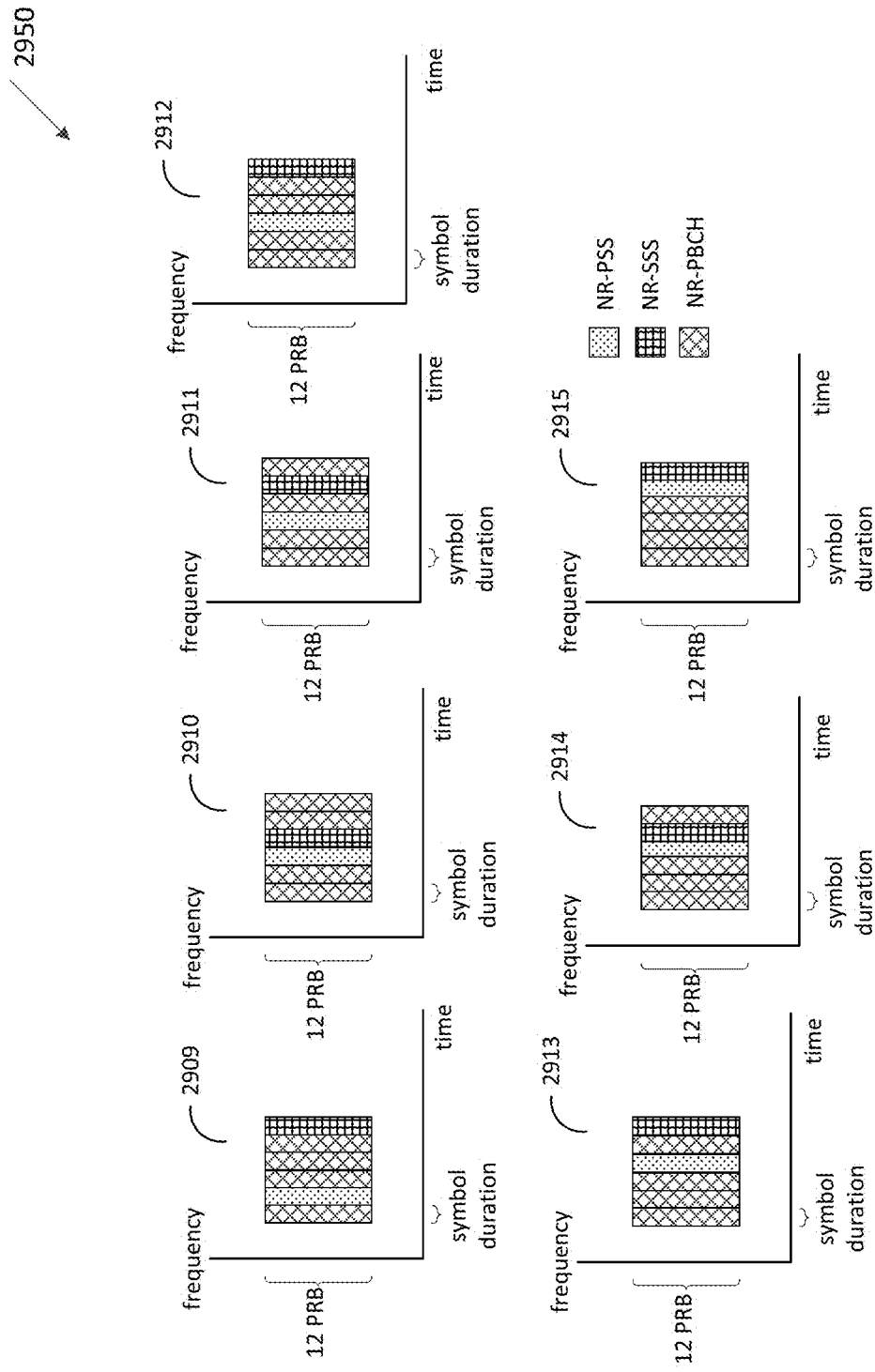
FIG. 29B illustrates another example NR-SS block composition according to embodiments of the present disclosure.

FIG. 29A illustrates an example NR-SS block composition 2900 according to embodiments of the present disclosure. The embodiment of the NR-SS block composition 2900 illustrated in FIG. 29A is for illustration only. FIG. 29A does not limit the scope of this disclosure to any particular implementation FIG. 29B illustrates another example NR-SS block composition 2950 according to embodiments of the present disclosure. The embodiment of the NR-SS block composition 2950 illustrated in FIG. 29B is for illustration only. FIG. 29B does not limit the scope of this disclosure to any particular implementation Yet another important design consideration is the time domain multiplexing pattern of NR-PSS, NR-SSS, and NR-PBCH symbols within an NR-SS block. In one embodiment, when NR-PBCH is consisted of 4 symbols, examples of NR-SS block composition in time domain are illustrated in FIGS. 29A, 29B, and 29C.

In one example 2901, the multiplexing of an SS block is NR-PSS, NR-PBCH, NR-PBCH, NR-SSS, NR-PBCH, NR-PBCH.

In one example 2902, the multiplexing of an SS block is NR-PSS, NR-PBCH, NR-SSS, NR-PBCH, NR-PBCH, NR-PBCH.

In one example 2903, the multiplexing of an SS block is NR-PSS, NR-PBCH, NR-PBCH, NR-PBCH, NR-SSS, NR-PBCH.

In one example 2904, the multiplexing of an SS block is NR-PSS, NR-SSS, NR-PBCH, NR-PBCH, NR-PBCH, NR-PBCH.

In one example 2905, the multiplexing of an SS block is NR-PSS, NR-PBCH, NR-PBCH, NR-PBCH, NR-PBCH, NR-SSS.

In one example 2906, the multiplexing of an SS block is NR-PBCH, NR-PSS, NR-SSS, NR-PBCH, NR-PBCH, NR-PBCH.

In one example 2907, the multiplexing of an SS block is NR-PBCH, NR-PSS, NR-PBCH, NR-SSS, NR-PBCH, NR-PBCH.

In one example 2908, the multiplexing of an SS block is NR-PBCH, NR-PSS, NR-PBCH, NR-PBCH, NR-SSS, NR-PBCH.

In one example 2909, the multiplexing of an SS block is NR-PBCH, NR-PSS, NR-PBCH, NR-PBCH, NR-PBCH, NR-SSS.

In one example 2910, the multiplexing of an SS block is NR-PBCH, NR-PBCH, NR-PSS, NR-SSS, NR-PBCH, NR-PBCH In one example 2911, the multiplexing of an SS block is NR-PBCH, NR-PBCH, NR-PSS, NR-PBCH, NR-SSS, NR-PBCH.

In one example 2912, the multiplexing of an SS block is NR-PBCH, NR-PBCH, NR-PSS, NR-PBCH, NR-PBCH, NR-SSS.

In one example 2913, the multiplexing of an SS block is NR-PBCH, NR-PBCH, NR-PBCH, NR-PSS, NR-PBCH, NR-SSS.

In one example 2914, the multiplexing of an SS block is NR-PBCH, NR-PBCH, NR-PBCH, NR-PSS, NR-SSS, NR-PBCH.

In one example 2915, the multiplexing of an SS block is NR-PBCH, NR-PBCH, NR-PBCH, NR-PBCH, NR-PSS, NR-SSS.

TABLE 15 summarizes all the possible multiplexing patterns of NR-PSS, NR-SSS, and NR-PBCH within an SS block (the symbol index in TABLE 15 refers to the one within an SS block), when the number symbols within an SS block is 6 (i.e., 4 symbols for NR-PBCH).

In one example 3002, the multiplexing of an SS block is NR-PSS, NR-PBCH, NR-PBCH, NR-SSS, NR-PBCH.

In one example 3003, the multiplexing of an SS block is NR-PSS, NR-PBCH, NR-PBCH, NR-PBCH, NR-SSS.

In one example 3004, the multiplexing of an SS block is NR-PSS, NR-SSS, NR-PBCH, NR-PBCH, NR-PBCH.

In one example 3005, the multiplexing of an SS block is NR-PBCH, NR-PSS, NR-PBCH, NR-PBCH, NR-SSS.

In one example 3006, the multiplexing of an SS block is NR-PBCH, NR-PSS, NR-PBCH, NR-SSS, NR-PBCH.

In one example 3007, the multiplexing of an SS block is NR-PBCH, NR-PSS, NR-SSS, NR-PBCH, NR-PBCH.

In one example 3008, the multiplexing of an SS block is NR-PBCH, NR-PBCH, NR-PSS, NR-SSS, NR-PBCH.

In one example 3009, the multiplexing of an SS block is NR-PBCH, NR-PBCH, NR-PSS, NR-PBCH, NR-SSS.

In one example 3010: the multiplexing of an SS block is NR-PBCH, NR-PBCH, NR-PBCH, NR-PSS, NR-SSS.

TABLE 16 summarizes all the possible multiplexing patterns of NR-PSS, NR-SSS, and NR-PBCH within an SS block (the symbol index in TABLE 16 refers to the one within an SS block), when the number symbols within an SS block is 5 (i.e., 3 symbols for NR-PBCH).

TABLE 15

Multiplexing patterns of NR-PSS, NR-SSS, and NR-PBCH within an SS block

| Multiplexing Pattern | #0 | #1 | #2 | #3 | #4 | #5 |
|---|---|---|---|---|---|---|
| 1 | NR-PSS | NR-SSS | NR-PBCH | NR-PBCH | NR-PBCH | NR-PBCH |
| 2 | NR-PSS | NR-PBCH | NR-SSS | NR-PBCH | NR-PBCH | NR-PBCH |
| 3 | NR-PSS | NR-PBCH | NR-PBCH | NR-SSS | NR-PBCH | NR-PBCH |
| 4 | NR-PSS | NR-PBCH | NR-PBCH | NR-PBCH | NR-SSS | NR-PBCH |
| 5 | NR-PSS | NR-PBCH | NR-PBCH | NR-PBCH | NR-PBCH | NR-SSS |
| 6 | NR-SSS | NR-PSS | NR-PBCH | NR-PBCH | NR-PBCH | NR-PBCH |
| 7 | NR-SSS | NR-PBCH | NR-PSS | NR-PBCH | NR-PBCH | NR-PBCH |
| 8 | NR-SSS | NR-PBCH | NR-PBCH | NR-PSS | NR-PBCH | NR-PBCH |
| 9 | NR-SSS | NR-PBCH | NR-PBCH | NR-PBCH | NR-PSS | NR-PBCH |
| 10 | NR-SSS | NR-PBCH | NR-PBCH | NR-PBCH | NR-PBCH | NR-PSS |
| 11 | NR-PBCH | NR-PSS | NR-SSS | NR-PBCH | NR-PBCH | NR-PBCH |
| 12 | NR-PBCH | NR-PSS | NR-PBCH | NR-SSS | NR-PBCH | NR-PBCH |
| 13 | NR-PBCH | NR-PSS | NR-PBCH | NR-PBCH | NR-SSS | NR-PBCH |
| 14 | NR-PBCH | NR-PSS | NR-PBCH | NR-PBCH | NR-PBCH | NR-SSS |
| 15 | NR-PBCH | NR-SSS | NR-PSS | NR-PBCH | NR-PBCH | NR-PBCH |
| 16 | NR-PBCH | NR-SSS | NR-PBCH | NR-PSS | NR-PBCH | NR-PBCH |
| 17 | NR-PBCH | NR-SSS | NR-PBCH | NR-PBCH | NR-PSS | NR-PBCH |
| 18 | NR-PBCH | NR-SSS | NR-PBCH | NR-PBCH | NR-PBCH | NR-PSS |
| 19 | NR-PBCH | NR-PBCH | NR-PSS | NR-SSS | NR-PBCH | NR-PBCH |
| 20 | NR-PBCH | NR-PBCH | NR-PSS | NR-PBCH | NR-SSS | NR-PBCH |
| 21 | NR-PBCH | NR-PBCH | NR-PSS | NR-PBCH | NR-PBCH | NR-SSS |
| 22 | NR-PBCH | NR-PBCH | NR-SSS | NR-PSS | NR-PBCH | NR-PBCH |
| 23 | NR-PBCH | NR-PBCH | NR-SSS | NR-PBCH | NR-PSS | NR-PBCH |
| 24 | NR-PBCH | NR-PBCH | NR-SSS | NR-PBCH | NR-PBCH | NR-PSS |
| 25 | NR-PBCH | NR-PBCH | NR-PBCH | NR-PSS | NR-SSS | NR-PBCH |
| 26 | NR-PBCH | NR-PBCH | NR-PBCH | NR-PSS | NR-PBCH | NR-SSS |
| 27 | NR-PBCH | NR-PBCH | NR-PBCH | NR-SSS | NR-PSS | NR-PBCH |
| 28 | NR-PBCH | NR-PBCH | NR-PBCH | NR-SSS | NR-PBCH | NR-PSS |
| 29 | NR-PBCH | NR-PBCH | NR-PBCH | NR-PBCH | NR-PSS | NR-SSS |
| 30 | NR-PBCH | NR-PBCH | NR-PBCH | NR-PBCH | NR-SSS | NR-PSS |

Figure 30:
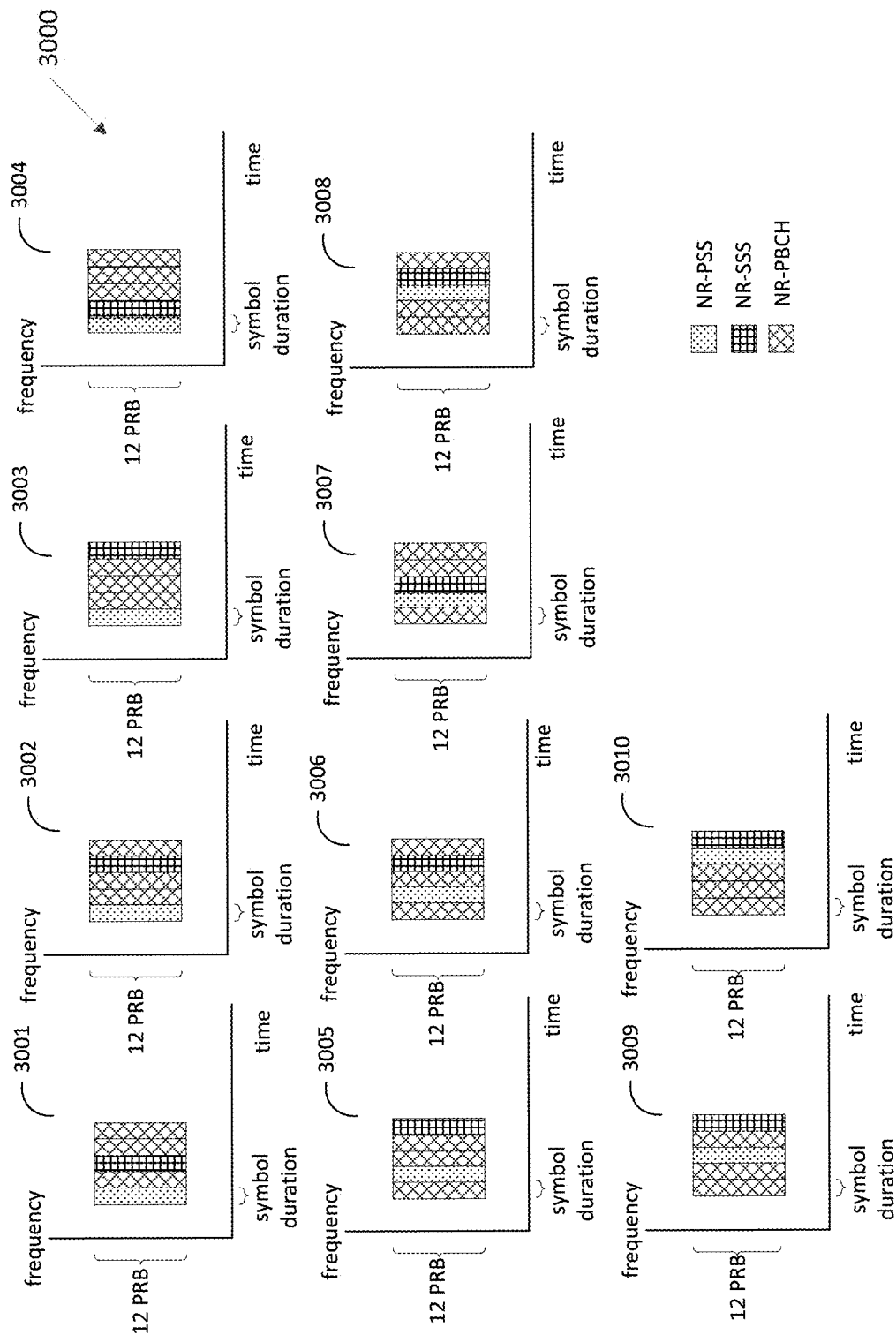
FIG. 30 illustrates yet another example NR-SS block composition according to embodiments of the present disclosure.

FIG. 30 illustrates yet another example NR-SS block composition 3000 according to embodiments of the present disclosure. The embodiment of the NR-SS block composition 3000 illustrated in FIG. 30 is for illustration only. FIG. 30 does not limit the scope of this disclosure to any particular implementation In another embodiment, when NR-PBCH is consisted of 3 symbols, examples of NR-SS block composition in time domain are illustrated in FIG. 30.

In one example 3001, the multiplexing of an SS block is NR-PSS, NR-PBCH, NR-SSS, NR-PBCH, NR-PBCH.

TABLE 16 multiplexing patterns of NR-PSS, NR-SSS, and NR-PBCH within an SS block

| Multiplexing Pattern | #0 | #1 | #2 | #3 | #4 |
|---|---|---|---|---|---|
| 1 | NR-PSS | NR-SSS | NR-PBCH | NR-PBCH | NR-PBCH |
| 2 | NR-PSS | NR-PBCH | NR-SSS | NR-PBCH | NR-PBCH |
| 3 | NR-PSS | NR-PBCH | NR-PBCH | NR-SSS | NR-PBCH |
| 4 | NR-PSS | NR-PBCH | NR-PBCH | NR-PBCH | NR-SSS |

TABLE 16-continued multiplexing patterns of NR-PSS, NR-SSS, and NR-PBCH within an SS block

| Multiplexing Pattern | #0 | #1 | #2 | #3 | #4 |
|---|---|---|---|---|---|
| 5 | NR-SSS | NR-PSS | NR-PBCH | NR-PBCH | NR-PBCH |
| 6 | NR-SSS | NR-PBCH | NR-PSS | NR-PBCH | NR-PBCH |
| 7 | NR-SSS | NR-PBCH | NR-PBCH | NR-PSS | NR-PBCH |
| 8 | NR-SSS | NR-PBCH | NR-PBCH | NR-PBCH | NR-PSS |
| 9 | NR-PBCH | NR-PSS | NR-SSS | NR-PBCH | NR-PBCH |
| 10 | NR-PBCH | NR-PSS | NR-PBCH | NR-SSS | NR-PBCH |
| 11 | NR-PBCH | NR-PSS | NR-PBCH | NR-PBCH | NR-SSS |
| 12 | NR-PBCH | NR-SSS | NR-PSS | NR-PBCH | NR-PBCH |
| 13 | NR-PBCH | NR-SSS | NR-PBCH | NR-PSS | NR-PBCH |
| 14 | NR-PBCH | NR-SSS | NR-PBCH | NR-PBCH | NR-PSS |
| 15 | NR-PBCH | NR-PBCH | NR-PSS | NR-SSS | NR-PBCH |
| 16 | NR-PBCH | NR-PBCH | NR-PSS | NR-PBCH | NR-SSS |
| 17 | NR-PBCH | NR-PBCH | NR-SSS | NR-PSS | NR-PBCH |
| 18 | NR-PBCH | NR-PBCH | NR-SSS | NR-PBCH | NR-PSS |
| 19 | NR-PBCH | NR-PBCH | NR-PBCH | NR-PSS | NR-SSS |
| 20 | NR-PBCH | NR-PBCH | NR-PBCH | NR-SSS | NR-PSS |

Figure 31A:
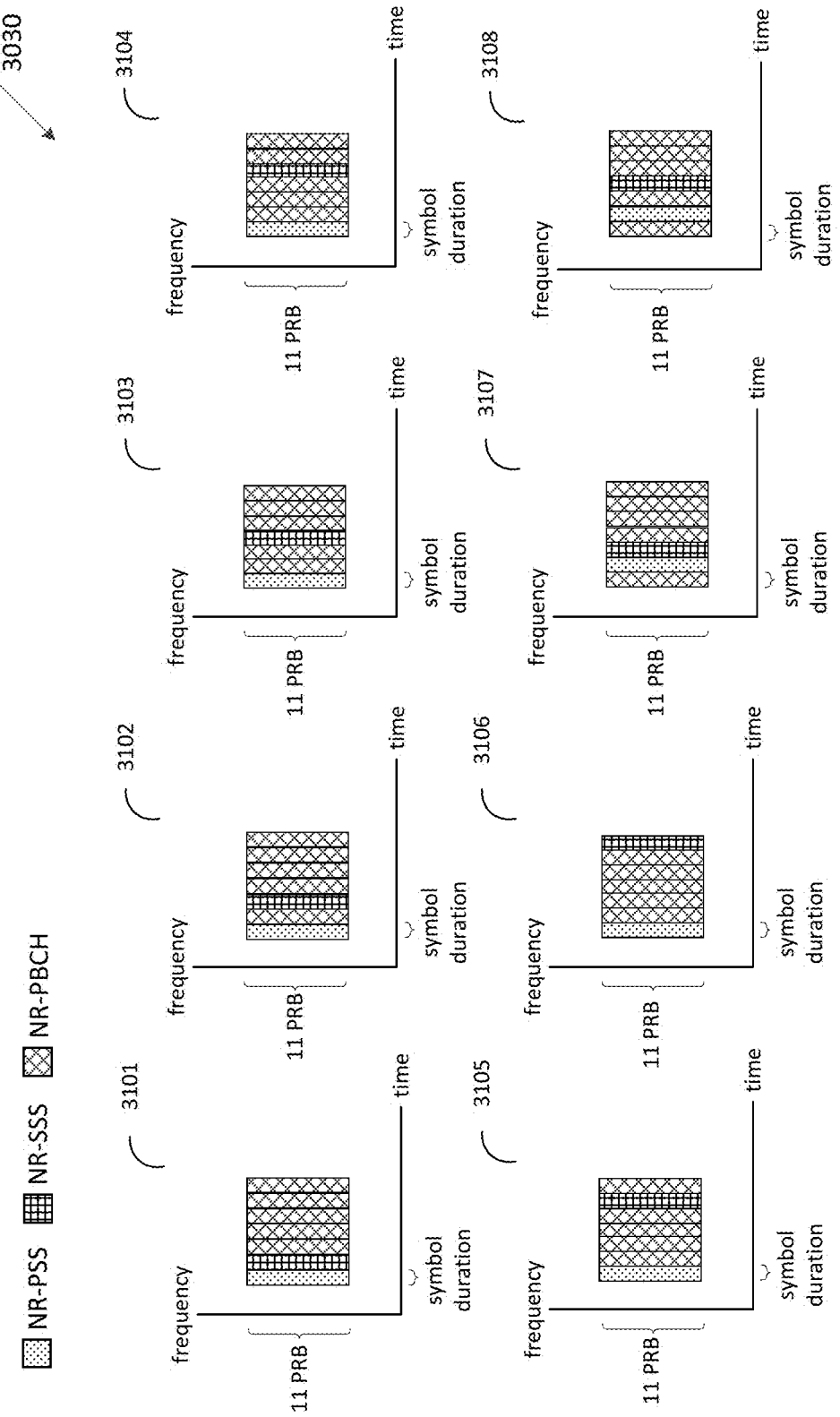
FIG. 31A illustrates yet another example NR-SS block composition according to embodiments of the present disclosure.
Figure 31B:
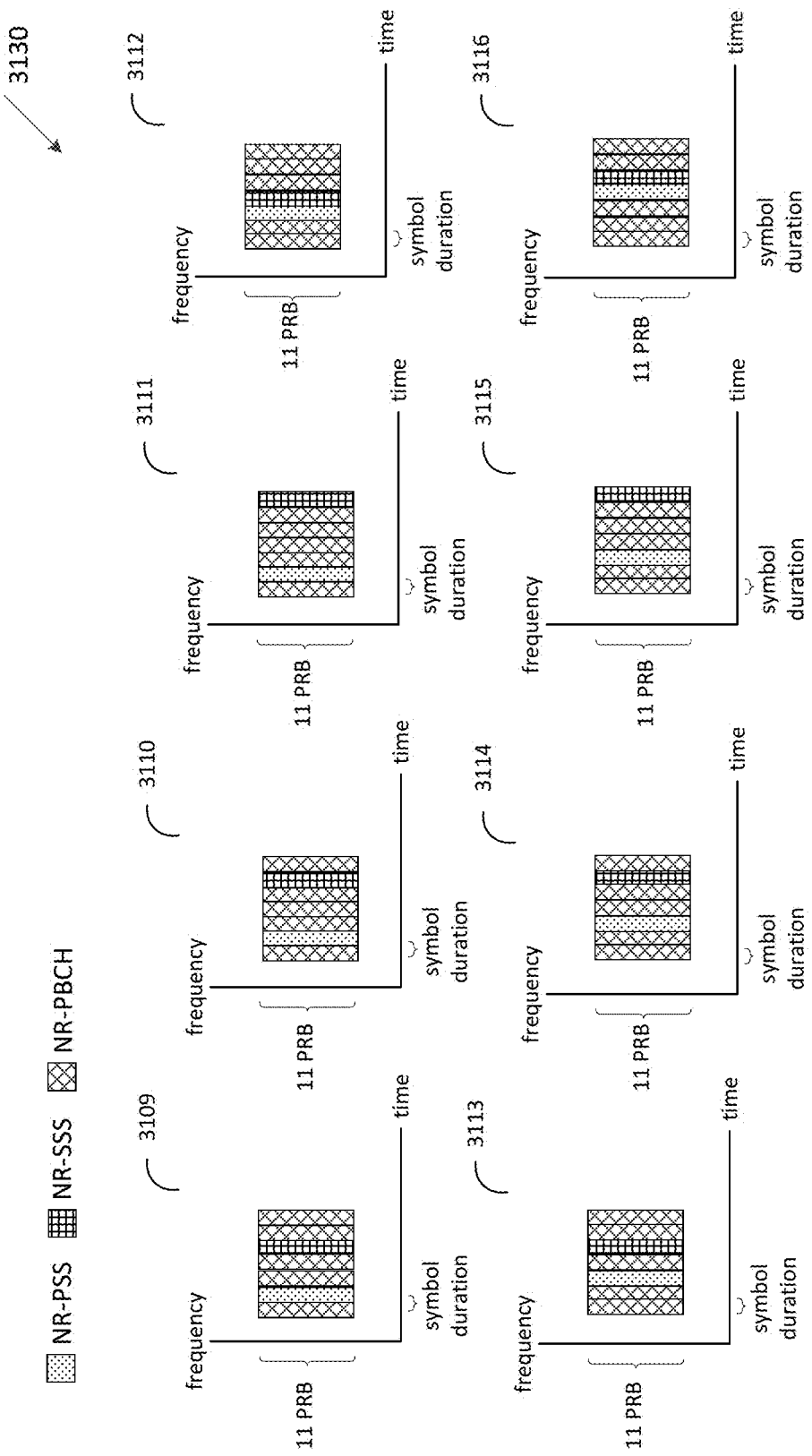
FIG. 31B illustrates yet another example NR-SS block composition according to embodiments of the present disclosure.
Figure 31C:
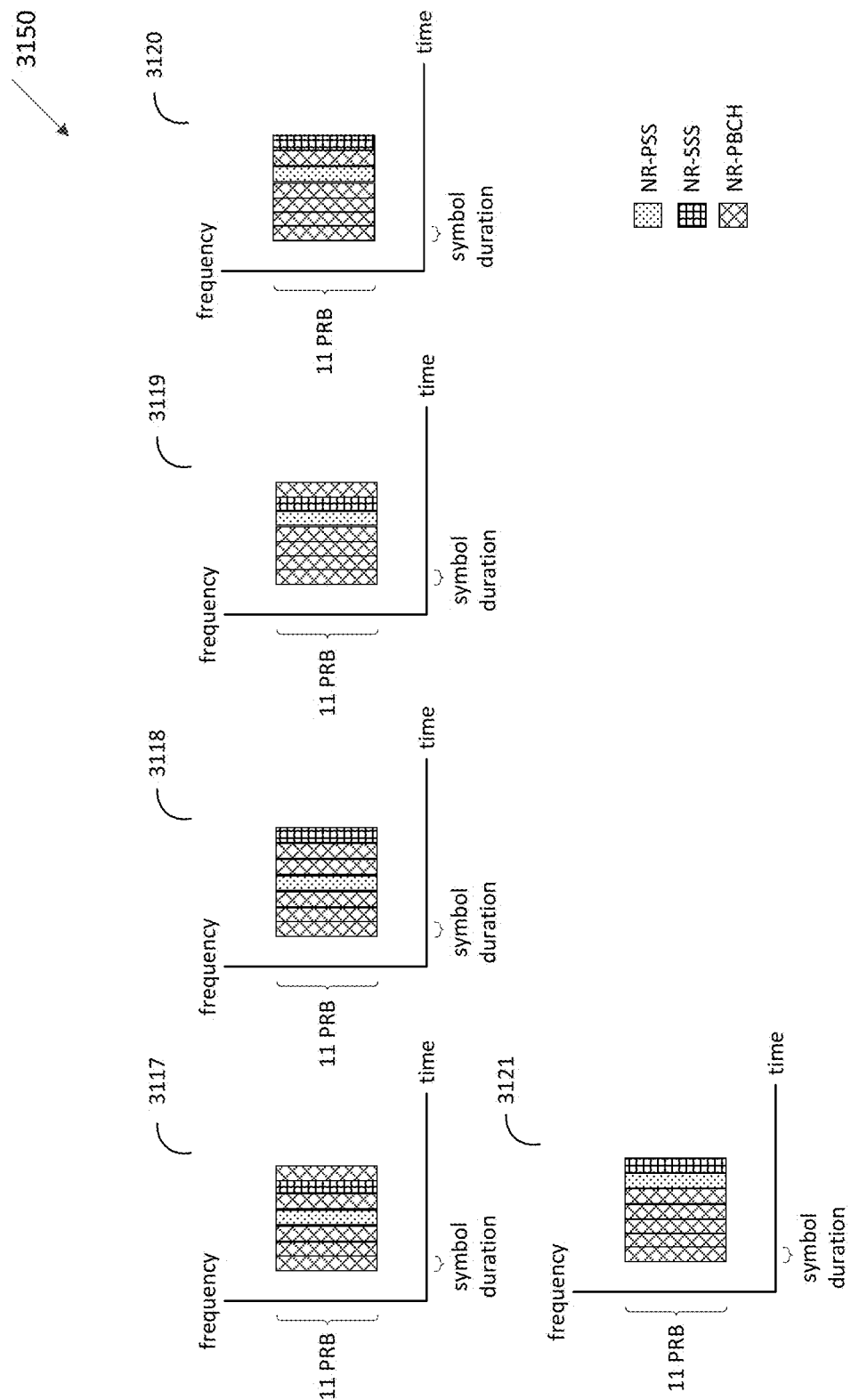
FIG. 31C illustrates yet another example NR-SS block composition according to embodiments of the present disclosure.

FIG. 31A illustrates yet another example NR-SS block composition 3100 according to embodiments of the present disclosure. The embodiment of the NR-SS block composition 3100 illustrated in FIG. 31A is for illustration only. FIG. 31A does not limit the scope of this disclosure to any particular implementation FIG. 31B illustrates yet another example NR-SS block composition 3130 according to embodiments of the present disclosure. The embodiment of the NR-SS block composition 3130 illustrated in FIG. 31B is for illustration only. FIG. 31B does not limit the scope of this disclosure to any particular implementation FIG. 31C illustrates yet another example NR-SS block composition 3150 according to embodiments of the present disclosure. The embodiment of the NR-SS block composition 3150 illustrated in FIG. 31C is for illustration only. FIG. 31C does not limit the scope of this disclosure to any particular implementation In yet another embodiment, when NR-PBCH is consisted of 7 symbols, examples of NR-SS block composition in time domain are illustrated in FIGS. 31A, 31B, and 31C.

In one example 3101, the multiplexing of an SS block is NR-PSS, NR-SSS, NR-PBCH, NR-PBCH, NR-PBCH, NR-PBCH, NR-PBCH.

In one example 3102, the multiplexing of an SS block is NR-PSS, NR-PBCH, NR-SSS, NR-PBCH, NR-PBCH, NR-PBCH, NR-PBCH.

In one example 3103, the multiplexing of an SS block is NR-PSS, NR-PBCH, NR-PBCH, NR-SSS, NR-PBCH, NR-PBCH, NR-PBCH.

In one example 3104, the multiplexing of an SS block is NR-PSS, NR-PBCH, NR-PBCH, NR-PBCH, NR-SSS, NR-PBCH, NR-PBCH.

In one example 3105, the multiplexing of an SS block is NR-PSS, NR-PBCH, NR-PBCH, NR-PBCH, NR-PBCH, NR-SSS, NR-PBCH.

In one example 3106, the multiplexing of an SS block is NR-PSS, NR-PBCH, NR-PBCH, NR-PBCH, NR-PBCH, NR-PBCH, NR-SSS.

In one example 3107, the multiplexing of an SS block is NR-PBCH, NR-PSS, NR-SSS, NR-PBCH, NR-PBCH, NR-PBCH, NR-PBCH.

In one example 3108, the multiplexing of an SS block is NR-PBCH, NR-PSS, NR-PBCH, NR-SSS, NR-PBCH, NR-PBCH, NR-PBCH.

In one example 3109, the multiplexing of an SS block is NR-PBCH, NR-PSS, NR-PBCH, NR-PBCH, NR-SSS, NR-PBCH, NR-PBCH.

In one example 3110, the multiplexing of an SS block is NR-PBCH, NR-PSS, NR-PBCH, NR-PBCH, NR-PBCH, NR-SSS, NR-PBCH.

In one example 3111, the multiplexing of an SS block is NR-PBCH, NR-PSS, NR-PBCH, NR-PBCH, NR-PBCH, NR-PBCH, NR-SSS.

In one example 3112, the multiplexing of an SS block is NR-PBCH, NR-PBCH, NR-PSS, NR-SSS, NR-PBCH, NR-PBCH, NR-PBCH.

In one example 3113, the multiplexing of an SS block is NR-PBCH, NR-PBCH, NR-PSS, NR-PBCH, NR-SSS, NR-PBCH, NR-PBCH.

In one example 3114, the multiplexing of an SS block is NR-PBCH, NR-PBCH, NR-PSS, NR-PBCH, NR-PBCH, NR-SSS, NR-PBCH.

In one example 3115, the multiplexing of an SS block is NR-PBCH, NR-PBCH, NR-PSS, NR-PBCH, NR-PBCH, NR-PBCH, NR-SSS.

In one example 3116, the multiplexing of an SS block is NR-PBCH, NR-PBCH, NR-PBCH, NR-PSS, NR-SSS, NR-PBCH, NR-PBCH.

In one example 3117, the multiplexing of an SS block is NR-PBCH, NR-PBCH, NR-PBCH, NR-PSS, NR-PBCH, NR-SSS, NR-PBCH.

In one example 3118, the multiplexing of an SS block is NR-PBCH, NR-PBCH, NR-PBCH, NR-PSS, NR-PBCH, NR-PBCH, NR-SSS.

In one example 3119: the multiplexing of an SS block is NR-PBCH, NR-PBCH, NR-PBCH, NR-PBCH, NR-PSS, NR-SSS, NR-PBCH.

In one example 3120, the multiplexing of an SS block is NR-PBCH, NR-PBCH, NR-PBCH, NR-PBCH, NR-PSS, NR-PBCH, NR-SSS.

In one example 3121, the multiplexing of an SS block is NR-PBCH, NR-PBCH, NR-PBCH, NR-PBCH, NR-PBCH, NR-PSS, NR-SSS.

TABLE 17 summarizes all the possible multiplexing patterns of NR-PSS, NR-SSS, and NR-PBCH within an SS block (the symbol index in TABLE 19 Error! Not a valid bookmark self-reference. refers to the one within an SS block), when the number symbols within an SS block is 7 (i.e., 5 symbols for NR-PBCH).

TABLE 17 multiplexing patterns of NR-PSS, NR-SSS, and NR-PBCH within an SS block

| Multiplexing Pattern | #0 | #1 | #2 | #3 | #4 | #5 | #6 |
|---|---|---|---|---|---|---|---|
| 1 | NR-PSS | NR-SSS | NR-PBCH | NR-PBCH | NR-PBCH | NR-PBCH | NR-PBCH |
| 2 | NR-PSS | NR-PBCH | NR-SSS | NR-PBCH | NR-PBCH | NR-PBCH | NR-PBCH |
| 3 | NR-PSS | NR-PBCH | NR-PBCH | NR-SSS | NR-PBCH | NR-PBCH | NR-PBCH |

TABLE 17-continued multiplexing patterns of NR-PSS, NR-SSS, and NR-PBCH within an SS block

| Multiplexing Pattern | #0 | #1 | #2 | #3 | #4 | #5 | #6 |
|---|---|---|---|---|---|---|---|
| 4 | NR-PSS | NR-PBCH | NR-PBCH | NR-PBCH | NR-SSS | NR-PBCH | NR-PBCH |
| 5 | NR-PSS | NR-PBCH | NR-PBCH | NR-PBCH | NR-PBCH | NR-SSS | NR-PBCH |
| 6 | NR-PSS | NR-PBCH | NR-PBCH | NR-PBCH | NR-PBCH | NR-PBCH | NR-SSS |
| 7 | NR-SSS | NR-PSS | NR-PBCH | NR-PBCH | NR-PBCH | NR-PBCH | NR-PBCH |
| 8 | NR-SSS | NR-PBCH | NR-PSS | NR-PBCH | NR-PBCH | NR-PBCH | NR-PBCH |
| 9 | NR-SSS | NR-PBCH | NR-PBCH | NR-PSS | NR-PBCH | NR-PBCH | NR-PBCH |
| 10 | NR-SSS | NR-PBCH | NR-PBCH | NR-PBCH | NR-PSS | NR-PBCH | NR-PBCH |
| 11 | NR-SSS | NR-PBCH | NR-PBCH | NR-PBCH | NR-PBCH | NR-PSS | NR-PBCH |
| 12 | NR-SSS | NR-PBCH | NR-PBCH | NR-PBCH | NR-PBCH | NR-PBCH | NR-PSS |
| 13 | NR-PBCH | NR-PSS | NR-SSS | NR-PBCH | NR-PBCH | NR-PBCH | NR-PBCH |
| 14 | NR-PBCH | NR-PSS | NR-PBCH | NR-SSS | NR-PBCH | NR-PBCH | NR-PBCH |
| 15 | NR-PBCH | NR-PSS | NR-PBCH | NR-PBCH | NR-SSS | NR-PBCH | NR-PBCH |
| 16 | NR-PBCH | NR-PSS | NR-PBCH | NR-PBCH | NR-PBCH | NR-SSS | NR-PBCH |
| 17 | NR-PBCH | NR-PSS | NR-PBCH | NR-PBCH | NR-PBCH | NR-PBCH | NR-SSS |
| 18 | NR-PBCH | NR-SSS | NR-PSS | NR-PBCH | NR-PBCH | NR-PBCH | NR-PBCH |
| 19 | NR-PBCH | NR-SSS | NR-PBCH | NR-PSS | NR-PBCH | NR-PBCH | NR-PBCH |
| 20 | NR-PBCH | NR-SSS | NR-PBCH | NR-PBCH | NR-PSS | NR-PBCH | NR-PBCH |
| 21 | NR-PBCH | NR-SSS | NR-PBCH | NR-PBCH | NR-PBCH | NR-PSS | NR-PBCH |
| 22 | NR-PBCH | NR-SSS | NR-PBCH | NR-PBCH | NR-PBCH | NR-PBCH | NR-PSS |
| 23 | NR-PBCH | NR-PBCH | NR-PSS | NR-SSS | NR-PBCH | NR-PBCH | NR-PBCH |
| 24 | NR-PBCH | NR-PBCH | NR-PSS | NR-PBCH | NR-SSS | NR-PBCH | NR-PBCH |
| 25 | NR-PBCH | NR-PBCH | NR-PSS | NR-PBCH | NR-PBCH | NR-SSS | NR-PBCH |
| 26 | NR-PBCH | NR-PBCH | NR-PSS | NR-PBCH | NR-PBCH | NR-PBCH | NR-SSS |
| 27 | NR-PBCH | NR-PBCH | NR-SSS | NR-PSS | NR-PBCH | NR-PBCH | NR-PBCH |
| 28 | NR-PBCH | NR-PBCH | NR-SSS | NR-PBCH | NR-PSS | NR-PBCH | NR-PBCH |
| 29 | NR-PBCH | NR-PBCH | NR-SSS | NR-PBCH | NR-PBCH | NR-PSS | NR-PBCH |
| 30 | NR-PBCH | NR-PBCH | NR-SSS | NR-PBCH | NR-PBCH | NR-PBCH | NR-PSS |
| 31 | NR-PBCH | NR-PBCH | NR-PBCH | NR-PSS | NR-SSS | NR-PBCH | NR-SSS |
| 32 | NR-PBCH | NR-PBCH | NR-PBCH | NR-PSS | NR-PBCH | NR-SSS | NR-PBCH |
| 33 | NR-PBCH | NR-PBCH | NR-PBCH | NR-PSS | NR-PBCH | NR-PBCH | NR-SSS |
| 34 | NR-PBCH | NR-PBCH | NR-PBCH | NR-SSS | NR-PSS | NR-PBCH | NR-PBCH |
| 35 | NR-PBCH | NR-PBCH | NR-PBCH | NR-SSS | NR-PBCH | NR-PSS | NR-PBCH |
| 36 | NR-PBCH | NR-PBCH | NR-PBCH | NR-SSS | NR-PBCH | NR-PBCH | NR-PSS |
| 37 | NR-PBCH | NR-PBCH | NR-PBCH | NR-PBCH | NR-PSS | NR-SSS | NR-PBCH |
| 38 | NR-PBCH | NR-PBCH | NR-PBCH | NR-PBCH | NR-PSS | NR-PBCH | NR-SSS |
| 39 | NR-PBCH | NR-PBCH | NR-PBCH | NR-PBCH | NR-SSS | NR-PSS | NR-PBCH |
| 40 | NR-PBCH | NR-PBCH | NR-PBCH | NR-PBCH | NR-SSS | NR-PBCH | NR-PSS |
| 41 | NR-PBCH | NR-PBCH | NR-PBCH | NR-PBCH | NR-PBCH | NR-PSS | NR-SSS |
| 42 | NR-PBCH | NR-PBCH | NR-PBCH | NR-PBCH | NR-PBCH | NR-SSS | NR-PSS |

Another important design factor is regarding the applicability of the provided multiplexing patterns of NR-PSS, NR-SSS, and NR-PBCH within an SS block.

One embodiment is that the provided patterns in TABLE 15 and/or TABLE 16 and/or TABLE 17 can be applied to only a subset of NR bands. For example, for sub-6 GHz bands only. For another example, for above-6 GHz bands only.

One embodiment is that the provided patterns in TABLE 15 and/or TABLE 16 and/or TABLE 17 can be applied to all the NR bands, including both sub-6 GHz and above-6 GHz bands.

Given the provided compositions of an SS block in the aforementioned embodiment, another important design consideration is to define the mapping of time locations for such SS block within a slot. In particular, in the present disclosure, a slot is referred to as 14 consecutive and non-overlapping symbols for NR.

In one embodiment, the possible mapping patterns of SS blocks within a slot may depend on the number of symbols for each SS block, and the number of SS blocks within each slot.

In one sub-embodiment, each slot contains 2 SS blocks, wherein each SS block consists of 6 symbols (1 symbol for NR-PSS, 1 symbol for NR-SSS, and 4 symbols for NR-PBCH).

In another sub-embodiment, each slot contains 1 SS block, wherein each SS block consists of 6 symbols (1 symbol for NR-PSS, 1 symbol for NR-SSS, and 4 symbols for NR-PBCH).

In another sub-embodiment, each slot contains 2 SS blocks, wherein each SS block consists of 5 symbols (1 symbol for NR-PSS, 1 symbol for NR-SSS, and 3 symbols for NR-PBCH).

In another sub-embodiment, each slot contains 1 SS block, wherein each SS block consists of 5 symbols (1 symbol for NR-PSS, 1 symbol for NR-SSS, and 3 symbols for NR-PBCH).

In another sub-embodiment, each slot contains 2 SS blocks, wherein each SS block consists of 7 symbols (1 symbol for NR-PSS, 1 symbol for NR-SSS, and 5 symbols for NR-PBCH).

In another sub-embodiment, each slot contains 1 SS block, wherein each SS block consists of 7 symbols (1 symbol for NR-PSS, 1 symbol for NR-SSS, and 5 symbols for NR-PBCH).

FIG. 32 illustrates an example mapping of NR-SS block locations 3200 according to embodiments of the present disclosure. The embodiment of the mapping of NR-SS block locations 3200 illustrated in FIG. 32 is for illustration only. FIG. 32 does not limit the scope of this disclosure to any particular implementation In one embodiment, FIG. 32 illustrates the mapping of SS block locations within a slot, when each slot contains 2 SS blocks and each SS block consists of 6 symbols.

In one example 3201, the 1st SS block occupies symbol #2 to symbol #7 within the slot, and the 2nd SS block occupies symbol #8 to symbol #13 within the slot. The first 2 symbols at the beginning of the slot can be preserved for DL control.

In one example 3202, the 1st SS block occupies symbol #1 to symbol #6 within the slot, and the 2nd SS block occupies symbol #7 to symbol #12 within the slot. Symbol #0 at the beginning of the slot can be preserved for DL control.

In one example 3203, the 1st SS block occupies symbol #1 to symbol #6 within the slot, and the 2nd SS block occupies symbol #8 to symbol #13 within the slot. Symbol #0 at the beginning of the slot can be preserved for DL control, and a gap between the two SS blocks is introduced at symbol #7 which can be used for multiplexing with other subcarrier spacing.

In one example 3204, the 1st SS block occupies symbol #0 to symbol #5 within the slot, and the 2nd SS block occupies symbol #6 to symbol #11 within the slot. The last 2 symbols at the end of the slot are preserved, which can be used for guard period and UL control.

In one example 3205, the 1st SS block occupies symbol #0 to symbol #5 within the slot, and the 2nd SS block occupies symbol #7 to symbol #12 within the slot. A gap between the two SS blocks is introduced at symbol #6 which can be used for multiplexing with other subcarrier spacing.

In one example 3206, the 1st SS block occupies symbol #0 to symbol #5 within the slot, and the 2nd SS block occupies symbol #8 to symbol #13 within the slot. A gap between the two SS blocks is introduced at symbol #6 and symbol #7.

Figure 33:
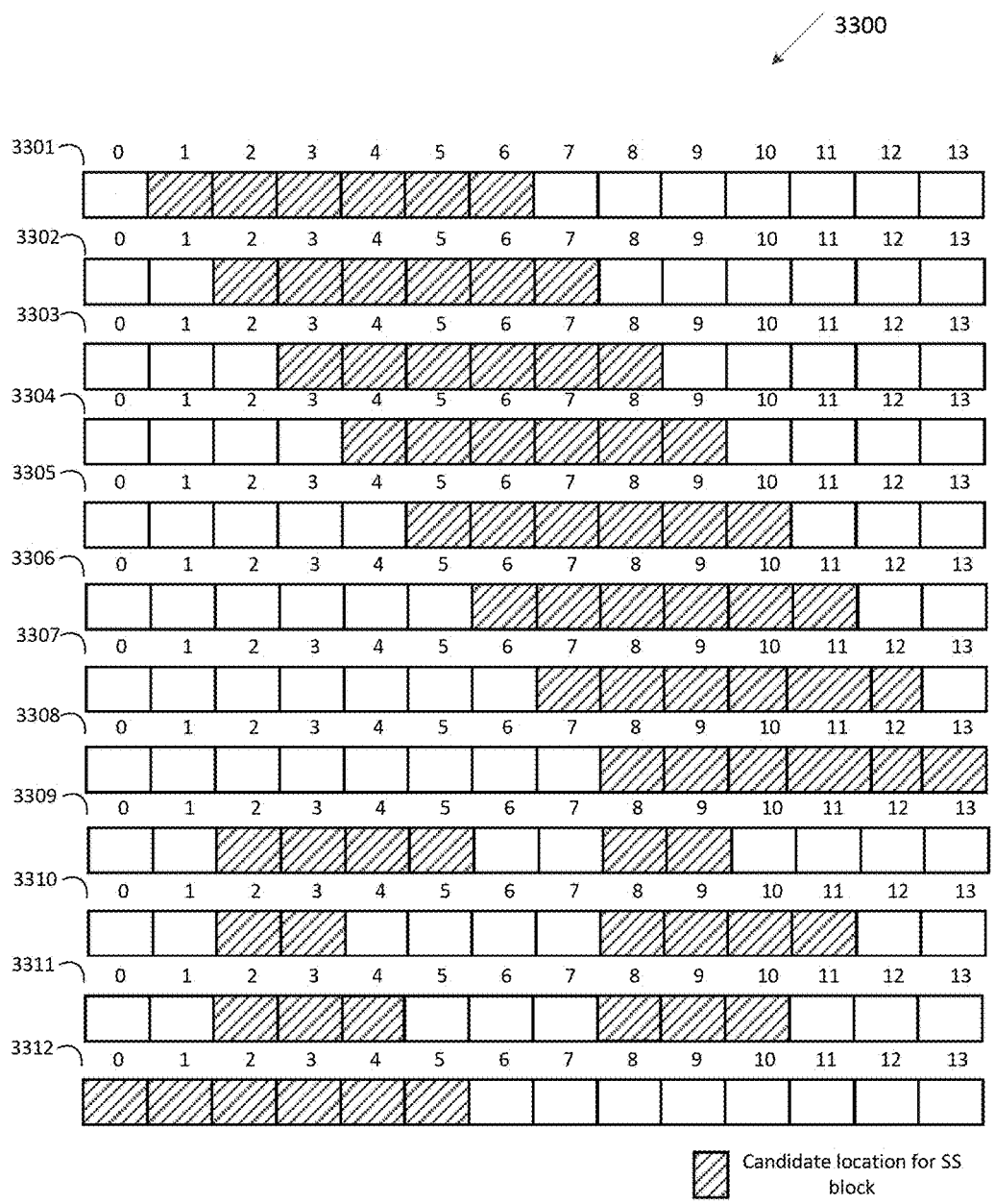
FIG. 33 illustrates another example mapping of NR-SS block locations according to embodiments of the present disclosure.

FIG. 33 illustrates another example mapping of NR-SS block locations 3300 according to embodiments of the present disclosure. The embodiment of the mapping of NR-SS block locations 3300 illustrated in FIG. 33 is for illustration only. FIG. 33 does not limit the scope of this disclosure to any particular implementation.

In one embodiment, FIG. 33 illustrates the mapping of SS block locations within a slot, where each slot contains 1 SS block and each SS block consists of 6 symbols. One sub-embodiment is that from example 3301 to example 3311 in FIG. 33, at least 1 or 2 symbols are preserved for DL control at the beginning of the slot of 14 symbols. Specifically, 1 symbol is preserved for DL control for example 3301, and 2 symbols are preserved for DL control for the example 3301 to example 3311. Another sub-embodiment is that at least 2 symbols are preserved for guard period and UL control at the end of the slot from example 3301 to example 3306, and example 3309 to example 3312. The specific possible locations of the SS block within the slot are detailed from example 3301 to example 3312 in FIG. 33.

FIG. 34 illustrates yet another example mapping of NR-SS block locations 3400 according to embodiments of the present disclosure. The embodiment of the mapping of NR-SS block locations 3400 illustrated in FIG. 34 is for illustration only. FIG. 34 does not limit the scope of this disclosure to any particular implementation In one embodiment, FIG. 34 illustrates the mapping of SS block locations within a slot, where each slot contains 2 SS block and each SS block consists of 5 symbols. The details of the examples of FIG. 34 are illustrated as follows.

In one example 3401, the 1st SS block occupies symbol #2 to symbol #6 within the slot, and the 2nd SS block occupies symbol #7 to symbol #11 within the slot. The first 2 symbols at the beginning of the slot can be preserved for DL control, and the last 2 symbols at the end of the slot can be preserved for guard period and UL control.

In one example 3402, the 1st SS block occupies symbol #1 to symbol #5 within the slot, and the 2nd SS block occupies symbol #6 to symbol #10 within the slot. Symbol #0 at the beginning of the slot can be preserved for DL control, and the last 2 symbols at the end of the slot can be preserved for guard period and UL control.

In one example 3403, the 1st SS block occupies symbol #3 to symbol #7 within the slot, and the 2nd SS block occupies symbol #8 to symbol #12 within the slot. The first 2 symbols at the beginning of the slot can be preserved for DL control.

In one example 3404, the 1st SS block occupies symbol #1 to symbol #5 within the slot, and the 2nd SS block occupies symbol #7 to symbol #11 within the slot. The 1st symbol (i.e., symbol #0) at the beginning of the slot can be preserved for DL control, and the last 2 symbols at the end of the slot are also preserved, which can be used for guard period and UL control. In addition, a gap at symbol #6 is introduced between the two SS blocks.

In one example 3405, the 1st SS block occupies symbol #1 to symbol #5 within the slot, and the 2nd SS block occupies symbol #8 to symbol #12 within the slot. The 1st symbol (i.e., symbol #0) at the beginning of the slot can be preserved for DL control, and a 2 symbols gap at symbol #6 and symbol #7 between the two SS blocks is introduced, which can be used for multiplexing with other subcarrier spacing.

In one example 3406, the 1st SS block occupies symbol #2 to symbol #6 within the slot, and the 2nd SS block occupies symbol #8 to symbol #12 within the slot. The first 2 symbols at the beginning of the slot can be preserved for DL control, a gap between the two SS blocks is introduced at symbol #7, and 1 symbol at the end of the slot is preserved.

In one example 3405, the 1st SS block occupies symbol #1 to symbol #5 within the slot, and the 2nd SS block occupies symbol #8 to symbol #12 within the slot. The 1st symbol (i.e., symbol #0) at the beginning of the slot can be preserved for DL control, and a 2 symbols gap at symbol #6 and symbol #7 between the two SS blocks is introduced, which can be used for multiplexing with other subcarrier spacing.

In one example 3406, the 1st SS block occupies symbol #2 to symbol #6 within the slot, and the 2nd SS block occupies symbol #8 to symbol #12 within the slot. The first 2 symbols at the beginning of the slot can be preserved for DL control, and a gap between the two SS blocks is introduced at symbol #7.

In one example 3407, the 1st SS block occupies symbol #4 to symbol #8 within the slot, and the 2nd SS block occupies symbol #9 to symbol #13 within the slot. The first 4 symbols at the beginning of the slot can be preserved for DL control.

In one example 3408, the 1st SS block occupies symbol #0 to symbol #4 within the slot, and the 2nd SS block occupies symbol #5 to symbol #9 within the slot. The last 4 symbols at the end of the slot can be preserved for guard period and UL control.

In one example 3409, the 1st SS block occupies symbol #2 to symbol #6 within the slot, and the 2nd SS block occupies symbol #9 to symbol #13 within the slot. The first 2 symbols at the beginning of the slot can be preserved for DL control, and a gap between the two SS blocks is introduced at symbol #7 and symbol #8.

In one example 3410, the 1st SS block occupies symbol #0 to symbol #4 within the slot, and the 2nd SS block occupies symbol #7 to symbol #11 within the slot. The last 2 symbols at the end of the slot can be preserved for guard period and UL control, and a gap between the two SS blocks is introduced at symbol #5 and symbol #6.

Figure 35:
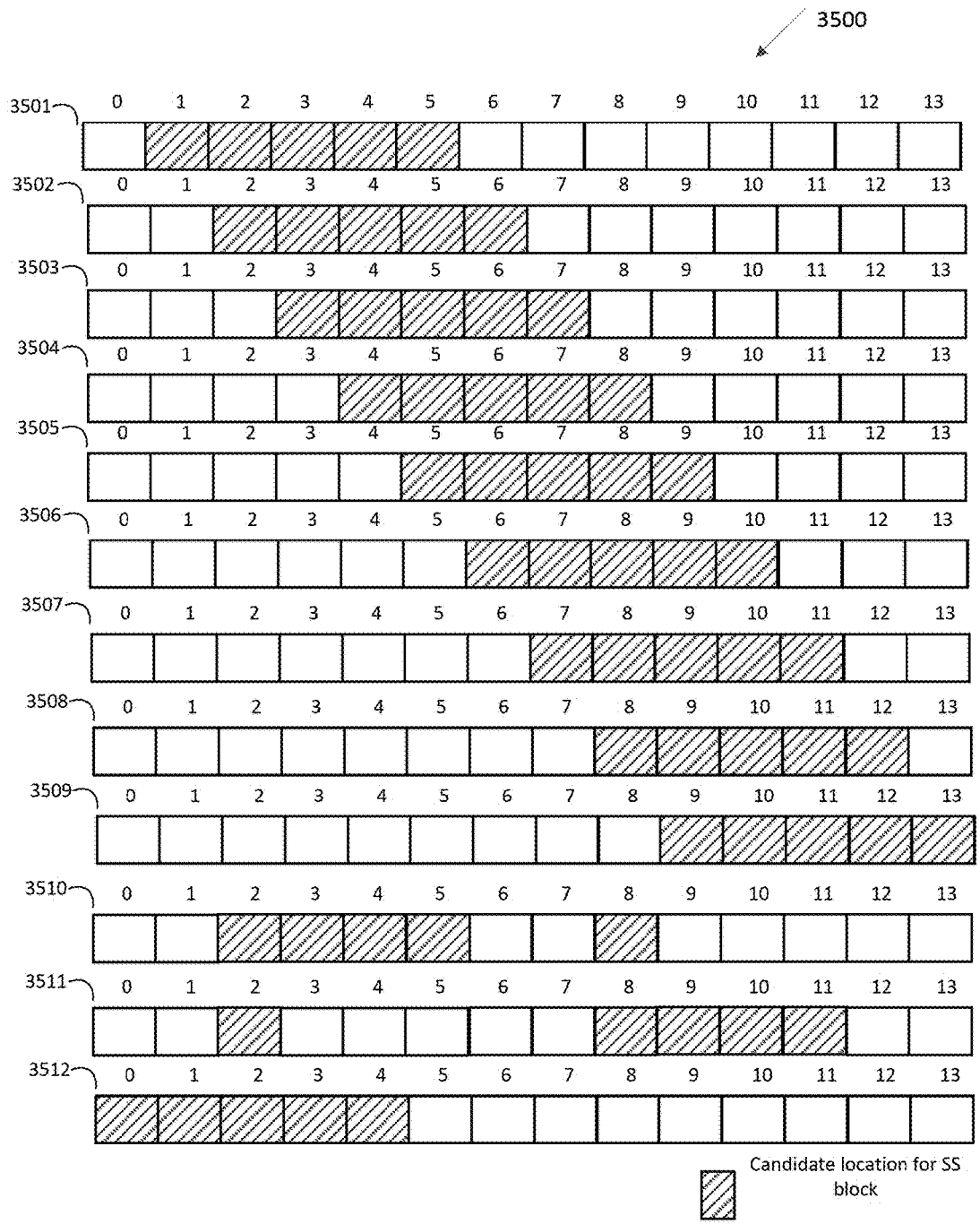
FIG. 35 illustrates yet another example mapping of NR-SS block locations according to embodiments of the present disclosure.

FIG. 35 illustrates yet another example mapping of NR-SS block locations 3500 according to embodiments of the present disclosure. The embodiment of the mapping of NR-SS block locations 3500 illustrated in FIG. 35 is for illustration only. FIG. 35 does not limit the scope of this disclosure to any particular implementation.

In one embodiment, FIG. 35 illustrates the mapping of SS block locations within a slot, where each slot contains 1 SS block and each SS block consists of 5 symbols. One sub-embodiment is that from example 3501 to example 3511 in FIG. 35, at least 1 or 2 symbols are preserved for DL control at the beginning of the slot of 14 symbols. Specifically, 1 symbol is preserved for DL control for example 3501, and 2 symbols are preserved for DL control for example 1502 to example 15111. Another sub-embodiment is that from example 3501 to example 3507, and example 3510 to example 3512, at least 2 symbols are preserved for guard period and UL control at the end of the slot. The specific possible locations of the SS block within the slot are detailed from example 3501 to example 3512 in FIG. 35.

FIG. 36 illustrates yet another example mapping of NR-SS block locations 3600 according to embodiments of the present disclosure. The embodiment of the mapping of NR-SS block locations 3600 illustrated in FIG. 36 is for illustration only. FIG. 36 does not limit the scope of this disclosure to any particular implementation In one embodiment, FIG. 36 illustrates the mapping of SS block locations within a slot, where each slot contains 2 SS block and each SS block consists of 7 symbols. The details of the example of FIG. 36 are illustrated as follows.

In one example 3601, the $1^{st}$ SS block occupies symbol #0 to symbol #6 within the slot, and the $2^{nd}$ SS block occupies symbol #7 to symbol #13 within the slot. The two SS blocks may fully occupy the slot.

Figure 37:
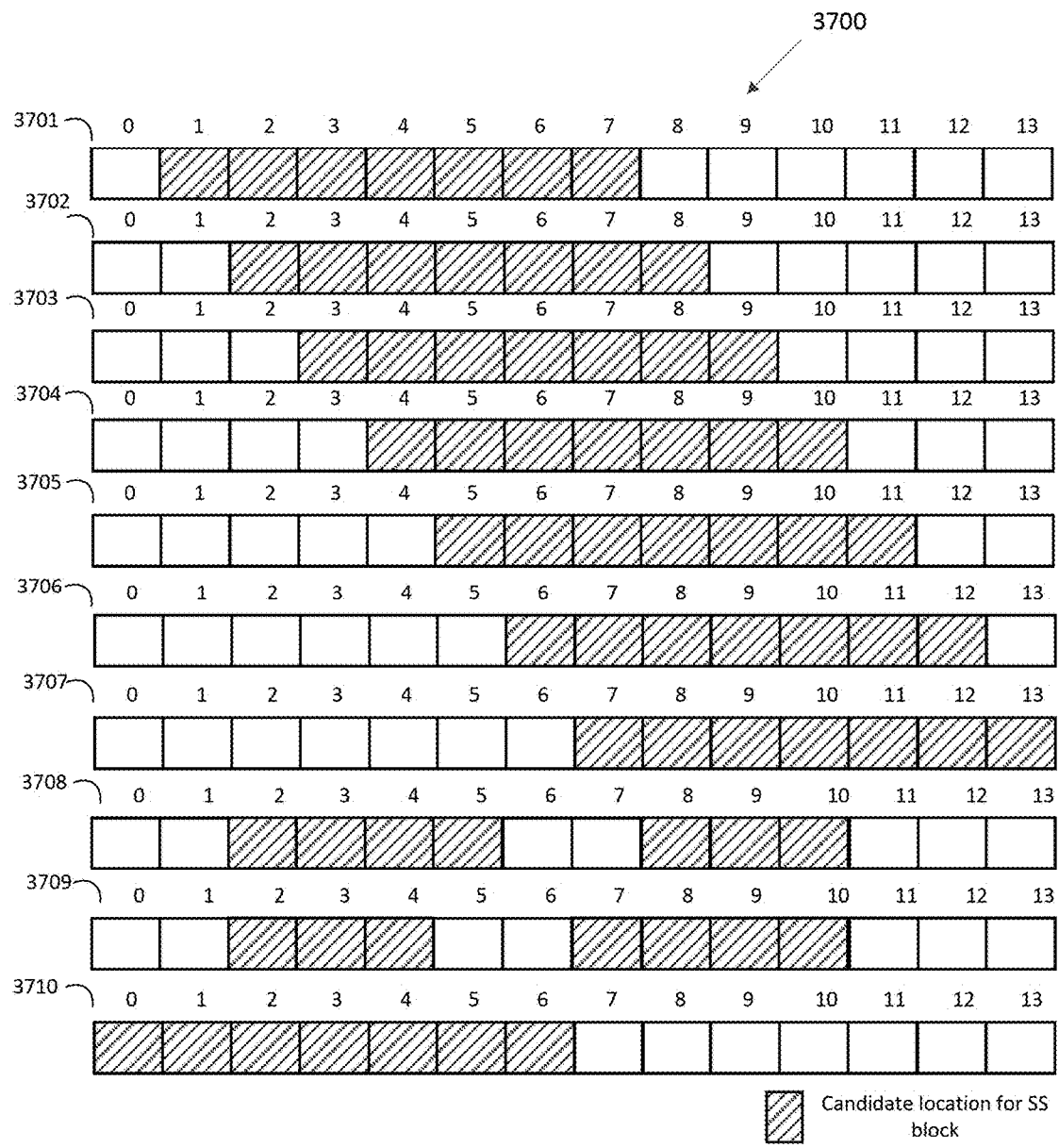
FIG. 37 illustrates yet another example mapping of NR-SS block locations according to embodiments of the present disclosure.

FIG. 37 illustrates yet another example mapping of NR-SS block locations 3700 according to embodiments of the present disclosure. The embodiment of the mapping of NR-SS block locations 3700 illustrated in FIG. 37 is for illustration only. FIG. 37 does not limit the scope of this disclosure to any particular implementation.

In one embodiment, FIG. 37 illustrates the mapping of SS block locations within a slot, where each slot contains 1 SS block and each SS block consists of 7 symbols. One sub-embodiment is that from example 3701 to example 3709 in FIG. 37, at least 1 or 2 symbols are preserved for DL control at the beginning of the slot of 14 symbols. Specifically, 1 symbol is preserved for DL control for example 3701, and 2 symbols are preserved for DL control for example 3702 to example 3709. Another sub-embodiment is that from example 3701 to example 3705, and example 3708 to example 3710, at least 2 symbols are preserved for guard period and UL control at the end of the slot. The specific possible locations of the SS block within the slot are detailed from example 3701 to example 3710 in FIG. 37.

Another important factor is regarding the frequency bands that the above provided mapping patterns of SS blocks can be applied to.

One embodiment is that the provided patterns from FIG. 32 to FIG. 37 can be applied to only a subset of NR bands. For example, for sub-6 GHz bands only. For another example, for above-6 GHz bands only.

One embodiment is that the provided patterns from FIG. 32 to FIG. 37 can be applied to all the NR bands, including both sub-6 GHz and above-6 GHz bands.

The mapping patterns of SS block within a slot provided in the aforementioned embodiments may be associated with the specific subcarrier spacing. In principle, the mapping patterns provided in the aforementioned embodiments can be applied to a slot for any subcarrier spacing of 15 KHz, 30 KHz, 120 KHz, or 240 KHz. The SS block composition depends on the frequency band of the NR system. For sub-6 GHz system, the SCS for SS block is 15 KHz or 30 KHz; and the SCS for data can be 15 KHz, 30 KHz, or 60 KHz. For above 6 GHz system, the SCS for SS block is 120 KHz or 240 KHz; and the SCS for data can be 60 KHz, 120 KHz, and 240 KHz. Examples of specific SS block composition are detailed for the following number of symbols for each SS block, and the number of SS blocks within each slot.

Figure 38:
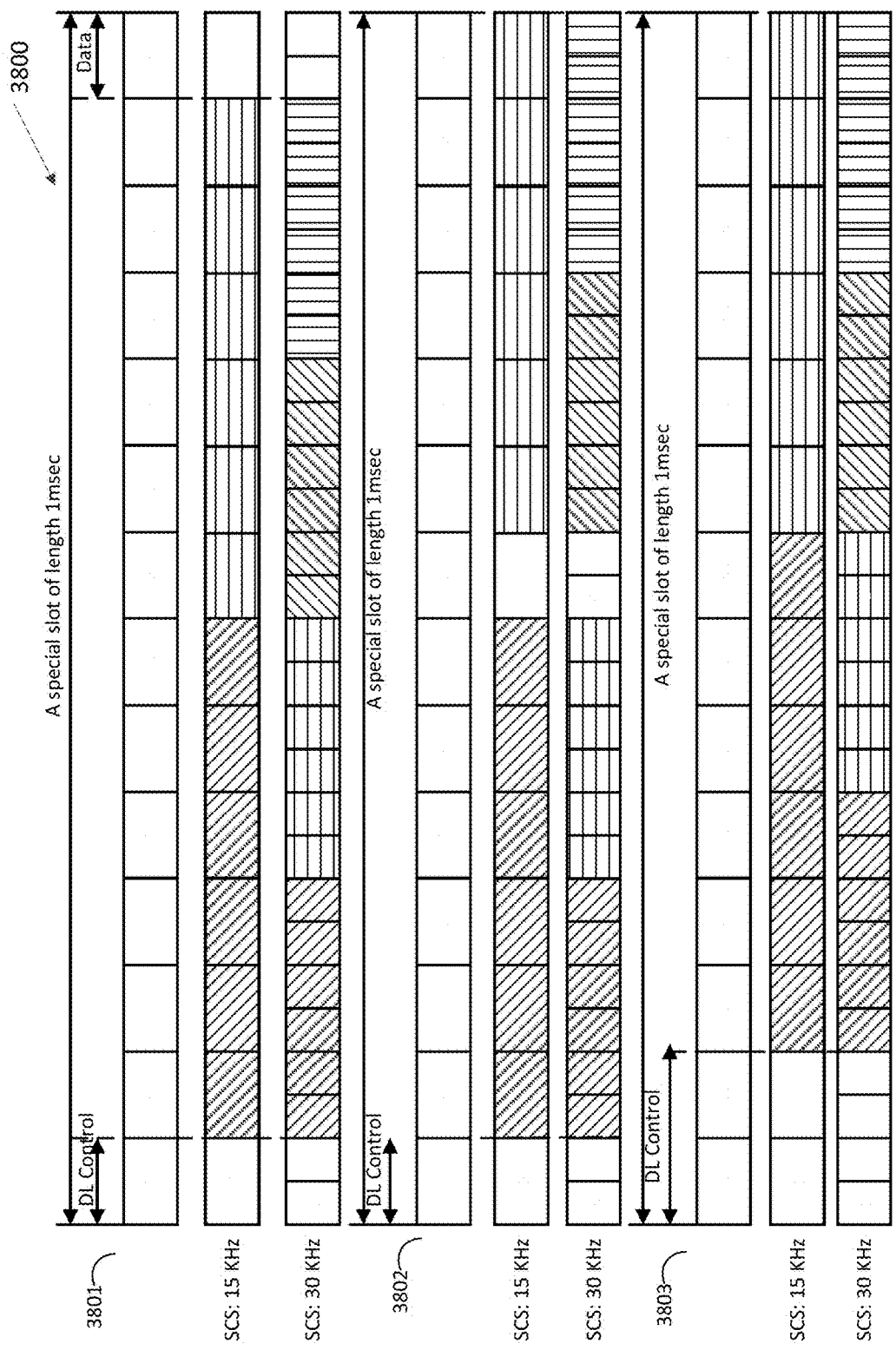
FIG. 38 illustrates yet another example mapping of NR-SS block locations according to embodiments of the present disclosure.

FIG. 38 illustrates yet another example mapping of NR-SS block locations 3800 according to embodiments of the present disclosure. The embodiment of the mapping of NR-SS block locations 3800 illustrated in FIG. 38 is for illustration only. FIG. 38 does not limit the scope of this disclosure to any particular implementation In one embodiment, each SS block consists of 6 symbols, and each slot contains 2 SS blocks or 2 consecutive slots contain 4 SS blocks. In one sub-embodiment, for SS block with 15 KHz SCS and 30 KHz SCS, FIG. 38 shows the examples of SS block compositions.

In one example 3801, for a reference slot with 1 millisecond length, symbol #0 is preserved for DL control, and symbol #13 is also preserved. Given the reference slot, for 15 KHz SCS slot that contains SS block, first SS block is from symbol #1 to symbol #6, and second SS block is from symbol #7 to symbol #12. For 30 KHz SCS slots that contain SS block, map 2 SS blocks to the first slot as follows: first candidate SS block is at symbol #2 to symbol #7, second candidate SS block is at symbol #8 to symbol #13; map 2 SS blocks to the second slot as follows: first candidate SS block is at symbol #0 to symbol #5, second candidate SS block is at symbol #6 to symbol #11.

In one example 3802, for a reference slot with 1 millisecond length, symbol #0 is preserved for DL control. Given the reference slot, for 15 KHz SCS slot that contains SS block, first SS block is from symbol #1 to symbol #6, and second SS block is from symbol #8 to symbol #13. For 30 KHz SCS slots that contain SS block, map 2 SS blocks to the first slot as follows: first candidate SS block is at symbol #2 to symbol #7, second candidate SS block is at symbol #8 to symbol #13; map 2 SS blocks to the second slot as follows: first candidate SS block is at symbol #2 to symbol #7, second candidate SS block is at symbol #8 to symbol #13.

In one example 3803, for a reference slot with 1 millisecond length, symbol #0 and symbol#1 are preserved for DL control. Given the reference slot, for 15 KHz SCS slot that contains SS block, first SS block is from symbol #2 to symbol #7, and second SS block is from symbol #8 to symbol #13. For 30 KHz SCS slots that contain SS block, map 4 SS blocks across two slots of 28 symbols as follows: first candidate SS block is at symbol #4 to symbol #9, second candidate SS block is at symbol #10 to symbol #15; third candidate SS block is at symbol #16 to symbol #21, fourth candidate SS block is at symbol #22 to symbol #27.

Figure 39:
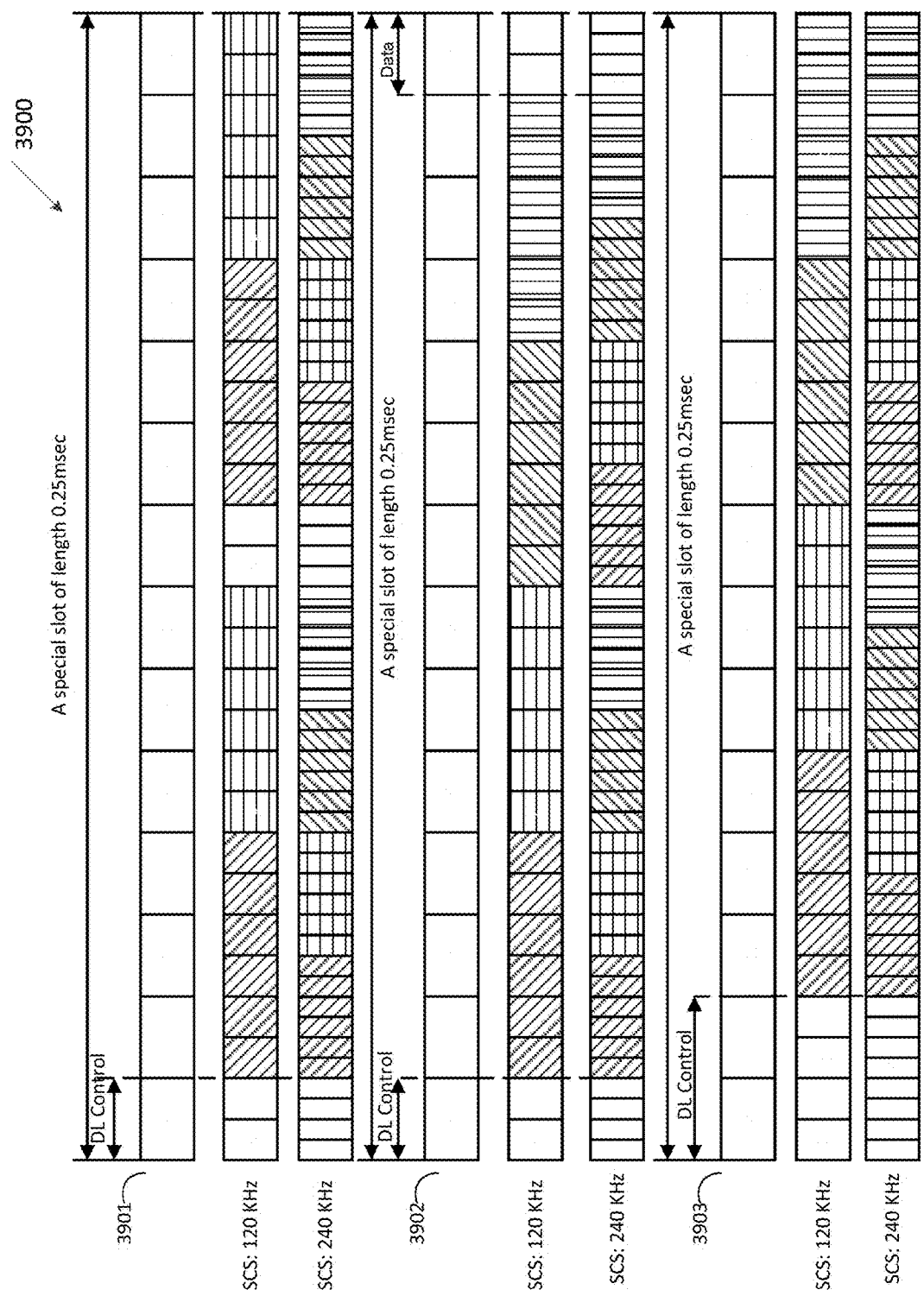
FIG. 39 illustrates yet another example mapping of NR-SS block locations according to embodiments of the present disclosure.

FIG. 39 illustrates yet another example mapping of NR-SS block locations 3900 according to embodiments of the present disclosure. The embodiment of mapping of NR-SS block locations 3900 illustrated in FIG. 39 is for illustration only. FIG. 39 does not limit the scope of this disclosure to any particular implementation.

In another sub-embodiment, for SS block with 120 KHz SCS and 240 KHz SCS, FIG. 39 shows the examples of SS block compositions.

In one example 3901, for a reference slot with 0.25 millisecond length, symbol #0 is preserved for DL control. Given the reference slot, for 120 KHz SCS slot that contains SS block, map 2 SS blocks to the slot as follows: first SS block is from symbol #2 to symbol #7, and second SS block is from symbol #8 to symbol #13. For 240 KHz SCS slots that contain SS block, map 4 SS blocks across 2 slots of 28 symbols as follows: first candidate SS block is at symbol #4 to symbol #9, second candidate SS block is at symbol #10 to symbol #15; third candidate SS block is at symbol #16 to symbol #21, fourth candidate SS block is at symbol #22 to symbol #27.

In one example 3902, in this example, for a reference slot with 0.25 millisecond length, symbol #0 is preserved for DL control and symbol #13 is also preserved. Given the reference slot, for 120 KHz SCS slots that contains SS blocks, map 2 SS blocks to the first slot as follows: first SS block is from symbol #2 to symbol #7, and second SS block is from symbol #8 to symbol #13; map 2 SS blocks to the second slot as follows: first SS block is from symbol #0 to symbol #5, and second SS block is from symbol #6 to symbol #11. For 240 KHz SCS slots that contain SS blocks, map 4 SS blocks across first 2 slots of 28 symbols as follows: first candidate SS block is at symbol #4 to symbol #9, second candidate SS block is at symbol #10 to symbol #15; third candidate SS block is at symbol #16 to symbol #21, fourth candidate SS block is at symbol #22 to symbol #27; map another 4 SS blocks across next 2 slots of 28 symbols as follows: first candidate SS block is at symbol #0 to symbol #5, second candidate SS block is at symbol #6 to symbol #11; third candidate SS block is at symbol #12 to symbol #17, fourth candidate SS block is at symbol #18 to symbol #23.

In one example 3903, for a reference slot with 0.25 millisecond length, symbol #0 and symbol #1 are preserved for DL control. Given the reference slot, for 120 KHz SCS slots that contain SS blocks, map 4 SS blocks across 2 slots of 28 symbols as follows: first candidate SS block is at symbol #4 to symbol #9, second candidate SS block is at symbol #10 to symbol #15; third candidate SS block is at symbol #16 to symbol #21, fourth candidate SS block is at symbol #22 to symbol #27. For 240 KHz SCS slots that contain SS blocks, map 8 SS blocks across 4 slots of 56 symbols as follows: first candidate SS block is at symbol #8 to symbol #13, second candidate SS block is at symbol #14 to symbol #19; third candidate SS block is at symbol #20 to symbol #25, fourth candidate SS block is at symbol #26 to symbol #31; fifth candidate SS block is at symbol #32 to symbol #37, sixth candidate SS block is at symbol #38 to symbol #43; seventh candidate SS block is at symbol #44 to symbol #49; eighth candidate SS block is at symbol #50 to symbol #55.

Figure 40:
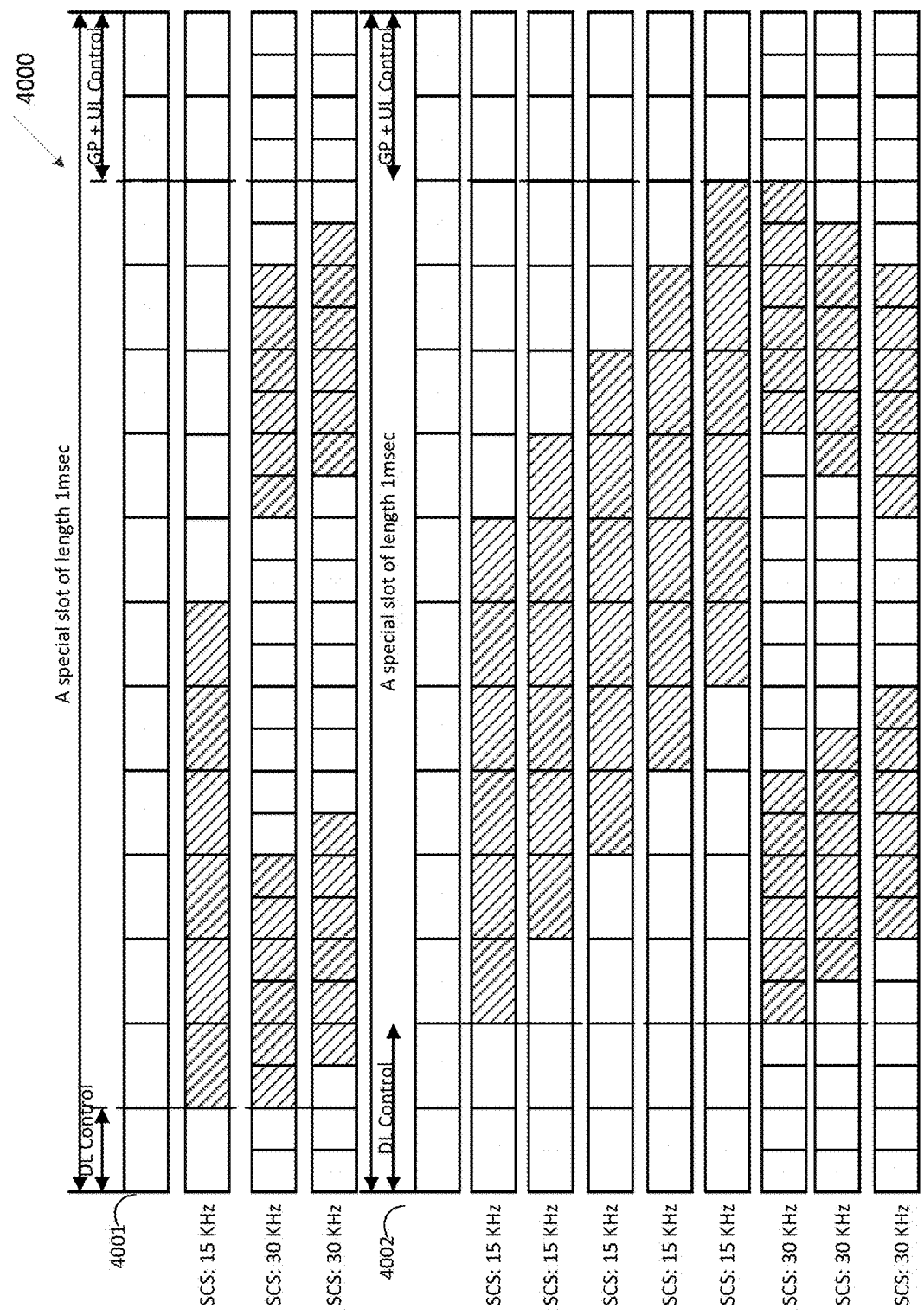
FIG. 40 illustrates yet another example mapping of NR-SS block locations according to embodiments of the present disclosure.

FIG. 40 illustrates yet another example mapping of NR-SS block locations 4000 according to embodiments of the present disclosure. The embodiment of the mapping of NR-SS block locations 4000 illustrated in FIG. 40 is for illustration only. FIG. 40 does not limit the scope of this disclosure to any particular implementation In another embodiment, each SS block consists of 6 symbols, and each slot contains 1 SS block or 2 consecutive slots contain 2 SS blocks. In one sub-embodiment, for SS block with 15 KHz SCS and 30 KHz SCS, FIG. 40 shows the examples of SS block compositions.

In one example 4001, for a reference slot with 1 millisecond length, symbol #0 is preserved for DL control, and symbol #12 and symbol #13 are preserved for guard period (GP) and UL control. Given the reference slot, map 1 SS block to one slot of 14 symbols with 15 KHz SCS, and map 1 SS block to one slot of 14 symbols with 30 KHz SCS. TABLE 18 shows the possible symbol positions of the SS block for each SCS.

TABLE 18

Symbol positions of the SS block

| SCS | Symbol locations for SS block |
|---|---|
| 15 KHz | (1, 2, 3, 4, 5, 6) |
| 30 KHz | (2, 3, 4, 5, 6, 7) |
| 30 KHz | (3, 4, 5, 6, 7, 8) |

In one example 4002, for a reference slot with 1 millisecond length, symbol #0 and symbol #1 are preserved for DL control, and symbol #12 and symbol #13 are preserved for guard period (GP) and UL control. Given the reference slot, map 1 SS block to one slot of 14 symbols with 15 KHz SCS, and map 2 SS blocks to two slots of 28 symbols with 30 KHz SCS. TABLE 19 shows the possible symbol positions of the SS block for each SCS.

TABLE 19

Symbol positions of the SS block

| SCS | Symbol locations for SS block |
|---|---|
| 15 KHz | (2, 3, 4, 5, 6, 7) |
| 15 KHz | (3, 4, 5, 6, 7, 8) |
| 15 KHz | (4, 5, 6, 7, 8, 9) |
| 15 KHz | (5, 6, 7, 8, 9, 10) |
| 15 KHz | (6, 7, 8, 9, 10, 11) |
| 30 KHz | (4, 5, 6, 7, 8, 9), (18, 19, 20, 21, 22, 23) |
| 30 KHz | (5, 6, 7, 8, 9, 10), (17, 18, 19, 20, 21, 22) |
| 30 KHz | (6, 7, 8, 9, 10, 11), (16, 17, 18, 19, 20, 21) |

Figure 41A:
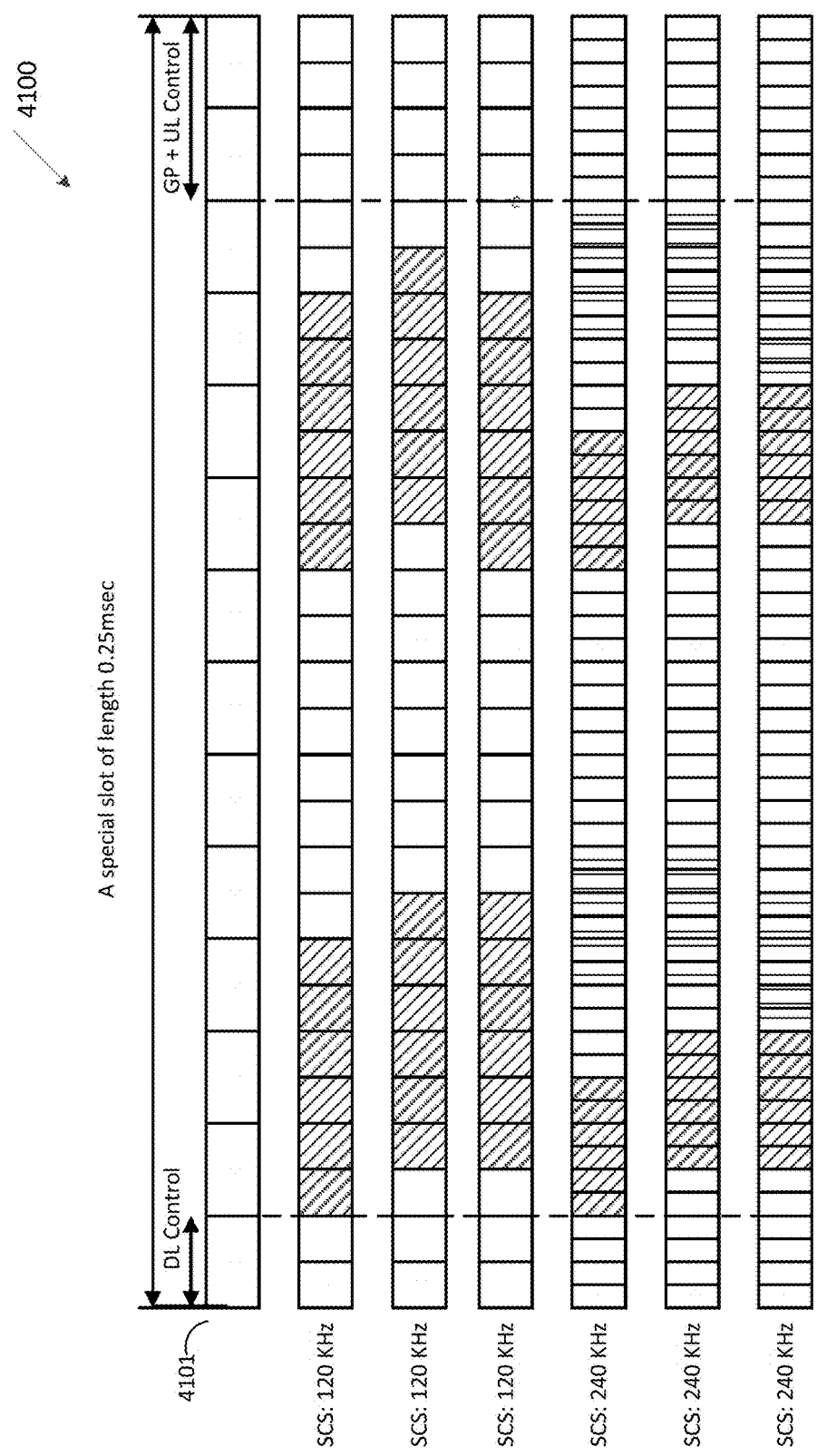
FIG. 41A illustrates yet another example mapping of NR-SS block locations according to embodiments of the present disclosure.

FIG. 41A illustrates yet another example mapping of NR-SS block locations 4100 according to embodiments of the present disclosure. The embodiment of the mapping of NR-SS block locations 4100 illustrated in FIG. 41A is for illustration only. FIG. 41A does not limit the scope of this disclosure to any particular implementation.

Figure 41B:
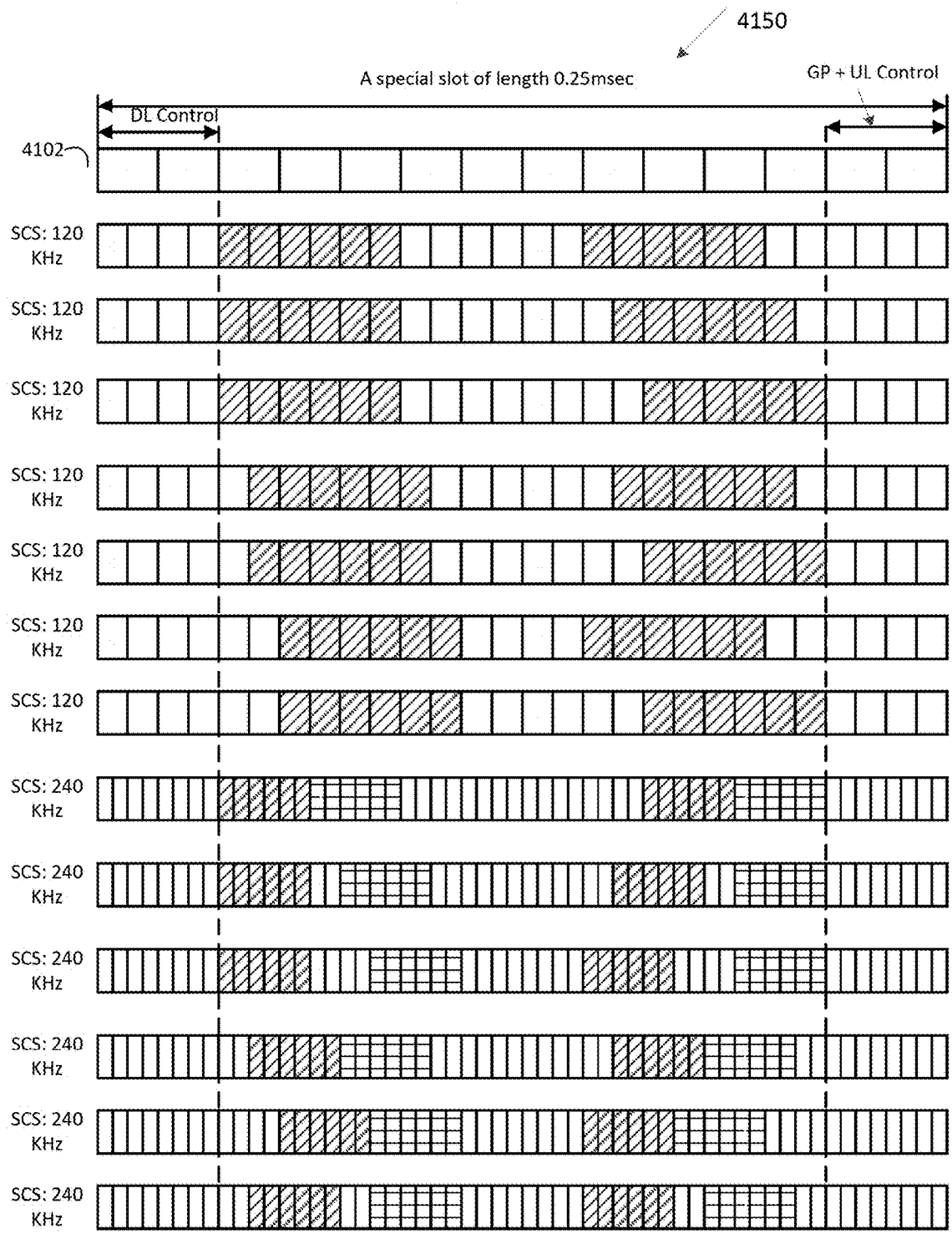
FIG. 41B illustrates yet another example mapping of NR-SS block locations according to embodiments of the present disclosure.

FIG. 41B illustrates yet another example mapping of NR-SS block locations 4150 according to embodiments of the present disclosure. The embodiment of the mapping of NR-SS block locations 4150 illustrated in FIG. 41B is for illustration only. FIG. 41B does not limit the scope of this disclosure to any particular implementation.

In another sub-embodiment, for SS block with 120 KHz SCS and 240 KHz SCS, FIGS. 41A and 41B shows the examples of SS block compositions.

In one example 4101, for a reference slot with 0.25 millisecond length, symbol #0 is preserved for DL control, and symbol #12 and symbol #13 are preserved for guard period (GP) and UL control. Given the reference slot, map 2 SS blocks across two slot of 28 symbols with 120 KHz SCS, and map 2 SS blocks across two slot of 28 symbols with 240 KHz SCS. TABLE 20 shows the possible symbol positions of the SS block for each SCS.

TABLE 20

Symbol positions of the SS block

| SCS | Symbol locations for SS block |
|---|---|
| 120 KHz | (2, 3, 4, 5, 6, 7), (16, 17, 18, 19, 20, 21) |
| 120 KHz | (2, 3, 4, 5, 6, 7, 8), (17, 18, 19, 20, 21, 22) |

TABLE 20-continued

Symbol positions of the SS block

| SCS | Symbol locations for SS block |
|---|---|
| 120 KHz | (3, 4, 5, 6, 7, 8), |
|  | (16, 17, 18, 19, 20, 21) |
| 240 KHz | (4, 5, 6, 7, 8, 9), |
|  | (14, 15, 16, 17, 18, 19) |
| 240 KHz | (6, 7, 8, 9, 10, 11), |
|  | (14, 15, 16, 17, 18, 19) |
| 240 KHz | (6, 7, 8, 9, 10, 11), |
|  | (12, 13, 14, 15, 16, 17) |

In one example 4102, for a reference slot with 0.25 millisecond length, symbol #0 and symbol #1 are preserved for DL control, and symbol #12 and symbol #13 are preserved for guard period (GP) and UL control. Given the reference slot, map 2 SS blocks across two slot of 28 symbols with 120 KHz SCS, and map 2 SS blocks across two slot of 28 symbols with 240 KHz SCS (mapping pattern may be different for the first 2 slots and the next 2 slots). TABLE 21 and show the possible symbol positions of the SS block for each SCS.

TABLE 21

Symbol positions of the SS block

| SCS | Symbol locations for SS block |
|---|---|
| 120 KHz | (4, 5, 6, 7, 8, 9), |
|  | (16, 17, 18, 19, 20, 21) |
| 120 KHz | (4, 5, 6, 7, 8, 9), |
|  | (17, 18, 19, 20, 21, 22) |
| 120 KHz | (4, 5, 6, 7, 8, 9), |
|  | (18, 19, 20, 21, 22, 23) |
| 120 KHz | (5, 6, 7, 8, 9, 10), |
|  | (17, 18, 19, 20, 21, 22) |
| 120 KHz | (5, 6, 7, 8, 9, 10), |
|  | (18, 19, 20, 21, 22, 23) |
| 120 KHz | (6, 7, 8, 9, 10, 11), |
|  | (16, 17, 18, 19, 20, 21) |
| 120 KHz | (6, 7, 8, 9, 10, 11), |
|  | (18, 19, 20, 21, 22, 23) |

TABLE 22

Symbol positions of the SS block

| SCS | Symbol locations for SS block in first 2 slots | Symbol locations for SS block in next 2 slots |
|---|---|---|
| 240 KHz | (9, 10, 11, 12, 13, 14), | (9, 10, 11, 12, 13, 14), |
|  | (15, 16, 17, 18, 19, 20) | (15, 16, 17, 18, 19, 20) |
| 240 KHz | (9, 10, 11, 12, 13, 14), | (7, 8, 9, 10, 11, 12), |
|  | (17, 18, 19, 20, 21, 22) | (15, 16, 17, 18, 19, 20) |
| 240 KHz | (9, 10, 11, 12, 13, 14), | (5, 6, 7, 8, 9, 10), |
|  | (19, 20, 21, 22, 23, 24) | (15, 16, 17, 18, 19, 20) |
| 240 KHz | (11, 12, 13, 14, 15, 16), | (7, 8, 9, 10, 11, 12), |
|  | (17, 18, 19, 20, 21, 22) | (13, 14, 15, 16, 17, 18) |
| 240 KHz | (13, 14, 15, 16, 17, 18), | (5, 6, 7, 8, 9, 10), |
|  | (19, 20, 21, 22, 23, 24) | (11, 12, 13, 14, 15, 16) |
| 240 KHz | (11, 12, 13, 14, 15, 16), | (5, 6, 7, 8, 9, 10), |
|  | (19, 20, 21, 22, 23, 24) | (13, 14, 15, 16, 17, 18) |

Figure 42A:
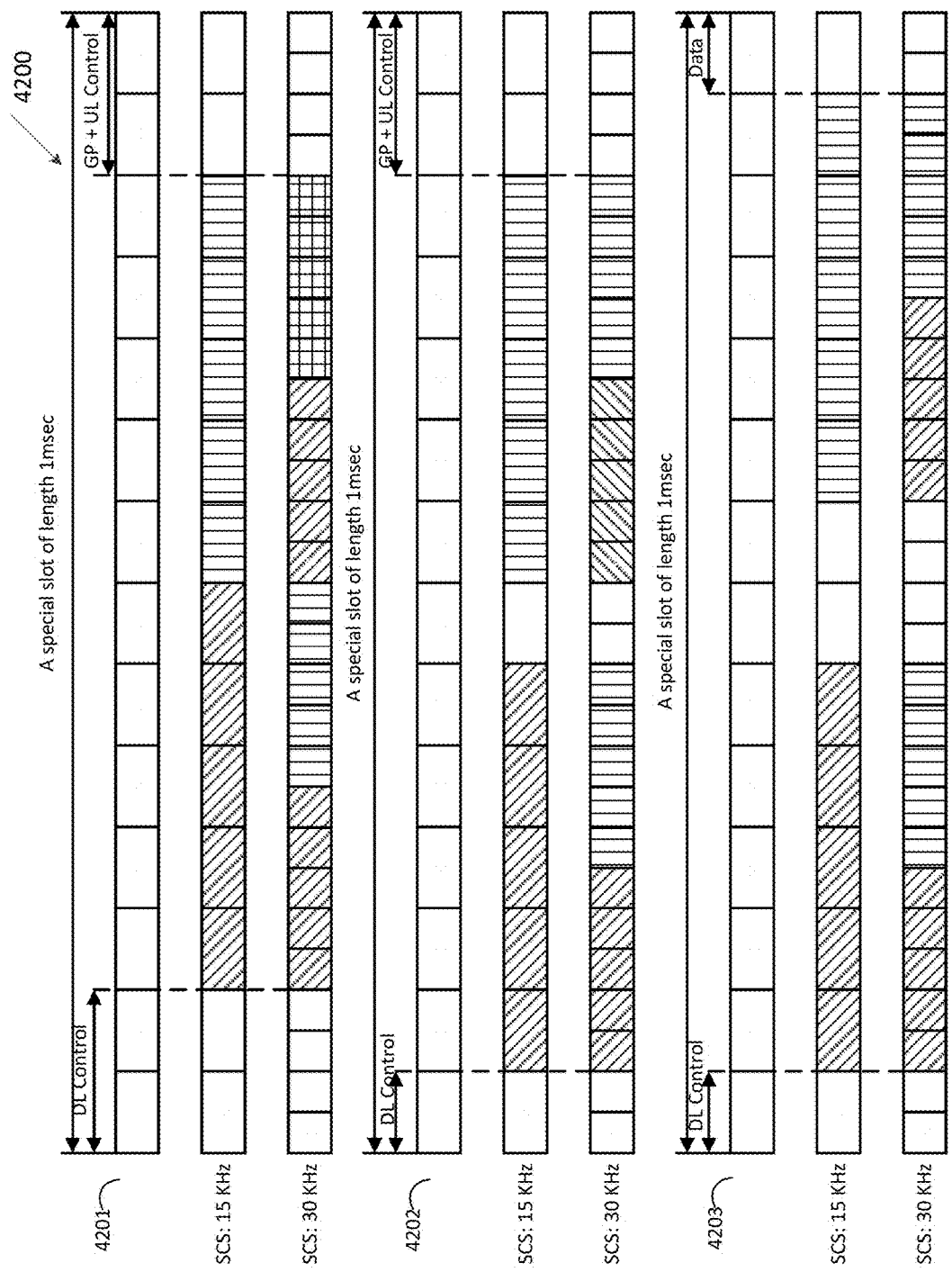
FIG. 42A illustrates yet another example mapping of NR-SS block locations according to embodiments of the present disclosure.

FIG. 42A illustrates yet another example mapping of NR-SS block locations 4200 according to embodiments of the present disclosure. The embodiment of the mapping of NR-SS block locations 4200 illustrated in FIG. 42 is for illustration only. FIG. 42 does not limit the scope of this disclosure to any particular implementation.

Figure 42B:
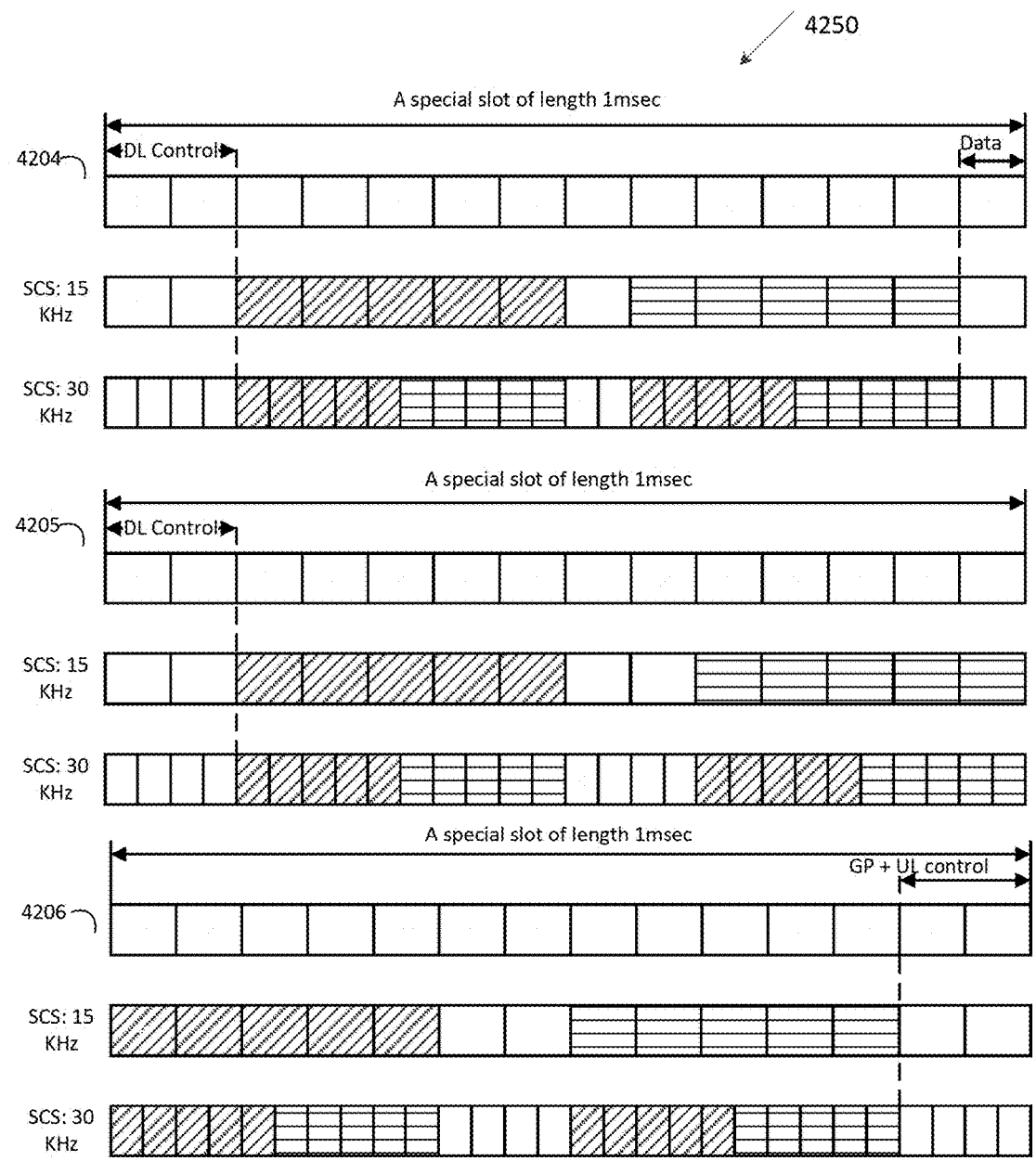
FIG. 42B illustrates yet another example mapping of NR-SS block locations according to embodiments of the present disclosure.

FIG. 42B illustrates yet another example mapping of NR-SS block locations 4250 according to embodiments of the present disclosure. The embodiment of the mapping of NR-SS block locations 4250 illustrated in FIG. 42B is for illustration only. FIG. 42B does not limit the scope of this disclosure to any particular implementation.

In another embodiment, each SS block consists of 5 SS blocks, and each slot contains 2 SS blocks or 2 consecutive slots contain 4 SS blocks. In one sub-embodiment, for SS block with 15 KHz SCS and 30 KHz SCS, FIGS. 42A and 42B show the examples of SS block compositions.

Figure 43A:
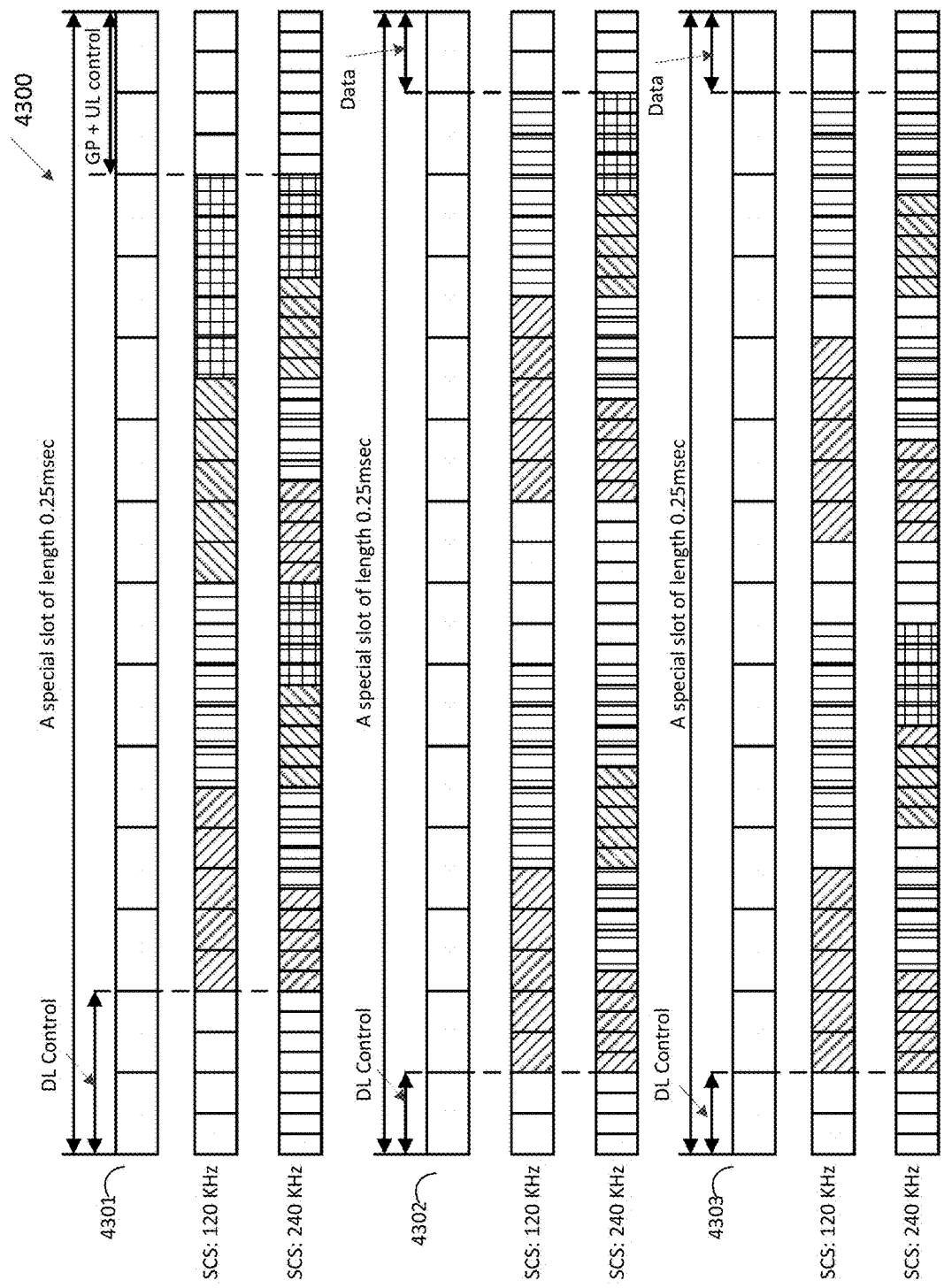
FIG. 43A illustrates yet another example mapping of NR-SS block locations according to embodiments of the present disclosure.

FIG. 43A illustrates yet another example mapping of NR-SS block locations 4300 according to embodiments of the present disclosure. The embodiment of the mapping of NR-SS block locations 4300 illustrated in FIG. 43A is for illustration only. FIG. 43A does not limit the scope of this disclosure to any particular implementation.

Figure 43B:
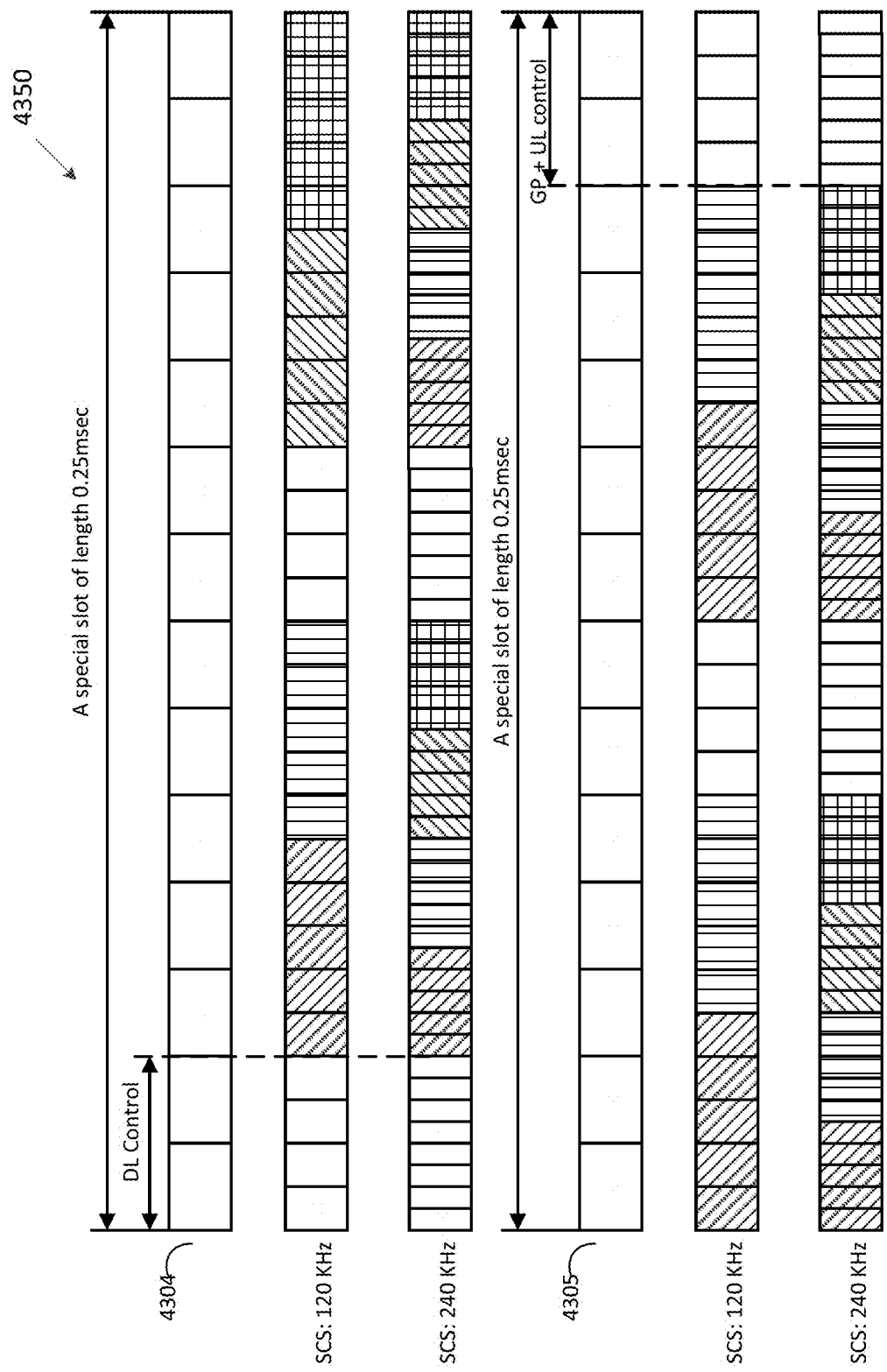
FIG. 43B illustrates yet another example mapping of NR-SS block locations according to embodiments of the present disclosure.

FIG. 43B illustrates yet another example mapping of NR-SS block locations 4350 according to embodiments of the present disclosure. The embodiment of the mapping of NR-SS block locations 4350 illustrated in FIG. 43B is for illustration only. FIG. 43B does not limit the scope of this disclosure to any particular implementation.

In another sub-embodiment, for SS block with 120 KHz SCS and 240 KHz SCS, FIGS. 43A and 43B show the examples of SS block compositions.

Figure 44A:
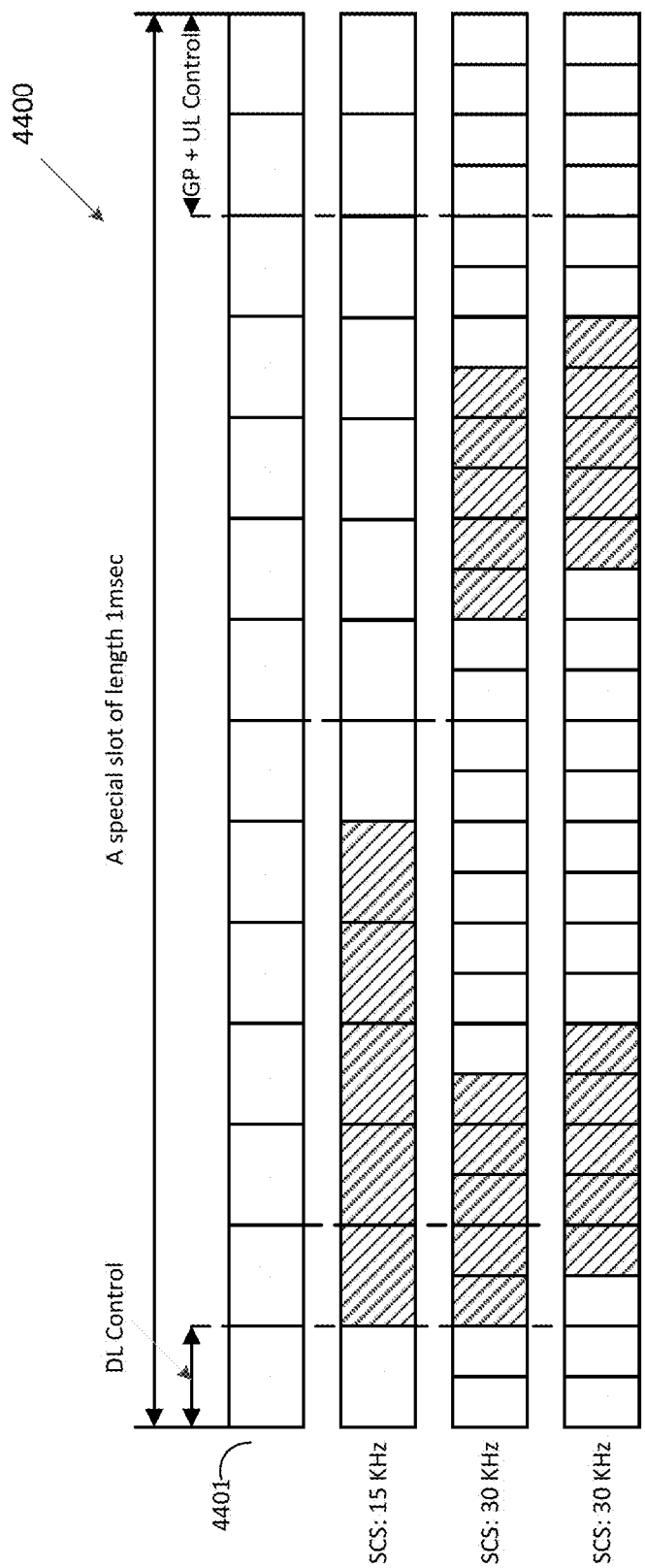
FIG. 44A illustrates yet another example mapping of NR-SS block locations according to embodiments of the present disclosure.

FIG. 44A illustrates yet another example mapping of NR-SS block locations 4400 according to embodiments of the present disclosure. The embodiment of the mapping of NR-SS block locations 4400 illustrated in FIG. 44A is for illustration only. FIG. 44A does not limit the scope of this disclosure to any particular implementation.

Figure 44B:
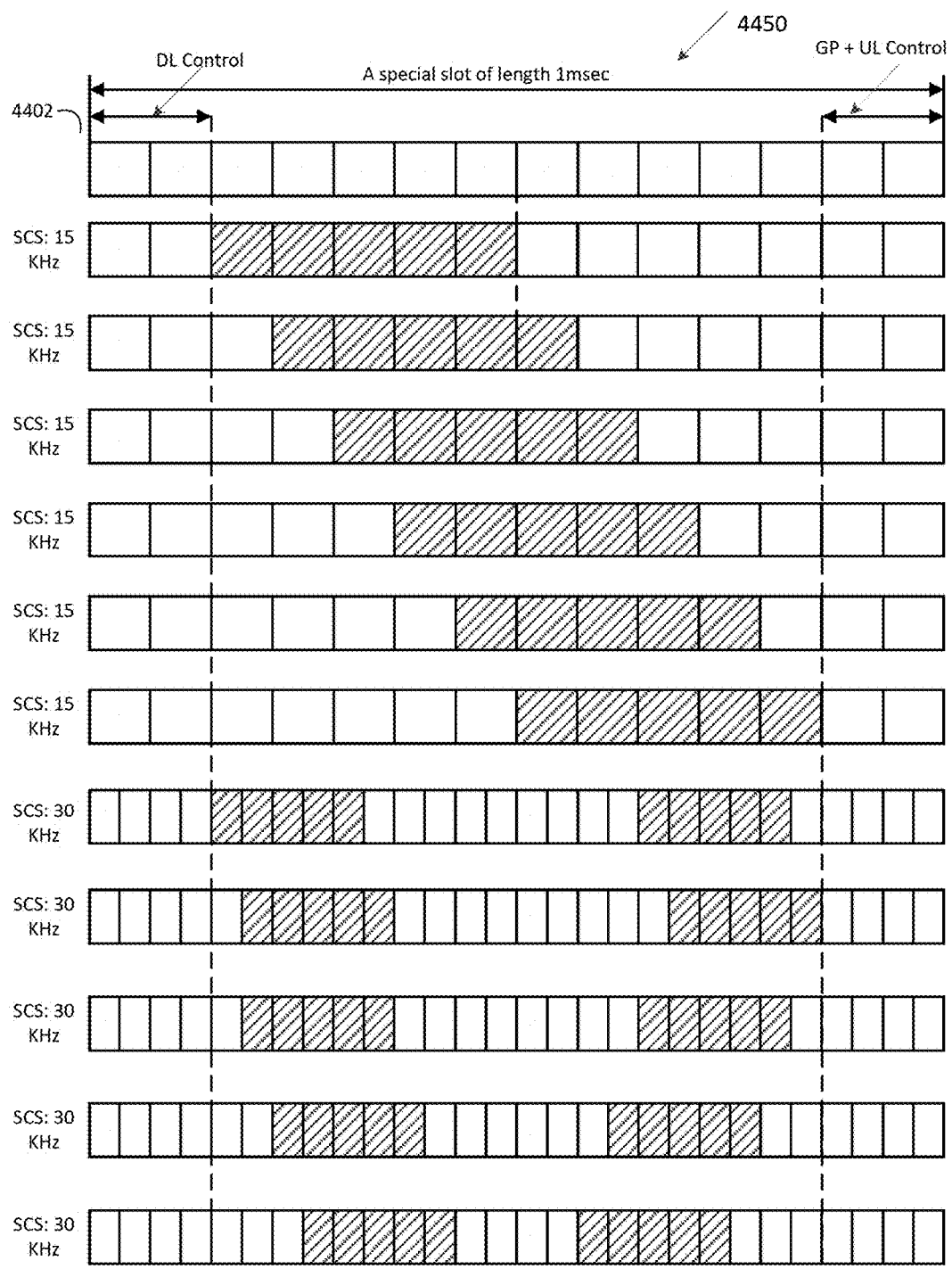
FIG. 44B illustrates yet another example mapping of NR-SS block locations according to embodiments of the present disclosure.

FIG. 44B illustrates yet another example mapping of NR-SS block locations 4450 according to embodiments of the present disclosure. The embodiment of the mapping of NR-SS block locations 4450 illustrated in FIG. 44B is for illustration only. FIG. 44B does not limit the scope of this disclosure to any particular implementation.

In another embodiment, each SS block consists of 5 symbols, and each slot contains 1 SS block or 2 consecutive slots contain 2 SS blocks. In one sub-embodiment, for SS block with 15 KHz SCS and 30 KHz SCS, FIGS. 44A and 44B show the examples of SS block compositions.

Figure 45A:
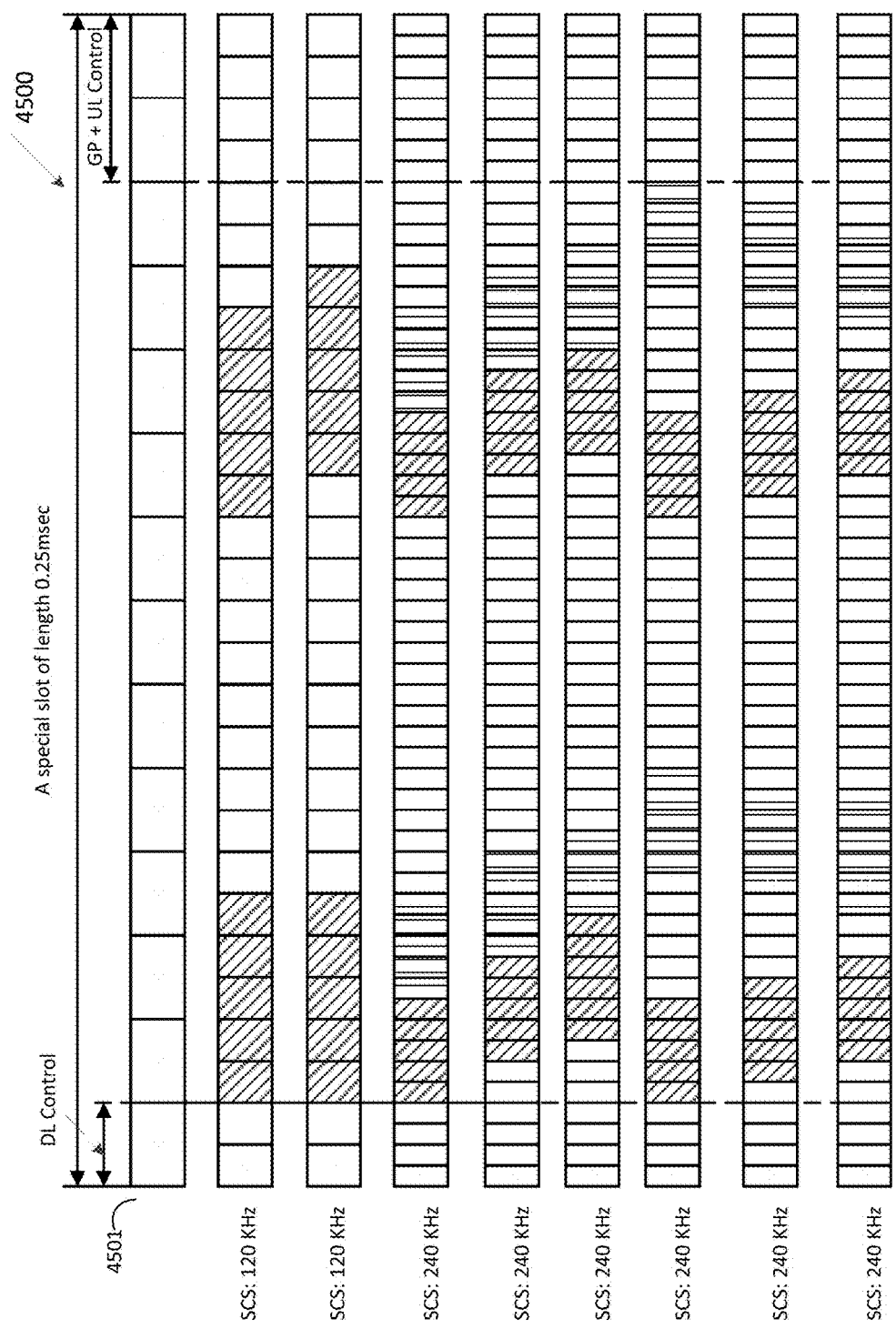
FIG. 45A illustrates yet another example mapping of NR-SS block locations according to embodiments of the present disclosure.

FIG. 45A illustrates yet another example mapping of NR-SS block locations 4500 according to embodiments of the present disclosure. The embodiment of the mapping of NR-SS block locations 4500 illustrated in FIG. 45A is for illustration only. FIG. 45A does not limit the scope of this disclosure to any particular implementation.

Figure 45B:
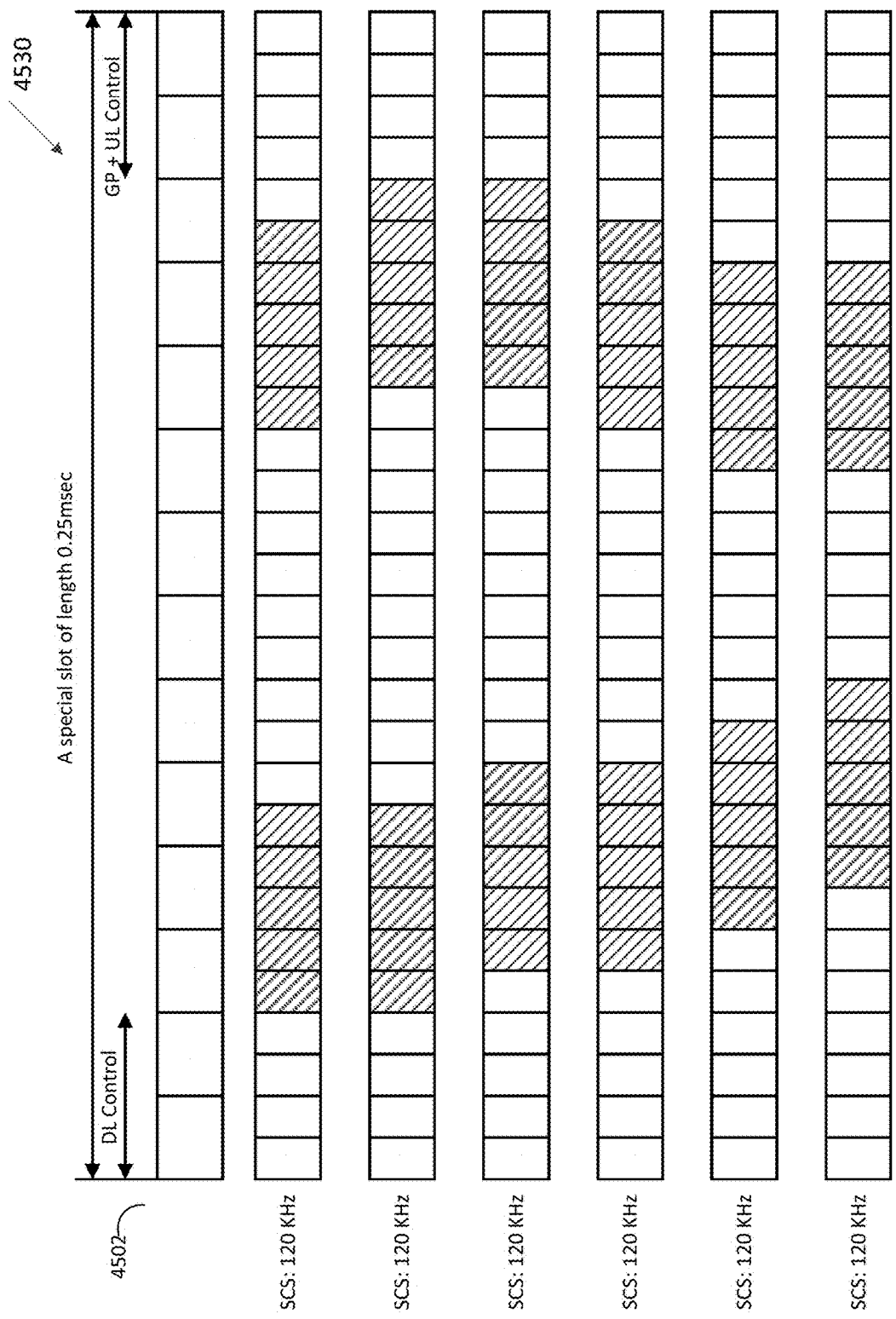
FIG. 45B illustrates yet another example mapping of NR-SS block locations according to embodiments of the present disclosure.

FIG. 45B illustrates yet another example mapping of NR-SS block locations 4530 according to embodiments of the present disclosure. The embodiment of the mapping of NR-SS block locations 4530 illustrated in FIG. 45B is for illustration only. FIG. 45B does not limit the scope of this disclosure to any particular implementation.

Figure 45C:
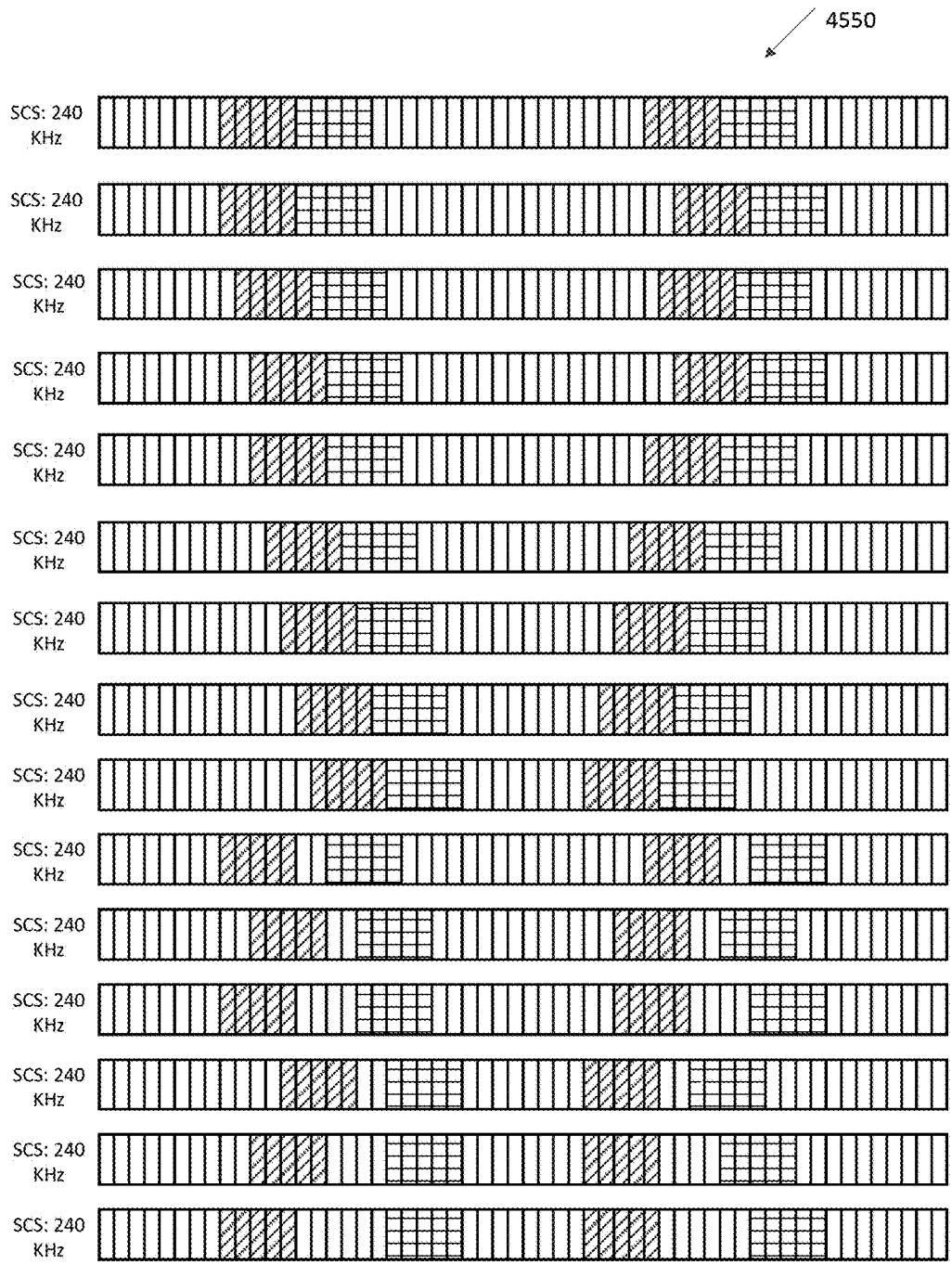
FIG. 45C illustrates yet another example mapping of NR-SS block locations according to embodiments of the present disclosure.

FIG. 45C illustrates yet another example mapping of NR-SS block locations 4550 according to embodiments of the present disclosure. The embodiment of the mapping of NR-SS block locations 4550 illustrated in FIG. 45C is for illustration only. FIG. 45C does not limit the scope of this disclosure to any particular implementation.

Figure 46:
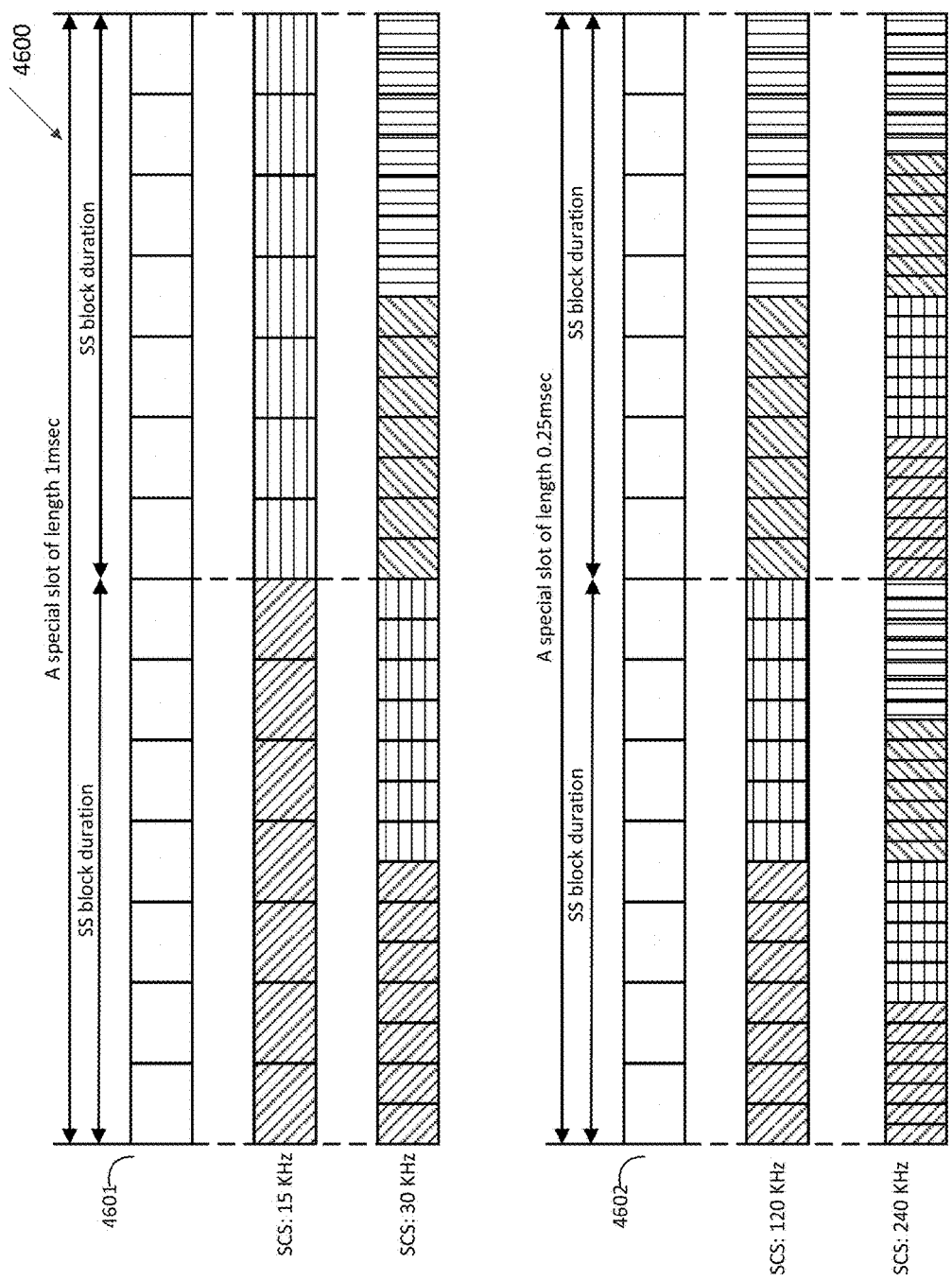
FIG. 46 illustrates yet another example mapping of NR-SS block locations according to embodiments of the present disclosure.

In another sub-embodiment, for SS block with 120 KHz SCS and 240 KHz SCS, FIGS. 45A, 45B, and 45C show the examples of SS block compositions. FIG. 46 illustrates yet another example mapping of NR-SS block locations 4600 according to the present disclosure. The embodiment of the example mapping of NR-SS block locations 4600 illustrated in FIG. 46 is for illustration only. FIG. 46 does not limit the scope of this disclosure to any particular implementation In another embodiment, each SS block consists of 7 symbols, and each slot contains 2 SS blocks or 2 consecutive slots contain 4 SS blocks. FIG. 46 shows the examples of SS block compositions for SS block with 15 KHz SCS and 30 KHz SCS, as well as SS block with 120 KHz SCS and 240 KHz SCS.

Figure 47A:
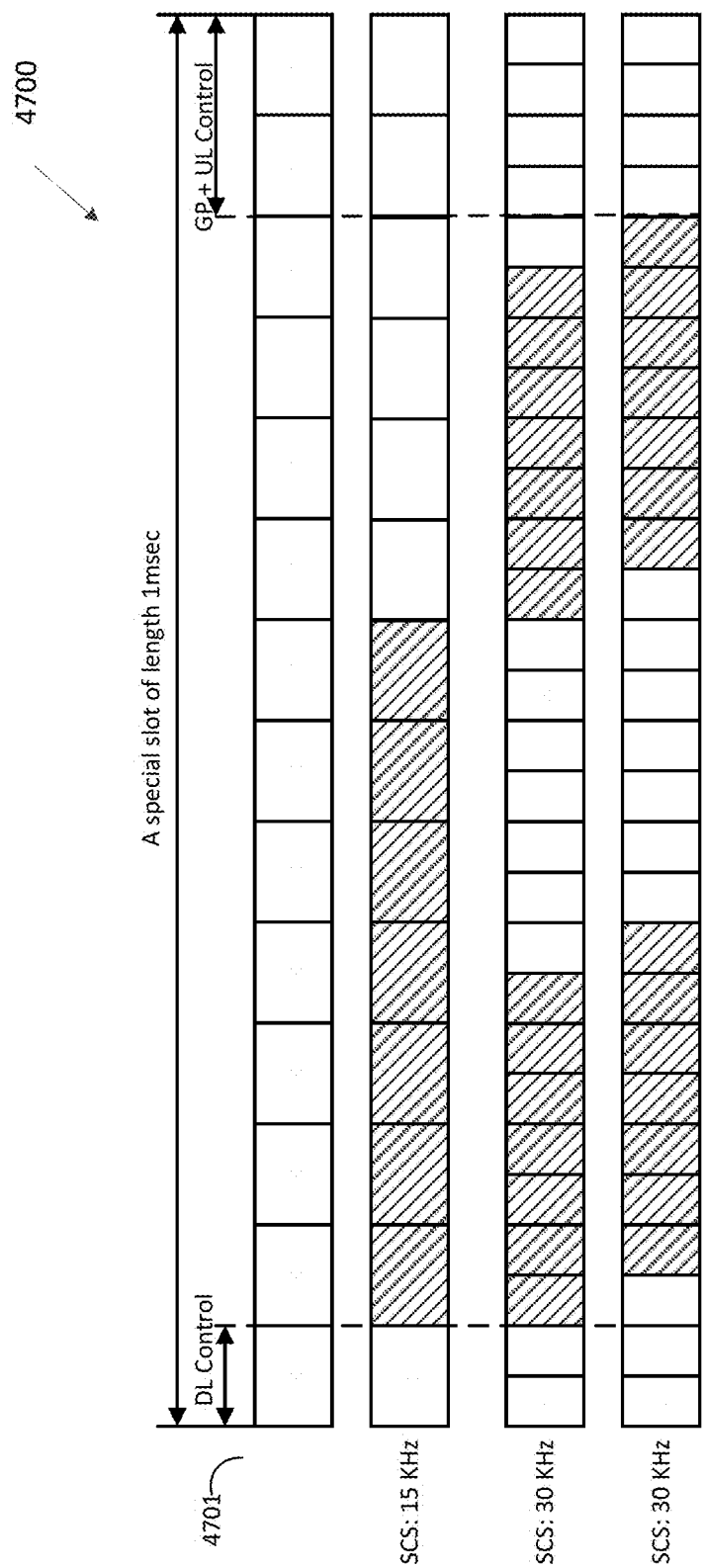
FIG. 47A illustrates yet another example mapping of NR-SS block locations according to embodiments of the present disclosure.

FIG. 47A illustrates yet another example mapping of NR-SS block locations 4700 according to embodiments of the present disclosure. The embodiment of the mapping of NR-SS block locations 4700 illustrated in FIG. 47A is for illustration only. FIG. 47A does not limit the scope of this disclosure to any particular implementation.

Figure 47B:
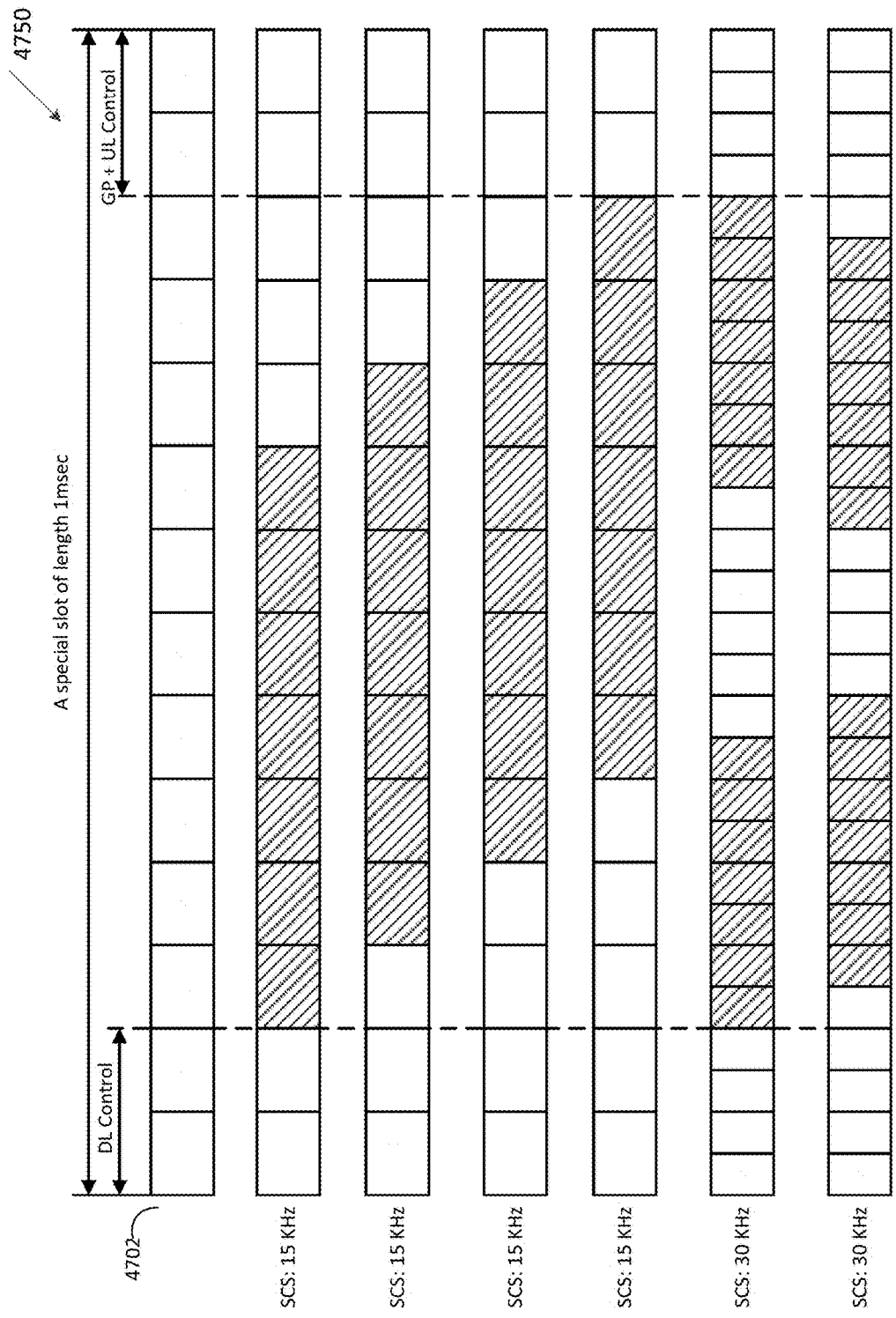
FIG. 47B illustrates yet another example mapping of NR-SS block locations according to embodiments of the present disclosure.

FIG. 47B illustrates yet another example mapping of NR-SS block locations 4750 according to embodiments of the present disclosure. The embodiment of the mapping of NR-SS block locations 4750 illustrated in FIG. 47B is for illustration only. FIG. 47B does not limit the scope of this disclosure to any particular implementation.

In another embodiment, each SS block consists of 7 symbols, and each slot contains 1 SS block or 2 consecutive slots contain 2 SS blocks. In one sub-embodiment, for SS block with 15 KHz SCS and 30 KHz SCS, FIGS. 47A and 47B shows the examples of SS block compositions.

Figure 48A:
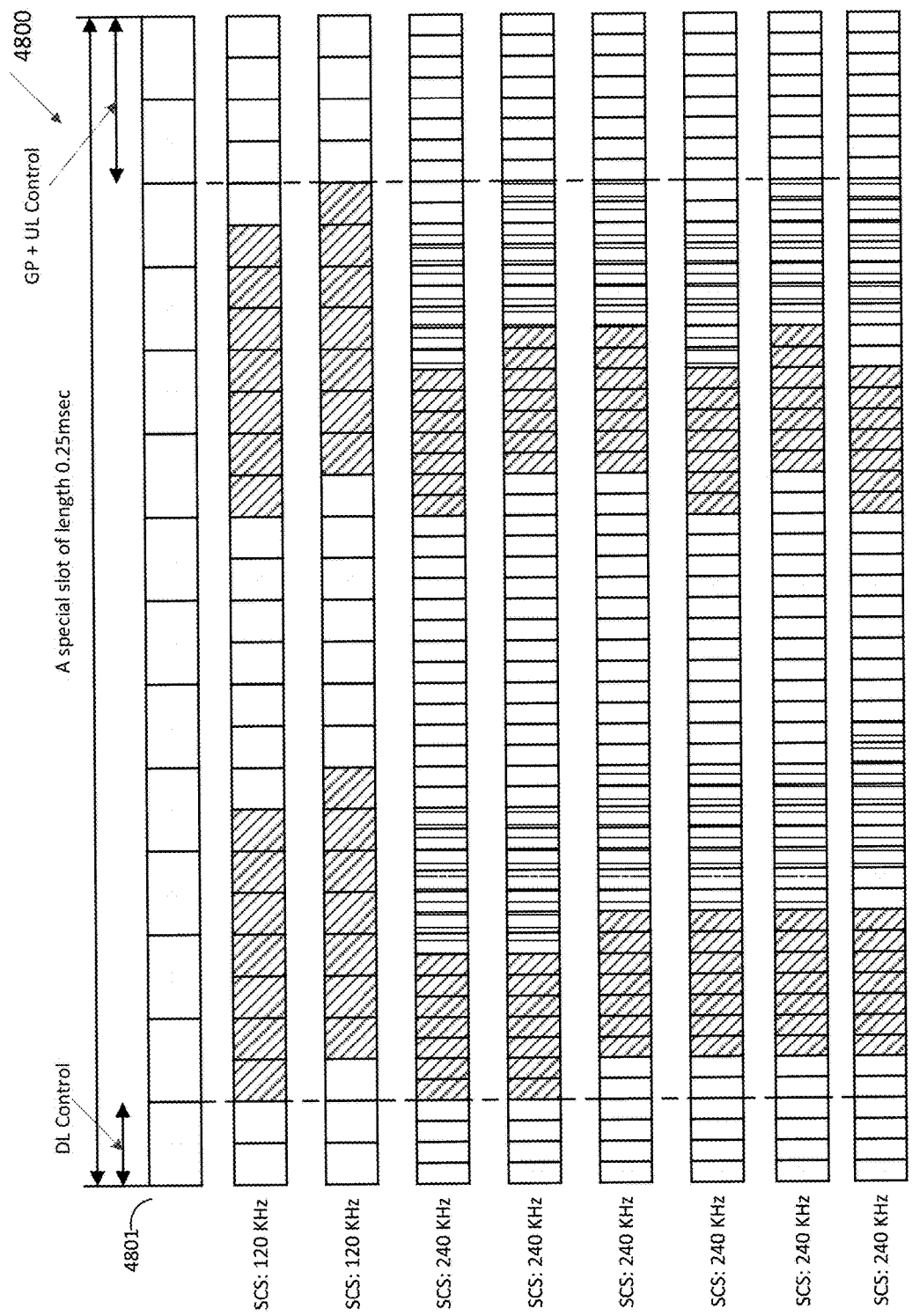
FIG. 48A illustrates yet another example mapping of NR-SS block locations according to embodiments of the present disclosure.

FIG. 48A illustrates yet another example mapping of NR-SS block locations 4800 according to embodiments of the present disclosure. The embodiment of the mapping of NR-SS block locations 4800 illustrated in FIG. 48A is for illustration only. FIG. 48A does not limit the scope of this disclosure to any particular implementation.

Figure 48B:
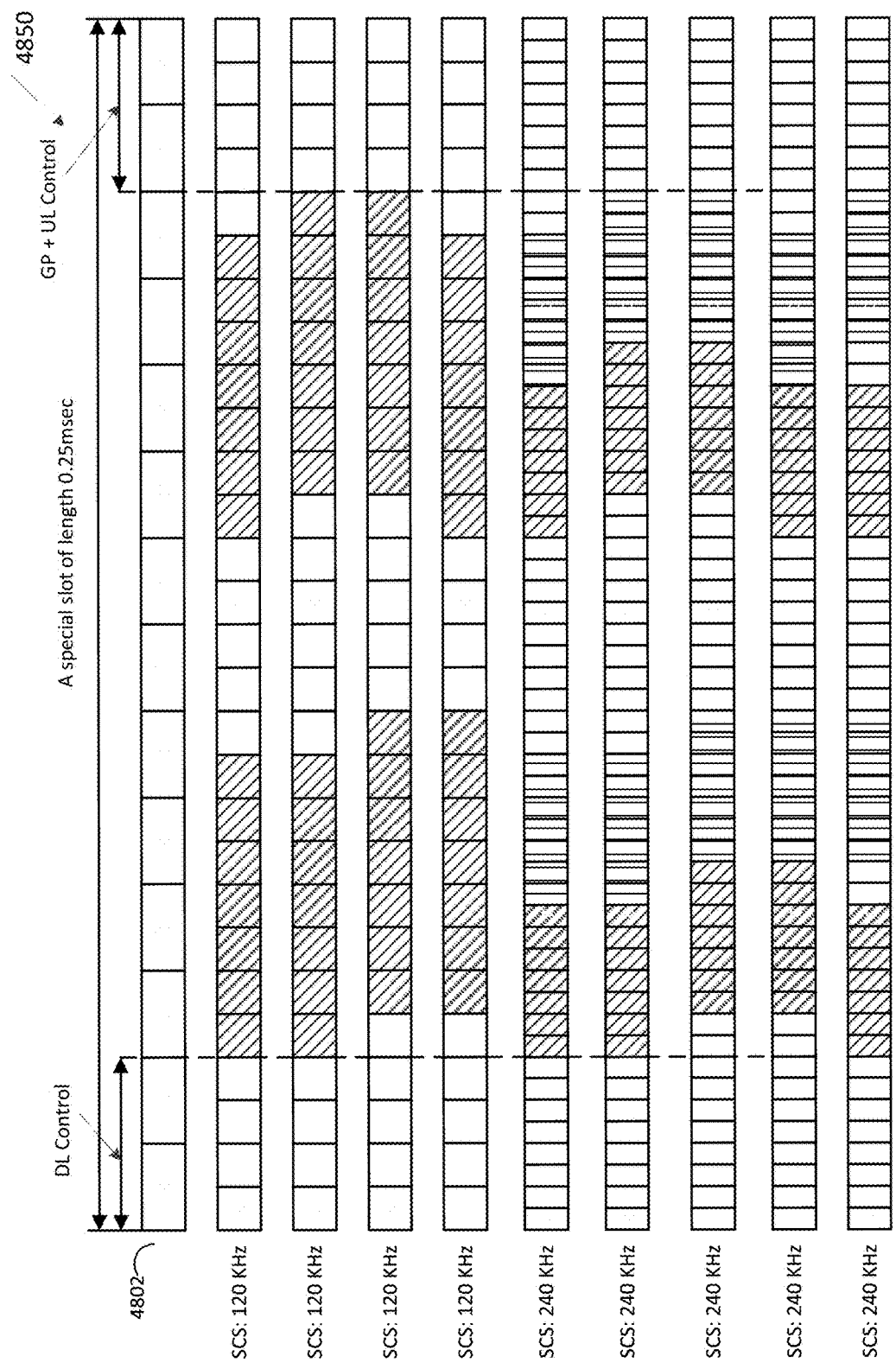
FIG. 48B illustrates yet another example mapping of NR-SS block locations according to embodiments of the present disclosure.

FIG. 48B illustrates yet another example mapping of NR-SS block locations 4850 according to embodiments of the present disclosure. The embodiment of the mapping of NR-SS block locations 4850 illustrated in FIG. 48B is for illustration only. FIG. 48B does not limit the scope of this disclosure to any particular implementation.

In another sub-embodiment, for SS block with 120 KHz SCS and 240 KHz SCS, FIGS. 48A and 48B show the examples of SS block compositions.

Another important factor is regarding the frequency bands that the above provided mapping of SS blocks within slot(s) can be applied to.

One embodiment is that the provided patterns in the present disclosure can be applied to only a subset of NR bands. For example, for sub-6 GHz bands only. For another example, for above-6 GHz bands only.

One embodiment is that the provided patterns in the present disclosure can be applied to all the NR bands, including both sub-6 GHz and above-6 GHz bands.

For NR, the transmission of SS blocks is confined to a 5 ms window (i.e., half a radio frame). Within this 5 ms window, the maximum number of possible candidate SS block locations L depends on the number of SS blocks within each slot, as well as the subcarrier spacing. According to th aforementioned embodiments, the following conditions are possible regarding the maximum number of SS blocks within a slot.

In one embodiment, the maximum number of SS blocks per slot is 2 (or the maximum number of SS blocks across 2 consecutive slots is 4). This applies to the cases where the number of symbols for an SS block is 4, 5, 6, or 7, as detailed in the aforementioned embodiments.

In this case, the following mapping of slots within a half radio frame as well as the maximum number of possible candidate SS block locations L is provided in TABLE 23.

One note is that for 240 KHz SCS, it is also possible that the maximum number of SS blocks across 2 consecutive slots is 4.

TABLE 23

Candidate SS block locations L

| Subcarrier spacing (kHz) | Possible slot number containing SS block within half a radio frame | Max number of candidate SS blocks L |
|---|---|---|
| 15 | (0, 1) | 4 |
| 15 | (0, 1, 2, 3) | 8 |
| 30 | (0, 1) | 4 |
| 30 | (0, 1, 2, 3) | 8 |
| 120 | $U_{n=0}^{7}\{(0, 1, 2, 3) + 5 \times n\}$, or $U_{n=0}^{3}\{(0, 1, 2, 3, 4, 5, 6, 7) + 10 \times n\}$ | 64 |
| 240 | $U_{n=0}^{3}\{(0, 1, 2, 3, 4, 5, 6, 7) + 10 \times n\}$, or $U_{n=0}^{1}\{(0, 1, 2, 3, 4, 5, 6, 7, 8, 9, 10, 11, 12, 13, 14, 15) + 20 \times n\}$ | 64 |

In another embodiment, the maximum number of SS blocks per slot is 1 (or the maximum number of SS blocks across 2 consecutive slots is 2). This applies to the cases where the number of symbols for an SS block is 4, 5, 6, or 7, as detailed in the aforementioned embodiment. In this case, the following mapping of slots within a half radio frame as well as the maximum number of possible candidate SS block locations L is provided in TABLE 24.

TABLE 24

Candidate SS block locations L

| Subcarrier spacing (kHz) | Possible slot number containing SS block within half a radio frame | Max number of candidate SS blocks L |
|---|---|---|
| 15 | (0, 1) | 2 |
| 15 | (0, 1, 2, 3) | 4 |
| 30 | (0, 1) | 4 |
| 30 | (0, 1, 2, 3, 5, 6, 7, 8) | 8 |
| 120 | $U_{n=0}^{7}\{(0, 1, 2, 3) + 5 \times n\}$, or $U_{n=0}^{3}\{(0, 1, 2, 3, 4, 5, 6, 7) + 10 \times n\}$ | 32 |
| 240 | $U_{n=0}^{7}\{(0, 1, 2, 3, 4, 5, 6, 7) + 10 \times n\}$, or $U_{n=0}^{3}\{(0, 1, 2, 3, 4, 5, 6, 7, 8, 9, 10, 11, 12, 13, 14, 15) + 20 \times n\}$ | 64 |

Another important factor is regarding the frequency bands that the above provided mapping of slots within half a radio frame can be applied to.

One embodiment is that the provided patterns in TABLE 23 and TABLE 24 can be applied to only a subset of NR bands. For example, for sub-6 GHz bands only. For another example, for above-6 GHz bands only.

One embodiment is that the provided patterns in TABLE 23 and TABLE 24 can be applied to all the NR bands, including both sub-6 GHz and above-6 GHz bands.

The previous embodiments in this disclosure are mainly focused on the cases wherein NR-PBCH symbols are fully TDMed with NR-PSS and NR-SSS. Another possible frequency and time domain composition for NR-PBCH is as follows: the number of symbols purely for NR-PBCH is 2 symbols; while in the frequency domain, instead of using 24 PRBs for NR-PBCH, reduce each NR-PBCH symbol to X=20 PRBs and add Y=4 NR-PBCH PRBs from each NR-PBCH symbols to the NR-SSS symbol. Under this composition, each SS block may occupy 20 PRBs and 4 symbols. An important design consideration with this composition is that on the NR-SSS/NR-PBCH symbol, how the resources are allocated for NR-PBCH/DM-RS and NR-SSS, e.g. FDMed and/or IFDMed.

Figure 49:
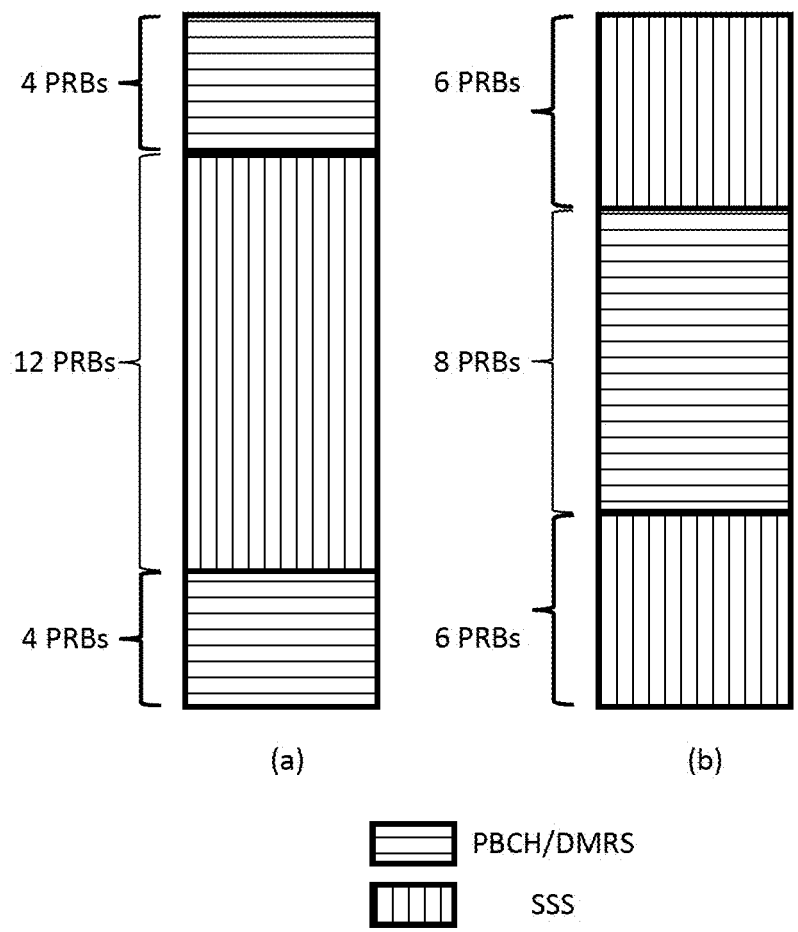
FIG. 49 illustrates an example FDMed NR-PBCH and NR-SSS according to embodiments of the present disclosure.

FIG. 49 illustrates an example FDMed NR-PBCH and NR-SSS according to 4900 embodiments of the present disclosure. The embodiment of the FDMed NR-PBCH and NR-SSS according to 4900 illustrated in FIG. 49 is for illustration only. FIG. 49 does not limit the scope of this disclosure to any particular implementation In one embodiment, the truncated PRB for NR-PBCH can be directly added to the blanked PRBs (e.g. 4 PRBs on each side of PRBs for NR-SSS) within the original NR-SSS symbol. Specifically, among the 20 PRBs of the NR-SSS/NR-PBCH symbol, NR-SSS may occupy the 127 subcarriers in the center 12 PRBs; while 4 PRBs for NR-PBCH may be added to the top and bottom 4 PRBs respectively (e.g. purely FDMed NR-PBCH and NR-SSS). Example of this structure is illustrated in FIG. 49 (e.g., (a) in FIG. 49). Another possible way of FDMing the NR-SSS and NR-PBCH/DMRS is illustrated in FIG. 49 (e.g., (b) in FIG. 49).

In another embodiment, instead of allocating all the NR-SSS in the middle of the 20 PRBs and NR-PBCH/DMRS in the top and bottom parts of the 20 PRBs, the NR-SSS and NR-PBCH could be IFDMed in a uniform or non-uniform way within the symbol, which may be beneficial in terms of channel estimation.

In one sub-embodiment, the same DM-RS density in the NR-PBCH of the NR-SSS symbol can be used as the NR-PBCH symbol, i.e., one DM-RS RE in every 4 NR-PBCH REs, and the unit to allocate IFDMed NR-PBCH and NR-SSS resources can be 4 REs within the NR-SSS/NR-PBCH symbol.

Figure 50:
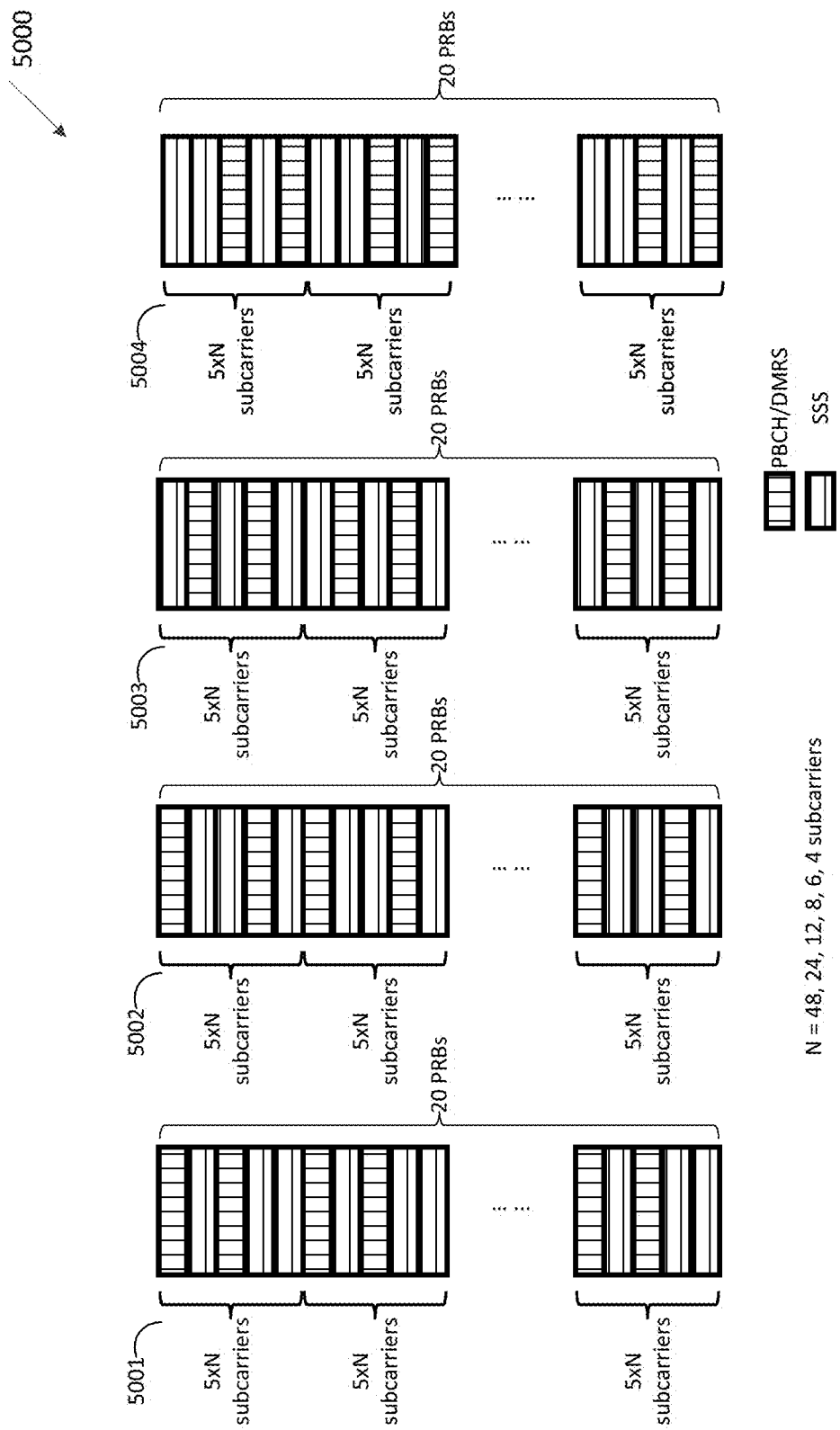
FIG. 50 illustrates an example FDMed NR-PBCH and NR-SSS according to embodiments of the present disclosure.

FIG. 50 illustrates an example FDMed NR-PBCH and NR-SSS 5000 according to 5000 embodiments of the present disclosure. The embodiment of the FDMed NR-PBCH and NR-SSS 5000 illustrated in FIG. 50 is for illustration only. FIG. 50 does not limit the scope of this disclosure to any particular implementation.

In another sub-embodiment, FIG. 50 shows several examples of allocating REs for NR-PBCH/DMRS and NR-SSS within the symbol. Specifically, the examples in FIG. 50 are based on forming 5×N subcarriers according to certain multiplexing pattern of the NR-PBCH/DMRS and NR-SSS resources, with every NR-PBCH/DMRS and NR-SSS resource allocation unit being N subcarriers (N=48, 24, 12, 8, 6, 4). Such pattern of 5×N subcarriers are repeated in the frequency domain of 20 PRBs. Note that since the actual NR-SSS is composed of 127 subcarriers, the first 8 subcarriers and last 9 subcarriers for NR-SSS resources in FIG. 50 are empty.

Note that when N=12, this scheme can be considered as PRB-level IFDM of NR-PBCH/DMRS and NR-SSS.

Note that when N=24, or 48, this scheme can be considered as group-PRB-level IFDM of NR-PBCH/DMRS and NR-SSS.

Some examples as shown in FIG. 50 are as follows.

In one example 5001, the multiplexing pattern for NR-PBCH and NR-SSS within the 5×N subcarriers is SSS, SSS, PBCH, SSS, PBCH (in increasing order in the frequency domain).

In one example 5002, the multiplexing pattern for NR-PBCH and NR-SSS within the 5×N subcarriers is SSS, PBCH, SSS, SSS, PBCH (in increasing order in the frequency domain).

In one example 5003, the multiplexing pattern for NR-PBCH and NR-SSS within the 5×N subcarriers is SSS, PBCH, SSS, PBCH, SSS (in increasing order in the frequency domain).

In one example 5004, the multiplexing pattern for NR-PBCH and NR-SSS within the 5×N subcarriers is PBCH, SSS, PBCH, SSS, SSS (in increasing order in the frequency domain).

Figure 51:
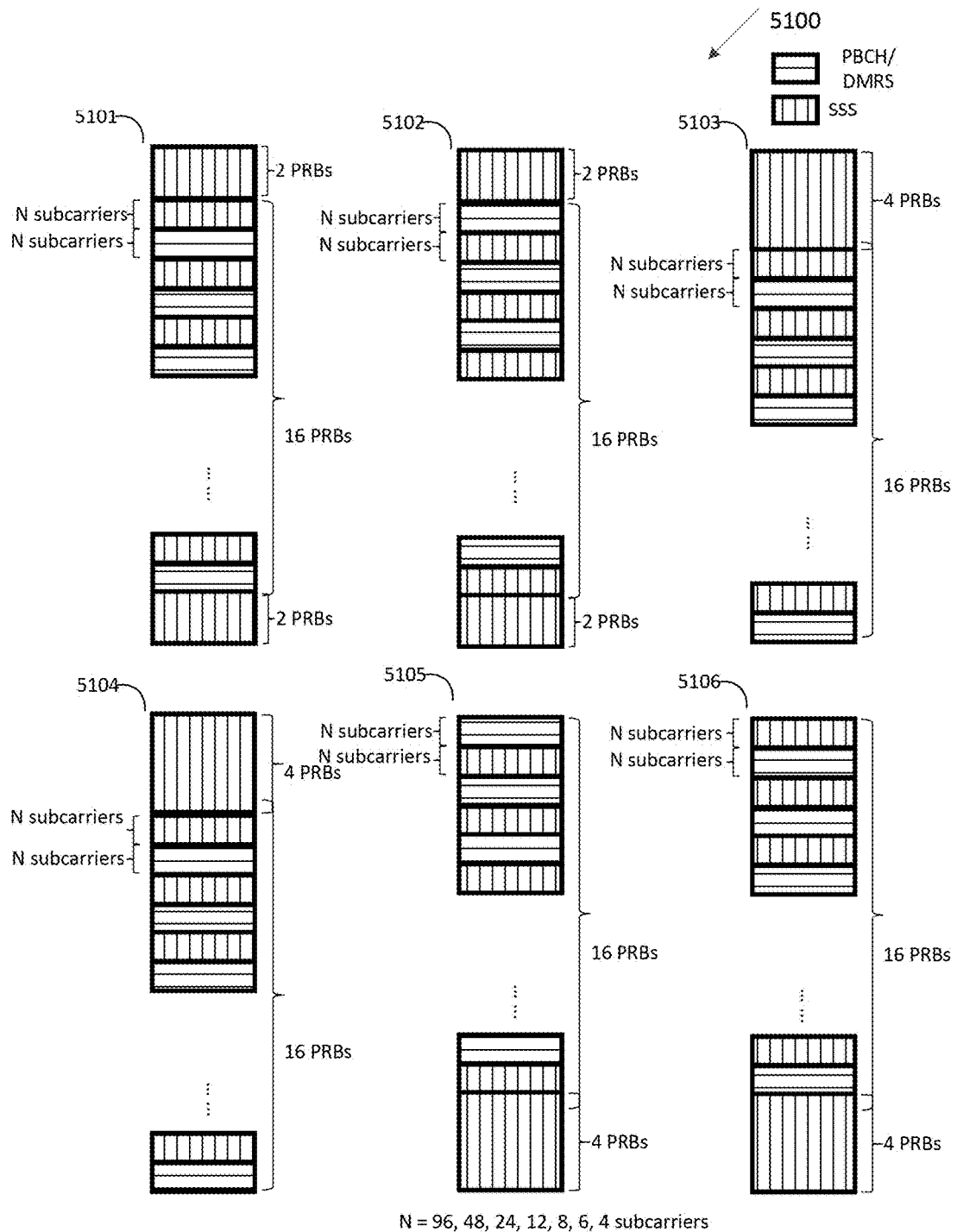
FIG. 51 illustrates an example FDMed NR-PBCH and NR-SSS according to embodiments of the present disclosure.

FIG. 51 illustrates an example FDMed NR-PBCH and NR-SSS 5100 according to 5100 embodiments of the present disclosure. The embodiment of the FDMed NR-PBCH and NR-SSS 5100 illustrated in FIG. 51 is for illustration only. FIG. 51 does not limit the scope of this disclosure to any particular implementation In another sub-embodiment, FIG. 51 shows several other examples of allocating REs for NR-PBCH/DMRS and NR-SSS within the symbol. Specifically, the examples in FIG. 51 are based on forming an alternating pattern for NR-PBCH/DMRS and NR-SSS, with each NR-PBCH/DMRS and NR-SSS unit composed of N subcarriers. Here N could be 96, 48, 24, 12, 8, 6, or 4. Since there are 4 more PRBs for NR-SSS compared to NR-PBCH in this symbol, the examples in FIG. 51 differ at how these resources are allocated. Similar to FIG. 50, since the actual NR-SSS is composed of 127 subcarriers, the first 8 subcarriers and last 9 subcarriers for NR-SSS resources are empty in the examples of FIG. 51.

Note that when N=12, this scheme can be considered as PRB-level IFDM of NR-PBCH/DMRS and NR-SSS.

Note that when N=24, or 48, or 96, this scheme can be considered as group-PRB-level IFDM of NR-PBCH/DMRS and NR-SSS.

Some details of the examples in are illustrated as follows.

In one example 5101, the first and last 2 PRBs within the 20 PRBs in this symbol are allocated to NR-SSS. In the middle 16 PRBs, the NR-SSS and NR-PBCH are alternating, with each NR-PBCH followed by NR-SSS.

In one example 5102, the first and last 2 PRBs within the 20 PRBs in this symbol are allocated to NR-SSS. In the middle 16 PRBs, the NR-SSS and NR-PBCH are alternating, with each NR-SSS followed by NR-PBCH.

In one example 5103, the last 4 PRBs within the 20 PRBs in this symbol are allocated to NR-SSS. In the first 16 PRBs, the NR-SSS and NR-PBCH are alternating, with each NR-PBCH followed by NR-SSS.

In one example 5104, the last 4 PRBs within the 20 PRBs in this symbol are allocated to NR-SSS. In the first 16 PRBs, the NR-SSS and NR-PBCH are alternating, with each NR-SSS followed by NR-PBCH.

In one example 5105, the first 4 PRBs within the 20 PRBs in this symbol are allocated to NR-SSS. In the next 16 PRBs, the NR-SSS and NR-PBCH are alternating, with each NR-SSS followed by NR-PBCH.

In one example 5106, the first 4 PRBs within the 20 PRBs in this symbol are allocated to NR-SSS. In the next 16 PRBs, the NR-SSS and NR-PBCH are alternating, with each NR-PBCH followed by NR-SSS.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claims scope. The scope of patented subject matter is defined only by the claims. Moreover, none of the claims are intended to invoke 35 U.S.C. § 112(f) unless the exact words "means for" are followed by a participle.

What is claimed is:

1. A user equipment (UE) for receiving control signals in a wireless communication system, the UE comprising:
a transceiver configured to receive, from a base station (BS), at least one synchronization signal/physical broadcast channel block (SSB) included in a set of SSBs over downlink channels; and
at least one processor operably connected to the transceiver, the at least one processor configured to:
determine a subcarrier spacing (SCS) associated with the at least one SSB included in the set of SSBs based on a carrier frequency range;
detect the at least one SSB included in the set of SSBs comprising a plurality of symbols in a time domain; and
determine a starting time and a transmission duration for the at least one SSB included in the set of SSBs.

2. The UE of claim 1, wherein, for the carrier frequency range from 0 Hz to 7 gigahertz (GHz), the SCS associated with the at least one SSB of the set of SSB is determined from at least one of a 15 kilohertz (kHz), a 30 kHz, or a 60 kHz, and wherein, for the carrier frequency range higher than 7 GHz, the SCS associated with the set of SSB is determined from at least one of a 60 kHz, a 120 kHz, a 240 kHz, a 480 kHz, or a 960 kHz.

3. The UE of claim 1, wherein, for the carrier frequency range from 0 Hz to 7 GHz, at least one of following is determined:
the starting time and the transmission duration of the received SSB included in the set of SSBs associated with the SCS of 15 kHz a same as a starting time and a transmission duration of at least four consecutive SSBs associated with the SCS of 60 kHz; or
the starting time and the transmission duration of the received SSB included in the set of SSBs associated with the SCS of 30 kHz a same as a starting time and a transmission duration of at least two consecutive SSBs associated with the SCS of 60 kHz.

4. The UE of claim 1, wherein, for carrier frequency range higher than 7 GHz, at least one of following is determined:
the starting time and the transmission duration of the received SSB included in the set of SSBs associated with the SCS of 60 kHz a same as a starting time and a transmission duration of at least four consecutive SSBs associated with the SCS of 240 kHz;
the starting time and the transmission duration of the received SSB included in the set of SSBs associated with the SCS of 240 kHz a same as a starting time and a transmission duration of at least two consecutive SSBs associated with the SCS of 480 kHz;
the starting time and the transmission duration of the received SSB included in the set of SSBs associated with the SCS of 120 kHz a same as a starting time and a transmission duration of at least four consecutive SSBs associated with the SCS of 480 kHz;
the starting time and the transmission duration of the received SSB included in the set of SSBs associated with the SCS of 480 kHz a same as a starting time and a transmission duration of at least two consecutive SSBs associated with the SCS of 960 kHz; or
the starting time and the transmission duration of the received SSB included in the set of SSBs associated with the SCS of 240 kHz a same as a starting time and a transmission duration of at least four consecutive SSBs associated with the SCS of 960 kHz.

5. A base station (BS) for transmitting control signals in a wireless communication system, the BS comprising:
at least one processor configured to:
determine a subcarrier spacing (SCS) for a set of synchronization signal/physical broadcast channel blocks (SSBs) based on a carrier frequency range;
generate the set of SSBs comprising a plurality of symbols in a time domain using the determined SCS;
determine a transmission window associated with the set of SSBs in the time domain, wherein the set of SSBs is confined in the transmission window; and
determine a starting time and a transmission duration for each SSB of the set of SSBs that is confined in the transmission window; and
a transceiver operably connected to the at least one processor, the transceiver configured to transmit, to a user equipment (UE), the set of SSBs at the determined starting time and with the determined transmission duration over downlink channels.

6. The BS of claim 5, wherein the at least one processor is further configured to:
determine, for the carrier frequency range from 0 Hz to 7 gigahertz (GHz), the SCS associated with the set of SSBs from at least one of a 15 kilohertz (kHz), a 30 kHz, or a 60 kHz; and
determine, for the carrier frequency range higher than 7 GHz, the SCS associated with the set of SSBs from at least one of a 60 kHz, a 120 kHz, a 240 kHz, a 480 kHz, or a 960 KHz.

7. The BS of claim 5, wherein the at least one processor is further configured to:
determine a set of symbols before the determined starting time of at least one of an SSB or a group of SSBs included in the set of SSBs, the set of symbols being reserved for performing a listen-before-talk (LBT);
determine a set of spatial reception parameters for performing the LBT and a channel occupancy time (COT) associated with the LBT; and
determine a set of spatial transmission parameters for a transmission of at least one of the SSB or the group of SSBs included in the set of SSBs in the COT associated with the LBT.

8. The BS of claim 7, wherein:
the set of symbols reserved for performing the LBT is pre-defined when the LBT is performed with a fixed sensing duration; and
the set of symbols reserved for performing the LBT is at least one of predefined or configurable when the LBT is performed with a configurable sensing duration and an adaptable contention window size.

9. The BS of claim 7, wherein a spatial area corresponding to the set of spatial reception parameters for performing the LBT is a superset of a spatial area corresponding to the set of spatial transmission parameters for the transmission of at least one of the SSB or the group of SSBs in the COT associated with the LBT.

10. The BS of claim 5, wherein the transceiver is further configured to transmit at least one of the SSB or the group of SSBs included in the set of SSBs in a COT associated with the LBT using the determined spatial transmission parameters after the LBT is successfully performed.

11. The BS of claim 5, wherein the at least one processor is further configured to configure, for the carrier frequency range from 0 Hz to 7 GHz, at least one of:
the starting time and the transmission duration of each SSB of the set of SSBs associated with the SCS of 15 kHz as a starting time and a transmission duration of at least four consecutive SSBs associated with the SCS of 60 kHz; or the starting time and the transmission duration of each SSB of the set of SSBs associated with the SCS of 30 kHz as a starting time and a transmission duration of at least two consecutive SSBs associated with the SCS of 60 kHz.

12. The BS of claim 5, wherein the at least one processor is further configured to configure, for carrier frequency range higher than 7 GHz, at least one of:
the starting time and a transmission duration of each SSB of the set of SSBs associated with the SCS of 60 kHz as a starting time and a transmission duration of at least four consecutive SSBs associated with the SCS of 240 kHz;
the starting time and the transmission duration of each of the SSBs associated with the SCS of 240 kHz as a starting time and a transmission duration of at least two consecutive SSBs associated with the SCS of 480 kHz;
the starting time and the transmission duration of each of the SSBs associated with the SCS of 120 kHz as a starting time and a transmission duration of at least four consecutive SSBs associated with the SCS of 480 kHz;
the starting time and the transmission duration of each of the SSB associated with the SCS of 480 kHz as a starting time and a transmission duration of at least two consecutive SSBs associated with the SCS of 960 kHz; or
the starting time and the transmission duration of each of the SSB associated with the SCS of 240 kHz as a starting time and a transmission duration of at least four consecutive SSBs associated with the SCS of 960 kHz.

13. A method of a base station (BS) for transmitting control signals in a wireless communication system, the method comprising:
determining a subcarrier spacing (SCS) for a set of synchronization signal/physical broadcast channel blocks (SBBs) based on a carrier frequency range;
generating the set of SSBs comprising a plurality of symbols in a time domain using the determined SCS;
determining a transmission window associated with the set of SSBs in the time domain, wherein the set of SSBs is confined in the transmission window;
determining a starting time and a transmission duration for each SSB of the set of SSBs that is confined in the transmission window; and
transmitting, to a user equipment (UE), the set of SSBs at the determined starting time and with the determined transmission duration over downlink channels.

14. The method of claim 13, wherein, for the carrier frequency range from 0 Hz to 7 GHz, the SCS associated with the set of SSB is determined from at least one of a 15 kilohertz (kHz), a 30 kHz, or a 60 kHz, and wherein, for the carrier frequency range higher than 7 GHz, the SCS associated with the set of SSB is determined from at least one of a 60 kHz, a 120 kHz, a 240 kHz, a 480 kHz, or a 960 kHz.

15. The method of claim 13, wherein:
a set of symbols before the starting time of at least one of an SSB or a group of SSBs included in the set of SSBs is determined, the set of symbols being reserved for performing a listen-before-talk (LBT);
a set of spatial reception parameters for performing the LBT and a channel occupancy time (COT) associated with the LBT is determined; and
a set of spatial transmission parameters for a transmission of at least one of the SSB or the group of SSBs included in the set of SSBs in the COT associated with the LBT is determined.

16. The method of claim 15, wherein:
the set of symbols reserved for performing the LBT is pre-defined when the LBT is performed with a fixed sensing duration; and
the set of symbols reserved for performing the LBT is at least one of predefined or configurable when the LBT is performed with a configurable sensing duration and an adaptable contention window size.

17. The method of claim 15, wherein, a spatial area corresponding to the set of spatial reception parameters for performing the LBT is a superset of a spatial area corresponding to the set of spatial transmission parameters for the transmission of at least one of the SSB or the group of SSBs in the COT associated with the LBT.

18. The method of claim 13, further comprising transmitting at least one of the SSB or the group of SSBs included in the set of SSBs in a COT associated with the LBT using the determined spatial transmission parameters after the LBT is successfully performed.

19. The method of claim 13, wherein, for the carrier frequency range from 0 Hz to 7 GHz, at least one of following is configured:
the starting time and the transmission duration of each SSB of the set of SSBs associated with the SCS of 15 kHz as a starting time and a transmission duration of at least four consecutive SSBs associated with the SCS of 60 kHz; or
the starting time and the transmission duration of each SSB of the set of SSBs associated with the SCS of 30 kHz as a starting time and a transmission duration of at least two consecutive SSBs associated with the SCS of 60 kHz.

20. The method of claim 13, wherein, for carrier frequency range higher than 7 GHz, at least one of following is configured:
the starting time and a transmission duration of each SSB of the set of SSBs associated with the SCS of 60 kHz as a starting time and a transmission duration of at least four consecutive SSBs associated with the SCS of 240 kHz;
the starting time and the transmission duration of each of the SSBs associated with the SCS of 240 kHz as a starting time and a transmission duration of at least two consecutive SSBs associated with the SCS of 480 kHz;
the starting time and the transmission duration of each of the SSBs associated with the SCS of 120 kHz as a starting time and a transmission duration of at least four consecutive SSBs associated with the SCS of 480 kHz;
the starting time and the transmission duration of each of the SSB associated with the SCS of 480 kHz as a starting time and a transmission duration of at least two consecutive SSBs associated with the SCS of 960 kHz; or
the starting time and the transmission duration of each of the SSB associated with the SCS of 240 kHz as a starting time and a transmission duration of at least four consecutive SSBs associated with the SCS of 960 kHz.

* * * * *